United States Patent [19]

Bachman et al.

[11] 4,318,182

[45] Mar. 2, 1982

[54] DEADLOCK DETECTION AND PREVENTION MECHANISM FOR A COMPUTER SYSTEM

[75] Inventors: Charles W. Bachman, Lexington; Jacques Bouvard, Wellesley, both of Mass.

[73] Assignee: Honeywell Information Systems Inc., Waltham, Mass.

[21] Appl. No.: 462,552

[22] Filed: Apr. 19, 1974

[51] Int. Cl.³ .............................................. G06F 15/16
[52] U.S. Cl. .................................... 364/200; 364/300
[58] Field of Search .................... 340/172.5; 445/1; 444/1; 364/200 MS File, 300, 900 MS File

[56] References Cited

U.S. PATENT DOCUMENTS

| | | | |
|---|---|---|---|
| 3,603,935 | 9/1971 | Moore | 445/1 |
| 3,641,505 | 2/1972 | Artz et al. | 445/1 |
| 3,648,252 | 3/1972 | Thron et al. | 445/1 |
| 3,648,253 | 3/1972 | Mullery et al. | 445/1 |
| 3,665,404 | 5/1972 | Werner | 445/1 |
| 3,676,860 | 7/1972 | Collier et al. | 445/1 |
| 3,676,861 | 7/1972 | Ruth | 445/1 |
| 3,753,234 | 8/1973 | Gilbert et al. | 445/1 |

OTHER PUBLICATIONS

Ivan Flores, Operating System for Multiprogramming with a Variable Number of Tasks, Allyn and Bacon, Inc., Boston, 1973, pp. 204-216.

*Primary Examiner*—Charles E. Atkinson
*Attorney, Agent, or Firm*—Nicholas Prasinos

[57] ABSTRACT

A method and apparatus for detecting a deadlock condition where two or more processes are waiting for events which cannot happen. Firmware is provided to examine the request of a first process of a group of processes for assignment of a first resource of a group of resources, and to determine whether said first resource is or is not currently assigned to a second process of said group of processes which said second process is already waiting directly or indirectly for a second resource of said group of resources which said second resource is currently assigned to the said first process.

12 Claims, 117 Drawing Figures

| RESOURCE CLASS | ACCESS TYPE | |
|---|---|---|
| | EXCLUSIVE | SHAREABLE |
| 1 RESOURCE OCCURRENCE | BINARY SEMAPHORE FOR EXCLUSIVE ACCESS (CASE 1) | BINARY SEMAPHORE FOR SHARED ACCESS (CASE 3) |
| MANY RESOURCE OCCURRENCE | GENERAL SEMAPHORE FOR EXCLUSIVE ACCESS (CASE 2) | GENERAL SEMAPHORE FOR SHARED ACCESS (CASE 4) |

*FIG. 1F*

| REQUEST MODE OF PROCESS | | | |
|---|---|---|---|
| | EXCLUSIVE | ASSIGN | WAIT IF NO DEADLOCK | WAIT IF NO DEADLOCK |
| | SHAREABLE | ASSIGN | WAIT IF NO DEADLOCK | ASSIGN |
| CURRENT STATE OF RESOURCE | | AVAILABLE | EXCLUSIVELY ASSIGNED | SHAREABLY ASSIGNED |

*FIG. 1K*

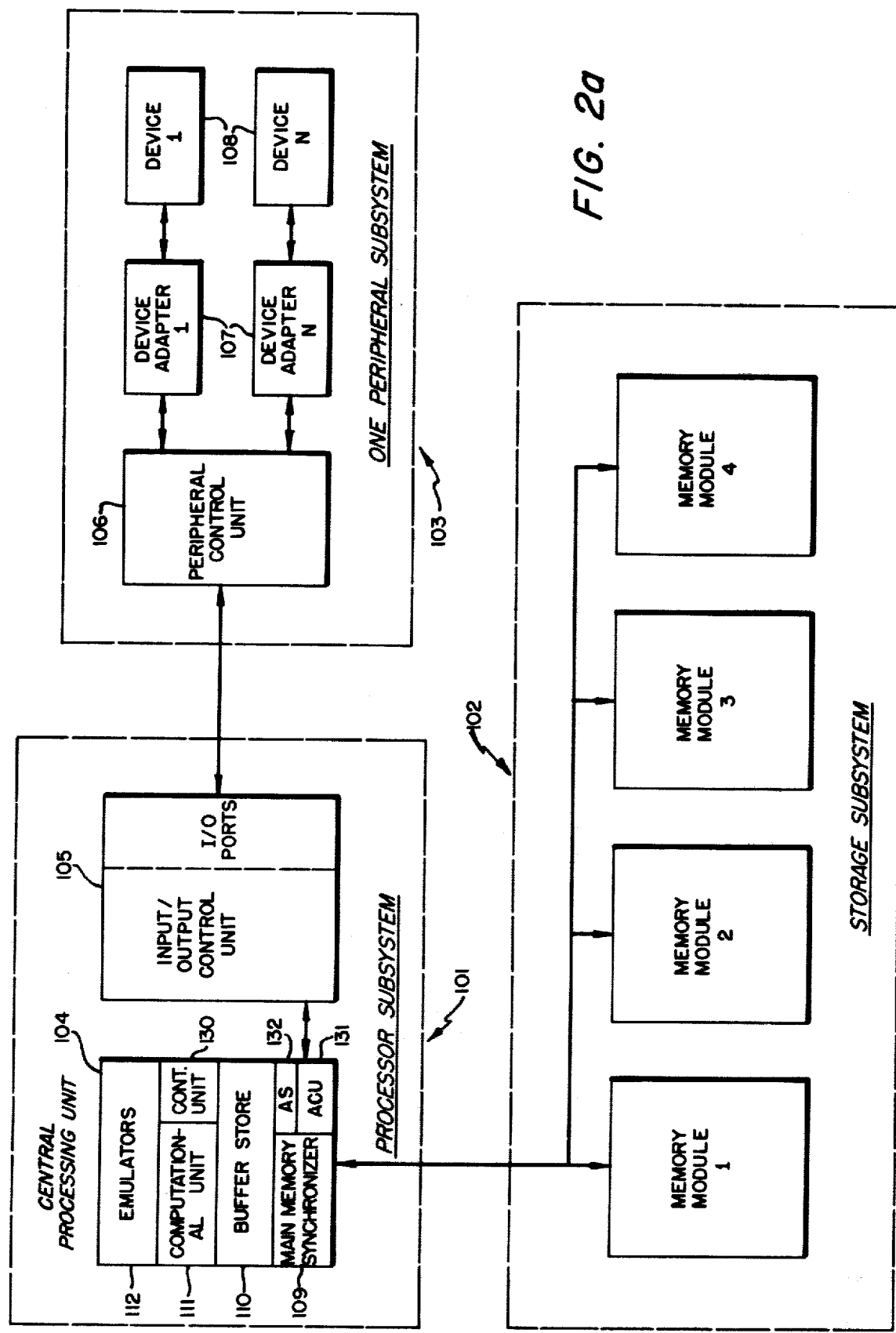

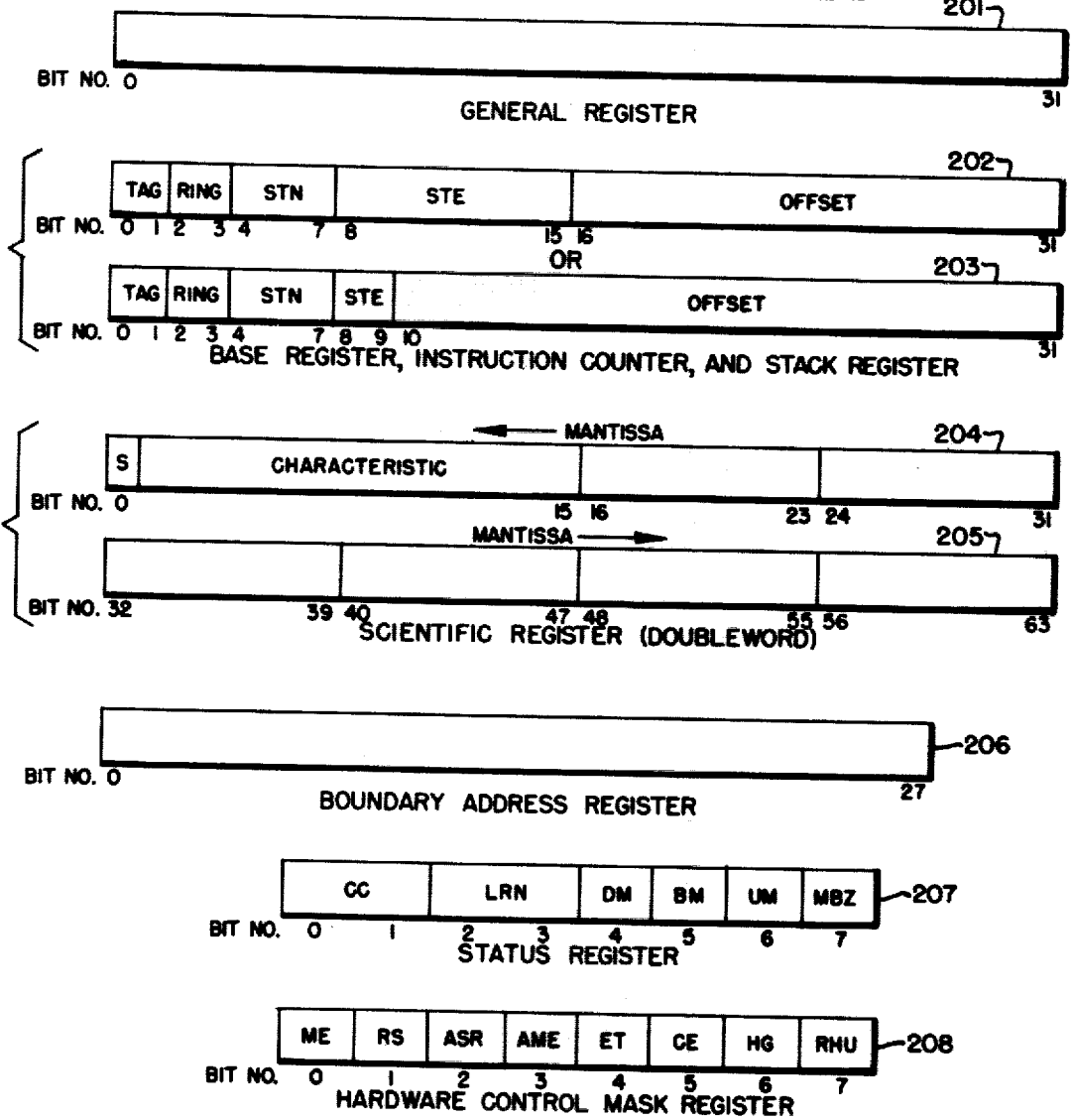

| MEMORY LOCATION | | | | | NAME: | |
|---|---|---|---|---|---|---|
| -40 | CURRENT STATE ENTRY TIME | | | | CET | ⎫ |
| -32 | READY TIME ACCOUNTING | | | | RTA | ⎬ OPTIONAL |
| -24 | WAITING TIME ACCOUNTING | | | | WTA | |
| -16 | RUNNING TIME ACCOUNT | | | | RUA | |
| -8 | RESIDUAL TIME OUT | | | | RTO | ⎭ |
| PCB ADDRESS → 0 | CAPABILITY | PRIORITY | STATE | DEXT | PMW #0 | |
| 4 | STATUS | MBZ | MP | MBZ | PMW #1 | |
| 8 | | | | | PMW #2 | |
| 12 | DETSZ | DETA | | | PMW #3 | |
| 16 | STWSZ | STWA | | | ASW #0 | |
| 20 | STWSZ | STWA | | | ASW #1 | |
| 24 | | | | | EXW | |
| 28 | T CONTENTS | | | | SKW | |
| 32 | IC CONTENTS | | | | ICW | |
| 36 | MBZ | | | | | |
| 40 | | | | | SBW #0 | |
| 44 | | | | | SBW #1 | |
| 48 | | | | | SBW #2 | |
| 52 – 80 | BASE REGISTERS SAVING AREA (8 WORDS) | | | | | |
| 84 – 144 | GENERAL REGISTERS SAVING AREA (16 WORDS) | | | | | |
| 148 – 176 | SCIENTIFIC REGISTERS SAVING AREA (8 WORDS) | | | | | ⎫ OPTIONAL ⎭ |

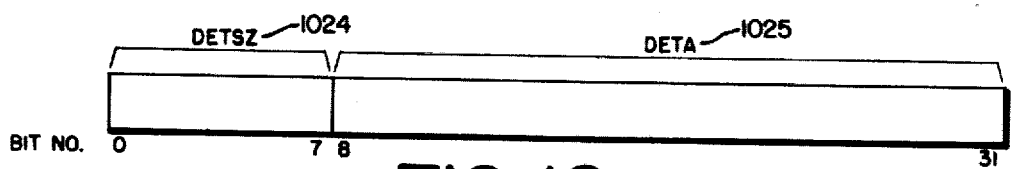
FIG. 10g
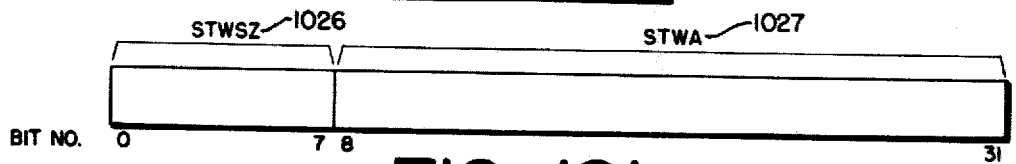
FIG. 10h
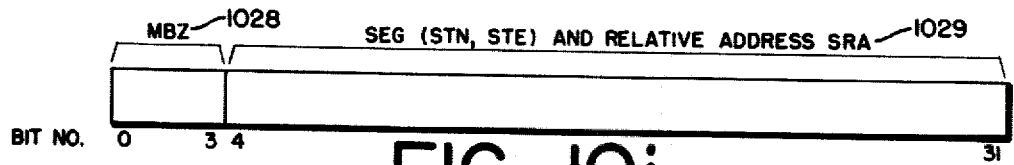
FIG. 10i
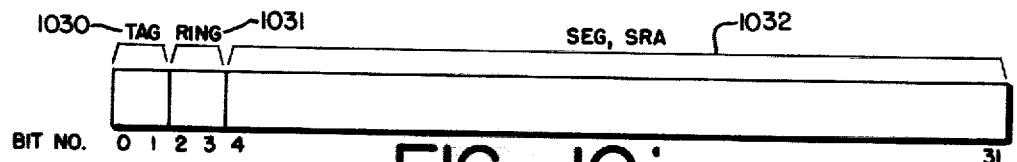
FIG. 10j
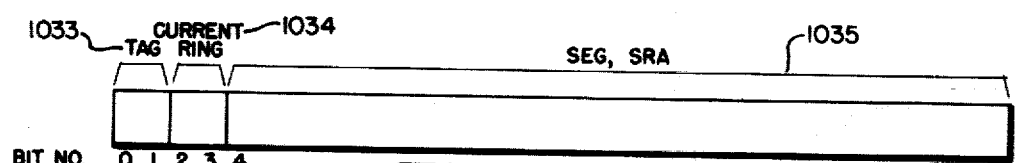
FIG. 10k
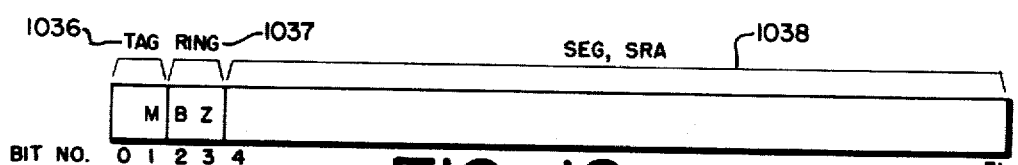
FIG. 10ℓ

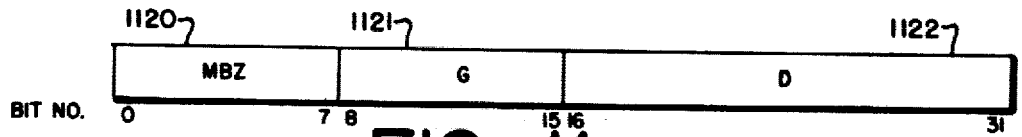
FIG. 11g
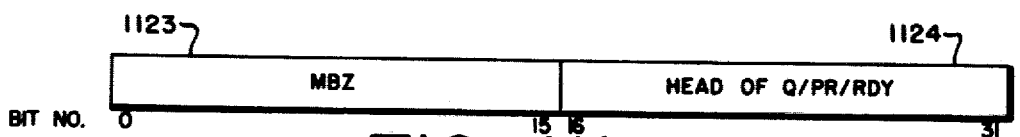
FIG. 11h
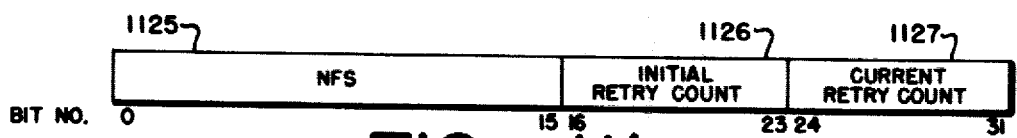
FIG. 11i
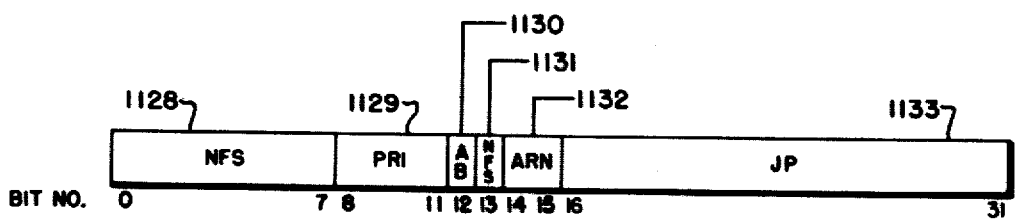
FIG. 11j
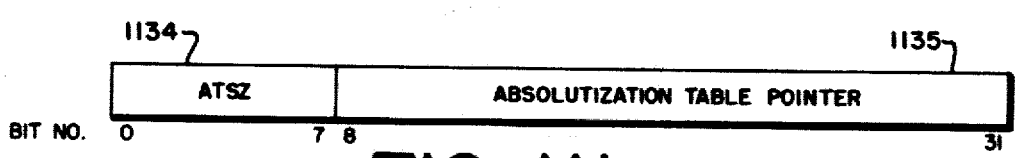
FIG. 11k
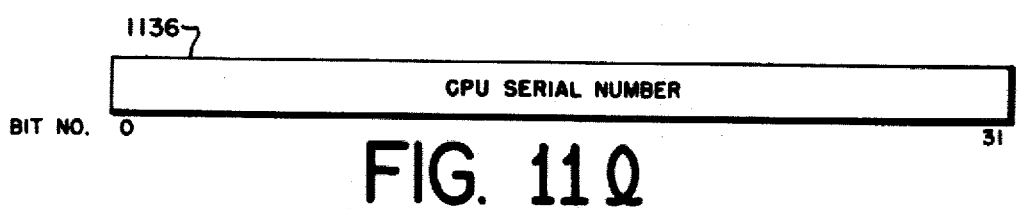
FIG. 11ℓ

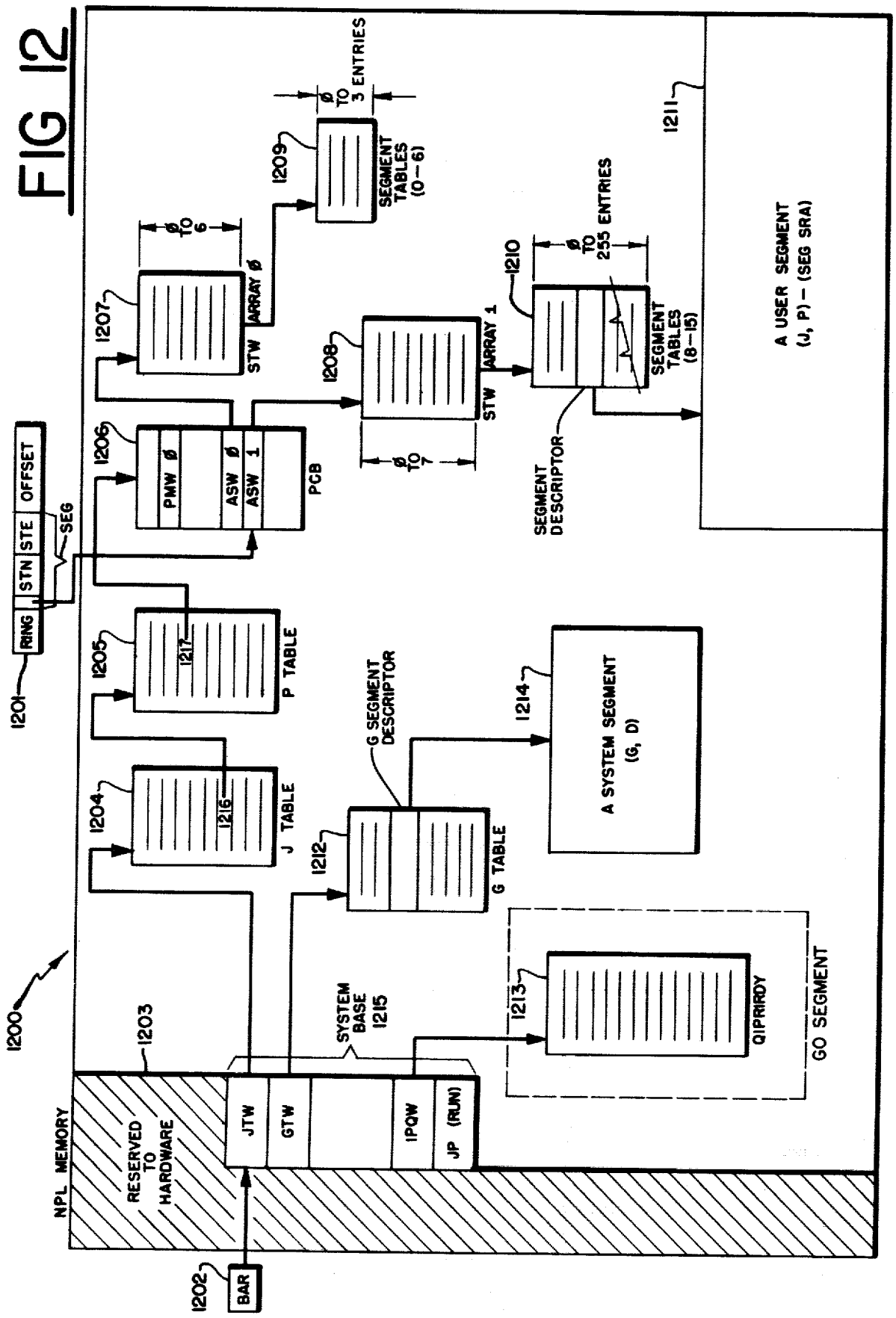

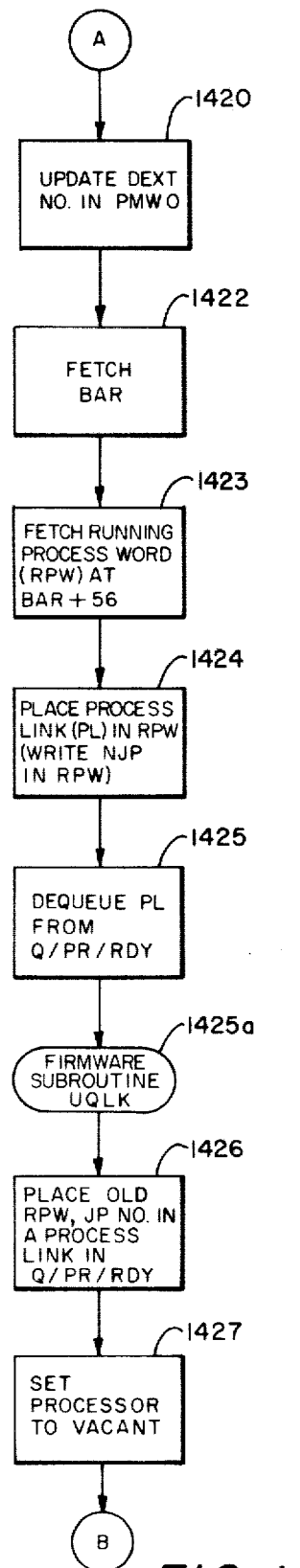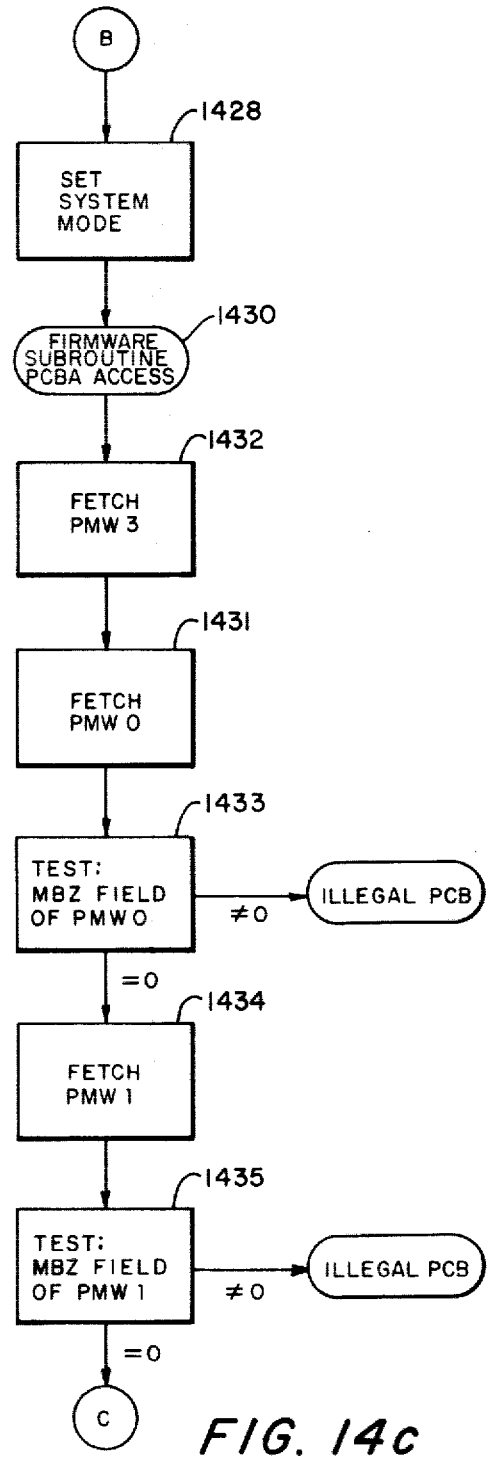
FIG. 14b
FIG. 14c

SEMAPHORE WITHOUT A MESSAGE

| STAG | S M C | SCT | |
|---|---|---|---|
| 0  3 | 4          15 | 16         31 | 1600 |
| PQ HP (ev--epd) | | TEP (pr--ro) | |
| 32         47 | | 48         63 | |

*Fig. 16A.*

SEMAPHORE WITH MESSAGE

| STAG | SMC | MBZ | |
|---|---|---|---|
| 0  3 | 4          15 | 16         31 | 1602 |
| PQHP/MQHP | | MQTP | |
| 32         47 | | 48         63 | |

*Fig. 16B.*

PROCESS LINK SEMAPHORE

| STAG | SMC | M BZ | |
|---|---|---|---|
| 0  3 | 4          15 | 16         31 | 901 |
| N F S | | P L Q P | |
| 32         47 | | 48         63 | |

*Fig. 16C.*

FREE LINK SEMAPHORE

| STAG | MBZ | FLSCT | |
|---|---|---|---|
| 0  3 | 4          15 | 16         31 | 1504 |
| PQHP | | FLQP | |
| 32         47 | | 48         63 | |
| MBZ | G | CCT | |
| 64  71 | 72         79 | 80         95 | |

*Fig. 16D.*

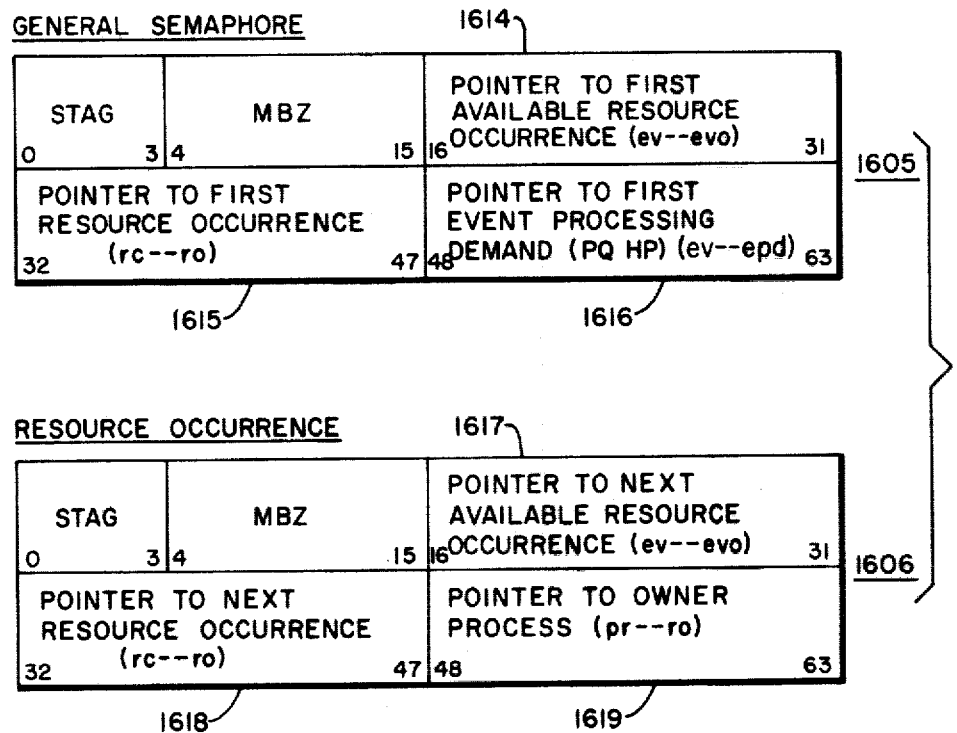
FIG.16E
FIG.16F
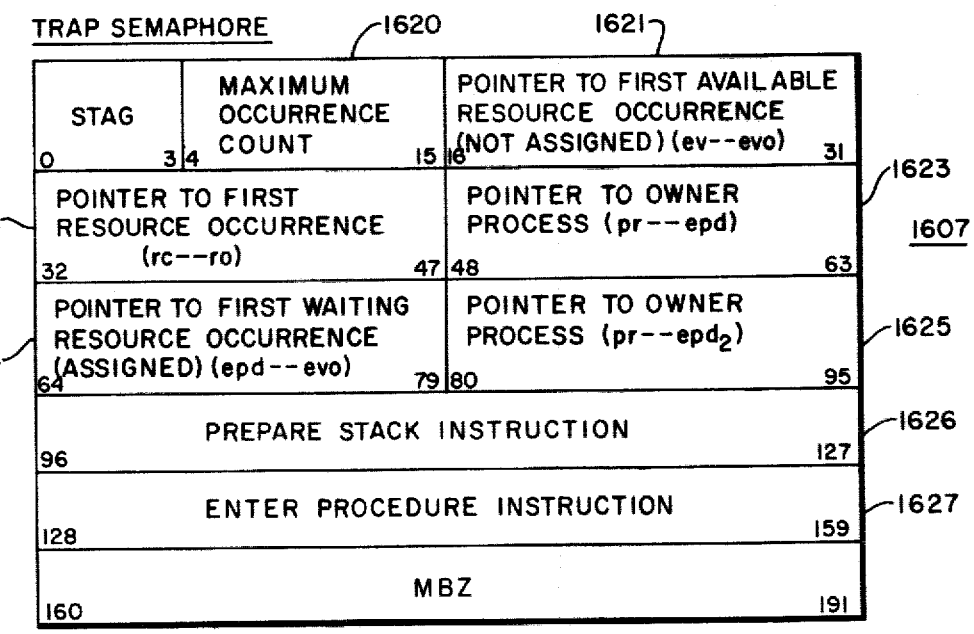
FIG.16G

FIG. 16H

TRAP RESOURCE OCCURRENCE 1628

| STAG | MBZ | POINTER TO NEXT AVAILABLE RESOURCE OCCURRENCE (ev--evo) |
|---|---|---|
| 0    3 | 4    15 | 16    31 |
| POINTER TO NEXT RESOURCE OCCURRENCE (rc--ro) | | POINTER TO OWNER PROCESS (pr--ro) |
| 32    47 | | 48    63 |
| POINTER TO NEXT WAITING RESOURCE OCCURRENCE (epd--evo) | | MBZ |
| 64    79 | | 80    95 |
| MBZ | | |
| 96    127 | | |

EXTENDED SEMAPHORE 1633    1634

| STAG | MBZ | POINTER TO FIRST AVAILABLE RESOURCE OCCURRENCE (ev--evo) |
|---|---|---|
| 0    3 | 4    15 | 16    31 |
| POINTER TO FIRST RESOURCE OCCURRENCE (rc--ro) | | POINTER TO FIRST EVENT PROCESSING DEMAND (ev--epd) |
| 32    47 | | 48    63 |

GATE
EVENT PROCESSING DEMAND 1637    1638

| STAG | MAXIMUM OCCURRENCE COUNT | POINTER TO NEXT EVENT VARIABLE (ev--epd) |
|---|---|---|
| 0    3 | 4    15 | 16    31 |
| POINTER TO FIRST PROCESS WAITING (epd--pr) | | POINTER TO OWNER PROCESS (pr--epd₁) |
| 32    47 | | 48    63 |
| POINTER TO FIRST WAITING RESOURCE OCCURRENCE (ASSIGNED) (epd--evo) | | MBZ |
| 64    79 | | 80    95 |
| MBZ | | |
| 96    127 | | |

TRAP EVENT PROCESSING DEMAND

| STAG (0-3) | MAXIMUM OCCURRENCE COUNT (4-15) | POINTER TO NEXT EVENT VARIABLE (ev--epd) (16-31) |
|---|---|---|
| POINTER TO FIRST PROCESS (epd--pr) (32-47) | | POINTER TO OWNER PROCESS (pr--epd₁) (48-63) |
| POINTER TO FIRST WAITING RESOURCE OCCURRENCE (ASSIGNED) (epd--evo) (64-79) | | POINTER TO NEXT EVENT PROCESSING DEMAND (pr--epd₂) (80-95) |
| PREPARE STACK INSTRUCTION (96-127) | | |
| ENTER PROCEDURE INSTRUCTION (128-159) | | |
| MBZ (160-191) | | |

- 1643: STAG
- 1644: POINTER TO NEXT EVENT VARIABLE
- 1645: POINTER TO FIRST PROCESS
- 1646: POINTER TO OWNER PROCESS
- 1647: POINTER TO FIRST WAITING RESOURCE OCCURRENCE
- 1648: POINTER TO NEXT EVENT PROCESSING DEMAND
- 1649: PREPARE STACK INSTRUCTION
- 1650: ENTER PROCEDURE INSTRUCTION
- 1611

FIG.16L

EXTENDED RESOURCE OCCURRENCE

| STAG (0-3) | MBZ (4-15) | POINTER TO NEXT AVAILABLE RESOURCE OCCURRENCE (ev--evo) (16-31) |
|---|---|---|
| POINTER TO NEXT RESOURCE OCCURRENCE (rc--ro) (32-47) | | POINTER TO OWNER PROCESS (pr--ro) (48-63) |
| POINTER TO NEXT WAITING RESOURCE OCCURRENCE (epd--evo) (64-79) | | MBZ (80-95) |
| MBZ (96-127) | | |

- 1651: MBZ
- 1652: POINTER TO NEXT AVAILABLE RESOURCE OCCURRENCE
- 1653: POINTER TO NEXT RESOURCE OCCURRENCE
- 1654: POINTER TO OWNER PROCESS
- 1655: POINTER TO NEXT WAITING RESOURCE OCCURRENCE
- 1656: MBZ
- 1612

FIG.16M

PROCESS LINK

| POINTER TO NEXT PROCESS LINK OR ZERO (ev--epd) (0-15) | (16) | PRI | AB | (28) | ARN (31) |
|---|---|---|---|---|---|
| JP (OF PROCESS) (32-47) | | SEMAPHORE SEGMENT RELATIVE ADDRESS D (48-63) | | | |

- 1657: POINTER TO NEXT PROCESS LINK OR ZERO
- 1658, 1659: PRI
- 1660: AB
- 1661, 1662: ARN
- 1663: JP (OF PROCESS)
- 1664: SEMAPHORE SEGMENT RELATIVE ADDRESS
- 1613

BINARY SEMAPHORE (SHARED ACCESS)

| STAG | SMC ┌1670 | SCT ┌1671 |
|---|---|---|
| 0   3 | 4          15 | 16                          31 |
| POINTER TO FIRST PROCESS (ev--epd) | | POINTER TO FIRST RESOURCE OBJECT ASSIGNMENT (ro--roa) |
| 32                                     47 | | 48                          63 |
| 1672 | | 1673 |

FIG. 16N

RESOURCE OBJECT ASSIGNMENT

| STAG | MBZ ┌1674 | MODE ┌1675 | POINTER TO NEXT RESOURCE OBJECT ASSIGNMENT (ro--roa) ┌1676 |
|---|---|---|---|
| 0   3 | 4        14 | 15 | 16                          31 |
| POINTER TO NEXT RESOURCE OBJECT ASSIGNMENT (pr--roa) | | | MBZ |
| 32                                    47 | | | 48                          63 |
| 1677 | | | 1678 |

FIG. 16O

RESOURCE OCCURRENCE (SHARED ACCESS)

| STAG | MBZ ┌1679 | POINTER TO NEXT AVAILABLE RESOURCE OCCURRENCE (ev--evo) ┌1680 |
|---|---|---|
| 0   3 | 4          15 | 16                          31 |
| POINTER TO NEXT RESOURCE OCCURRENCE (rc--ro) | | POINTER TO FIRST RESOURCE OBJECT ASSIGNMENT (pr--roa) |
| 32                                    47 | | 48                          63 |
| 1681 | | 1682 |

FIG. 16P

| ADDRESS IN HEX | CONTENTS | CODE |
|---|---|---|
| 00 | GR0 | GR0 |
| 01 | GR1 | GR1 |
| 02 | GR2 | GR2 |
| 03 | GR3 | GR3 |
| 04 | GR4 | GR4 |
| 05 | GR5 | GR5 |
| 06 | GR6 | GR6 |
| 07 | GR7 | GR7 |
| 08 | GR8/IR0 | GR8 |
| 09 | GR9/IR1 | GR9 |
| 0A | GR10/IR2 | GRA |
| 0B | GR11/IR3 | GRB |
| 0C | GR12/IR4 | GRC |
| 0D | GR13/IR5 | GRD |
| 0E | GR14/IR6 | GRE |
| 0F | GR15/IR7 | GRF |
| 10 | SR0-UPPER | S0U |
| 11 | SR0-LOWER | S0L |
| 12 | SR1-UPPER | S1U |
| 13 | SR1-LOWER | S1L |
| 14 | SR2-UPPER | S2U |
| 15 | SR2-LOWER | S2L |
| 16 | SR3-UPPER | S3U |
| 17 | SR3-LOWER | S3L |
| 18 | CURRENT JP PCB ADDRESS | CJA |
| 19 | CURRENT JP NO. & PRIORITY | CJP |
| 1A | PMW NO. 0 | CJQ |
| 1B | PMW NO. 3 | PW3 |
| 1C | ASW NO. 0 | AS0 |
| 1D | ASW NO. 1 | AS1 |
| 1E | ICW | ICW |
| 1F | BAR | BAR |
| 20 | SBW NO. 0 | SB0 |
| 21 | SBW NO. 1 | SB1 |
| 22 | SBW NO. 2 | SB2 |
| 23 | T-REG | TRG |
| 24 | GTW | GTW |
| 25 | JTW | JTW |
| 26 | NEW JP PCB ADDRESS | NJA |
| 27 | NEW JP PCB PRIORITY | NJP |
| 28 | NEW JP PMW NO. 0 | NJQ |
| 29 | INTERNAL PROCESSOR QUEUE WORD | IQW |
| 2A | RPW ADDRESS | RPA |
| 2B | +1 | PL1 |
| 2C | +4 | PL4 |
| 2D | EXW | EXW |
| 2E | RESERVED | W2E |
| 2F | RESERVED | W2F |
| 30 ↓ 3F | 16 WORKING LOCATIONS | W30 ↓ W3F |
| 40 ↓ 4F | 16 STW'S (1 DUMMY) | SW0 ↓ SWF |
| 50 ↓ 7F | 48 UNASSIGNED LOCATIONS | |
| 80 ↓ BF | 64 IMAGE AREA LOCATIONS | I80 ↓ IBF |
| C0 ↓ FF | 64 WORKING LOCATIONS | WC0 ↓ WFF |

| LOCATION | WORD STORED | [SUBROUTINE] | LOCATION | WORD STORED | [SUBROUTINE] |
|---|---|---|---|---|---|
| W28 | PMW #0 (NJP) | [PCBA] | WE1 | | |
| W29 | IPQW NORD | | WE2 | | |
| W2A | | | WE3 | | |
| W2B | +1 | | WE4 | TEMP. REG #0 | |
| W2C | +4 | | WE5 | TEMP. REG #1 | |
| W2D | | | WE6 | TEMP. REG #2 | |
| W2E | | | WE7 | TEMP. REG #3 | |
| W2F | | | WE8 | UPL | [SPLQ] |
| WC0 | SEGMENTED SEMAPHORE ADDRESS | [SF] | WE9 | UNL | [SPLQ] |
| WC1 | SEMAPHORE DESCRIPTION | [SF] | WEA | QHP | [JPDQ] |
| WC2 | | | WEB | SREL | [JPDQ] |
| WC3 | | | WEC | ULK | [JPDQ] |
| WC4 | SEMAPHORE WORD #0 | [SF] | WED | | |
| WC5 | SEMAPHORE WORD #1 | [SF] | WEE | | |
| WC6 | | | WEF | | |
| WC7 | INCREMENTED(DECREMENTED)SCT [FLSCT] | [SF] | WF0 | | |
| WC8 | PCB+84 GR0 | [RNP] | WF1 | | |
| WC9 | GO SEGMENT | | WF2 | | |
| WCA | FLS WORD #0 ADDRESS | [FLSC] | WF3 | | |
| WCB | FLS WORD #0 | [FLSC] | WF4 | | |
| WCC | FLS WORD #1 | [FLSC] | WF5 | | |
| WCD | FLS WORD #2 | [FLSC] | WF6 | | |
| WCE | | | WF7 | | |
| WCF | | | WF8 | | |
| WD0 | | | WF9 | | |
| WD1 | GO BASE ADDRESS | [FGO] | WFA | | |
| WD2 | FLSP | [FLSC] | WFB | | |
| WD3 | NEW IPQW WORD | [JF] | WFC | | |
| WD4 | | | WFD | | |
| WD5 | | | WFE | | |
| WD6 | HEAD LINK Q/PR/RDY WORD #0 | | WFF | | |
| WD7 | RPW ADDRESS | | W30 | ML,PL ABSOLUTE ADDRESS | [FAR] |
| WD8 | | | W31 | ML,PL RELATIVE ADDRESS | [PRIQ,FAR] |
| WD9 | | | W32 | ML,PL WORD #0 | [PRIQ,FAR] |
| WDA | | | W33 | ML WORD #0 | [FLSC] |
| WDB | SNL | [PRIQ] | W34 | ML ABSOLUTE ADDRESS | [PM] |
| WDC | SREL | [PRIQ] | W35 | ML RELATIVE ADDRESS | [PM] |
| WDD | ULK | [PRIQ] | W36 | ML WORD #0 | [PM] |
| WDE | LK | [PRIQ] | W37 | | |
| WDF | | | W38 | J,P NAME | |
| WE0 | | | W39 | FREE PL ADDRESS #0 | [TAML,QML] |

*Fig. 19b.*

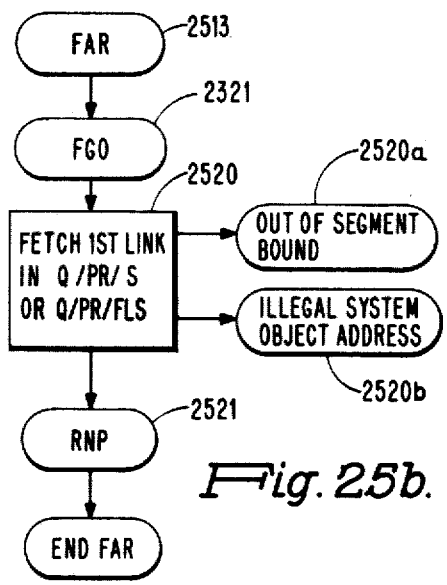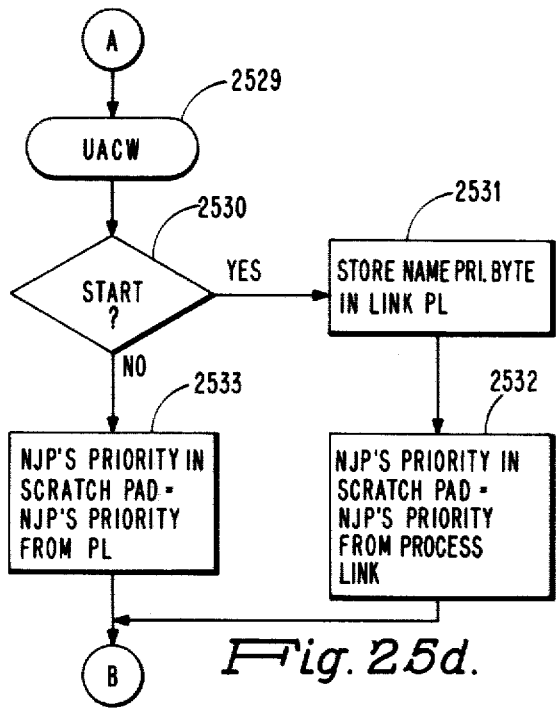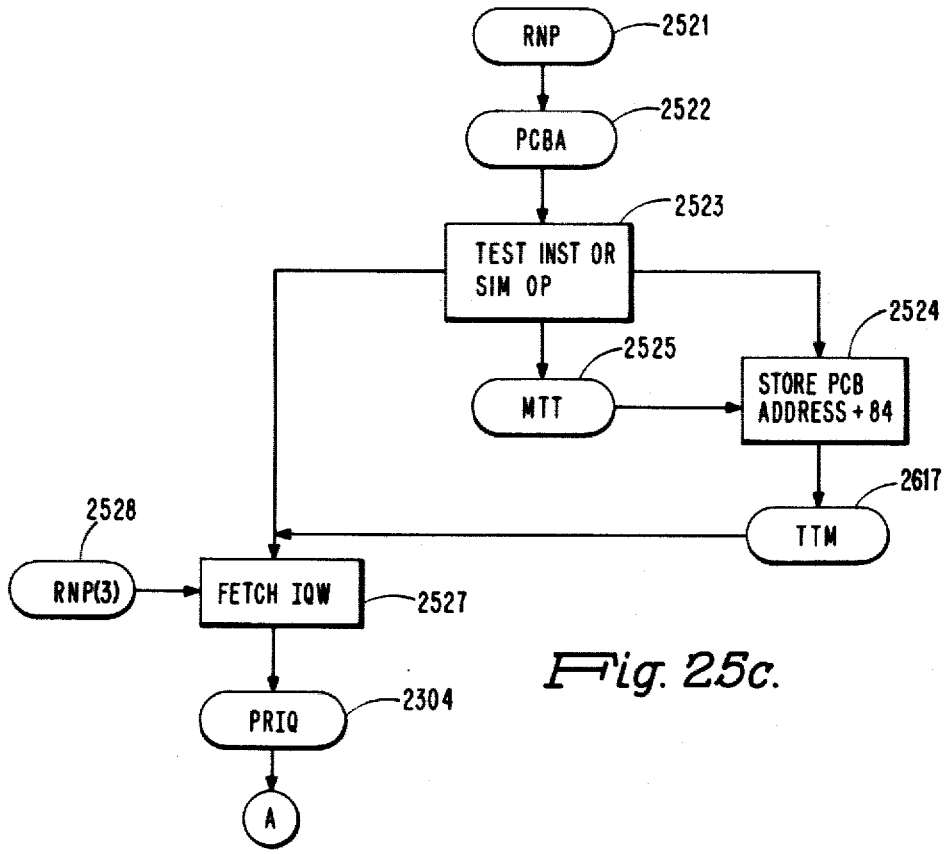
Fig. 25b.
Fig. 25d.
Fig. 25c.

DEADLOCK DETECTION AND PREVENTION MECHANISM FOR A COMPUTER SYSTEM

RELATED APPLICATIONS

The following applications are related the instant application.

1. "Buffer Store" invented by J. L. Curley, T. J. Donahue, W. A. Martland, and B. S. Franklin, filed on Oct. 5, 1972 having Ser. No. 295,301 and assigned to the same assignee named herein, now U.S. Pat. No. 3,820,078.

2. "Variable Masking for Segmented Memory" invented by Wallace A. Martland and John L. Curley, filed on Oct. 5, 1972 having Ser. No. 295,303 and assigned to the same assignee named herein, now U.S. Pat. No. 3,800,292.

3. "Override Hardware for Main Store Sequencer" invented by Thomas J. Donahue, filed on Oct. 5, 1972 having Ser. No. 295,418 and assigned to the same assignee named herein, now U.S. Pat. No. 3,820,081.

4. "Main Memory Sequencer" invented by T. J. Donahue, J. L. Curley, B. S. Franklin, W. A. Martland, and L. V. Cornaro, filed on Oct. 5, 1972 having Ser. No. 295,331 and assigned to the same assignee named herein, now U.S. Pat. No. 3,821,709.

5. "Main Memory Reconfiguration" invented by J. L. Curley, B. S. Franklin, W. A. Martland, T. J. Donahue and L. V. Cornaro filed on Oct. 5, 1972 having Ser. No. 295,417 and assigned to the same assignee named herein, now U.S. Pat. No. 3,796,996.

6. "Segmented Address Development" invented by Jacques Michel Jean Bienvenu, filed on May 16, 1974 and having priority date May 16, 1973 and having Ser. No. 470,496 and assigned to the same assignee named herein.

7. "Protection of Data in an Information Multiprocessing System by Implementing a Concept of Rings to Represent the Different Levels of Privileges Among Processes" invented by Marc Appell, et al, first filed on Nov. 30, 1973 in France and having French Ser. No. 73 42706 and further filed in the United States within the priority convention date of Dec. 2, 1974 and having Ser. No. 528,953 and assigned to the same assignee named herein, now U.S. Pat. No. 4,177,510.

8. "Procedure Calls and Stack Mechanism" invented by Marc Appell, et al, first filed on Nov. 30, 1973 in France having French Ser. No. 73 42705 and assigned to the same assignee named herein and further filed in the United States within the priority convention date of Dec. 2, 1974, and having Ser. No. 529,019 and assigned to the same assignee named herein.

9. "Process Management Structures and Hardware/Firmware Control" invented by Patrick Dufond, et al, first filed on Nov. 30, 1973 in France having French Ser. No. 73 42693 and further filed in the United States within the priority convention date of Dec. 2, 1974, and having U.S. Ser. No. 529,253 and assigned to the same assignee named herein.

10. "P and V Instructions on Semaphores for Process Synchronization" invented by Jacques Bienvenu, et al, first filed on Nov. 30, 1973 in France having French Ser. No. 73 42697 and further filed in the U.S. within the priority convention date of Dec. 2, 1974, and having Ser. No. 529,017 and assigned to the same assignee named herein.

11. "Method for Definition of Computer Architecture" invented by C. W. Bachman and Jacques Bouvard, filed on Nov. 24, 1972, and having U.S. Ser. No. 309,584 and assigned to the same assignee named herein, now abandoned.

12. "An Extended Semaphore Architecture" by C. W. Bachman and Jacques Bouvard, filed on Apr. 19, 1974, and having Ser. No. 462,551 and assigned to the same assignee named herein.

BACKGROUND

1. Field of the Invention

This invention relates generally to computer systems and more particularly to a deadlock detection mechanism for detecting a situation where one or several processes are waiting for events which cannot happen.

2. Description of the Prior Art

Electronic computers have grown from first generation hardware characterized mainly by vacuum tubes, to second generation hardware characterized by transistors, to third generation hardware characterized, in the main, by integrated circuits. Along with these different generations of hardware there were different generations of software, wherein first generation software was characterized mainly by machine language, assemblers and subroutines, and second generation software was characterized by high-level languages, monitors and macro assemblers. Third generation software is characterized by operating systems, on-line real-time systems multiprogramming systems, and data management systems.

The first generation hardware in combination with first generation software, and also the second generation hardware in combination with second generation software were primarily oriented toward batch processing where jobs were executed primarily in serial fashion. Moreover, the third generation of hardware/software systems are also batch-process oriented; however because of the advent of multiprogramming, several jobs may be executed in parallel rather than serial, and permits the acceptance of input information for processing as it is generated.

The fourth generation system will typically be classified as a communication and control system capable of widely diversified processor applications, and will be stimulated primarily by transmitted data rather than by batch programs (i.e. system control will be established primarily by input rather than by operator action) wherein submission of information will generally be in real time.

Processing in first generation hardware/software computer systems was relatively straightforward where the job or program was considered the basic processing unit. For each user initiated job or transaction a program generally ran with little or no interruption until the job or transaction was completed. Many straightforward jobs such as the compilation and execution of a high level language program, such as FORTRAN, could and did run as a single process. More difficult jobs, however, would require multitask operations and they would create other processes as they ran. (Note that a process is a concept implying the carrying on of some activity and should not be confused with the concept of a program, which is a process or activity description and can be used by one or more processes. We can speak either of a process or a processor executing a program. See Glossary of Definitions).

The concept of a process as being the basic processing unit developed to fill a need for the multiprogramming/multiprocessing environment of third generation computers. In such an environment where many users are demanding service simultaneously, it is natural to conceive of multiple processes competing for resources within the computer system. Each process consists of a program (i.e. an ordered collection of instructions and other data associated with the instructions) which is executed by the computer processor and a process state vector which defines the current status of the process. The process operates on data to perform a user's job or some phase of that job. Where many such processes are demanding simultaneous attention from the system, the task of communicating with and between such processes and the task of controlling and allocating resources to such processes particularly in view of the requirements of fourth generation systems becomes extremely complex.

In a multiprogramming/multiprocessing environment, it is essential that cooperation between two or more processes be efficiently and expeditiously realized. While many solutions to this problem have been proposed in the past, the technique of interprocess communication and control needed for the fourth generation computers has not, until now, been fully realized. The germination of the concepts required for a fourth generation computer, however, have been partially developed by E. W. Dijkstra in a paper entitled "Cooperative Sequential Processes from Programming Languages", NATO Advanced Study Institute, edited by F. Genuys of Paris and published in Academic Press, 1968. In this paper, Dijkstra postulates a basic concept of a semaphore for use in process synchronization and "P" and "V" instructions operating upon the semaphore. Unfortunately, Dijkstra provides for interprocess communication and process synchronization solely by software usage thus not only slowing down the operating time of the system but also decreasing the efficiency and extending the overall overhead required for such a system. More importantly, Dijkstra does not provide the concepts required for any significant exploitation of a fourth generation computer since he formulates only a basic premise in process synchronization. For one example, the transmission of messages from one process to another is not anticipated nor explained in Dijkstra's paper.

The concepts of P and V instructions have also been previously expounded by Edsger W. Dijkstra in the previously cited article. However, these concepts are presented only in generalized terms and do not provide the system configuration needed in a fourth generation computer. Moreover, Dijkstra merely provides a software basis for interpreting and using P and V Instructions. Thus the memory organization necessary for rapidly accessing processes in addition to providing a systematic reallocation of the data processor has not been contemplated. As a result, not only are many of the P and V instructions necessary for delivering or receiving data by the executing processes not shown by Dijkstra but also the hardware/firmware basis for enabling process transferral in response to all P and V instructions is not envisioned.

Moreover in a multiprocessing environment, interprocess communication and synchronization facilities are essential to achieve smooth cooperation between loosely connected processes. Primitive hardware mechanisms such as traps and interrupts were initially devised to fill basic system needs. More advanced facilities such as Dijkstra's semaphores described in Reference 1 infra were later introduced and have been widely applied in one form or another. Please refer to References 2-4 attached hereto as an appendix under the caption *References.* User-oriented software control structures such as event control blocks were also provided for user intertask communication in a multitasking environment.

While these facilities have proved useful in the resolution of many specific problems, they have failed to provide a broad and unified interprocess communication capability well suited to general system and user needs in asynchronous processing applications.

By asynchronous processing, we refer to the type of activity carried out by a sequential process (as defined in Reference 1) in response to signals that are generated independently and asynchronously from that process (by some other process or device). Examples of this type of processing include:

handling hardware-generated traps which signal the occurrence of exception conditions such as machine error, program error, overflow, etc.;

handling hardware-generated interrupts which indicate the occurrence of significant external events including I/O transfer completion, I/O error detection, and timer run-out;

processing software interrupts generated upon detection of unusual results within a procedure; or those triggered by calls to the system supervisor;

processing activity performed by one software task in response to requests issued by some other task in a multitasking environment.

Several trends are contributing to enhance the significance of asynchronous processing. Among these are:

the trend of computer architecture toward multiprocessor configurations for central as well as peripheral sub-systems. Typical of this trend is the use of multiple central processors, or separate front-end and network processors to enhance system performance and system availability;

the trend toward distributed implementation of multiprogramming or time-sharing operation systems;

the trend toward fast-response on-line application systems providing a broad variety of services to a community of simultaneous users.

What is required for the fourth generation computer is a system which automatically integrates process communication and process control so as to not only enhance the operating efficiency of the system but also to provide sufficient flexibility to deal with the innumerable situations arising in the transfer of information from one process to another and in the management of events and messages. The system is the subject of a U.S. patent application Ser. No. 462,551, disclosing an invention by the same inventors of the instant invention entitled "An Extended Semaphore Architecture" and filed on an even date with the instant application and assigned to the same assignee, and incorporated herein by reference.

In such a fourth generation architecture where each process is concerned with several event variables, the possibility of a deadlock situation is introduced, wherein two or more processes are permitted to wait for related events which cannot happen.

OBJECTS OF THE INVENTION

It is a primary object of the invention to provide a deadlock detection mechanism for detecting a deadlock situation wherein two or more processes are waiting for related events which cannot happen.

Another object of the invention is to provide an improved deadlock detection mechanism.

Still another object of the invention is to detect and prevent a requesting process from waiting for the availability of resources which are already held by some other process which is itself already waiting directly or indirectly on the first process.

Yet a further object of the invention is to provide firmware and a method to examine the request of a first process of a group of processes for assignment of a first resource of a group of resources, and to determine whether said first resource is or is not currently assigned to a second process of said group of processes which said second process is already waiting directly or indirectly for a second resource of said group of resources which said second resource is currently assigned to the said first process.

A still further object of the invention is to provide a hardware/firmware mechanism which will quickly and efficiently search the system control tables and determine whether causing a requesting process to wait on the availability of a resource or other process would in fact cause a deadlock situation.

SUMMARY OF THE INVENTION

The foregoing objects are achieved by providing a deadlock detection and prevention mechanism which detects a situation where two or more processes are waiting for related events which cannot occur, and preventing a requesting process from waiting for the availability of a resource or resources which are already held by a second process which is waiting directly or indirectly upon the first process.

Firmware and a method is provided to examine the request of a first process of a group of processes for assignment of a first resource of a group of resources, and to determine whether said first resource is or is not currently assigned to a second process of said group of processes which said second process is already waiting directly or indirectly for a second resource of said group of resources which said second resource is currently assigned to the said first process.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by references to the following description taken in conjunction with the drawings in which:

FIG. 1F is a table for classifying four embodiments of the invention.

FIG. 1K is a table showing three operation states during which an assignment request may be honored, and three operation states during which a requesting process is caused to wait if a deadlock is not detected.

FIG. 2A is a block diagram of a multiprogramming system utilizing the invention.

FIG. 2B is a schematic representation of various hardware structures utilized by the invention.

FIG. 3 is a legend of terms used for reserved areas of storage in registers depicted in FIG. 2.

FIG. 4 is a schematic diagram of a process control block.

FIGS. 10A through 10L are block diagrams of structures in the PCB.

FIG. 12 is a schematic diagram of addressing schemes of user and system segments utilizing the system base and PCB structures.

FIGS. 13A–C are schematic diagrams of the control unit.

FIGS. 14A through 14I are flow diagrams of the dispatcher unit in firmware.

FIGS. 16A through 16P are block diagrams of semaphore structures utilized by the invention in the system.

FIGS. 19A–B are exploded schematic diagrams of the scratch pad memory of the logical store unit shown in FIG. 13 and illustrating the overall organization of its word structure.

FIGS. 22A–E are flow diagrams of the P instruction on semaphores with messages.

FIGS. 25A–I are flow diagrams of the V instructions on a semaphore when the SCT field of the semaphore is negative.

I. INTRODUCTION

Figure 1A:
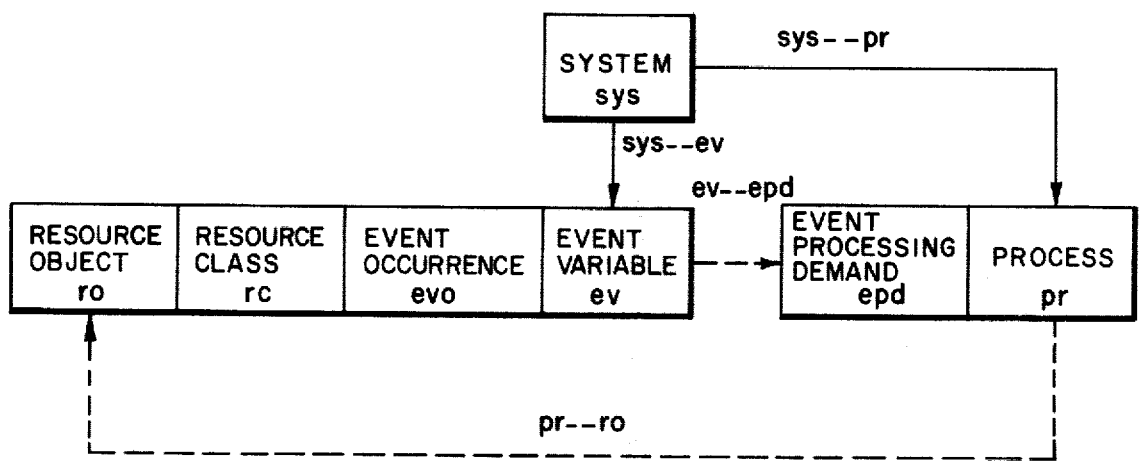
FIGS. 1A, 1C–1E, 1G, 1H, 1J, and 1L are entity structure diagrams useful in understanding the basic concepts of the invention. (Rules for constructing such diagrams are published in Reference 6).

A. Scope and Organization of the Disclosure

The instrumentalities employed for an event management system in a large-scale-computer are necessarily complex. Moreover, a full appeciation of the teachings of the present invention can be obtained only if the reader has some familiarity with the environment in which such instrumentalities reside. For this reason, it is desirable to at least briefly explore the general architecture of a typical large-scale data processing system of the type in which the principles of the present invention may be utilized to advantage. It is also desirable to first establish and understand the basic concepts on which the present invention is based. Accordingly this disclosure will first review the basic support requirements and the traditional process synchronization mechanisms. Next, the more general support requirements are established and extended capabilities are outlined. The key event-related architectural entities are isolated, characterized and structured, and a general event management functionality of the extended semaphore architecture is defined. The computer system environment in which the instrumentalities of the concepts reside, is shown and described. Finally, hardware structures of the invention and its environment are shown and described.

As pointed out in Reference 5, implementation considerations generally involve two radically different concerns: functionality definition and hardware considerations. The present disclosure focuses on both—first on the function aspect and secondly on hardware implementation.

B. Basic Concepts

1. Basic Requirements

In its most elementary form, interprocess communication permits one process to set a variable whose contents may, at some later time, be inspected and reset by another process. Typically, and by pre-established convention, the setting of that variable represents the occurrence of an event which is significant to the other. For example, a process might accumulate information into some buffer area for processing by another. Once the buffer has been filled, a mutually accessible variable is set to indicate that buffer processing may commence.

We may thus define the basic elements of an interprocess communication facility as consisting of:
- an event occurrence defined as the occurrence in one process (the event generator) of a condition which is significant to another process (the event handler).
- a mutually accessible binary state variable (event variable) which may be asserted to an "on" state by the event generator, and which can be tested and reset to an "off" state by the event handler. In addition, execution of these operations must be serialized (test, then reset to off) and indivisible.
- a context of interpretation for the event occurrence specifying the significance of the event and the nature of the reaction that is to be carried out.

Functionallty, the event generator process performs two major tasks:
- event condition monitoring; and,
- event variable setting (event posting). while the event handler performs:
- event detection; i.e., sensing and resetting the event variable; and,
- event reaction; i.e., execution of some procedure in response to the event occurrence.

An event mechanism constitutes a communication and synchronization device between cooperating processes. Event occurrences can be viewed as processing requests which are directed to the event handler and which gate its activity.

2. Basic Synchronization Mechanisms

The event detection function consists of the recognition of event occurrences posted on the event variable. Efficiency and discrimination are two important characteristics of this mechanism.

The efficiency of the detection mechanism is related to the processing cost associated with the recognition of an event occurrence. More specifically, it can be measured by the quantity of processing consumed by the event handler while waiting for the next event occurrence. Using a simple test mechanism, the event handler periodically tests the event variable. Each time an event occurrence is detected, the event handler executes the appropriate reaction procedure and then returns to its testing activity. This repeated testing could consume large quantities of processing power with no useful results. A more efficient mechanism is achieved by the introduction of a "wait-for-event" in addition to the "test-for-event" facility. Under this scheme, the event handler may enter a dormant state pending the next event occurrence.

The discrimination of the detection mechanism pertains to its ability in recognizing each individual event occurrence. An event occurrence could escape detection in case of event occurrence "pile-up". This is a situation where the event occurs more than once between two consecutive detections. Using the test/wait mechanism, the discrimination is measured by the interval of time required to carry out the reaction procedure. In many cases, however, the entire reaction procedure need not necessarily by completed prior to the next event occurrence. Two types of reaction procedures can thus be distinguished: foreground and background. The foreground reaction procedure is that which must be completed prior to the next event occurrence; the background reaction can be carried out in a non-sequential fashion with respect to the event occurrences. Typically, the foreground reaction represents some critical activity which must be completed before the next event occurs while background processing may be handled in a more leisurely way.

Several mechanisms have been devised to exploit this opportunity. The trap mechanism (or internal interrupt) causes the event handler to perform an implicit out-of-sequence call to a foreground procedure upon detection of an event occurrence. Using the trap mechanism, the detection discrimination is improved by reducing the "blind" period to the duration of the foreground reaction procedure. Another important characteristic of the trap mechanism lies in its ability to react to an event occurrence even while the event handler is not specifically expecting it (i.e., not currently testing on it or waiting for it). This characteristic proves extremely helpful enabling a process to handle several event variables as we will see later.

To illustrate the use of the trap mechanism, consider the case of a communication line processor. An event occurrence (type 1) consists of the arrival of a new character in a one-character line buffer. Reaction to this event involves fetching the character from the buffer, performing some validation and editing and moving the edited character to a message buffer area. It is clear that until a newly arrived character is actually moved out of the buffer area, it stands the risk of being destroyed upon the arrival of the next character. On the other hand, there is no compelling reason for completing the editing activity prior to the arrival of the next character. We can therefore treat the buffer emptying operation as a foreground procedure while the validation and editing activities are performed in the background.

Assume that the detection mechanism consists of a traditional test/wait data complemented with a trap feature.

The processing is broken into the foreground (buffer empty work) signalled by an event occurrences of type 1, when a character arrives and the background character editing work signalled by an event occurrence of type 2 when a character has been save stored out of the buffer.

Assume that the line processor is initially processing an event occurrence of type 2. Upon arrival of the first character, an event occurrence (type 1) is posted. This traps the event handler and causes it to perform an implicit call to the foreground buffer emptying procedure. This procedure moves the character out of the buffer into some save area and then signals the required background activity (event occurrence type 2). Completing the foreground activity, the event handler returns to its interrupted activity. When it is complete, it checks the occurrence of another happening of event condition type 2 and finds the event occurrence (type 2) posted on the event variable, resets it, and proceeds with the background reaction. If no additional character arrivals cause interrupts prior to the completion of the background reaction, the line processor upon completion return to the event condition #2 gate and will find no pending background activity (event occurrence type 2). Thus it re-enters its wait state.

If, however, a new character arrives into the buffer prior to the completion of the background reaction, another event occurrence (type 1) is posted, and again, a trap occurs. An implicit call to the foreground reaction is automatically generated temporarily interrupting the execution of the background procedure. The event handler enters the foreground procedure, moves the second character to the save area, and then returns to its point of interruption to resume execution of the background procedure. Barring further event occurrence, the line processor completes the background reaction and returns to the gate where it finds the second event occurrence posted. It resets it and re-executes the background procedure for processing the second character.

A variation on the trap mechanism is the interrupt or external interrupt. Under the interrupt scheme, the foreground procedure is executed by another higher priority process while the event handler is temporarily suspended. The main distinction between traps and interrupts being that background and foreground reactions are performed within different process environments.

3. The Semaphore Mechanism

The semaphore mechanism introduced by Dijkstra [1] features two important improvements over the elementary test/wait facility. First, the mechanism is symmetrical. A process can both post and detect event occurrences upon the same event variable. Secondly, the same event variable is generalized from a binary state variable to a positive integer. This permits the simultaneous posting of multiple event occurrences up to a prespecified limit. Event occurrence posting is performed by a V-operation which increments the event variable. Event detection is performed by a P-operation which senses and decrements the event variable. The V-operation returns an error if it finds the event variable already set to its maximum count. Conversely the P-operation causes the process that issues it to enter a wait state if the event variable (semaphore count) is equal to zero. This wait state persists until the next event occurrence is posted on the semaphore.

The detection discrimination of the semaphore mechanism is independent of the frequency of event occurrences. As long as the backlog of unprocessed event occurrences remain below the maximum count, no event occurrence will go undetected and unprocessed. However, once this backlog reaches the limit, the event posting mechanism becomes inhibited and remains that way until the next P-operation reduces the actual count of event occurrences below the maximum for the semaphore.

4. Multiple Event Processors

In the foregoing discussion, we have only dealt with situations involving a single pair of asynchronous processes: one process which generates event occurrences and the other one which handles them. We have defined the requirements for and examined basic mechanisms that support interprocess communication and synchronization. Let us turn now to the more general situation where the same event generator is associated with several event handlers through a single event variable. We will discuss this problem using two examples. The first one involves a simple message handler and a second deals with a more general resource management problem.

Consider a process which assembles messages into a buffer area and two identical message handling processes sharing a common event variable. Assume that each event occurrence signals the availability of a new message in a pre-designated buffer area. Our objective is to arrange so that both message handlers cooperate in processing the messages in a coherent manner. This means that messages must be distributed between processors so that each message gets processed at least once but not more than once. In other words, we must guarantee that access to a message by the processes is mutually exclusive. Let us examine how the semaphore mechanism can be applied to satisfy this requirement.

Assume that the initial number of posted occurrences (i.e. messages) is three at the time both message handling processes are simultaneously activated. Assume also that no further messages will be arriving in the course of this discussion. As each message handling process begins it issues a P-operation. By definition, such an operation is indivisible, and, therefore, event detection by the two processes will take place serially. The first process to issue the P-operation finds a count of three, reduces it to two, and implicitly gains control of the first message in the buffer area. Next, the other process issues the P-operation. It finds a count of two, reduces it to one, and gets control of the second message. Both message handling processes then proceed independently from one another until their processing is complete. At this point they return to the semaphore to secure another message. The first process to reach the semaphore finds a count of one, reduces it down to zero, seizes control of the third and last message and proceeds to process it. From that point on, either process returning to the semaphore will find the count equal to zero and, therefore, will enter a wait state. We have thus satisfied our requirement and insured that each message be processed once and only once.

This example illustrates the capability inherent in a semaphore mechanism to resolve a contention situation developing between several processes that are vying for the acquisition of the same resource. This capability derives from the indivisibility of the P-operation. Effectively, only one process at a time is able to detect the availability of a resource and acquire its control. Note that in the preceding example, the message handling processes requests for resource assignment were not directed to any particular message but rather to any message available for processing. The event variable was tied to the whole class of message objects, not to any particular member of that class. Also observe that the availability of a particular message object was a non-recurrent condition. Once assigned to a message handler, a message could not become available again for reassignment. In this case, a message constitutes a non-reusable resource.

5. The Basic Resource Management Problem

Consider now the case of a reusable resource object. This is a resource which can only be used by one process at a time. It may, however, be released and reassigned to another process. Mutually exclusive assignment is required so that each process can achieve full control over the state or information contents of an object.

A classical example illustrating this requirement is the order entry application. A stock inventory file is updated according to transactions originating from multiple on-line terminals. Each terminal is served by a distinct process. To fulfill an order, a process must access the database record corresponding to a given article, look up its contents and determine whether the inventory level is sufficient to fill the order. If so, the record is updated according to the quantity ordered. Because several other processes may also, in some unpredictable way, attempt to perform simultaneously the same update operation, some provision must be made to prevent interference. Specifically, only one process must be permitted to access a given record during the critical period between the time where the record is examined and the time where its updated contents is returned to the file.

Mutual exclusion on record access can be insured by performing the record look-up and updating operations as a critical section, in the sense defined in Reference 1. Prior to examining the inventory level, each process requests exclusive assignment of the corresponding record. It then performs the update, replaces the record into the file and releases the record assignment. In this case, a semaphore-like binary event variable is associated with the record as a resource object. The state of availability of the resource is represented by the value of the event variable; one for available and zero for already assigned. A resource assignment request consists of issuing a P-operation on the event variable while resource release is accomplished by a V-operation on the same event variable.

Note that this arrangement is completely symmetrical. Each process alternately acts as an event handler when it requests assignment of a record and as an event generator when it releases it. This scheme can therefore be generalized and applied to control the assignment of resources between any number of processes, using one event variable to represent the state of availability of each reusable resource object.

6. Deadlock considerations

Earlier in this disclosure we have considered the use of a single event mechanism as a means for communication between several processes. In the architecture depicted above, we are allowing each process to be concerned with several event variables. This introduces the possibility of deadlock situations.

A deadlock is a situation where one or several processes are waiting for an event which cannot happen. A deadlock can only be resolved by external intervention, typically, by removing one or several processes from the system and releasing their resources. The simplest deadlock situation (and also the easiest to detect) develops if a process were permitted to wait for the availability of a resource which it already owns. Since only that process has the ability to fulfill the required condition by releasing the resource, it is clear that a deadlock will result if it were allowed to enter a wait state. This is, of course, a trivial case which should be treated as an error; the wait request should be rejected with appropriate notification:

A similar but less trivial deadlock situation involves two or more processes. A deadlock may develop if several processes are permitted to wait for the availability of resources which are already held by some member of that group. Deadlock detection, although more involved than in the case of a single process, is straightforward. With reference to the entity structure diagram shown in FIG. 1a, a deadlock is readily detected if the "pr--ro" and "ev--epd" set occurrences hierarchy, when traversed in an upward direction, (findowner) reveals an annular or closed loop structure.

C. Basic Event Management Architecture

1. Architecture Definition

At this point, it seems appropriate to consolidate our understanding of the event mechanism into a somewhat more formal architectural definition. To follow the approach suggested in [5], let us first identify and characterize the relevant architectural entities. Seven distinct entity classes can be isolated: system, process, resource class, resource object, event variable, event processing demand and event occurrences. Table 1 lists these entities and their attributes.

FIG. 1a is a particular entity structure diagram which portrays certain relationships between entity classes. These are also described in Table 2. A detailed explanation of the notations involved in entity structure diagrams can be found in Reference 6 infra. Briefly, each box represents a distinct entity class. Simple (1:n) relationships between entity classes are represented as set classes. Each arrow denotes a distinct set class. A set occurrence is owned by a unique entity occurrence which belongs to the class designated by the tail of the arrow. A set occurrence has zero, one or several member entity occurrences which belong to the class designated by the head of the arrow.

The set classes are designated by a pair of abbreviated entity class names, in the order: (owner)--(member). For example, "sys--pr" designates the process name space. It is a set class owned by a system entity and comprising every process known to that system. Similarly, "sys--ev" designates the event variable name space. It is the set of all event variables in a system.

2. Binary Semaphore

FIG. 1a portrays the most basic resource management structure. Reusable resource objects are assigned to independent processes. Each resource object is associated with its own event variable. The availability of a resource is evidenced by the presence of an event occurrence on the corresponding event variable. In this case, there can be no more than one concurrent event occurrence per event variable. We have also a one-for-one correspondence between resource objects and event variables. For the moment, we are talking about resource classes with only one resource object. The four entity classes: resource object, resource class, event variable, and the event occurrence are therefore related on a one-for-one basis. This is shown on the diagram by the close grouping of the corresponding boxes. Only one event processing demand can exist per process; therefore, the entity classes for process and event processing demand are joined on a one-for-one basis.

These four entity classes (resource object, resource class, event variable and event occurrence) represent concepts which are buried in the classis semaphore. At the risk of creating confusion, they are all identified here for the reader. Subsequent steps in the development of the generalized semaphore will require the surrender of the 1:1 relationship now being defined and will focus on their importance as independent concepts.

The dashed arrow "ev—epd" illustrates the concept of a "sometimes" relationship. It represents the set of event processing demands and thus processes that are waiting on an event variable. A given process may or may not be waiting on an event variable and therefore is or is not inserted into that set. The event processing demand is inserted only if the process is currently waiting on the event variable represented by the owner of that set. Similarly, the set "pr—ro" designates the set of resource objects currently assigned to a process. This is also a "sometimes" relationship. If a resource object is assigned to a process, then the entity resource object is inserted in that set. Otherwise, it is not inserted and the corresponding resource object is available for assignment upon request.

There are three primitive operations associated with this basic event management architecture: "Wait", "Test" and "Post". These primitives are described below in two different forms. First, an English language description is given, then it is precisely described in the form of a function definition algorithm. This function definition algorithm is written in PL/1 languages and references standard database set manipulation primitives (e.g. find next, find owner, empty, etc.). A complete definition of these primitives is given in Reference 5 infra.

The Wait-On-Event-Variable primitive is a P-like operation. If a process issues a wait on an event variable while an event occurrence is outstanding, the corresponding resource is assigned to the process and the process is so notified. This involves inserting the resource object into the pr-ro set owned by the process. Otherwise, the process is inserted into the set ev—epd of processes waiting on the event variable.

Table 3a is the precise definition of the Wait-On-Event-Variable primitive expressed as a function definition algorithm.

TABLE 1

| | | Basic Event Management: Entity Classes | |
|---|---|---|---|
| ENTITY CLASS NAME | ABBREVIATION NAME | DEFINITION | TYPICAL EVENT-RELATED ATTRIBUTES |
| Event occurrence | evo | Instance of realization of event condition | . Time of occurrence |
| Event Processing Demand | epd | The request of a process upon an event variable for event detection | . Trap procedure name |
| Event Variable | ev | Interprocess Communication and Synchronization Facility | . Name<br>. State (Happened/not happened)<br>. Current count of posted event occurrences<br>. Maximum count of posted event occurrences<br>. Current count of waiting processes |
| Process | pr | Program under execution | . Name<br>. Relative priority |
| Resource Class | rc | A grouping of resource objects having some common attributes | . Class name<br>. No. of objects within the class |
| Resource Object | ro | An entity occurrence susceptible of assignment to a process | . object name |
| System | sys | Root of entity structure | |

TABLE 2

| | Basic Event Management: Set Classes | | |
|---|---|---|---|
| SET CLASS NAME | DEFINITION | MEMBER-SHIP | ORDER |
| ev--epd | Process waiting for an event | Sometimes | . FIFO |
| pr--ro | Resource object assigned to a process | Sometimes | . FIFO |
| sys--ev | Event variable name space | Always | Alphabetical by name |
| sys--pr | Process name space | Always | Alphabetical by name |

TABLE 3a

| Function Definition Algorithm for "Wait-On-Event-Variable" |
|---|
| wait_on_event_variable: procedure (p_code, p_evptr, p_prptr);<br>/* This primitive causes a resource object represented by an event variable (p_evptr) to be assigned to a process (p_prptr), provided that it is not already assigned to some other process. Otherwise the process is waited until the |

TABLE 3a-continued

Function Definition Algorithm for "Wait-On-Event-Variable"

```
resource can be assigned.  */
/* determine whether resource is already assigned  */
if inserted (p_evptr, "pr_ro")
   then do;
      /* assign resource to process */
      call insert (p_evptr, "pr_ro", "after", p_prptr);
      p_code = 0;
      return;
      end;
/* determine whether resource is currently held by process */
call findowner (prptr, "pr_ro", p_evptr);
if prptr = p_prptr
   then do;
      code = 1;
      return;
      end;
/* determine whether wait would cause a deadly embrace */
if deadly_embrace (p_evptr, p_prptr)
   then do;
      code = 3;
      return;
      end;
/* wait process upon event processing demand */
call insert (p_prptr, "ev_epd", "before", p_evptr);
code = 0;
call process_disptach (p_prptr);
end wait_on_event_variable;
```

The Test-On-Event-Variable primitive is a similar operation except that the process will not wait for an event to happen, it is only notified as to whether or not the event did occur and the resource object assigned.

The function definition algorithm for Test-On-Event-Variable is contained in Table 3b.

TABLE 3b

Function Definition Algorithm for "Test-On-Event-Variable"

```
test-on_event_variable: procedure (p_code, p_evptr, p_prptr);
   /* This primitive causes a resource object represented
   by an event variable (p_evptr) to be assigned to a process
   (p_prptr), provided that it is not already assigned. Otherwise
   the process is so notified */
   /* determine whether resource is already assigned */
   if inserted (p_evptr, "pr_ro")
      then do;
         /* assign resource to process */
         call insert (p_evptr, "pr_ro", "after", p_prptr);
         p_code = 0;
         return;
         end;
   /* Make resource available */
   /* determine whether resource is currently held by process */
   call findowner (prptr, "pr_ro", p_evptr);
   if prptr = p_prptr
      then p_code = 2;
      else p_code = 1;
end test_on_event_variable;
```

In the context of the architecture described in FIG. 1a Post-On-Event-Variable is a V-like operation which releases the assignment on the resource associated with the designated event variable. The operation involves removing the resource from the "pr--ro" set. If the set of waiting processes on that event variable is not empty ("ev--epd"), then the process at the head of the queue is removed and reactivated. This process detects the event occurrence and gains control of the resource just released. This is represented by the insertion of that resource into the "pr--ro" set owned by the reactivated process. See Table 3c.

TABLE 3c

Function Definition Algorithm for "Post-On-Event-Variable"

```
post_on_event_variable: procedure (p_code, p_evptr, p_prptr);
   /* This primitive causes the release of the resource
   represented by an event variable (p_evptr) by the process
   (p_prptr) to which it is currently assigned. */
   /* validate that resource is currently assigned to process */
   call findowner (prptr, "pr_ro", p_evptr);
   if prptr = p_prptr
      then do;
         p_code = 1;
         return;
         end;
   /* determine whether there is a process waiting for the resource */
   call findnext(prptr, "ev_epd", p_evptr, eos);
   if eos
      then do;
         /* assign resource object to waiting process */
         call insert (p_evptr, "pr_ro", "after", prptr);
         /* dispatch waiting process */
         call remove (prptr, "ev_epd");
         call process_dispatch (prptr);
         end;
   p_code = 0;
end post_on_event_variable;
```

3. General Semaphore Architecture

Figure 1C:
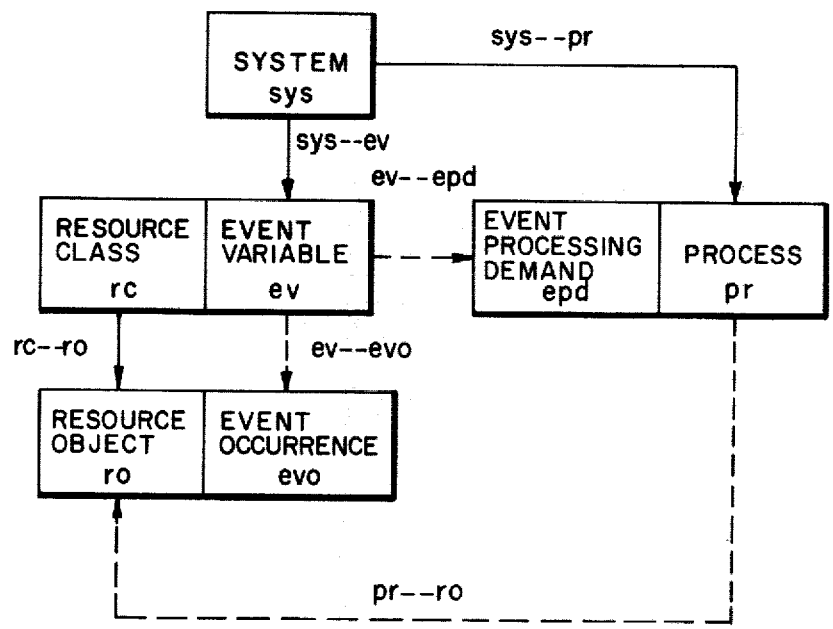

FIG. 1c describes a more general case where resource objects are assigned on the basis of requests directed against a resource class. Each resource object in the class is equally acceptable to the requesting process. Thus we see the first fracturing of the ro/rc/evo/ev quadruple. Here, we must treat event variables and event occurrence outstanding on an event variable. However, the event occurrence still represents the availability of a single resource object within the corresponding resource class. This is shown by the combined ro/evo entity. The "rc--ro" set defines all the resource objects in a resource class. The "ev--evo" set defines the "sometime" relationship between the event variable and the event occurrence. The sometime is defined as the time when the resource object is not assigned and therefore available. We still have a one-for-one relationship between resource class, and the event variable as shown by the rc/ev box. We still have the one-for-one relationship between event processing demand and process as shown by the epd/pr box.

The "ev-epd" set of processes waiting on an event variable remains as before. So does the resource assignment set pr--ro.

In the context of FIG. 1c, the Post-On-Event-Variable becomes an implicit operation. It is invoked as part of the Release-Resource-Assignment operation directed to a particular resource object. An event occurrence is posted on the event variable associated with the resource class which controls the released resource object. This is reflected by the insertion of the event occurrence entity associated with the released resource object into the "ev-evo" set of its event variable. If there is a process waiting on the event variable, the resource object is reassigned and the process redispatched as before.

The explicit dissociation of the event variable and event occurrence entities imply that an event may have a condition and a reaction that involves distinct entities. Here, for example the event condition pertains to the availability of any member of a resource class while the event reaction involves the assignment of a particular resource object.

Let us return for a moment to the message management problem. We did point out that the detection of an event occurrence entailed the assignment of a unique message to one of the message handling processes. We did not elaborate however on exactly how the message handler gets notified of the identity of the assigned message. This is a non-trivial problem owing to the asynchronous nature of the required information transfer. To resolve it, we will define an extension to the semaphore mechanism permitting a V-operation to append a unique message of descriptive information to each event occurrence. Conversely, an event occurrence detected by a P-operation will return the corresponding message to the process which issues it. This information may be stored, until it is needed, within the event occurrence entity.

In the semaphore architecture depicted in FIG. 1c, the deadlock detection algorithm must survey the occurrences of three set classes, "pr–ro", rc––ro" and "ev-epd" to determine whether a waiting process would create the annular structure for all resource objects which would signify a deadly embrace.

5. Trap Semaphore Architecture

Observe that the binary and general gating semaphore mechanism (FIGS. 1a & 1c) do not support the concept of foreground reaction. To introduce this feature into the semaphore architecture, we can retain the same entity classes but we must adjust the relationships between entity classes. This leads to defining several new set classes and functional primitives.

Figure 1B:
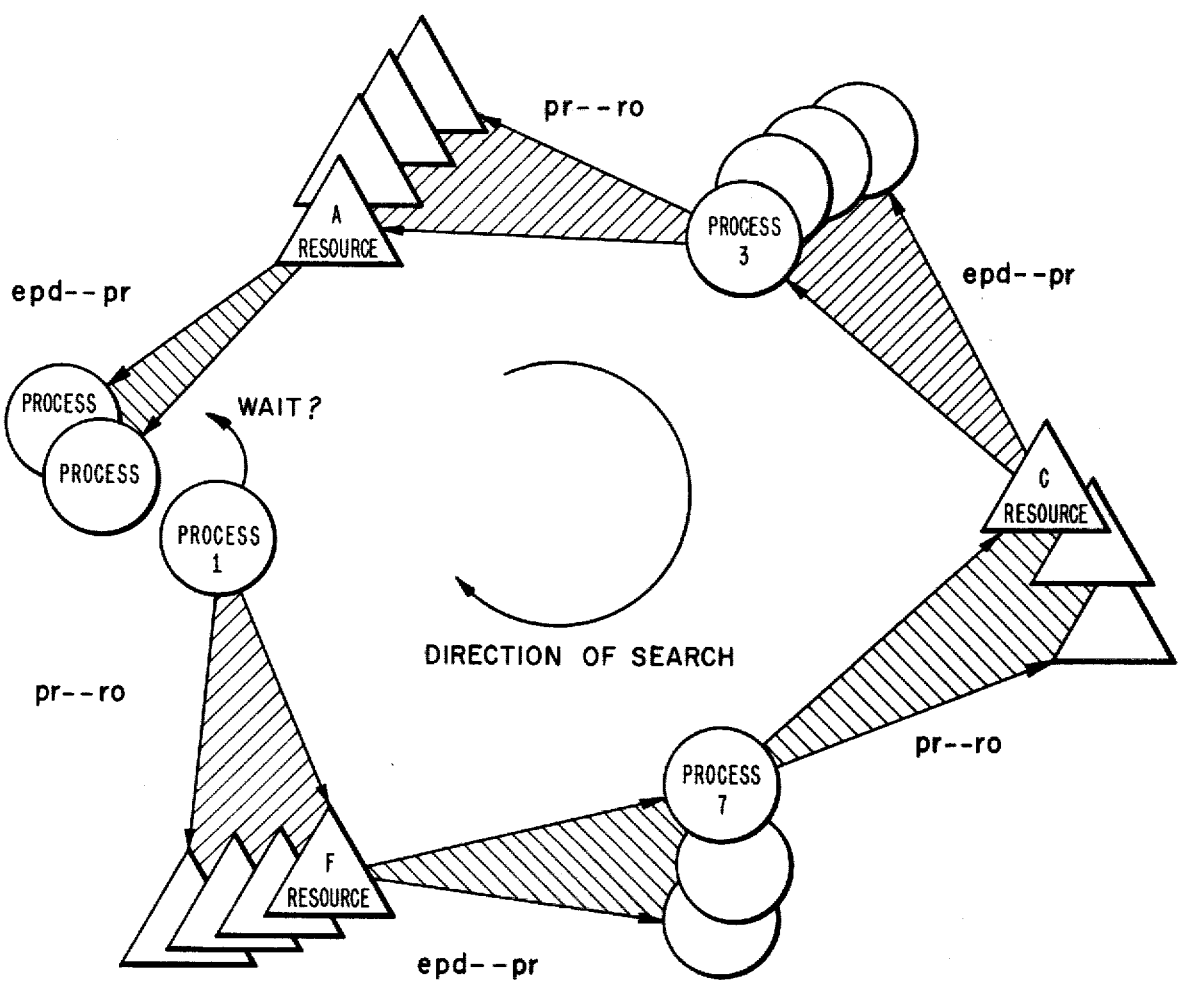
FIGS. 1B and 1I are schematic diagrams showing deadly embrace detection with exclusive assignment of resources and exclusive assignment of objects from a multiple object resource class respectively.
Figure 1D:
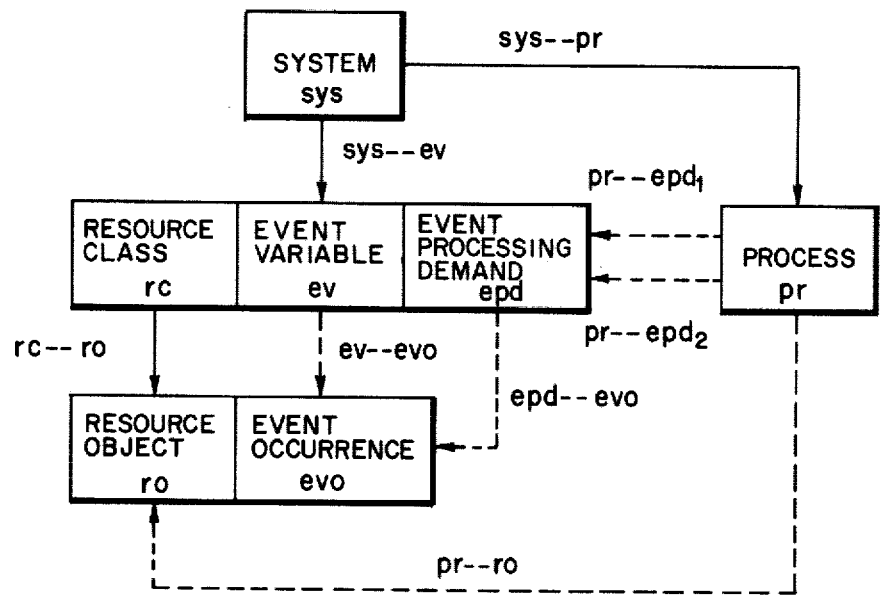

FIG. 1d is an entity structure diagram describing the architecture of a semaphore mechanism with a trap feature. This trap semaphore is distinct from the binary and general gating semaphores which we have developed through FIGS. 1a and 1c. You should note that the event processind demand which had existed on a one-for-one basis with the process entity has now been detached and re-associated on a one-for-one basis with the event variable. Thus the "ev––epd" set has disappeared and a new "pr––epd1" set has been created. This is a "sometime" set meaning that an event processing demand in the role of member is sometimes inserted into a set. This time is when the owner process has a "Set-Trap-On-Event" primitive in effect upon the trap semaphore. We have also added the "pr-epd2" set. This is a sometime set where the insertion of an event processing demand signifies that there are event occurrences waiting which have not been made known to the process because the event occurrences happened while the process was executing a trap procedure and thus was not interruptable.

The impact of the trap feature of the event posting mechanism can be summarized as follows: When an event occurrence is posted on the semaphore, the current state of the event processing demand is examined with regard to its insertion in the "pr––epd1" set. If the event processing demand is currently inserted into such a set, then a trap demand is in effect and the event occurrence is "assigned" to the process which owns the "pr––epd1" set. The resource object associated with the event occurrence is inserted into the "pr––ro" owned by that process. If the process is not currently in "trap" mode, a call is made to the trap procedure designated by the "Set-Trap-On-Event" primitive. That procedure would take whatever action was appropriate to the foreground activity associated with the event occurrence and then returns the process to what is was doing.

If the process is currently executing a trap procedure, the event occurrence is inserted in the "epd––evo" set to make it known when the trap procedure can subsequently be executed.

If the event processing demand is not currently inserted in a "pr––epd1" set then the trap is not set and the event occurrence is inserted in the "ev––evo" set rather than the "epd––evo" set. If the event happens several times (resource objects are released by processes) then all event occurrence representing the released resources are inserted into the "ev––evo" set.

When a "Set-Trap-on-Event" primitive is executed, the event occurrences currently inserted in the "ev–––evo" set may be removed and inserted in the "epd–––evo". The number of event occurrences which may be removed and inserted is controlled by the maximum count parameter of the event processing demand. The count may be set at 1, 2 or more. For each event occurrence which is transferred, the trap procedure is executed. However, each such procedure execution is delayed until the prior execution is completed. Each "trap" event processing demand with unnotified event occurrences is inserted in the "pr––ped2" so they can await the completion of the currently active trap procedure.

The normal event detection mechanism is disallowed with a trap semaphore. It is illegal for a process to wait/test such a trap semaphore as it is made known of event occurrences through the trap invoked procedure execution.

The following example illustrates a typical application of the trap semaphore. Consider a process P1 whose operation is gated by recurring event occurrences gate posted on an event variable E1. Each occurrence is accompanied with a message indicating the nature of the required processing. Typically, this processing would be handled as a gate reaction, just as if using a single semaphore. Although the exact timing of each event occurrence cannot be predicted, there is an implicit assumption that such event will indeed occur. It is therefore appropriate for the process to wait on such event occurrences.

Consider now a trap event variable E2 associated with an event whose occurrence is possible although not probable. This might be for example an exception situation requiring an urgent reaction on the part of the process P1. The problem is that P1 cannot really assume that E2 will ever occur and therefore it should not wait on it. In addition, there may be a sense of urgency associated with the reaction to an occurrence of E2 which should somehow pre-empt other routine work in progress such as that related to occurrences of E1. The use of the test operation would not therefore be satisfactory.

The use of the trap semaphore offers a clean solution to this apparent dilemma. Occurrences posted on E1 are processed as before. E1 is treated as a gating event. The process P1 detects occurrences posted on E1 by a wait operation and processes them as a gated reaction. E2 is considered as a trap event. Its occurrences are detected using a trap operation and are processed by the specified trap procedure. Gating events are handled sequentially within an event handling process while exception events are processed as they happen.

Note that a process can be in a wait state on a gating event variable and have concurrently a trap event processing demand in effect on one or several trap event variables. If the process is waiting on a gate event variable, the posting of an event occurrence on a trap event variable will cause the event occurrence to be assigned to the event processing demand, an implicit call to be made to the trap procedure, and the process to be reactivated. It will perform the trap procedure and then the wait operation will be reissued upon the return from the trap procedure.

The example cited earlier of the communications line processor is a perfect case for the use of two event variables, one trap event variable is established, where each event occurrence defines the arrival of a byte in a buffer to be quickly be removed. A gated event variable is established, where each event occurrence defines a byte which has been removed from the buffer and is awaiting the necessary editing associated with it. A single process could handle the foreground emptying of the buffer with the trap procedure and the background editing with its gated procedure. The higher priority of emptying the buffer is recognized by the immediate interrupt of the process in either the wait state or the background editing state to execute the trap procedure which is assigned the task of emptying the buffer.

As a single process may have a number of "Set-Trap-On-Event" primitives outstanding on different trap event variables, it could be monitoring several different communications buffers simultaneously.

One of the most attractive characteristics of the trap semaphore is the opportunity it gives a process to pursue its normal activities while, asynchronously, the semaphore keeps track of the posting of trap event occurrences. In effect, the "Set-Trap-On-Event" operation amount to registering the current process with the semaphore as a candidate for assignment of potential occurrences.

6. Extended Semaphore Architecture

Figure 1E:
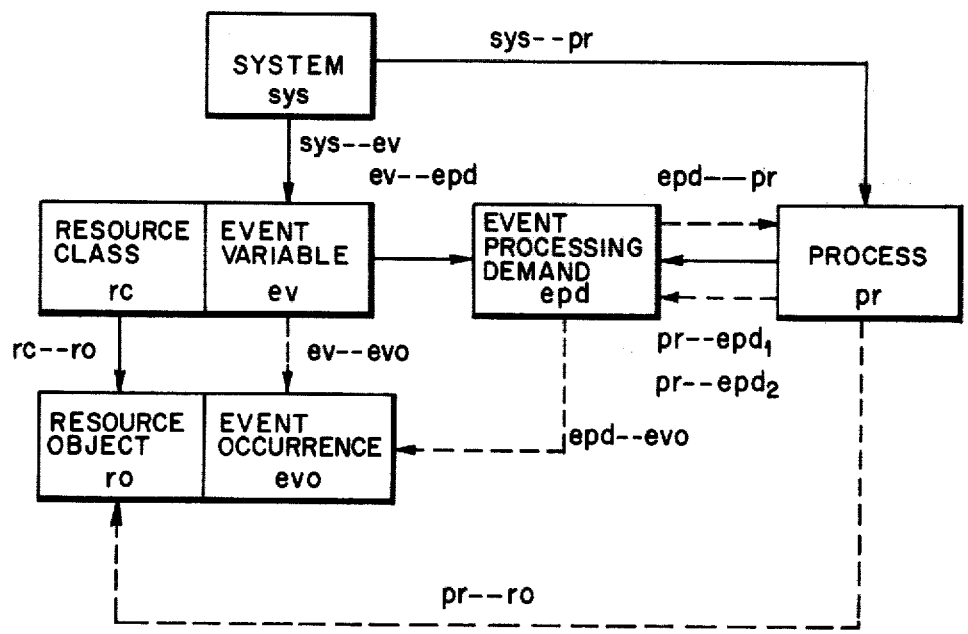

The gated semaphore (FIGS. 1a and 1c) and the trap semaphore (FIG. 1d), as described to this point, are both limited in a particular sense. The next stage is to eliminate these constraints. The gated semaphore, as described, only considers the request of a process when the process is actually waiting upon the event occurrence to happen. As a result, the process can attempt to acquire control of a resource only while waiting for it. And it cannot do any other processing while it waits. Secondly, if it wanted to acquire several resources which were controlled by separate semaphores, then it cannot wait on both or all concurrently. If is forced to serialize this resource acquisition and any actual processing that it could have been doing in parallel. In a similar way, the trap semaphore as previously described is limited in that only one process can have a trap event processing demand set upon it at a given time. This means that very rapid processing of the trap events is limited to the capability of a simple trap process to execute its trap procedure and get back to handle the next event occurrence. Both of these problems yield to the same basic change in the control structure. This change is specified in FIG. 1e. In this entity structure diagram the "event processing demand" entity has been separated from both the event variable and process entities. The net result is that a many-to-many relationship can now exist between the "event variable" entity and the "process" entity. The "event processing demand" entity now clearly specifies that a process wants the event management mechanism to take a particular event variable under surveillance on its behalf. Further, this demand for surveillance can be in either "trap" or "gate" mode. From the point of view of the "gate" demand, the event mechanism can note the occurrence of an event and immediately assign it to the first available and unsatisified "event processing demand" entity. Further, it would immediately assign the associated resource objects to the requesting process. Because several event processing demands may be outstanding concurrently, resource of several different resource classes may be collected simultaneously. Furthermore, the process is free to continue active processing until it must have the results of the event processing demand. Only then will it execute a wait upon the event processing demand so that it can be waited if the event has not happened, or continue if the event has occurred and has been assigned to it. From the point of view of the "trap" demand, it is now possible for several processes to set event processing demands on the same semaphore. In that manner, the simultaneous execution capabilities of independent processes can be brought to bear to handle whatever high priority trap demands that might exist at a moment.

To set up this event monitoring, the "Set-Trap-On-Event" operation has been generalized into a "Initiate-Event-Processing" primitive, with or without the trap option. Because the process is free to continue processing it will also want a "Terminate-Event-Processing" primitive to remove the demand if its interests change. The Terminate-Event-Processing operation will release any event occurrences which have been assigned to the demand and reverses any resource object assignments which have taken place.

The complete separation of the event processing demand entity from the event variable and process entities modifies the structure of the sets in which they participate. The "ev—epd" set from FIGS. 1a and 1c and the "pr—epd1" and "pr—epd2" from FIG. 1d all now appear as the semaphore can act as either a trap or gate semaphore.

Both sets have been converted from "sometime" membership sets to required membership as an event processing demand, if it exists at all, must be inserted in both sets. A new set has been added, the "epd—pr" set where the process entity is a sometime member. The time is when the process is waiting upon an event processing demand of the gate type. Table 3 lists all the sets, and their definitions involved in the extended semaphore architecture.

TABLE 4

| Basic Event Management: Extended Semaphore Set Classes | | | |
|---|---|---|---|
| NAME | DEFINITION | MEMBERSHIP TYPES | TYPICAL ORDER |
| edp__pr | Process waiting for fulfillment of an event processing demand | Sometimes | N/A |
| epd__evo | Event occurrences assigned to an event processing demand where the process has not been notified as to the assignment | Sometimes | FIFO |
| ev__epd | Event processing demands outstanding on an event variable | Always | FIFO/Priority |

TABLE 4-continued

Basic Event Management: Extended Semaphore Set Classes

| NAME | DEFINITION | MEMBERSHIP TYPES | TYPICAL ORDER |
|---|---|---|---|
| ev_evo | Outstanding event occurrences posted on event variable but not assigned to an event processing demand | Sometimes | FIFO/LIFO/Priority |
| pr_epd1 | Event processing demands issued by a process and currently outstanding against event variables | Always | FIFO |
| pr_epd2 | Event processind demands with unnotified event occurrences | Sometimes | FIFO |
| pr_ro | Resource objects assigned to process | Sometimes | N/A |
| ro_ro | Resource objects in a resource class | Always | N/A |
| sys_ev | Event variables in system | Always | Name |
| sys_pr | Processes in system | Always | Name |

The Initiate-Event-Processing primitive establishes the claim of a process upon any event occurrence which may become available under an event variable. Two options are granted with this primitive. The first option relates to whether the demand will be a "trap" demand or a "gate" demand. The second option provides for specifying of the multiple occurrences of the event to be queued for a process. Table 5A is the function definition algorithm of the Initiate-Event-Processing primitive written in PL/1.

The Evaluate-Event procedure determines whether there are any event occurrences available and assigns them to the event processing demand, up to its maximum occurrence count. This procedure is shared by Initiate-Event-Processing with the other primitives. Table 5B lists this procedure.

TABLE 5A:

The Function Definition Algorithm for Initiate-Event-Processing

```
initiate_event_processing: procedure (p_code, p_evptr, p_prptr,
    p_trap_procedure, p_max_occ_ cnt);
    /* This function definition algorithm causes a process
    (p_prptr) to become an active candidate for processing an event
    occurrence posted on the event variable (p_evptr). A trap
    option may be specified by naming a procedure which is to be
    executed by the requesting process immediately upon the
    detection of the event occurrence, unless it is currently
    executing a trap procedure. The max_occ_cnt parameter species
    the maximum number of event occurrences which may be assigned
    to the process at any time (epd_evo set).  */
    /* Check whether process is already active on event variable */
    call findnext (epdptr, "pr_epd", p_prptr, eos);
    do while   ( eos);
        call findowner (evptr, "ev_epd", epdptr);
        if evptr = p_evptr
            then do;
                p_code = 1;
                return;
                end;
        call findnext (epdptr, "pr_epd", epdptr, eos);
        end;
    /* create event processing demand for process and establish its
    attributes */
    call create (epdptr, "epd");
    epdptr → epd.trap = p_trap_procedure;
    epdptr → epd.max_occ_cnt = p_max_occ_cnt;
    /* insert event processing demand into "ev_epd and "pr_epd"
    sets */
    call insert (epdptr, "ev_epd", "before", p_evptr);
    call insert (epdptr, "pr_epd", "after", p_prptr);
    /* evaluate the initiate event */
    call evaluate_event (p_evptr);
    p_code = 0;
    end initiate_event_processing;
```

TABLE 5B:

Evaluate Event Procedure

```
evaluate_event: procedure (p_evptr);
    /* This procedure is called whenever a resource is
    released, an event processing demand is created, a process
    executes a test_on_event_variable, a process executes
    a wait_on_event_variable, or a trap procedure is completed. */
    /* Search for an unsatisfied event processing demand as
    long as there is an available event occurrence. */
    call findnext epdptr, "ev_epd", p_evptr, eos);
    do while ( ∧ eos & ∧ empty (p_evptr, "ev_evo"));
        call findnext (evoptr, "epd_evo", epdptr, eos_2);
        do count = 1 to eptptr → epd.max_occ_cnt while (eos_2);
            call findnext (evoptr, "epd_evo", evoptr, eos_2);
            end;
        /* determine whether maximum count is satisfied */
        do while (count epdptr.epd.max_occ_cnt & ∧ empty (p_evptr,
                "ev_evo"));
            call findnext (evoptr, "ev_evo", p_evptr, eos);
            call remove (evoptr, "ev_evo");
    /* assign resource to process */
    call findowner (prptr, "pr_epd1", epdptr);
        call insert (evoptr, "pr_ro", "after", prptr);
    /* determine whether trap or gate demand */
        if epdptr → epd.trap ∧ = " "
            then do;
                /* trap demand */
                /* determine whether process is currently
                    in trap mode */
                if prptr → or.status ∧ = "trapped"
                    then call trap (epdptr, evoptr);
                    else do;
                        call insert (evoptr, "epd_evo",
                                "before", epdptr);
                        if inserted (epdptr, "pr_epd2");
                            /* alert process of delayed
                            trap */
                            then call insert (epdptr,
                                    "pr_epd2", "before", prptr);
                            count = count + 1;
                    end;
            end;
            else do;
                /* gate demand */
                /* determine whether process is
                    currently waiting */
                if ∧ empty (epdptr, "epd_pr")
                    then do;
                        /* restart waiting process
                            and notify of event */
                        call findnext (prptr, epd_pr",
                                epdptr);
                        call remove (prptr, "epd_pr");
                        call dispatch_process prptr,
                                evoptr);
                        end;
                    else do;
                        /* assign event occurrence to
                            event processing demand */
                        call insert (evopr, "epd_evo",
                                "before", epdptr);
                        count = count + 1;
                        end;
```

TABLE 5B:-continued

Evaluate Event Procedure

```
            end;
        end;
        call findnext (epdptr, "ev_epd", epdptr, eos);
    end;
end evaluate_event;
```

The Terminate-Event-Processing primitive causes the event processing demand entity to be deleted, thus terminating the surveillance of the event variable for the process. Any event occurrences which have been assigned to the process, but for which the process has not received notice will be returned and made available to other event processing demands. Any resource objects controlled by the event occurrence will be released. Table 5C is the function definition algorithm of the Terminate-Event-Processing primitive. It references the evaluate event procedure (Table 5B) to see that any event occurrences which were made available will be void if possible.

TABLE 5C:

The Function Definition Algorithm for Terminate-Event-Processing

```
terminate_event_processing: procedure (p_code, p_epdptr, p_prptr);
    /* Event occurrences currently assigned to the event
    resource object. They will be made available to any other
    unsatisfied event processing demand of other processes. */
    /* verify that referenced event processing demand belongs to
    the process */
    call findowner (prptr, "pr_epd", p_epdptr);
    if prptr = p_prptr
        then do;
            p_code = 1
            return;
        end;
    call findowner (evptr, "ev_epd", p_epdptr);
    /* release any unprocessed event occurrence */
    do while ( eos);
        call remove (evoptr, "epd_evo");
        call insert (evoptr, "ev_evo", "after",prptr;
        call remove (evoptr, "pr_ro");
        call findnext (evoptr, "epd_evo", p_evptr, eos);
    end;
    /* delete the event processing demand */
    call remove (p_epdptr, "ev_epd");
    call remove (p_epdptr, "pr_epd");
    call destory (p_epdptr, "epd");
    /* evaluate the terminate event */
    call evaluate_event (evptr);
    p_code = 0;
end terminate_event_processing;
```

The Wait-On-Event-Variable primitive for the extended semaphore closely parallels the same primitive for the binary and general semaphores. The main difference is that the extended semaphore will permit the process to collect a resource whenever it becomes available. Therefore there is a greater chance that when the Wait primitive is executed that it will not have to wait because the resource object will already be assigned. The function definition algorithm for Wait-On-Event-Variable is given in Table 5D. Because the extended semaphore assigns resource objects out of a resource class, a notification message is established to tell the process something about the resource occurrence. This was not necessary with the binary semaphore as the resource class had exactly one resource occurrence.

TABLE 5D:

The Function Definition Algorithm for Wait-On-Event-Variable

```
wait_on_event_variable: procedure (p_code, p_epdptr, p_prptr
```

TABLE 5D:-continued

The Function Definition Algorithm for Wait-On-Event-Variable

```
p-notification-message);
    /*This primitive determines whether an event processing
    demand established by a process has been satisfied. If the
    demand is satisfied then the process is so notified, else the
    process is waited until the demand has been satisfied. */
    /* verify that the event processing demand belongs to the
    process */
    call findowner (prptr, "pr_epd", p_epdptr);
    if prptr = p_prptr
        then do;
            p_code = 1;
            return;
        end;
    /* determine whether "gate" event processing demand */
    if p_epdptr → epd.trap = "  "
        then do;
            p_code = 3;
            return;
        end;
    /* determine whether event has happened */
    if ∧ empty (p_epdptr, "epd_evo")
        then do;
            /* notify of event occurrence */
            call findnext (evoptr, "epd_evo", p_epdptr, eos);
            p_notification_message = evoptr_evo.message;
            call remove (evoptr, "epd_evo");
            p_code - 0;
            return;
        end;
    /* determine whether wait would cause a deadly embrace */
    if deadly_embrace (p_epdptr, p_prptr);
        then return;
    /* wait process upon event processing demand */
    call insert (p_prptr, "epd_pr", "before", p_epdptr);
    p_code = 0;
    call process_dispatch (prptr);
end wait_on_event_variable);
```

The Test-On-Event-Variable is similar to the Wait-On-Event-Variable primitive except the process receives a "not happened" signal rather than being waited if the event has not happened. The function definition algorithm for the test primitive is given in table 5E. It is identical to the first eight percent of the Wait-On-Event-Variable primitive (FIG. 5b).

TABLE 5E:

The Function Definition Algorithm for Test-On-Event-Variable

```
test_on_event_variable; procedure (p_code, p_epdptr, p_prptr;
p-notification-message);
    /* This primitive causes a resource object represented
    by an event processing demand (p_epdptr) to be assigned to a
    process (p_prptr), provided that it is not already assigned.
    Otherwise the process is so notified */
    /* verify that the event processing demand belongs to the
    process */
    call findowner (prptr, "pr_epd", p_epdptr);
    if prptr = p_prptr
        then do;
            p_code = 1;
            return;
        end;
    /* verify that this is a "gate" event processing demand */
    if p_epdptr.epd.trap = "  "
        then do;
            p_code = 3;
            return;
        end;
    /* determine whether event has happened */
    if empty (p_epdptr, "epd_evo")
        then do;
            /* notify of event occurrence */
    call findnext (evoptr, "epd_evo", p_epdptr, eos);
    p_notification_message = evoptr_evo.message;
    call remove (evoptr, "epd_evo");
            p_code = 0;
        end;
```

TABLE 5E:-continued

The Function Definition Algorithm for Test-On-Event-Variable

```
    else p_code = 2;
end wait_on_event_assignment;
```

The Release-Resource Assignment primitive makes a resource object which has been assigned available to other event processing demands. It does this by first releasing the resource object and placing the event occurrence into the set owned by the event variable. It then checks to see whether there are any unsatisfied event process demands queued on the event variable. Table 5F is the function definition algorithm for the release primitive. Some information may be transmitted to the next user of the resource object through the notification message.

TABLE 5F:

The Function Definition Algorithm for
Release-Resource-Assignment

```
release_resource_assignment: procedure (p_code, p_roptr,
p_prptr, p-notification-message);
    /*  This procedure releases the assignment of a resource
(p_roptr currently assigned to a process p_prptr). This may
cause an event occurr if the event variable representing the
resource class has an unsatisfied event processing demand
posted against it. */
    /*  verify that resource is currently assigned to process */
    call findowner (prptr, "pr_ro", p_roptr);
    if prptr = p_prptr
        then do;
            p_code = 1;
            return;
        end;
    /*  release resource */
    call remove (p_roptr, "pr_ro");
    /*  insert event occurrence into "ev_evo" */
    call findowner (rcptr, "rc_ro", p_roptr);
    call insert (p_roptr, "ev_evo", "before", pr_ptr);
    p_ro_ptr → evo.message = p-notification-message;
    call evaluate_event (rcptr);
end release_resource_assignment;
```

4. Deadlock Detection Mechanism

The invention herein is a firmware/hardware mechanism which will examine the request by a process to acquire a resource object and determine whether or not that resource object is available. More specifically, the mechanism identifies the situation where the resource object is not available because it is currently assigned to some other process, which process is currently waiting directly or indirectly on the process making the request. If the processes were allowed to wait for the desired resource object, a deadlock situation would arise because the resource object could never be relinquished by the process currently holding it. The net result of such a deadlock condition would be that the process itself would have some work which is incomplete and incompletable because the two processes, and potentially more than two, could never resume their activity.

There are four separate cases that require examination by any deadlock detection mechanism. These cases are categorized by a table shown on FIG. 1F. The access type parameter is shown as the horizontal abscissa whereas the resource class parameter is shown as the vertical ordinate. There are two choices categorized under the access type; one is where access is considered exclusive to the resource object whereas the other is where access is considered sharable for the resource object. There are two choices also categorized under resource class; one is where the resource class has only one resource occurrence, whereas the other is where the resource class has many resource occurrences. There are therefore two choices for each of the two variables resulting in four cases requiring examination for deadlock conditions. The first case is the binary semaphore architecture for exclusive access; the second case is the general semaphore architecture for exclusive access; the third case is the binary semaphore architecture for shared access; whereas the fourth case is the general semaphore architecture for shared access.

Figure 1G:
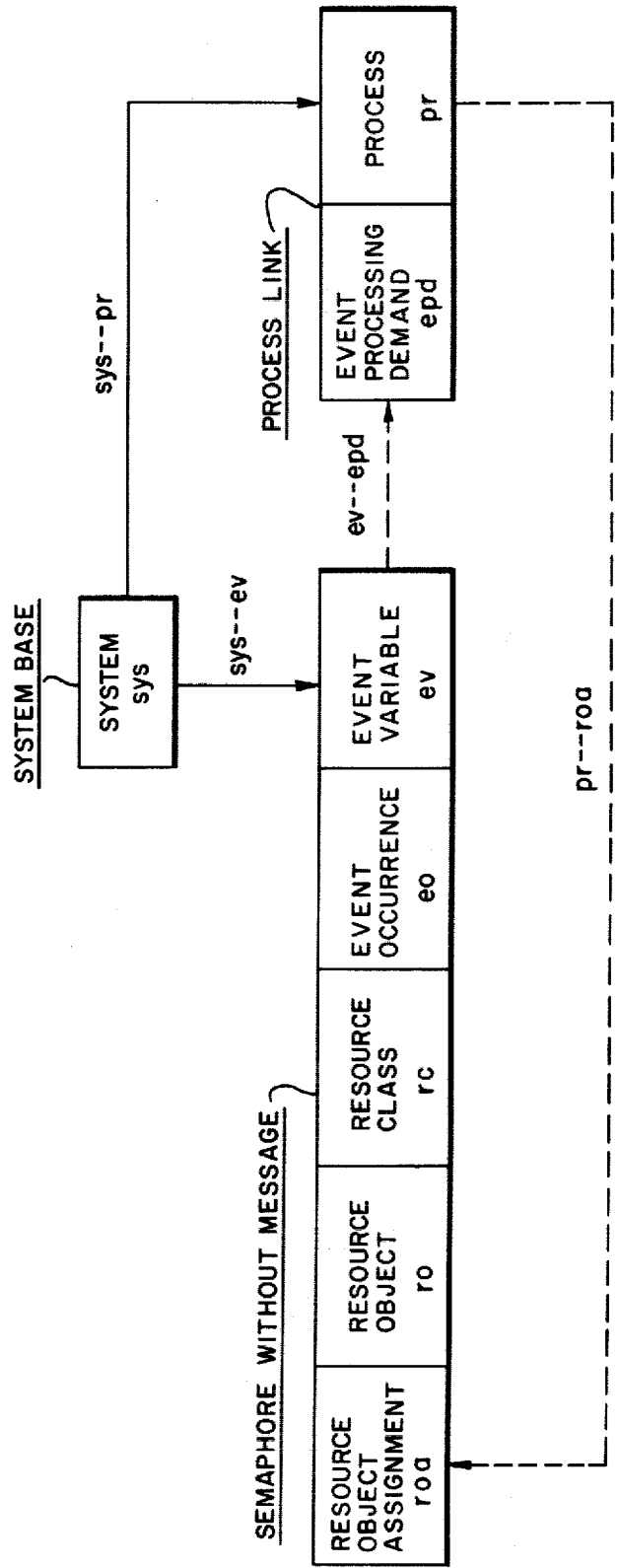

FIG. 1B is the schematic diagram of deadly embrace detection with exclusive assignment of resources and where there is a single resource occurrence within a resource class, i.e. case 1. The data structure diagram showing the logical entities which exist in the case of a binary semaphore architecture for exclusive resource assignment is on FIG. 1G. Associated with these logical structures are the hardware structures of FIGS. 16A and 16M. The firmware algorithm for deadlock detection for the logical structure of FIG. 1G is shown on Table 5G as implemented in the control unit shown on FIGS. 13A-13C.

Figure 1H:
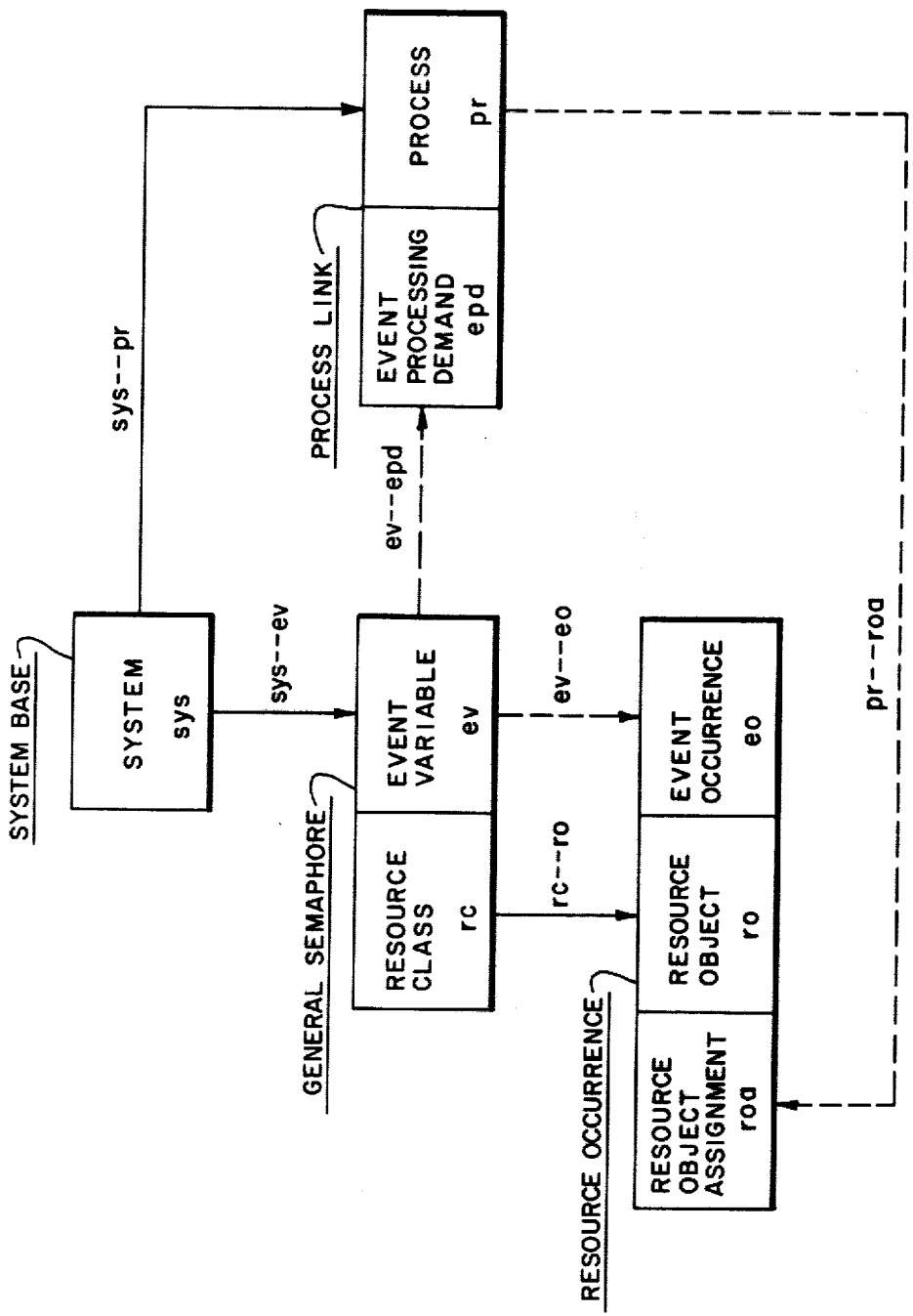

The data structure diagram showing the logical entity structure which exists for the case of a general semaphore architecture for exclusive resource assignment is on FIG. 1H. Associated with these logical structures are the hardware structures of FIGS. 16E and 16F. The firmware algorithm for deadlock detection for the logical structure of FIG. 1H is shown on Table 5H also as implemented on the control unit shown on FIGS. 13A-13C.

Figure 1I:
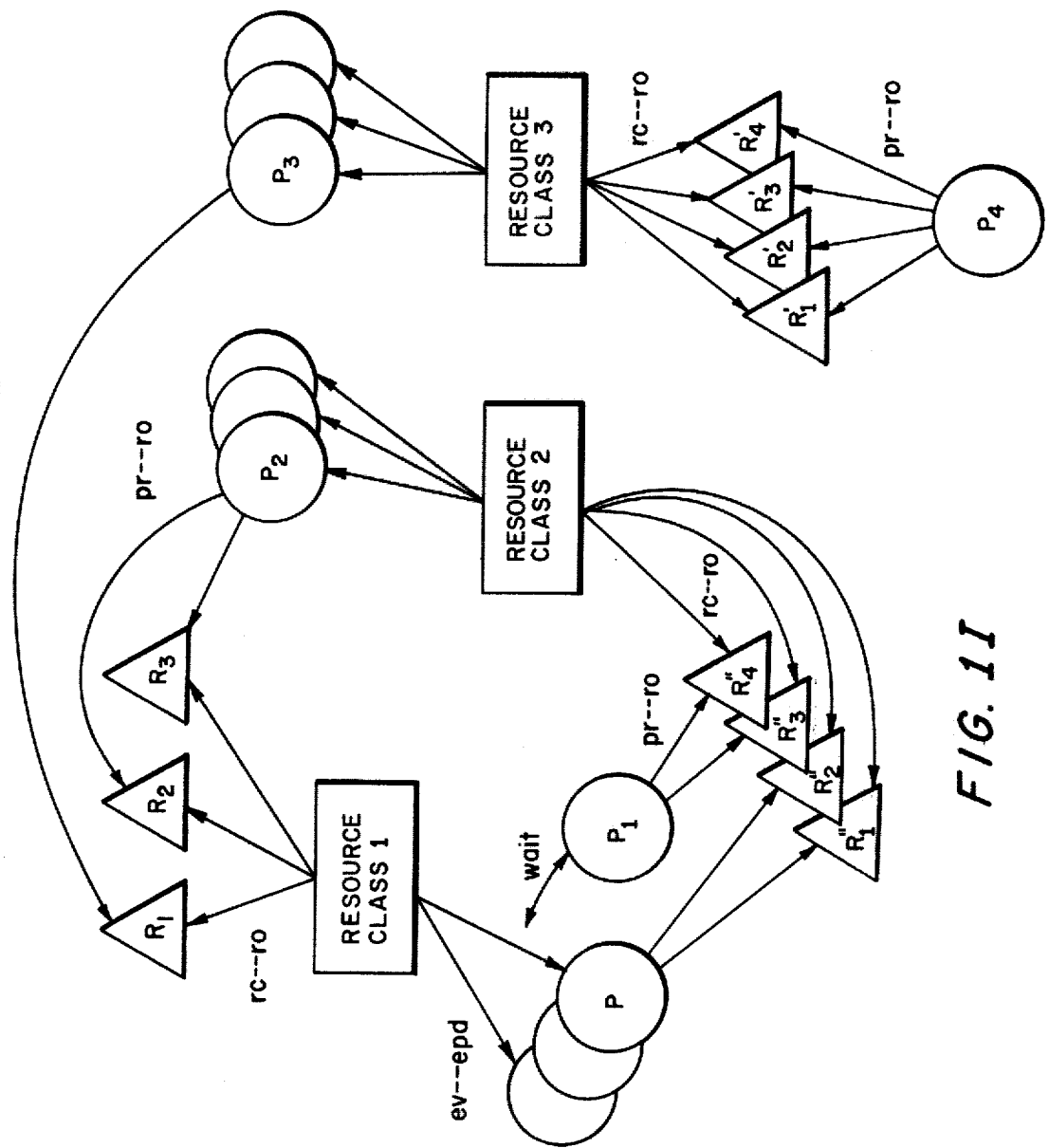
Figure 1J:
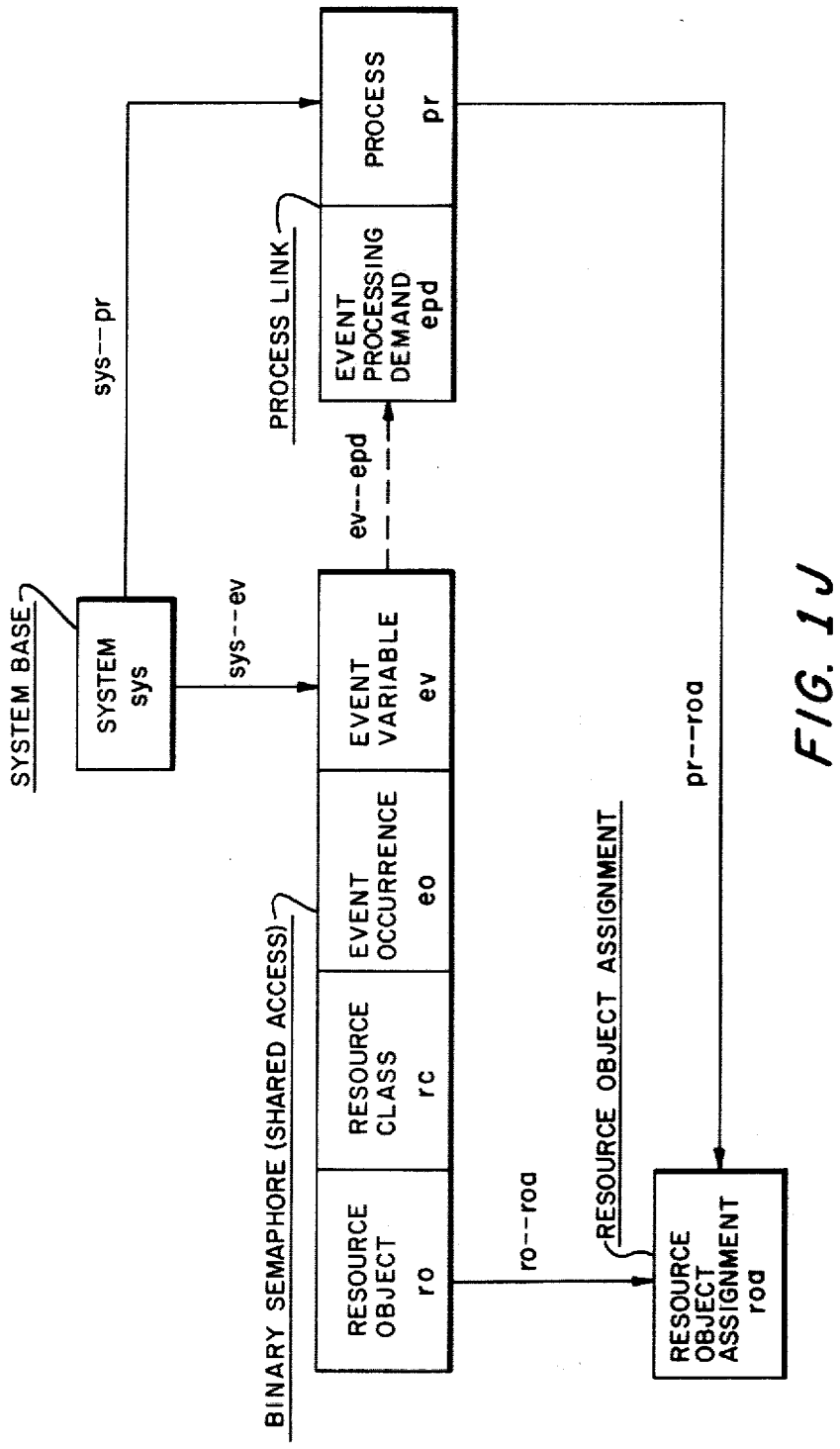

The data structure diagram showing the logical entity structure which exists for the case of a binary semaphore architecture for shared resource assignment is on FIG. 1J. Associated with this logical structure are the hardware structures of FIGS. 16M, 16N and 16O. The firmware algorithm is shown on Table 5I.

Figure 1L:
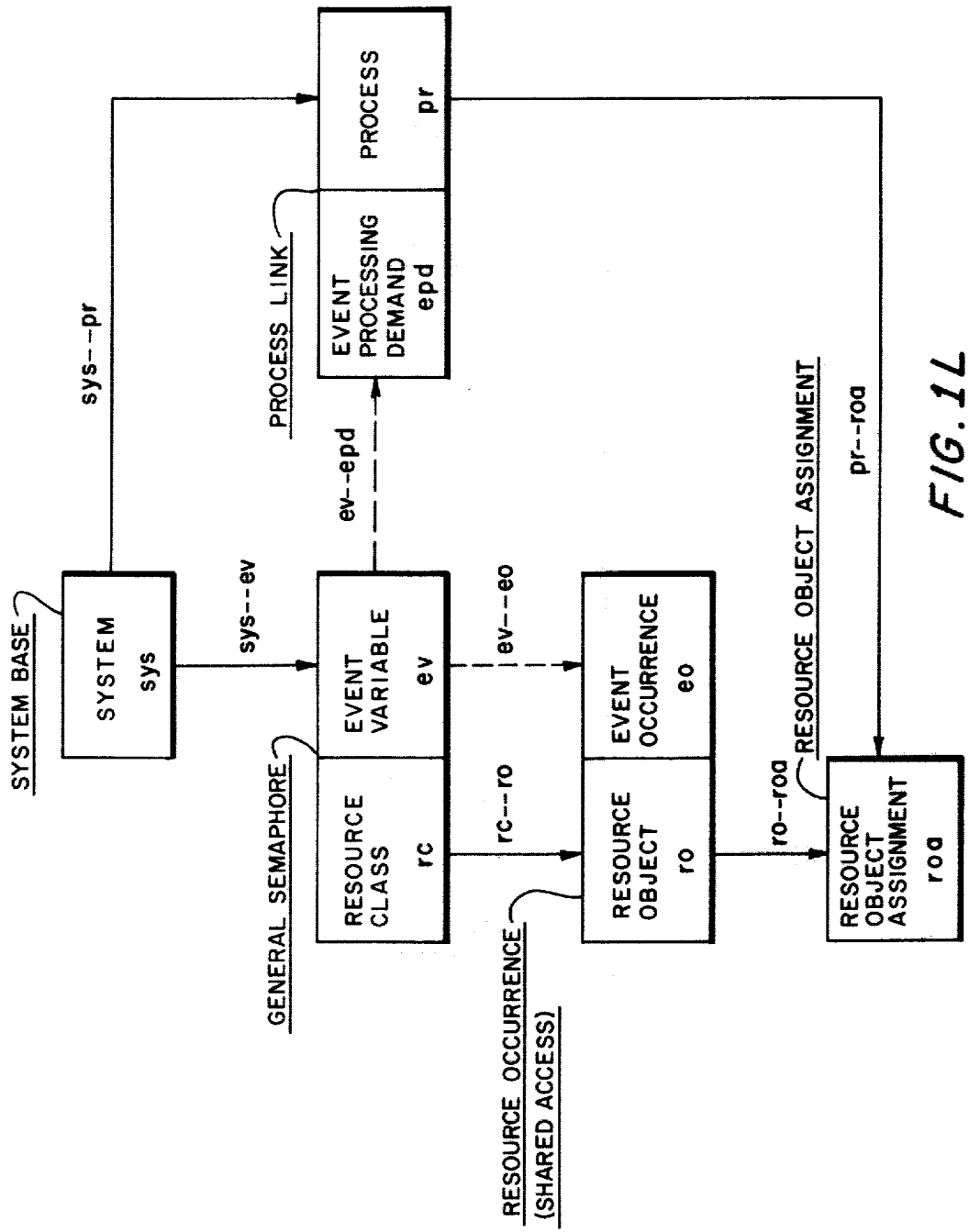
Figure 13A:
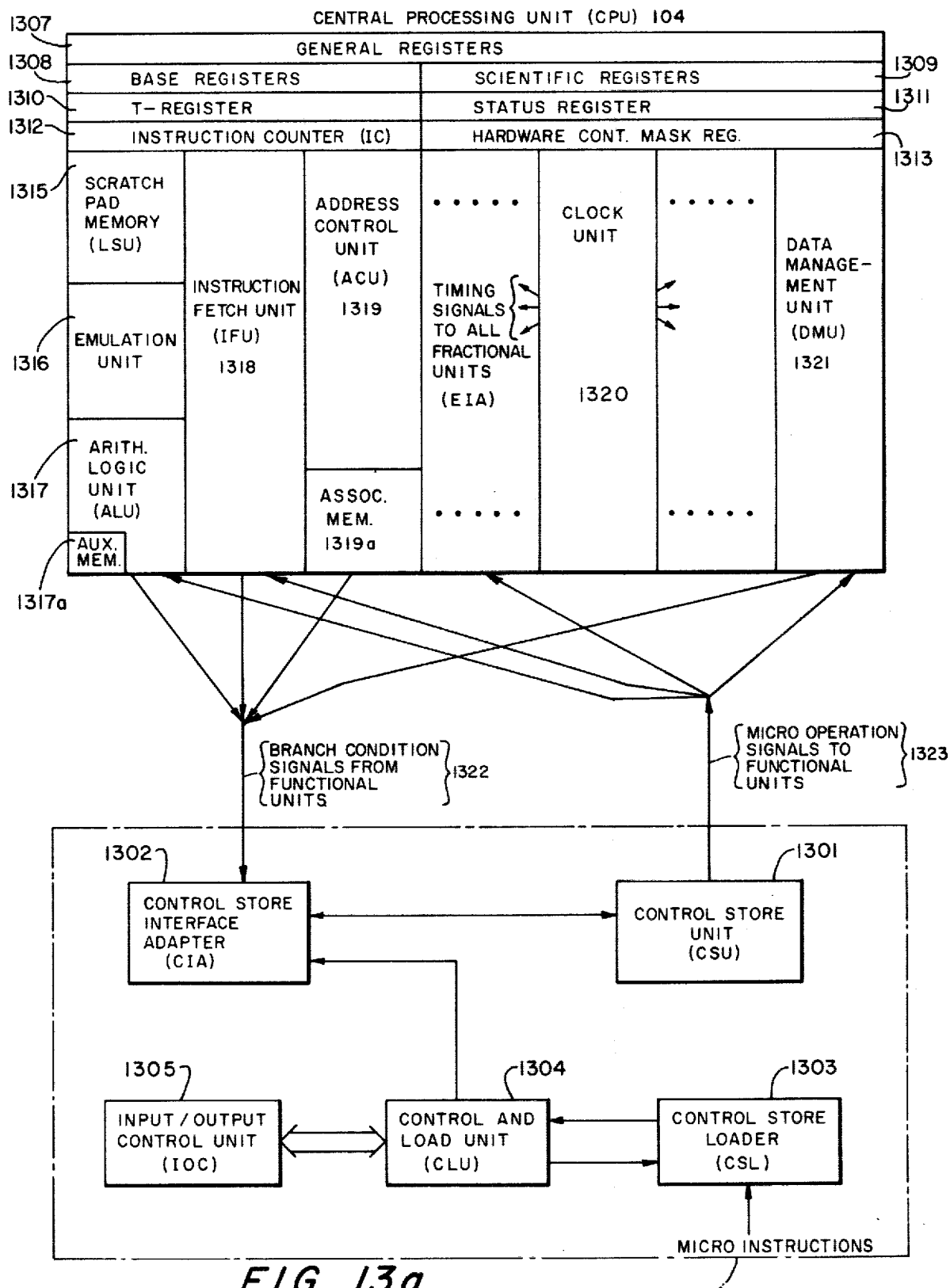
Figure 13B:
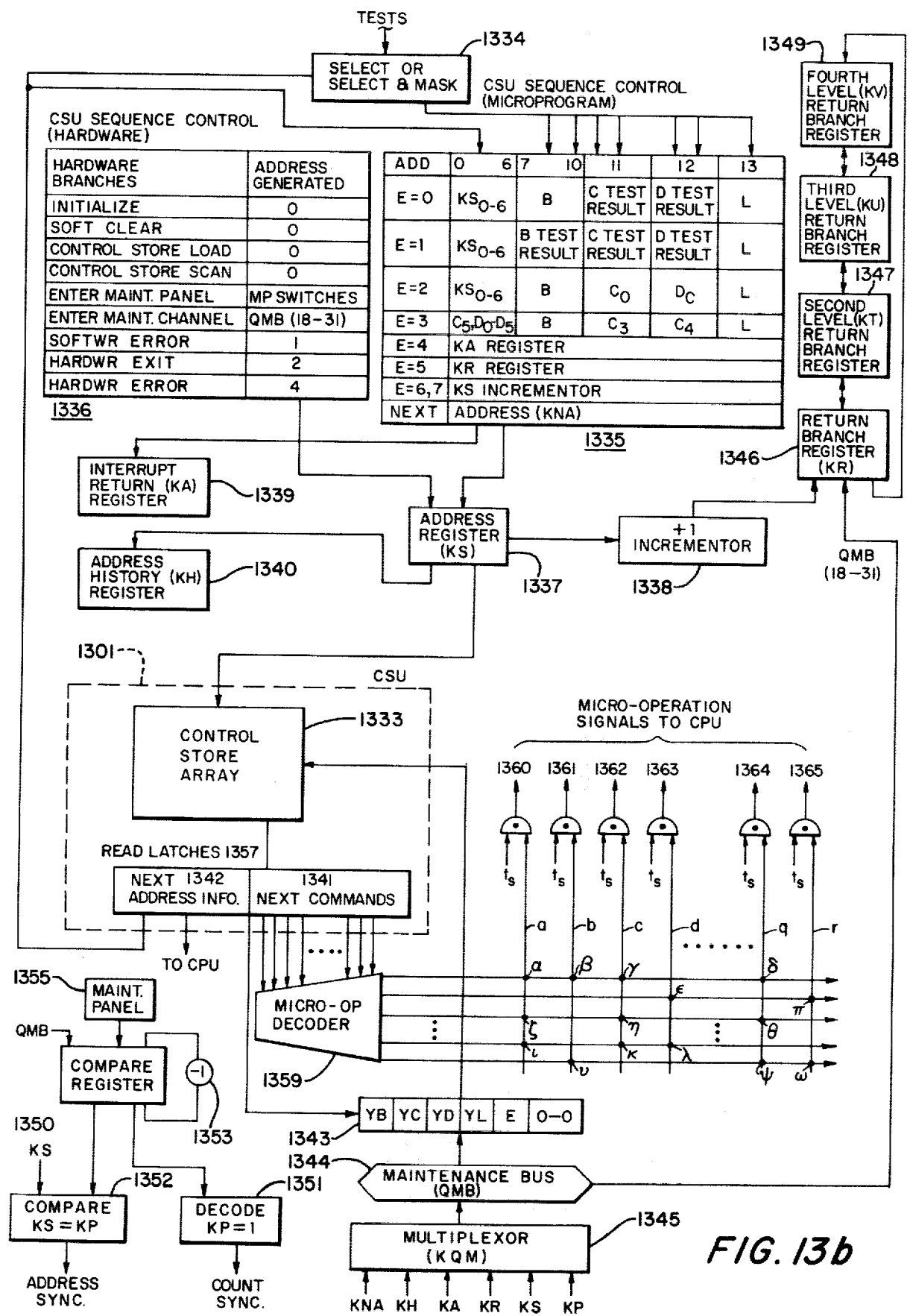
Figures 13C, 14I:
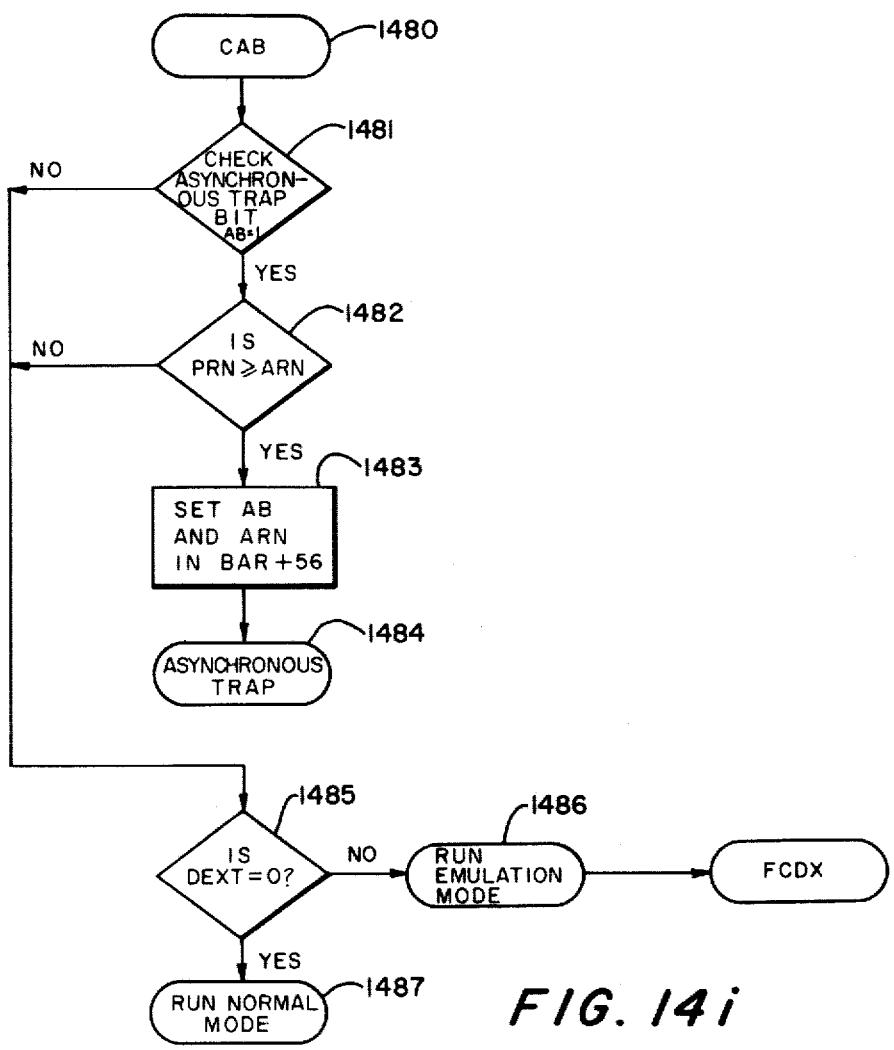

Similarly, the data structure diagram for a general semaphore architecture for shared resource assignment is shown on FIG. 1L. Associated with this logical structure are the hardware structures of FIGS. 16E, 16P, 16O, and 16M. The firmware algorithm implemented on the control unit of FIGS. 13A-13C is shown on Table 5J.

Referring to FIG. 1b there is shown an example of deadlock detection for exclusive access to a resource i.e. case 1. Process #1 wants to have resouce A assigned to it. It declares its intent to do so by executing a Wait-On-Event-Variable primitive. The primitive first finds that resource A is not available. It is assigned to process #3. Other processes are also waiting for it. Will process #1 be allowed to wait too? Not in the situation illustrated because:

(a) resource A is assigned to process 3 (pr--ro set),
(b) process 3 is waiting on resource c (ev--epd set),
(c) resource C is assigned to process 7 (pr--ro set),
(d) process 7 is waiting on resource F (ev--epd set),
(e) resource F is assigned to process 1 (pr--ro set).

If the statement "process 1 is waiting on resource A" were added, then a closed loop would result. In this case, ignoring cache memory opportunities, it requires only six memory fetches to discover and to reject the requested Wait-On-Event primitive.

FIG. 1G is closely related to FIG. 1A discussed previously; however, the concept of a resource object assignment roa has been added. The elements of FIGS. 4 and 1G are associated to other Figures as follows:

Semaphore Without Message of FIG. 1G to Semaphore Without Message of FIG. 16A; and Process Link of FIG. 1G with Process Link of FIG. 16M.

The "deadly embrace" procedure in Table 5G gives the PL/1 firmware algorithmic description of the deadlock detection algorithm for the semaphore of FIG. 1G (case 1).

TABLE 5G:

Procedure for Deadlock Detection

```
deadlock 1: procedure (p_evref, p_prref) returns (bit (1));
call findownerx (prref, "pr_roa"; p_evref);
if prref = p_prref
    then return ("1"b);
    else if insertedx (prref, "ev_epd")
        then do;
            call findowner (evref, "ev_epd", prref);
            return (deadlock1 (evref, p_prref);
            and;
            else return ("0"b);
end deadlock1;
```

Case 2 of deadly embrace the general semaphore for exclusive access to a resource occurrence within a multioccurrence class is concerned with the exclusive assignment of resource objects to a process. Referring now to FIG. 1H, and FIG. 1I, there is shown on FIG. 1I process 1, p1 that would like to wait on a resource class 1 which has within it three resource occurrences $R_1$, $R_2$, $R_3$. If process 1, (p1) is going to wait for any one of these three resources $R_1$, $R_2$, $R_3$, the question that arises is, "Are all three resources currently assigned to one or more other processes (p2, p3) which in turn are directly or indirectly waiting for process 1, (p1)?" In the diagram of FIG. 1I, resources 2 and 3 ($R_2$ and $R_3$) are assigned to process 2, (p2), which is waiting on process 1, (p1). However resource 1 of this class is currently assigned to process 3, (p3), which is waiting on a different resource class 3. Resources $R'_1$, $R'_2$, $R'_3$, $R'_4$ of resource class 3 are in turn assigned to process 4, (p4), which is currently not waiting on anything. Accordingly, therefore, process 4, (p4), will relinquish resource class 3 at some time in the future, and no deadlock or "deadly-embrace" situation would result if process 1, (p1), is allowed to wait on resource class 1.

FIG. 1H of case 2 is a data structure diagram similar to the structure diagram of FIG. 1C of the General Semaphore Architecture previously discussed; however, the concept of resource assignment has been focused upon more closely and the concept of a resource object assignment has been attached to the resource object of the resource occurrence block. The reading and interpretation of the structure diagram is as previously described supra. In implementing the data structure diagram of FIG. 1H the following Figures representing hardware structure are associated with elements of FIG. 1H: System Base of FIG. 1H with System Base of FIG. 6; General Semaphore of FIG. 1H with General Semaphore of FIG. 16E; Process Link of FIG. 1H with Process Link of FIG. 16M; and Resource Occurrence of FIG. 1H with Resource Occurrence of FIG. 16F.

The "deadly embrace" procedure in Table 5H gives the PL/1 firmware algorithmic description of the deadlock detection for the General Semaphore Architecture of FIG. 1H.

TABLE 5H

```
deadlock2: procedure (p_evref, p_prref) returns (bit (1));
call findnext (roaref, "rc_ro", p_evref,oes);
```

TABLE 5H-continued

```
do while (^ eos);
    call findowner (prref, "pr_roa", roaref);
    if prref = p_prref
        then;
        else if inserted (prref, "ev_epd")
            then do;
                call findowner (evref, "ev_epd", prref);
                if deadlock2 (evref, p_prref);
                    then;
                    else return ("0"b);
                end;
    call findnext (roaref, "rc_ro", eos);
    end;
return ("1"b);
end deadlock2;
```

Case 3 of deadly embrace treats with the binary semaphore when used for shared access control as previously noted. (See FIG. 1J). The notion of shared access is best explained by an example. A file, for example, may be considered a resource object which is shared by many processes. However it is difficult to control updating of a file if several processes are concurrently updating; accordingly, a process would shift to exclusive access control when it wanted to update the file, but would operate under shared access control for reading purposes only. Similarly a record may be considered the resource object wherein the record is multiple-assigned to several processes for reading purposes or exclusively assigned to a single process for update purposes. Accordingly since a resource occurrence can be multiple-assigned, a separate hardware structured element is necessary to represent this. Referring to FIG. 1J, each assignment as it is created causes a Resource Object Assignment element to be put into the control data structure and to be inserted into two different sets—one set the ro__roa set links the Resource Object Assignment back to the particular resource object which is being controlled by the assignment, while the pr__roa set associates the Resource Object Assignment with a particular process to which it is being assigned. This permits a process to at one time have many resource objects assigned to it while simultaneously any one of the resource assignments may be assigned to multiple processes. This gives rise to three situations wherein the assignment request by a process may be immediately made, and also three situations wherein the requesting process must be caused to wait if a deadlock situation is not detected. These situations are shown on FIG. 1K. Referring to FIG. 1K the absisca parameter is shown as the Request Mode whereas the ordinate parameter is shown as the Current State. Note that immediate assignment of a request from a requesting process can be made if the request mode is either exclusive or sharable and the current state of the requested resource object is available and also if the request mode of the process is sharable while the requested resource object is currently sharably assigned. However, if the request mode of the process is either exclusive or sharable whereas the current state of the resource object requested is exclusively assigned, and if the request mode of the process is exclusive whereas the current state of the resource object requested is sharably assigned, then deadlock embrace detection must be made and if no deadlock situation would result if the process is caused to wait on the requested object then it is placed in the wait state.

With the architecture of FIG. 1J, therefore, and taking the situation of FIG. 1K where a process is requesting shared access and is currently exclusively assigned then the logic flow for deadlock detection is similar to that in FIG. 1B. However, if the resource object is sharably assigned then it is clear that the process to which it is currently assigned is free and is not directly or indirectly waiting on the process making the request; therefore it may be necessary to investigate the status of many more processes before the waiting may be permitted. The deadlock determination for these conditions of Case 3 are performed by algorithm of Table 5I, as implemented in firmware in the control unit of FIGS. 13A-13C, utilizing the hardware structures of FIGS. 16N-16O, in accordance to the relationships of FIG. 1J, discussed supra.

TABLE 5I

```
deadlock3: procedure (p_evref, p_prref returns (bit (1));
call findnext (roaref, "ro_roa", p_evref, eos);
do while ( ^ eos);
    call findowner (prref, "pr_roa", roaref);
    if prref = p_prref
        then return ("1"b);
        else if inserted (prref, "ev_epd");
            then do;
                call findowner (evref, "ev_epd", prref);
                if deadlock3 (evref, p_prref)
                    then return (";1"b);
                    else;
                end;
    call findnext (roaref, "ro_roa", eos);
    end;
return ("0"b);
end deadlock3;
```

Case 4 of deadlock detection is for the General Semaphore Architecture for Shared Access shown on FIG. 1L. The general semaphore is the architecture for acquiring exclusive or sharable access over any one of several resource objects within a resource class. Deadly embrace detection for this architecture has additional degrees of complexity because a requesting process is willing to wait on any resource object within a resource class which in one sense makes it easier to make on available; however if there are no resource objects within a resource class available deadly embrace detection must ascertain that there is at least one resource object assigned which can be made available in the future and whose current access is not controlled by a process which is waiting directly or indirectly on the process making the request. Referring to FIG. 1L it is seen that it is similar to FIG. 1H; however, the Resource Object Assignment element has been separated from the Resource Occurrence entity and made an independent entity which can be inserted in the ro_roa and pr_roa set. An additional hardware structure shown on FIG. 16P is required together with the firmware algorithm of Table 5J (shown below) for this embodiment.

TABLE 5J

```
deadlock4: procedure (p_evref, p_prref) returns (bit (1));
call findnext (roref, "rc_ro", p_everf, eos);
do while ( ^ eos);
    deadly = "0"b;
    call findnext (roaref, "ro_roa", roref, eos);
    do while ( ^ eos & ^ deadly);
        call findowner (prref, "pr_roa", roaref);
        if prref = p_prref
            then deadly = "1"b;
            else if inserted (prref, "ev_epd")
                then do;
```

TABLE 5J-continued

```
                    call findowner (evref, "ev_epd", prref);
                    if deadlock4 (evref, p_prref)
                        then deadly = "1"b;
                        else call findnext (roaref, "ro_roa", eos);
                    end;
                else call findnext (roaref, "ro_roa", eos);
            end;
    if ^ deadly
        then return ("0"b);
        else call findnext (roref, "rc_ro", eos);
    end;
return ("1"b);
end deadlock4;
```

II. DESCRIPTION OF HARDWARE IMPLEMENTATION

1. General Discussion

The invention operates typically in the hardware system environment, coordinated by a hardware/firmware/software operating system and controlled by a control system hereinafter described. Referring to FIG. 2a the subsystems are the processor subsystem 101, the storage subsystem 102, and one or more—up to 32—peripheral subsystems 103. The processor subsystem contains a central processing unit (CPU) 104 and up to four input/output control units (IOC) 105. Each peripheral subsystem consists of a peripheral control unit (PCU) 106, a number of device adapters (DA) 107, and up to 256 peripheral I/O devices 108. The storage subsystem 102 consists of one to four semiconductor memory modules of 32 to 512 kilobytes each.

In the processor subsystem 101, the CPU 104 performs the basic processing operations for the system, and interfaces with memory 102. The IOC 105 controls all information exchanges between the storage subsystem 102 and peripheral devices 106.

A. Central Processing Unit

The CPU includes a main memory synchronizer 109, a buffer store 110, various elements that comprise the computational unit 111, and optional emulation facilities 112. The main memory synchronizer 109 resolves conflicts for the use of main memory among the computational unit 111, the buffer store 110, and the IOC 109. Conflicts are resolved on a priority basis: the IOC has the highest priority followed by memory writes (from the computational unit) and then memory reads (into the buffer store). The main CPU also includes the address control unit ACU 131 which controls main memory addressing and the associative memory AS 132 used to store most recently used addresses of main memory. The buffer store 110 is a small high-speed buffer memory that reproduces a selected region of main memory and interfaces with the computational unit to decrease average memory access time. During each memory read, both the buffer store and main memory are accessed. If the information to be fetched is already in the buffer store, the main memory read is terminated and the information fetched from the buffer store. Otherwise the main memory 102 is read. Every time this is done, the CPU 104 fetches 32 bytes that contains the desired information. This information remains in the buffer store for future memory references. Since the buffer store is transparent to software, the program controlling the computer at any given moment cannot determine whether the information it is processing has been fetched from the buffer store or from main memory.

The computational unit 111 performs all data processing and address generation within the CPU. A typical control store 130 within the computational unit (see a book entitled Microprogramming: Principles and Practices, Samir S. Husson, Prentice Hall, Inc.) contains firmware which initializes the system, controls the CPU 104 and IOC 105, and decodes an instruction set (not shown). Optionally the control store may provide scientific instructions, test routines, emulation packages, or special purpose features which extend the capabilities of the processor subsystem.

As an option, the CPU provides emulation of systems other than the instant system. Emulators 112 are components of firmware, software, and in some instances hardware.

B. Input-Output Control Unit

The IOC 105 portion of the processor subsystem provides a data path between any peripheral subsystem 103 and the storage subsystem 102. This path allows for the initiation of peripheral commands and controls the resulting data transfers. An IOC can typically handle up to 32 channel control units (not shown).

C. Peripheral Subsystems

In a peripheral subsystem 103 on FIG. 2a the PCU 106 is a stand-alone microprogramming processor that relieves the load on the CPU 104 by controlling the i/o devices 108 during i/o operations. The PCU does this by executing instructions contained in a channel program. This program results in arithmetic, logical, transfer, shift, and branch operations being performed in the PCU. There are several kinds of PCU's according to the kind of device each controls: i.e. unit record, mass (disk) storage, magnetic tape, communications, etc.

Device adapters 107 mediate between every PCU and the devices it controls. Each contains the dedicated firmware and logic necessary to implement communication with a particular type of device. Depending on the type, a DA 107 controls one or several devices.

The major functions performed by a peripheral subsystem 103 are as follows:
1. Transforming CPU instructions into a series of commands acceptable to the appropriate peripheral device.
2. Packing and unpacking data in the form needed by the CPU or the appropriate peripheral device.
3. Keeping the CPU informed of the status of the subsystem and of the devices under its control.
4. Independently initiating and processing error and recovery procedures.
5. Allowing on-line diagnosis of a device without disturbing the device-sharing capabilities of the associated peripheral processor.

A PCU resolves conflicts for main memory between devices attached to it; however, the IOC revolves conflicts between PCU's.

D. Storage Subsystem

Each memory module 1–4 is 4 or 8 bytes wide. The number of modules, their size, and the data path width may vary according to size of computer. Memory modules are four-way interleaved in such a way that the four modules are accessed sequentially (module 1 contains the first 8 bytes, module 2 contains the second 8 bytes, etc). Interleaving decreases the number of conflicts for access to main memory and thereby decreases the average memory access time. Memory is reconfigurable in case of failure; i.e., blocks of memory within a module may be removed without destroying contiguous addressing.

Main memory 102 consists of a capacitive storage medium in the form of metal oxide semiconductor (MOS) chips. This medium operates on the refresh principle to maintain information. Each memory location is typically refreshed at least once every 2 milliseconds; the design ensures that few conflicts occur between refresh timing and memory accesses. (In cases of conflict, refreshing takes precedence).

An area at the beginning of main memory is reserved for hardware and firmware. The upper limit of this area is defined by the content of a boundary address register (BAR—to be later described) which is visible to the system software. The BAR content is set at system initialization time. The memory area below the address specified in the BAR can contain IOC tables which define the configuration of the peripheral subsystems, firmware to control the CPU, or microprograms and tables for emulation. The size of the area below the address specified in the BAR depends on the system configuration. Whether microprograms are in main memory or control store depends on the system configuration and the applications run on the system.

2. Basic Machine Structures

There are typically three basic data structures utilized in this hardware: data formats, software visible registers, and the instruction formats.

A. Data Formats

Information is transferred between memory and the CPU in multiples of 8 parallel bits. Each 8-bit unit of information is called a byte. Parity or error correction data is also transferred with data but cannot be affected by software. Therefore, in this patent specification the term data excludes the associated parity of error correction data.

B. Bytes

Bits within a byte are numbered 0 through 7 from left to right. Bytes are processed separately or in groups. Two bytes constitute a halfword, 4 bytes a word, 8 bytes a doubleword, and 16 bytes a quadword. These are the basic formats for all data, including instructions.

C. DATA REPRESENTATION

All data are in binary form, but may be interpreted as binary, decimal, or alphanumeric. Data bits are interpreted in groups of four, as binary coded decimal data; eight as alphanumeric, or 16 to 64 as binary digits. The latter are interpreted as signed, fixed, or floating-point numbers in binary notation. Any number of contiguous bits up to a doubleword may also be manipulated as a string. The alphanumeric character set is represented in EBCDIC. ASCII is supported as an alternate exchange code.

D. BYTE ADDRESSES

Byte locations in main memory are consecutively numbered starting with zero; each number is the address of the byte. A group of consecutive bytes is said to be halfword-, word-, doubleword-, or quadword-aligned, if the address of the left byte in a group is a multiple of 2, 4, 8, or 16, respectively. Whenever a halfword, word, doubleword, or quadword is so aligned, that unit can be fetched from that address. The location of data in main memory is specified by a data descriptor which is accessed indirectly during address development. (See U.S. patent application Ser. No. 470,496 filed May 16, 1974 and having priority date May 16, 1973 entitled Segmented Address Development and assigned to the same assignee as the instant application).

E. VISIBLE REGISTERS

There are 33 user-visible registers in the CPU 104 FIG. 2a whose contents collectively define the state of the CPU. There are four types: (See FIG. 2).
1. general registers
2. base registers
3. scientific registers (optional)
4. miscellaneous registers

F. GENERAL REGISTERS

General registers (GR) 201 FIG. 2b are used to manipulate fixed-point binary numbers and bit strings. There are typically sixteen 32-bit general registers in the CPU 104—GR0 through GR15. General register GR8 through GR15 are also usable as index registers. When used as index registers, they are herein called X0 through X7. Indexing is performed using the 32-bit two's complement integer contained in a register.

G. BASE REGISTERS

Base registers (BR) have the same format as instruction counters IC and stack registers 202-203. Base registers are used during address computation to define a part of memory. There are typically eight 32-bit base registers, BR0 through BR7.

H. SCIENTIFIC REGISTERS

Scientific registers (SR) are optional equipment for computation with floating-point binary numbers. There are typically four 8-byte scientific registers which are referred to as SR0 through SR3. Scientific registers have the format 204-205 of FIG. 2b.

I. MISCELLANEOUS REGISTERS

There are five other registers:
- instruction counter—having format 202-203;
- status register—having format 207;
- stack register (called the T register);
- boundary address register—having format 202-203; and
- hardware control mask register—having format 208.

The instruction counter (IC) is a 32-bit register that contains the address of the instruction being executed. The status register (STR) 207 is an 8-bit register that records facts about the procedure currently being executed, for example, whether an underflow was caused by the most recent operation. The stack register also known as the T-register is a 32-bit register that contains a pointer to the top of a pushdown stack associated with the currently active procedure. Stacks to be described infra provide a work space, and a mechanism for saving local variables and preserving procedure entry, and return information. The boundary address register (BAR) 206 is a 28-bit register which specifies the lowest absolute main memory address accessible by software. This register is loaded during system initialization and can only be read by software. The hardware control mask register 208 is an 8-bit register which records machine condition information.

J. INSTRUCTION FORMATS

There are approximately 200 instructions although more or less may be utilized. Each instruction is one of four different lengths but always an even number of bytes long. Instructions are stored in consecutive storage locations. The address of the leftmost byte is a multiple of 2, and is the address of the instruction.

The eight most significant bits (and in some cases bits 8 through 11 or 12 through 15) of an instruction represent the operation code, while the remaining bits represent one or more operands. An operand may be a register designator, displacement designator, address syllable (logical address), literal value, immediate literal value. The type and number of operands are determined by the instruction format.

3. SYSTEM ORGANIZATION

A. JOB STEP AND TASK

Work to be performed by the computer system is defined externally by a series of job steps via a job control language. A job step is a unit of work to which hardware resources are allocated. Typically a job step consists of several tasks. A task is the smallest unit of user defined work consisting of a stream of instructions executed without parallelism.

B. PROCESS

The user-visible concepts of task and job step are represented in the hardware by a process and process group, respectively. A process is defined as an ordered sequence of instructions which can be executed asynchronously by the CPU (i.e., several processes can be active and sharing resources, but only one process is actually running at any one instant). A process group is a related set of processes necessary to perform one job step.

C. PROCESS CONTROL BLOCK AND SYSTEM BASE

Because processes can relinquish CPU control at various points during their execution, a storage area in main memory is made available to a process to save CPU status. This status information is utilized to precondition the CPU before a process regains control of the CPU.

The storage area assigned to a process is called a process control block (PCB) 400 on FIG. 4. The data contained in a PCB include the addresses of memory areas (address space) assigned to the process, the contents of all pertinent registers, and the state of the process. Thus a PCB serves as a temporary storage area for information necessary to start or restart a process without any information loss. Each PCB is visible to the hardware and can be addressed by the operating system via a set of hardware tables developed during system initialization and modified during system operation (FIG. 5).

Figure 5:
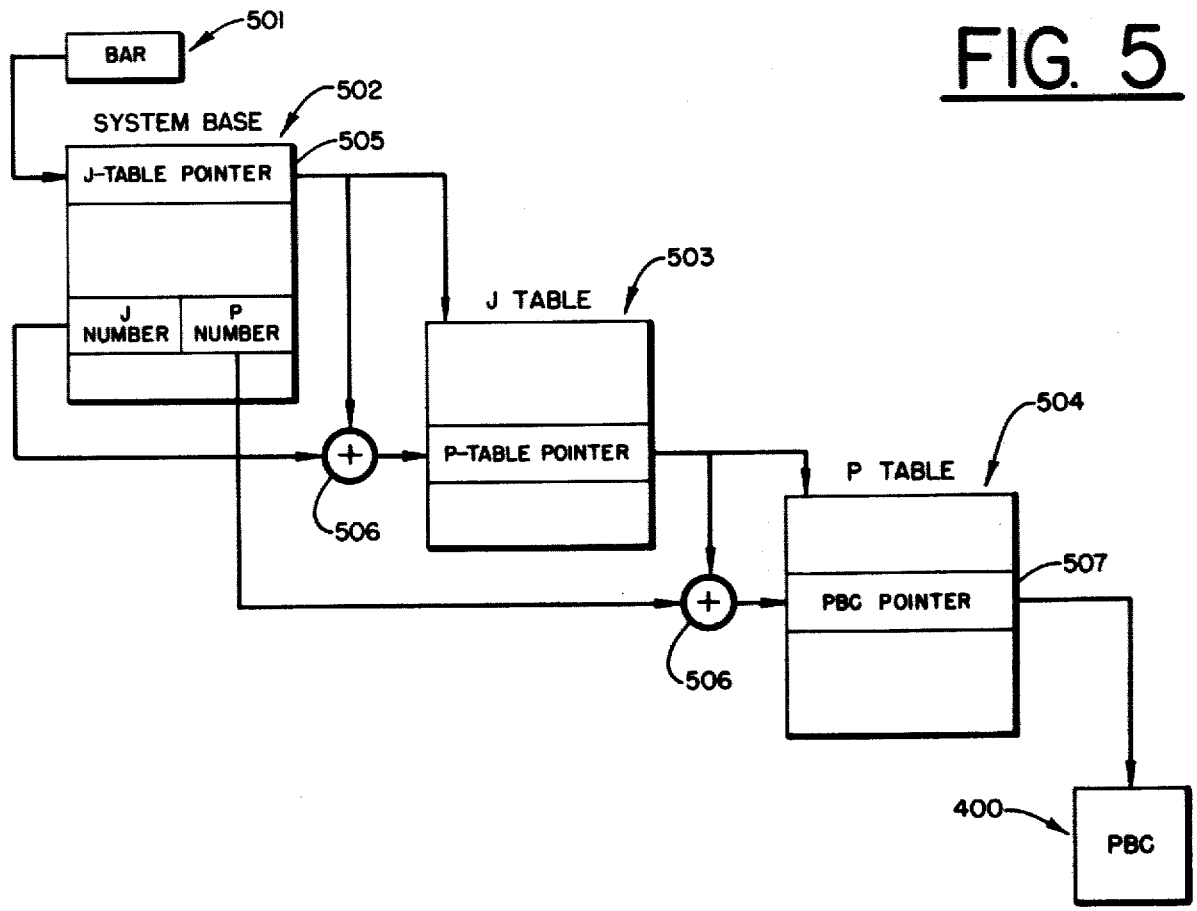
FIG. 5 is a schematic diagram of a system for addressing a process control block.
Figure 6:
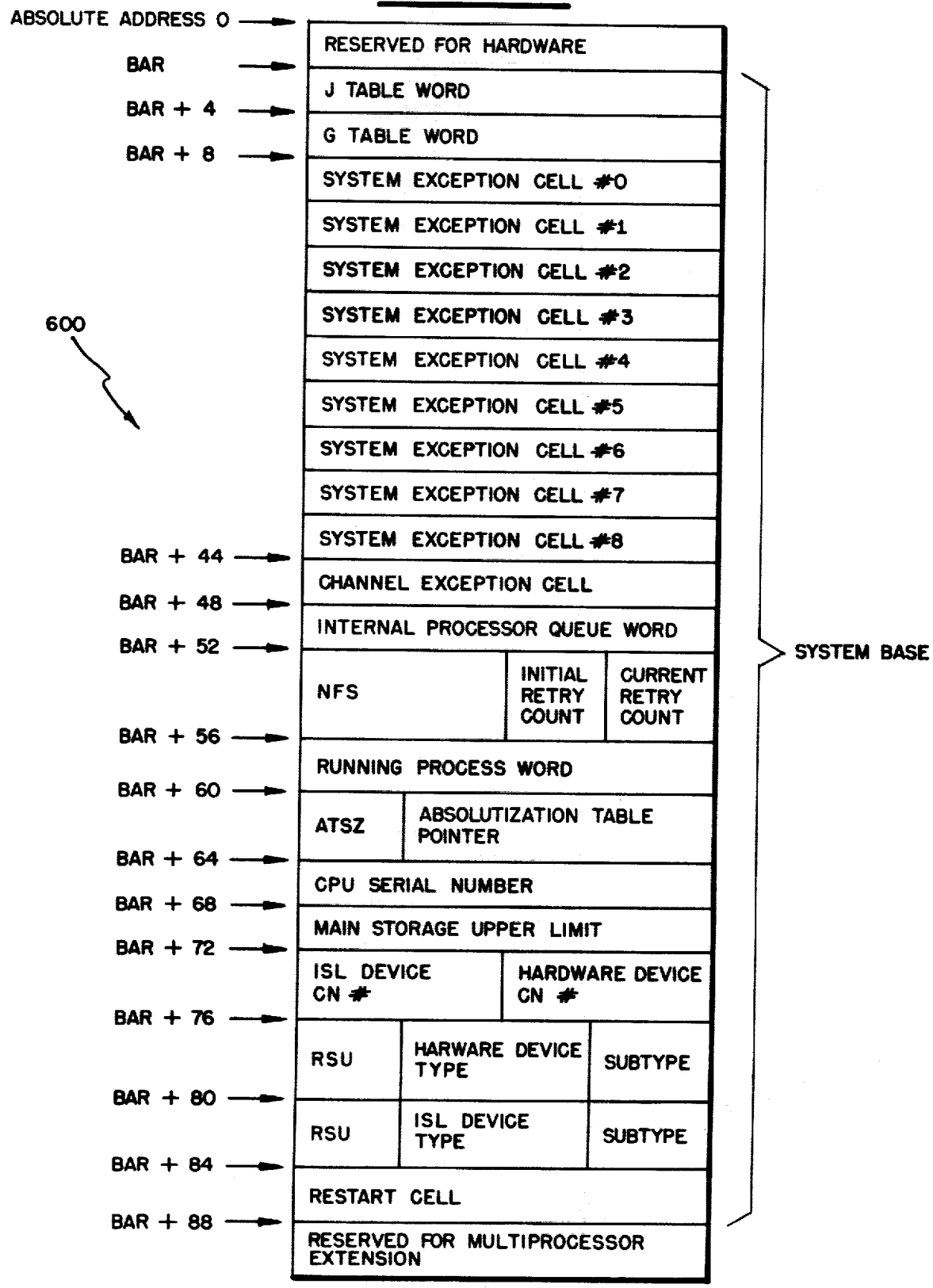
FIG. 6 is a schematic diagram of the system base of the computer system utilizing the invention.

There is an absolute main memory area which is referred to as the system base (FIGS. 5 and 6). This area is developed by firmware and is accessible via the base address register (BAR) 501 which can be read but not written. The system base 502 contains a number of system attributes which include a job step number and a process group number (J, P) respectively for the currently running process. Another attribute in the system base is a pointer to a hardware defined data structure known as the J table 503. This table contains an entry for every job step presently in the system. Each entry in the J table 503 points to an associated P table 504 which is also a hardware defined data structure. This table defines a process group and contains an entry for every process in the process group. Each P-table entry points to a PCB 400.

Referring to FIG. 5 the J-table pointer 505 indexed by the J number via the arithmetic portion 506 of computational unit 111 (FIG. 2a) provides access to a J-table entry 503. This entry contains a P-table pointer which when indexed by the P number via computational unit 506 provides access to a P-table entry 504. The P-table entry contains a pointer 507 to the PCB of the current running process. Thus the operating system can access the active PCB using the contents of the BAR 501 and can access any other PCB given its associated (J, P) logic name.

D. MEMORY SEGMENTATION

In a multiprocess environment, such as herein described there are many processes in memory at any given time. These processes vary in size and demand for memory which causes a memory allocation problem. The hardware herein described in cooperation with an operating system (not shown herein) solves the problem by dynamically allocating memory space. Due to the random nature of memory requirements, memory is allocated in variable size segments and the memory allocation can be restructured during process run time. Thus, a process may be allocated a number of noncontiguous memory segments. This memory allocation method is called segmentation.

Segmentation presents an additional problem in that memory addresses have to be modified whenever part or all of a process is relocated. To alleviate this problem the system herein described provides a technique whereby addresses used by a process are logical rather than absolute main memory addresses. These logical addresses are used to develop absolute addresses.

Segmentation also allows each process to access its own or related memory segments via a system of segment descriptors. By accessing a segment descriptor, a process can obtain the address of a segment. Segment descriptors are contained in main memory and are maintained by the operating system.

Each process may have access up to 2068 memory segments. Normally, this would require an equal number of segment descriptors per process. However, since segments can be shared, the operating system groups segment descriptors into segment tables. This grouping is based on accessability by one process (task), a process group (job step), or globally (system wide). Each process may have up to 15 segment tables associated with it. This technique requires only one segment descriptor for each segment which can be accessed by a process via a segment table. Thus, the memory space required for segment descriptors is decreased; memory updating during relocation is reduced; and some program protection is provided. (The main mechanism for program protection is the ring system. See U.S. patent application entitled "Protection of Data in an Information Multiprocessing System by Implementing a Concept of Rings to Represent the Different Levels of Privileges Among Processes" invented by Marc Appell, et al, first filed on Nov. 30, 1973 in France having French Ser. No. 73 42706 and further filed in the U.S. within the priority convention date of Dec. 2, 1974 and having U.S. Ser. No. 528,953 and assigned to the same assignee named herein.)

A process must be able to determine which segments it is allowed to access. Accordingly, the system provides a process with two segment table word arrays (STWA). These arrays contain the addresses of all segment tables accessible to a process. There are two segment table word arrays per process because there are two segment sizes, large and small. Large segments have a maximum size of $2^{22}$ bytes while small segments have a maximum size of $2^{16}$ bytes. All segments vary in size in 16-byte increments up to the maximum. A system can typically accomodate up to 28 large segments and 2040 small segments.

Segment table word arrays may be relocated by the operating system; therefore, a process must know the absolute address of its associated STWA's. The PCB for any process contains two words which contain this information which are known as address space words ASW0-1 on FIG. 4. Each word points to a segment table word array STWA. The operating system updates the contents of the ASW's whenever the associated STWA's are relocated. Working down the chain of pointers and decoding the segment descriptor is a firmware function and thus once initiated is not visible even to the operating system.

Segmentation defines over 200 million bytes of address space as being available for processes. This number exceeds the capacity of main memory; therefore, a secondary storage (magnetic disk or drum) is used in conjunction with main memory. The operating system creates the illusion that the system has a much larger main memory than is really available. This concept is called virtual memory.

At any given time, a defined segment may or may not be physically in main memory. The contents of a segment descriptor indicates whether or not the associated segment is in main memory. The hardware detects any attempts by a process to access a segment not in main memory and notifies the operating system. The operating system causes the desired segment to be loaded into main memory from secondary storage. Then the operating system places the segment's memory address in the segment descriptor which is the only place where the absolute address of a segment can be found. This operation is invisible to the process and thus it is not aware that the segment was not in main memory or that it may have to be relocated in main memory. (For details on memory segmentation see U.S. patent application Ser. No. 470,496 filed May 16, 1974 and entitled "Segmented Address Development"; also see patent no.

The computer system herein described provides data and procedure protection by preventing processes from interferring with each other or sharing each other's address space in an unauthorized manner. This protection is accomplished by restricting addressability via memory segmentation and by a ring system.

The segment tables isolate the address space of the various processes in the system. Processes always use a segmented address during execution. A segmented address consists of a segment number and a relative address within the segment (see above referenced application on Segmented Address Development). The hardware checks that the address used by a process is part of the address space assigned to the process. If the address is outside the prescribed address space, an exception occurs. A process cannot refer to data within the address space of another process because the hardware uses the segment tables of the referencing process. Thus, there is no possibility for a process or process group to reference an entity belonging to another process group.

Generally, overlap in address space in the system occurs for those segments shared by all processes. These public segments are created by system programs which check to insure against address conflicts. Thus, segmentation protects user programs against each other and protects the operating system against user programs.

Segments shared by several processes are not protected from misuse by one of these processes. To solve this problem, a ring system is utilized whereby procedure and data segments are grouped into a four-class hierarchy. The four ring classes are numbered 0 through 3. Each ring represents a level of system privilege with level 0 (the innermost ring) having the most privilege and level 3 (the outermost ring) the least. Every procedure in the system has a minimum and a maximum execute ring number assigned to it which specifies who may call the procedure. A procedure is a subroutine which is capable of calling other procedures and passing parameters to them:

The general rules of the ring system are as follows:
1. A procedure in an inner ring has free access to data in an outer ring. Conversely a procedure in an outer ring cannot access data in an inner ring.
2. A procedure in an outer ring can branch to a procedure in an inner ring, but the reverse is not allowed.
3. Each segment containing data is assigned two ring values, one for read (RD) and one for write (WR). These ring values specify the maximum ring value in which a procedure may execute when accessing the data in either the read or write mode.

Each time a procedure instruction is executed, the procedure's ring number (effective address ring, EAR) is checked against the ring numbers assigned to the segment containing the referenced data. The EAR is the maximum number of process ring numbers in the instruction counter and all ring numbers in base registers and data descriptors found in the addressing path. Access to the data will be granted or denied based on a comparison of the ring numbers. For example, if a system table exists in a segment having a maximum read ring value of 3 and a maximum write ring of 1, then a user procedure executing in ring 3 may read the table but may not update the table.

By predesign, rings 0 and 1 are reserved for the operating system and rings 2 and 3 are reserved for the user. Ring 0 contains those segments critical to total system operation. Ring 1 contains the bulk of the system segments whose failure would not be catastrophic and would allow recovery. The user may utilize ring 2 for checked-out programs and ring 3 for programs being debugged.

F. PROCEDURE CALLS

Figure 7A:
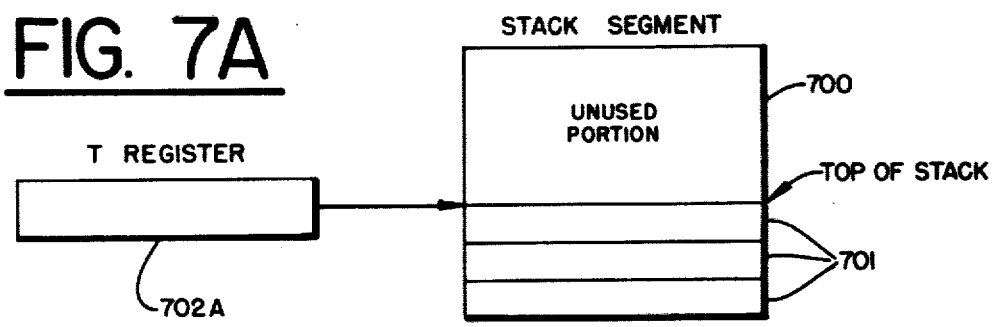
FIGS. 7A and 7B are a schematic representation of a stack segment and a stack frame respectively.

The procedure call is an important function in the system herein described. Procedure calls are used to pass from one procedure to another; to allow user procedures to employ operating system services; and to achieve a modular structure within the operating system. A procedure call is effected by instructions and a hardware recognized entity called a stack (FIG. 7A).

A stack is a mechanism that accepts, stores and allows retrieval of data on a last-in-first-out basis. Stacks reside in special segments called stack segments. A stack segment consists of a number of contiguous parts called stack frames 701 (FIGS. 7A and 7B) which are dynamically allocated to each procedure. The first stack frame is loaded into the top of the segment and succeeding frames are loaded after it. The last frame loaded is considered the top of the stack. The T-register 702 locates the top of the stack for the currently active process. A virtual T-register exists in the PCB of all other processes in the system.

Figure 7B:
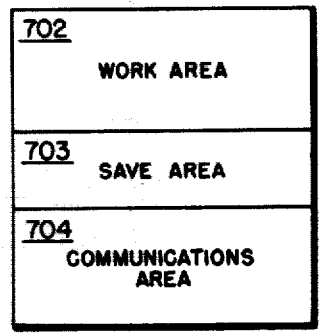

A stack frame 701 of FIG. 7B consists of three areas: a work area 702 in which to store variables, a save area 703 in which to save the contents of registers, and a communications area 704 in which to pass parameters between procedures. Prior to a procedure call, the user must specify those registers he wishes saved and he must load into the communications area the parameters to be passed to the called procedure. When the call is made, the hardware saves the contents of the instruction counter IC and specified base registers to facilitate a return from the called procedure.

Each procedure call creates a stack frame within a stack segment 701 and subsequent nested calls create additional frames. Each exit from one of these called procedures causes a stack frame to be deleted from the stack. Thus, a history of calls is maintained which facilitates orderly returns.

To insure protection between procedures executing in different rings, different stack segments are used. There is one stack segment corresponding to each protection ring per process. A PCB contains three stack base words which point to the start of the stack segments for rings 0, 1 and 2 associated with the process. The ring 3 stack segment can never be entered by an inward call; therefore, its stack starting address is not required in the PCB.

4. PROCESS MANAGEMENT AND SYNCHRONIZATION

The system herein provides for multiprocessing operations which are controlled by an operating system using a combination of software, hardware and firmware. Software creates and deletes processes within the system while hardware and firmware multiplex processes on the CPU. In addition, a combination of software, hardware and firmware provide for synchronization between processes.

Processes are normally, but not always, started and stopped at the initiation and termination of I/O operations, during related job handling, and at other times for purposes deemed necessary by the operating system. Therefore, a communications system is necessary to efficiently start and stop related processes and to pass information between them. The hardware system herein provides internal messages called semaphores to provide a communications link between the processes.

A. PROCESS STATES

A process can be in one of four possible states at any time: running, ready, waiting or suspended. The hardware recognizes these four possible process states and executes various firmware procedures to effect process dispatching, state changes and to maintain data structures based on a process's state. The PCB contains a state field which defines the current state of its associated process.

A process is in the running state when it has control of the CPU. This state involves supplying the CPU with an address space (segment tables) and a starting address. The CPU then executes instructions in the procedure segments of the process. The process name J table word (logical address) of the PCB for the currently running process is retained in the running process word (BAR + 60) within the system base (FIG. 6). (Note: The system base shown in FIG. 5 is the same as that shown in FIG. 6, but with some details omitted.)

The ready state is equivalent to running state except that the process does not have control of the CPU because it has not been recognized by the CPU. A process in the ready state is in contention for the CPU with other ready processes and the running process.

A process is in the wait state when it cannot continue until a specific event occurs such as a message via a semaphore. A waiting process is not in contention for the CPU but it may be in contention with other waiting processes for the required event.

A suspended process is a process which has been stopped for a time by software and may be resumed later. The decision to stop and resume the process is external to the process. Thus, a suspended process is not active and therefore cannot receive notification of event occurrences and cannot utilize the CPU.

A process is suspended under the following conditions:
(1) By executing a Terminate instruction (as a result of having completed all its functions.)
(2) By execution of a Suspend instruction by the operating system.
(3) By the occurrence of an exception condition whereby control is transferred to the operating system.

B. PROCESS DISPATCHING

Processes move from one state to another voluntarily by action of the process while running or involuntarily by the actions of other processes. CPU firmware, known as the dispatcher, controls the transaction of processes between states. The dispatcher uses a set of queues (to be later described) to manipulate processes which are in the ready or the waiting states. Suspended processes are controlled by software.

Figure 8:
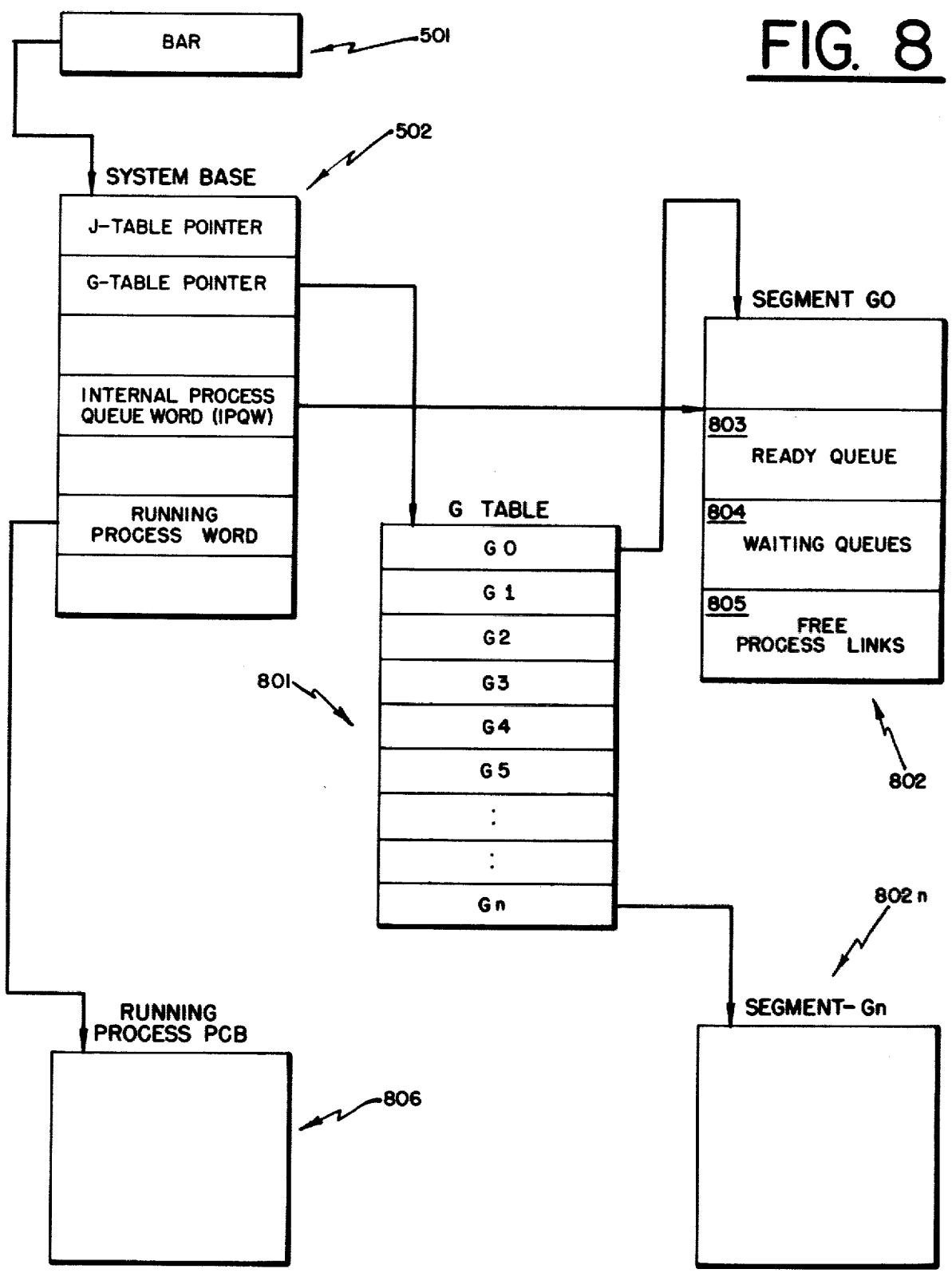
FIG. 8 is a schematic diagram of a system for addressing G-segments and in particular the queue of processes in the G0 segment.
Figure 9:
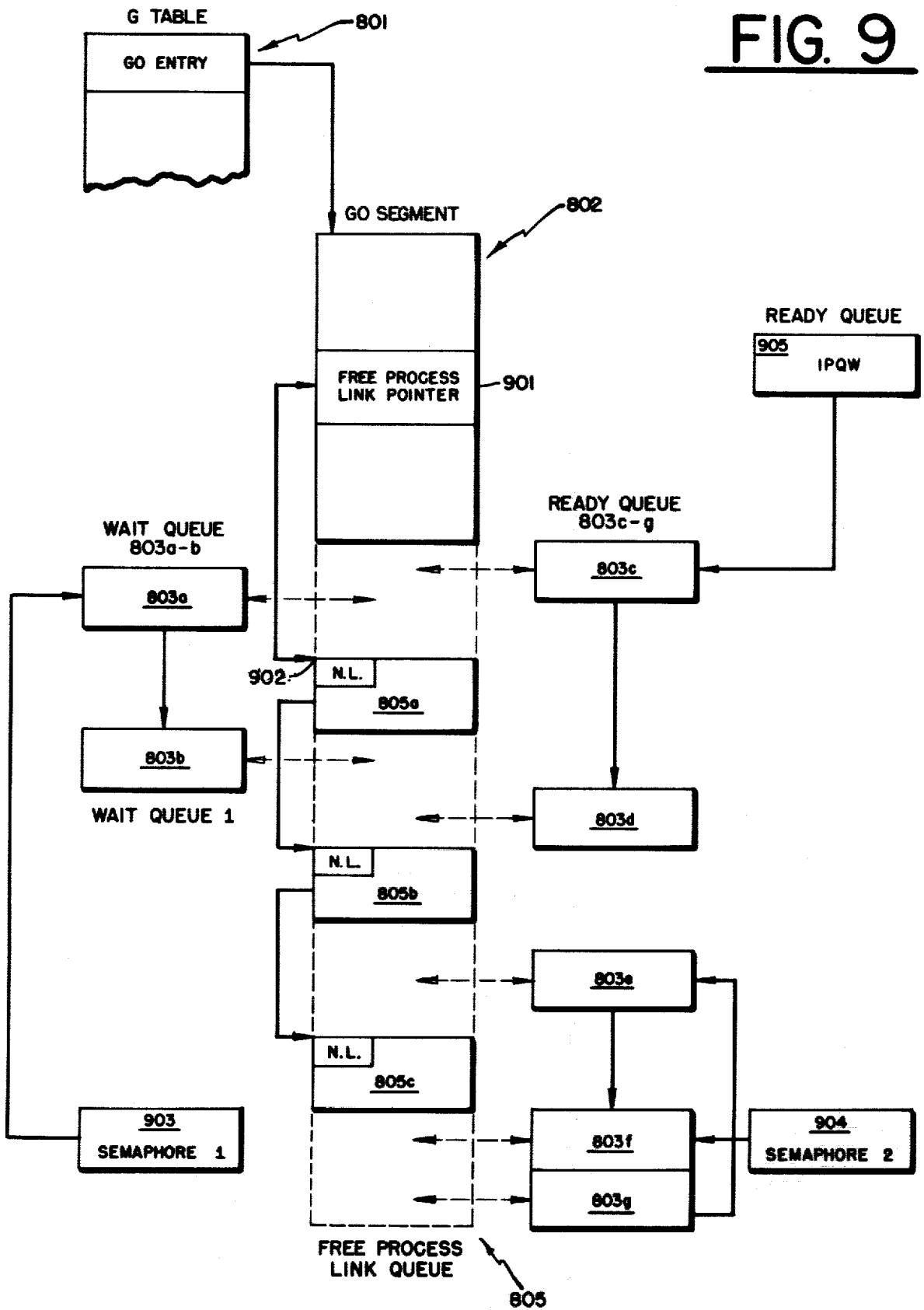
FIG. 9 is an exploded schematic diagram of a G0 segment illustrating queue of processes and process linking.

Referring to FIGS. 6, 8 and 9, a ready or waiting process is represented by a PCB and a special queue entry called a process link. FIG. 9 shows an exploded view of contents of the GO segment 802, and contains process links 803a-803b and 803c-803g of active processes, and free process links 805a-805c of suspended processes. Each process link specifies the process name (J, P), the process priority and a pointer to the next process link in the queue. There are various types of queues such as wait queue 803a-b and ready queue 803c-g.

A hardware device similar to the J table, known as the G table, (FIGS. 6 and 8) contains pointers to all general (known system wide) segments 802-802n. The first element, GO, of the G table 801 points to that segment 802 containing the dispatcher queues. A G-table pointer to the G table 801 is found in the system base 502 on FIG. 5. Also in the system base is an entry called the internal process queue word (IPQW) which identifies the head 805 of the ready queue 803c-803g in the GO segment 802.

Thus, the dispatcher can examine all ready processes by consulting the ready queue 803c-803g.

When the currently running process changes states, the dispatcher removes the process link at the head of the ready queue and uses the J, P name to access its PCB. The process defined by the PCB then becomes the new running process.

Since more than one process may be awaiting on the same event, a queue of waiting processes 803a-803b exists for each event. Waiting processes are also strung together via process links 805 residing in the GO segment. A pointer to the head of a wait queue exists in a semaphore 903 (to be later described). A number of events exist for which a process may wait; therefore, there are a number of wait queues each of which has an associated semaphore 903, 904.

The number of processes ready or waiting varies dynamically. Thus, the number of process links required for the ready and wait queues also varies. This fact introduces a memory mangagement problem for the dispatcher. The problem is solved by another queue called the free process link queue 805a-c. This queue links together all process links in segment GO that are not being used by the ready or the wait queues and can be used to extend a particular queue of ready or waiting processes. A pointer 901 to the head 902 of the free process link queue 805 resides near the beginning of the GO segment 802.

C. PROCESS SYNCHRONIZATION

Process synchronization is required to coordinate the activities of two processes working on the same task. The synchronization is achieved using semaphores 903-904 which are data structures residing in the address space of communicating processes. A semaphore is used to signal event occurrence and to handle queues of messages. An event in this context is anything observed by a process which may be of interest to some other process. The event may be the completion of an asynchronous operation or the availability of a resource.

A process uses two semaphore operations to signal an event occurrence. One operation sends a signal to a semaphore; the other picks up a signal from a semaphore. (The sending operation is often called a V-operation; the receiving operation is called a P-operation). The sending operation allows a process to send data or a signal that data are ready. The semaphore stores the signal until another process is ready to pick it up. Thus, the sending process is free to proceed, since it has sent the data. The receiving operation examines a specified semaphore and picks up the signal. If a signal is present, the receiving process continues executing. However, if there is no signal at the semaphore, the receiving process enters the wait state. The semaphore then serves as a pointer to the head of a wait queue. The process remains in the wait state queued at the semaphore until another process sends a signal to that particular semaphore. Thus, a semaphore can hold a signal until a process picks it up, or a semaphore can hold a process until a signal is sent to it.

Messages can also be passed from process to process. A message has the same present or not present quality as a signal plus additional information. Part of the information is supplied by hardware and part is supplied by the procedure of the process that sent the message. A message carries the process name of the sending process. Thus, many processes can send information through a single semaphore stamped with the sender's name.

A message semaphore may have a queue of messages waiting to be picked up by processes. As with signal semaphores, requirements for memory space increases and decreases thus presenting a memory management problem. Again, the problem is solved with a queue of free message links. These links reside in a known place in a segment that can easily be found when needed to supply or absorb message links.

Because semaphores and the queues built on them are shared by different processes, the total semaphore structure is protected. This is accomplished by hardware and software conventions that restrict access to any segment containing semaphores. Thus, semaphores must be in semaphore descriptor segments, some of which may be G segments (if system communications is necessary). However, all G segments (except G0) are semaphore descriptor segments.

Each semaphore descriptor contains a pointer to a semaphore. Semaphore addresses are developed via a semaphore descriptor, thus providing added protection for the semaphore. A semaphore segment can be addressed logically using a segment number and a relative location within the segment or directly using the G, D number.

E. Process Control Block Structures

Figure 10A:
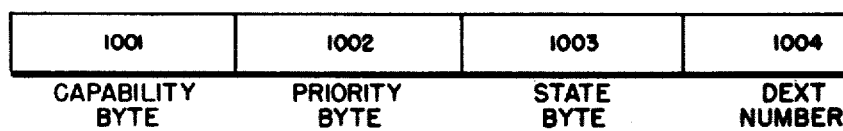
Figure 10B:
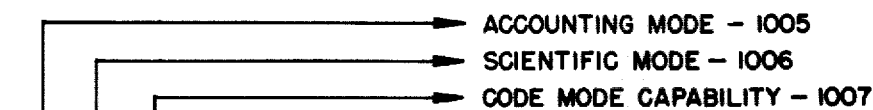

Referring to FIG. 4 there is shown the format of the process control block (PCB). The process control block 400 is a storage area in main memory made available to a process to save the CPU status. Addressing a PCB is performed as described supra in relation with FIG. 5. The PCB pointer 507 (FIG. 5) points to the process control block PCB at memory location 0 on FIG. 4. It will be noted that proceeding in a downward direction memory locations increase by 4 bytes whereas in proceeding in an upward direction from memory location 0 they increase by 8 bytes. The downward memory locations are considered positive from 0 whereas the locations in an upward direction from 0 are considered negative directions. The upward locations are optional and may or may not be included in the process control block; also locations 148 through 176 are also optional. (Note that the numerals under memory location specify the displacement in bytes from the 0 reference location of the process control block PCB and are not to be confused with the reference numerals commonly used to identify parts in a patent drawing). Starting at byte 0 up to but not including byte 16 there are stored four process main words PMW 0 through PMW 3 with each process main word PMW being four bytes in length. Process main word 0 occupies bytes 0 through 3 and is comprised of 4 parts: a capability byte, a priority byte, a state byte and a decor extension byte DEXT. Referring to FIGS. 10a through 10d there are shown details of process main word PMW 0, with further details of the capability byte 1001 shown on FIG. 10b. Referring to FIG. 10b, the first bit 1005 is the accounting mode bit for indicating whether or not time accounting functions are being performed for the process. When the accounting mode bit 1005 is set to binary 0 no time accounting function is being performed for the process; whereas when the accounting mode 1005 is set to binary 1, time accounting is being performed. The scientific mode bit 1006, when set to zero, indicates that saving of scientific register of the machine is not performed and the scientific register saving area located at bytes 148 to 176 on FIG. 4 does not exist in the process control block PCB. When the scientific mode bit 1006, is set to binary 1, the scientific optional feature exists and is being used in the process, and the scientific registers saving area is used to save the contents of the scientific registers when necessary. The code mode bit 1007 indicates whether or not a standard code set or compatibility code set is being used by the process, with a binary 0 in that position indicating that standard code set is being used; whereas a binary 1 in the third bit position 1007 indicates a compatibility code set is being used. The remaining of the bits of the capability byte are set to zero.

Figure 10C:
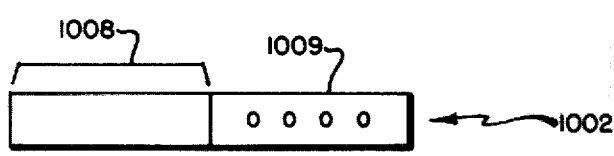

Details of the priority byte 1002 are shown on FIG. 10c. Referring to FIG. 10c the first four bits 1008 of priority byte 1002 is utilized to set the priority level of the process associated with that given process control block PCB. Each process is assigned one of 16 levels of priority which is used for ordering competing processes i.e. (a) for choosing the process to be run among ready processes, (b) for putting processes in queues. Priorities decrease from 0 to 15, and for a given priority level the FIFO (first in first out) rule is applied. The next 4 bits 1009 of priority byte 1002 are zeroes.

Figure 10D:
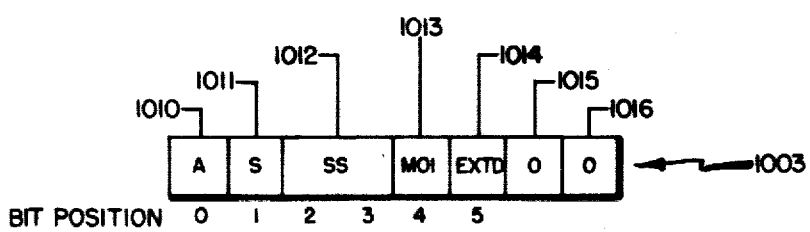

Referring to FIG. 10d details of the state byte 1003 are shown. A state byte is utilized to provide information with regard to the process associated with the process control block PCB 400. The active field bit A 1010 is set to binary 1 when the process is activated. The suspend field S 1011 is set to binary 1 when the process is suspended. The substrate field SS 1012 is a 2 bit field and defines the following substates of the process: (a) when set to binary 00 the process is inactive; (b) when set to binary 01 the process is waiting in the queue of ready process (Q/PR/RDY); (c) when set to binary 10 the process is waiting on a semaphore in a queue of semaphores (Q/PR/S); (d) when set to binary 11 the process is being executed by the processor. The mid-operation field (MOI) 1013 is set to binary 1 when an interrupt happens and is taken care of during the execution of an instruction—i.e. before the completion of the process. The extended decor mode bit EXTD 1014 is set to 1 when the process is operated in an extended decor mode which is an emulation mode of the machine. Bits 1015 and 1016 are set to 0. The fourth byte of process main word PMW 0 contains the decor extension number and is utilized when the system is in emulation mode.

Figure 10E:
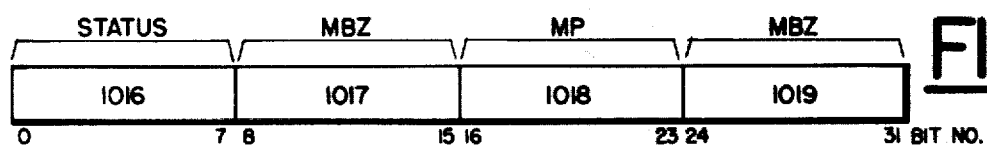

Process main word PMW 1 is stored in bytes 4–7 of the process control block PCB. Details of PMW 1 is shown on FIG. 10e. The status byte 1016 is the first byte in PMW 1 and stores the status register contents. The multiprocessor byte MP 1018 is significant in a multiprocessor architecture otherwise this field is zero. The second and fourth bytes of process main word 1 are the MBZ fields 1017 and 1019 respectively which must be zero for normal operation.

Figure 10F:
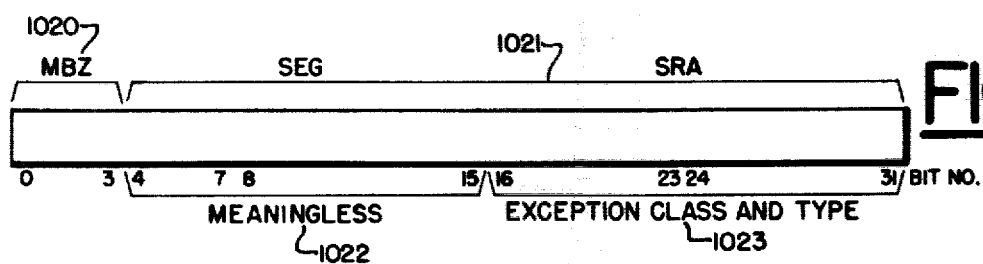

Process main word PMW 2 occupies bytes 8 through 11 of the process control block and is shown in more detail on FIG. 10f. Referring to FIG. 10f the field from bit 4 through bit 31 contains the local name SEG, SRA 1021 of the semaphore to which the PCB is linked when the process is either in the waiting or suspended states. The exception class and type field 1023 contains the class and the type of the interrupt-like exception which cause the process to enter the suspended state after an exception. The field from bits 4 through 15 is meaningless 1022 when a process is in a different state than those mentioned above.

Process main word PMW 3 occupies bytes 12 through 15 in PCB 400 and points to a decor extension table. Referring to FIG. 10g for details of PMW 3 the DETSZ field 1024 defines the number of entries in the table and if this field is zero no decor extension is allowed to the process. The DETA field 1025 is the absolute address of the decor extension table in units of 16 bytes and is significant only if DETSZ is not 0. The decor extension table is made up of DETSZ entries. Each entry is one byte size. The DEXT$^{th}$ entry of the table defines the capability of the process to operate in the decor extension mode DEXT. When the DEXT$^{th}$ byte is 0 the decor extension number DEXT is not allowed, whereas if the DEXT$^{th}$ byte is 1 the decor extension number DEXT is allowed. Values of DEXT other than 0 and 1 are illegal. (See FIGS. 10a DEXT number 1004).

Bytes 16 through 23 of PCB 400 contains 2 address space words ASW 0 and ASW 1 respectively and each ASW contains a pointer to an array of segment table words. Both ASW 0 and ASW 1 respectively have the same format shown on FIG. 10h. The size of the array of the segment table words is defined by the number of segment table words in an array and typically comprises six for ASW 0 and eight for ASW 1. The STWSZ field 1026 indicates the size of the array of the segment table words. The segment table word array field STWA 1027 contains the absolute address STWA of the array in units of 16 bytes—i.e. the absolute address of the array is 16 times STWA in bytes.

Bytes 24 through 27 in the PCB contain an exception word EXW shown in greater detail on FIG. 10i. The exception word contains a pointer (SEG, SRA) 1029 to an exception class table which defines the action to be taken following a process exception according to its class as stored in process main word PMW 2. (See FIG. 10f). The MBZ field 1028 of exception word EXW must be 0.

The stack word SKW located in bytes 28 through 31 of the PCB contains the value of the top of the T register of the stack of the process when the process is not running and is shown in greater detail in FIG. 10j. Referring to FIG. 10j, bits 0 and 1 define the TAG field 1030. The TAG indicates the type of descriptor by its contents and must be zero for SKW. Bits 2 and 3 of the SKW word contain the RING field 1031 which contains the ring number associated with the segmented address of the stack for protection purposes and in this case must be zero. Bits 4 through 31 contain the segment number SEG, and the segment relative address SRA 1032 and is a field which identifies the segment described in a segment table and the segment relative address within the segment. The stack word SKW is updated every time the process leaves the running state. It is used to restore the T register contents every time the process becomes running. In this last case the TAG 1030 and RING 1031 are tested to be zero, otherwise an illegal PCB exception occurs.

Bytes 32 through 35 of the PCB 400 contain the instruction counter content word ICW sometimes also referred to as ICC. Referring to FIG. 10k there are shown details of the instruction counter word ICW wherein the TAG field 1033 must contain binary 00 (i.e. values other than zero are illegal in the instruction counter). The current RING field 1034 occupying bits 2 and 3 defines the current ring number of the process to be used in determination of access rights to main storage. Bits 4 through 31 define the segment number and the segment relative address (SEG, SRA) 1035 which define the address of the next instruction to be executed.

The MBZ field in bytes 36 through 39 must be zero. (Note the MBZ field always indicates a field which must be zero). The MBZ word is tested every time the PCB is accessed from the name J, P. If it is not zero an illegal PCB exception occurs.

Stack base words SBW 0-2 occupy bytes 40-51 in the process control block 400. These words have the same format which is shown in greater detail on FIG. 10l. They are utilized during stack operations and whenever used their TAG field 1036 and RING field 1037 must be zero otherwise an illegal PCB exception occurs. Bits 4 through 31 contain the segmented address (SEG, SRA) 1038 of the first bytes of the stack segments for ring zero, 1 and 2 respectively.

Bytes 52 through 83 of the process control block 400 is a space reserved for the base registers saving area (8 words). Bytes 84 through 147 is a saving area which is utilized to save the values of all general registers (16 words). Bytes 148 through 179 is a saving area which is utilized to save the scientific registers (8 words).

Five double words are provided in the PCB 400 above the PCB zero address, for time accounting purposes when the accounting mode bit in the PMW 0 word is set. These words are located from PCB address minus 8 to PCB address minus 40. Each word contains a time or a time interval expressed in microsecond units in its first 52 bits with bits 52-63 filled with zeroes. The residual time out double word RTO (first 8 bytes above 0 in the PCB) contains the quantum of time which is actually spent by the processor on behalf of the process before a time out exception occurs. The RTO word is updated in the following way: each time the process exits the running state the process timer value is stored in the RTO word. Each time the process enters the running state, the process timer value is loaded from the RTO.

The running time accounting RUA double word at bytes 7 through 15 is a time counter which specifies the total amount of processor time a process was in the running state. The time accounted for is the time actually spent by the processor on behalf of the process exclusively. The RUA word is updated in the following way: each time the process exits the running state, the value of the process timer PT is read. The difference of the contents of RTO and PT is added to RUA. (Consecutively, the PT value is stored in RTO). Note that the time during which the process is suspended is not computed. The RTO and RUA words are updated even if the accounting mode bit is set to 0. However the CET, RTA, and WTA words (to be later described) are provided in the process control block only if the accounting mode bit in the process main word PMW 0 is set to 1. They are updated only in this case.

The waiting time accounting WTA word at bytes 17 through 23 is a real time counter which specifies the total amount of real time the process was in the waiting state. The WTA word is updated in the following way: each time the process exits the waiting state the time of day clock (not shown) value TOD is read and the value of TOD minus the value of CET word is added to the WTA word.

The ready time accounting RTA word located at bytes 24 through 31 is a double word which is a real time counter which specifies the total amount of real time the process was in the ready state. The RTA is updated in the following way: each time the process exits the ready state, the time of day clock value TOD is read, and the contents of TOD minus the contents of CET is added to RTA.

The current entry time CET double word at bytes 32 through 39 contains the time of day at which the process entered one of the following states: ready, waiting, running, and suspended.

System Base Structures

Figure 11A:
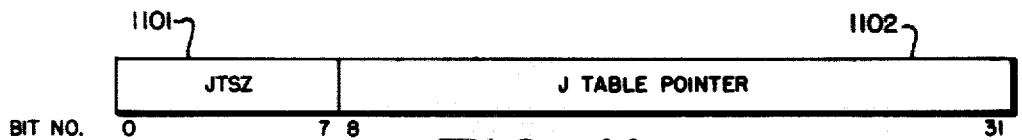
FIGS. 11A through 11R are block diagrams of structures in the system base.
Figure 11B:
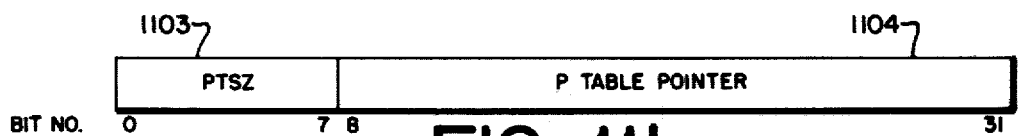
Figure 11C:
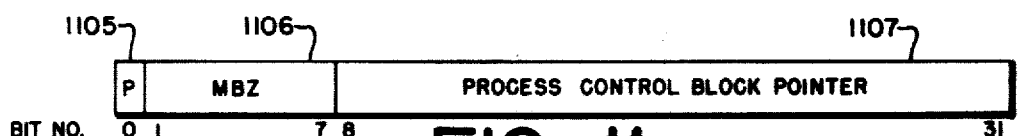

Referring to FIG. 6 the format of the system base 600 is shown. The system base resides in absolute main memory and is developed by firmware and is accessible via the boundary address register (BAR) which can be read but not written. The boundary address register BAR is below an area in main memory reserved for hardware and separates this area in memory reserved for hardware and the system base 600. Referring now to FIG. 6 the system base 600 contains a number of system attributes which includes a job step number and a process group number (J, P) for the currently running process. From the logical name of the process J, P, the absolute address of the corresponding process control block PCB is obtained. The size and address of the J table are defined by the contents of the J table word (JTW). This word is located at the address defined by the BAR register. The format of the JTW is shown on FIG. 11a. The size (JTSZ) 1101 or the J table 1024 on FIG. 12 defines the number of entries in the J table 1204 which may be up to 255 entries. The JTSZ 1101 is an 8 bit positive integer; an out of J table exception occurs if J is greater than JTSZ. The absolute address of the J table 1204 is obtained by multiplying the J table pointer 1102 by 16. The J table 1204 contains J table entries whose format is shown in greater detail on FIG. 11b. Each J table entry defines the absolute address of a P table 1205 which is obtained by multiplying the P table pointer 1104 by 16. The size (PTSZ) 1103 of a P table defines the number of entries in the P table. The PTSZ is an 8 bit positive integer which may typically vary from 0 to 255 to indicate the number of entries in the P table. An out of P table exception occurs if P is greater than PTSZ°. Each entry of the P table 1205 defines the absolute address of a process control block (PCB) 1206 by multiplying the process control block pointer 1107 by 16. A presence indicator P 1105 indicates the absence of a PCB 1206 when set to binary 0 and indicates the presence of a PCB when set to binary 1. (When the presence indicator P 1105 is found to be 0 a vacant P table entry exception occurs). Bits 1 through 7 of the P table indicator (FIG. 11c) must be 0 (MBZ) 1106, otherwise an illegal P table entry exception occurs.

Figure 11D:
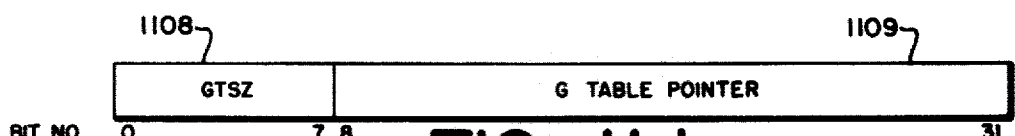
Figure 11E:
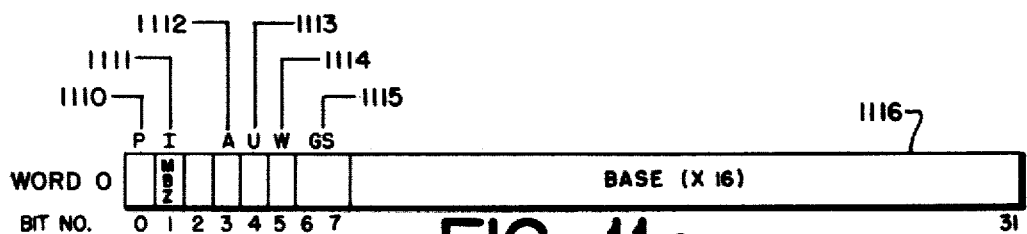
Figure 11F:
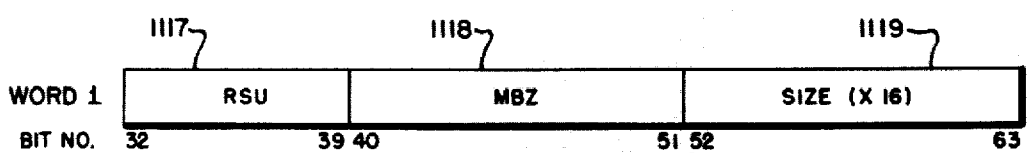

At address BAR plus 4 of the system base 600 there is the format byte of a G table word (GTW) shown in greater detail on FIG. 11d. The size and the address of a G segment-table 1212 on FIG. 1200 are defined by the contents of the G table word (GTW). The size (GTSZ) 1108 of the G table 1212 defines the number of entries in the G table which may typically be up to 255 entries. GTSZ is an 8 bit positive integer; an out of G table exception occurs if the G number is greater than the GTSZ. The absolute address of the G table 1212 is obtained by multiplying the G table pointer 1109 by 16. The format of the G segment table entry has a two word size (8 bytes) and is called a G segment descriptor. The format of the G segment descriptor is shown in detail on FIGS. 11e and 11f. All G segment descriptors are direct and therefore the indirect bit I, 1111 must be 0 otherwise an illegal segment descriptor exception occurs. The presence indicator P 1110 is a one bit field which when set to binary 1 indicates that a segment is defined in main storage for the segment number to which that descriptor corresponds; whereas if it cleared to 0 no segment is defined and a reference to the segment descriptor causes a missing segment exception. The available bit A 1112 is a one bit field which indicates whether or not the segment is available; it is only checked if this segment is defined (i.e. P equals binary 1), otherwise it is ignored. The used flag field U 1113 indicates whether or not the segment has been accessed. If the U bit is set to binary 0 the segment has not been accessed; whereas if the U field is set to binary 1 the segment has been accessed. The written flag field W 1114 indicates whether the segment has been written. If W is set to binary 0 the segment has not been written; whereas if W is set to binary 1 the segment has been written. The gating indicator GS 1115 of a G segment descriptor must be set to binary 01, otherwise an illegal segment descriptor exception occurs. The reason for this is that a G segment always contains semaphores (although the reverse is not true i.e. all semaphores are not required to be in a G segment) and instructions on semaphores require the GS code to be binary 01. The absolute address of the base of a segment 1214 is defined in the G segment descriptor of FIG. 11e by the 24 bit base field 1116; the content of this field is multiplied by 16 to obtain the absolute address. The second word of the G segment descriptor of FIG. 11f occupies bit position 32 through 63 in the G table 1212. The RSU field 1117, bits 32 through 39 is reserved for software use and is generally ignored when used as a G segment descriptor as it is in this case. The MBZ field 1118 must be 0 otherwise an illegal segment exception occurs. Since the MBZ field 1118 occupies bits 40 through 51 it sets the SIZE field 1119 which is the field for a small segment SIZE; hence all G segments must be of the small segment type. The segment SIZN 1119 is a 12 bit positive integer defining the number of bytes in the segment and the segment size is interpreted as a multiple of 16. Therefore the segment size for a G segment 1214 cannot exceed $2^{16}$ bytes (small segments).

Referring once again to the system base 600 of FIG. 6 there are 9 system exception cell words located between BAR plus 8 and BAR plus 44. The format of the system exception cell words EXC is shown on FIG. 11g. Since semaphores are utilized for transmitting messages to dedicated processes when a system exception occurs the pointers to these semaphores are found in 9 locations of memory each location called a system exception cell—one per class of system exception. The MBZ field 1120 must be set to binary 0 otherwise a system check occurs. Each exception cell (EXC) contains the system name G, D 1121 and 1122 respectively.

The channel exception cell located in BAR plus 44 of the system base 600 has a format which is similar to the system exception cell previously discussed and contains the system name GD of a semaphore which is used for transmitting messages to dedicated processes when a channel exception occurs.

An internal processor queue word IPQW is located beginning at BAR plus 48 and details of its format are shown on FIG. 11h. The IPQW word points to the head of a queue of processes ready (Q/PR/RDY) as shown on FIG. 9 by reference numerals 905 and 805. The queue of processes ready (Q/PR/RDY) links all processes which are in the ready state. It is referenced by the HEAD of Q/PR/RDY-field 1124 (FIG. 11h) of the IPQW word by pointing to the top of the ready process queue. The HEAD of Q/PR/RDY-field 1124 contains a 16 bit positive integer which is the displacement from the base of the G segment number 0, referred to as the GO segment, to the first byte of Q/PR/RDY. If this Q/PR/RDY bit field is 0, the ready queue is considered to be empty. The MBZ field 1123 must be 0 otherwise a system check occurs.

At BAR plus 52 of the system base 600 there is shown the storage for the initial and current retry counts whose format is shown in detail on FIG. 11*i*. The NFS field 1125 is a nonfunctional storage field and is not utilized by the system base. The initial retry count field 1126 and the current retry count field 1127 are used to control the number of times automatic instruction retry is executed before a machine error is made to produce a machine failure exception condition. They are loaded with the same number by a Reset Retry Count (not shown herein).

The running process word (RPW), shown in FIG. 11*j*, is stored in BAR plus 56 of the system base 600 and is used to store the name of the running process with its priority in case of a monoprocessor architecture. The NFS fields 1128 and 1131 respectively are nonfunctional storage fields and may be utilized for any purpose by any facility but is generally not utilized by the system base. The priority level of a running process is stored in the PRI field 1129. An asynchronous trap bit is stored in AB field 1130; whereas an asynchronous trap ring is stored in ARN field 1132. The logical name J, P of the running process in case of a monoprocessor architecture is stored in the J, P field 1133.

An Absolutization Table Pointer word shown on FIG. 11*k* is located at BAR plus 60 in the system base 600 and is utilized in initial system load to initialize the absolute addresses in the initial system load (ISL) program by adding the contents of BAR to all absolute addresses in the ISL program. The Absolutization Table Pointer 1135 defines the location of an Absolutization Table (not shown). The Absolutization Table Size is shown by the ATSZ field 1134.

The CPU serial number word shown on FIG. 11*l* is a 4 byte word located at BAR plus 64 and contains the serial number of the CPU in the CPU serial number field 1136.

Figure 11M:

A main storage upper limit word shown on FIG. 11*m* is located at BAR plus 68 and indicates the main storage upper limit 1139 by providing the absolute address of the last available word in main storage.

Figure 11N:
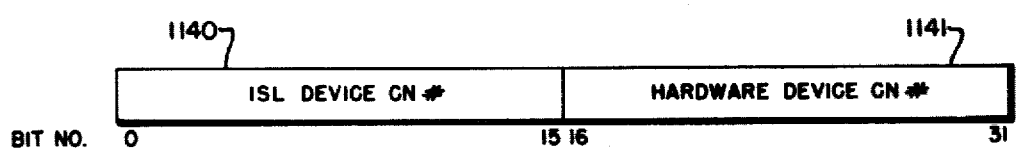

At BAR plus 72 there is located a word shown on FIG. 11*n* for providing the initial system load ISL device channel number (CN) 1140 and the hardware device channel number (CN) 1141.

Figure 11O:
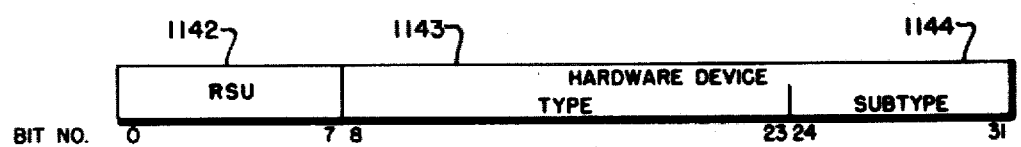
Figure 11P:
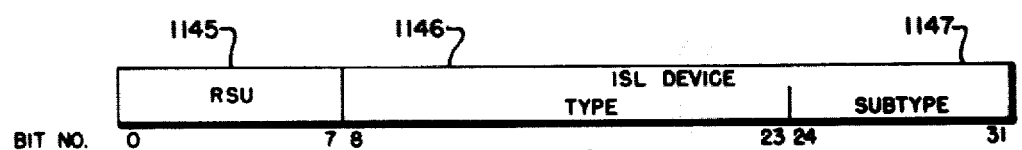

The type and subtype of a device used in the computer system is shown by a hardware device type word (FIG. 11*o*) in fields 1143 and 1144 respectively; where the RSU field 1142 is reserved for software. This word is found in the system base at BAR plus 76. A similar word having a similar type format shown on FIG. 11*p* contains the type and subtype of the device used in the initial system load. This word is located at BAR plus 80.

Figure 11Q:
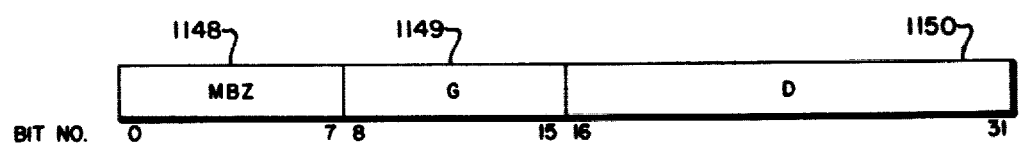
Figure 11R:
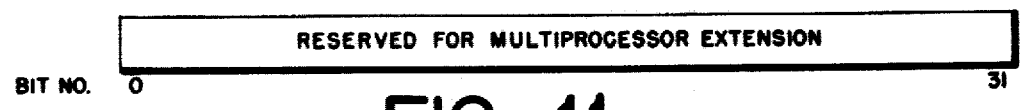

When the restart button of a computer is pressed, a simulated V-operation is performed on a semaphore and the Ready state is entered. A pointer to this semaphore is found at BAR plus 84 of the system base 600 and is called a restart cell word, and has a format shown on FIG. 11*q*. The format is similar to the system exception cell described supra and contains the system name G, D of a semaphore in the G field 1149 and D field 1150 respectively. The MBZ field 1148 must be 0.

Where there is more than one processor to the computer system, a word is provided in the system base 600 at BAR plus 88 for multiprocess extension. Details of this word are shown on FIG. 11*r*.

Examples of System Base and Process Control Block Use

Referring to FIG. 12 there is shown one example, how the system base may be utilized in combination with the process control block in order to address and access a user segment, a system segment, or a queue of processes ready (Q/PR/RDY) segment. Main memory 1200 has a portion 1203 reserved for hardware use. A boundary address register BAR 1202 separates the system base 1215 from the portion of memory 1203 reserved for hardware. The boundary address register BAR 1202 is utilized to address items in the system base 1215 by adding the contents of the boundary address register to the displacement in 4 byte units of the item desired in the system base. This address then points to the first byte of the item in the system base desired. In FIG. 12 the BAR 1202 is pointing at the J table word (JTW). The J table word, as previously discussed, has a pointer which points to a J table 1204. By indexing to the J number shown on FIG. 5, a J table entry 1216 is obtained. At the J table entry there is a P table pointer which points to the absolute address of the P table 1205. By indexing to the P number (see FIG. 5) within P table 1205 the absolute address of the process control block 1206 is obtained. As previously shown in process control block PCB 1206 there are two address space words ASW 0 and ASW 1. The high order bits of the segment table number field STN in the base register 1201 is used to access one of these two address space words, in this instance ASW 1 which has a segment table word array STWA pointer that points to segment table word array STWA 1208. Together with the segment table number STN of the base register 1201 one of 8 segment table words is accessed in STWA 1208, which points to one of 8 segment tables 1210. The segment table entry STE from base register 1201 is then utilized to make one of 256 entries in segment table 1210 where a segment descriptor is located. The segment descriptor is then utilized to access a user segment 1211. (For greater detail see application Ser. No. 470,496 filed on May 16, 1974 and having priority date May 16, 1973 entitled Segmented Address Development and assigned to the same assignee as the instant invention and is hereby incorporated by reference herein).

In order to access a system segment 1214 which is utilized to store semaphores a G table word GTW is utilized in the system base 1215. The address of the G table word is obtained by adding the displacement of the G table word in the system base to the boundary address register BAR 1202. (See FIG. 6). The G table word GTW includes a G table pointer which points to a G table 1212. By utilizing a G number available to the system and indexing in the G table a G segment descriptor is accessed which is utilized to address a system segment 1214.

Similarly the system base 1215 is utilized to access the queue of process ready (Q/PR/RDY) 1213 by locating an internal processor queue word IPQW which points to the Q/PR/RDY segment 1213.

G. Control Unit

Referring to FIGS. 13a-13c details of the control unit are shown. The control unit, although shown separate from the central processing unit (CPU), is in actuality a part of the CPU and is comprised of a control store unit CSU 1301, a control store interface adapter CIA 1302 and appurtenant subunits, control store loader CSL 1303 and control and load unit CLU 1304.

The control store unit CSU 1301 receives microinstructions from the control store loader CSL 1303 via the control and load unit CLU 1304 and the control store interface adapter CIA 1302. Under normal operating conditions, microprograms are loaded from an external source during system initialization and become a permanent control function of the machine. However the control store unit CSU 1301 has the ability to be reloaded and initialized in a manner that provides for a variety of central processing unit CPU 1306 operational modes. The following modes of operation of the CPU are available under control of the CSU 1301; (a) native mode; (b) emulation mode; (c) concurrent native and emulation modes; (d) diagnostic mode. This capability is possible because the micro-instructions resident in the CSU are the source of micro-operations used to control the operation of all other CPU functional units such as the emulation unit 1316, the arithmetic logic unit ALU 1317, the instruction fetch unit IFU 1318, the address control unit ACU 1319 and the data management unit DMU 1321. Also shown within the central processing unit CPU 1306 are previously described general registers 1307, base registers 1308, scientific registers 1309, T-registers 1310, status registers 1311, instruction counter IC 1312, and hardware control mask register 1313.

Typically the control store unit CSU 1301 is a 9 K bipolar integrated circuit programmable read-only memory (PROM) mixed with read/write random access store (RAM). It has a typical 150 nanosecond read cycle and a 450 nanosecond write cycle. Each location of control store stores one 84-bit micro-instruction word (to be later more fully described), and each microinstruction word controls one CPU cycle. As each location of the control store of the control store unit CSU 1301 is read, its contents are decoded by microoperation decoders which provide micro-operation control signals each of which causes a specific operation within the CPU to take place (to be later described in detail).

By grouping locations within each micro-instruction word (to be later described in detail) control store sequences are obtained that can perform a specific CPU operation or instruction. As each instruction is initiated by the CPU, certain bits within the op-code are used to determine the control store starting sequence. Testing of certain flops (not shown) which are set or reset by instruction decode functions allows the control store memory to branch to a more specific sequence when necessary.

The control store interface adapter CIA 1302 communicates with the control store unit 1301, the data management unit DMU 1321, the address control unit ACU 1319, and the arithmetic logic unti ALU 1317 for directing the operation of the control store memory 1333 of FIG. 13b. The CIA 1302 includes logic for control store address modification, testing, error checking, and hardware address generation. Hardware address generation is utilized generally for developing the starting address of error sequences or for the initialization sequence.

The data management unit DMU 1321 provides the interface between the CPU 1306 and the main memory and/or buffer store memory shown on FIG. 1. It is the responsibility of the data management unit to recognize which unit contains the information required by other units and strobe the information into the CPU registers at the proper time. The data management unit DMU also performs the masking during partial write operations.

The instruction fetch unit IFU 1318 interfaces with the DMU 1321, the ACU 1319, the ALU 1317, and the CSU 1301, and is responsible for keeping the CPU supplied with instructions. The instruction fetch unit has the next instruction available in its registers before the completion of the present instruction. To provide this capability, the instruction fetch unit IFU 1318 contains a 12-byte instruction register (not shown) that normally contains more than one instruction. In addition, the IFU, under control of the CSU, requests information (instructions) from main memory before the instruction is actually needed, thus keeping its 12-byte instruction register constantly updated. Instructions are thus prefetched by means of normally unused memory cycles. The instruction fetch unit also decodes each instruction and informs the other units of the instruction's length and format.

The address control unit ACU 1319 communicates with the IFU, ALU, DMU, and the CSU via the CIA. The ACU 1319 is responsible for all address development in the CPU. All operations of the ACU, including transfers to, from, and within the unit, are directed by CSU micro-operation and logic in the unit. The normal cycling of the ACU depends on the types of addresses in the instruction rather than on the type of the instruction. Depending on the address types the ACU may perform different operations for each address in an instruction. The ACU also contains an associative memory 1319a that typically stores the base address of the 8 most recently used memory segments, along with their segment numbers. Each time a memory request is made, the segment number is checked against the associative memory contents to determine if the base address of the segment has already been developed and stored. If the base address is contained in the associative memory 1319a, this address is used in the absolute address development, and a considerable amount of time is saved. If the base address is not contained in the associative memory 1319a it is developed by accessing the main memory tables. However, after the base address of the segment is developed, it is stored in the associative memory, along with the segment number, for future reference.

Interfacing with the ACU, IFU, DMU, and the CSU is the arithmetic and logic unit ALU 1317. Its primary function is to perform the arithmetic operations and data manipulations required of the CPU. The operations of the arithmetic logic unit are completely dependent on micro-operation control signals from the control store unit CSU 1301.

Associated with the ALU 1317 and the CSU 1301 is the scratch pad memory unit LSU 1315, (sometimes referred to also as the local store unit). It is typically comprised of 256-location (32 bits per location) solid state memory and selection and read/write logic for that memory. The scratch pad memory 1315 is used to store CPU control information and maintainability information. In addition, the scratch pad memory 1315 contains working locations which are primarily used for temporary storage of operands and partial results during data manipulation. Also associated with the ALU 1317 is an auxiliary memory 1317a comprised typically of 64 flip-flops for storing miscellaneous states of the computer system.

The CPU also has a clocking unit 1320 and is essentially 2 clocking systems in 1: the first clocking system generates the timing for the control interface adapter CIA 1302 and the second clocking system generates the timing pulses for the operations of the functional unit within the central processing unit.

Referring now to FIG. 13c there is shown the format of the control store word 1325. The control store word is typically 84 bits wide and is divided into 6 main fields:
 a. sequence type field 1326 (3 bits);
 b. branching and/or micro-operations 1327 (23 bits);
 c. constant generation and designation 1328 (14 bits);
 d. data to bus 1329 (8 bits);
 e. micro-operations 1330 (32 bits); and
 f. checking 1331 (4 bits).

The 3-bit E field of the control store word 1325 is used as a sequence control field. There are typically 7 different sequence types and 1 reserved type for the instant computer system. Referring to block 1335 of FIG. 13b, when E field equals binary 0, 1, or 2, the branching field A, B, C, D, and L of micro-instruction 1325 is utilized to generate the next address. The first 6 bits of KS register 1337 is utilized together with the B field, a C test results, the D test results and the L field to provide the next address of the next micro-instruction which is then placed in address register KS 1337. When the E field is set to binary 4 (see block 1335) the next address selected is taken from interrupt return register KA 1339. The address stored in the KA register is the one generated by the next address generation logic when the hardware interrupt occurs. When the E field is set to binary 5 a branch is used to initiate a sub-return from a micro-program subroutine. When used, the contents of the return register KR 1346 are used as the next control store address. The return register 1346 is loaded by issuing a control store command which will load present control store address in KS register 1337 plus 1, from incrementor 1338, into the KB register 1346. A one-level-nesting subroutine ability is provided via the KT return branch register 1347. Every time the KR register 1346 is loaded the old contents of the KR register is transferred to the KT register 1347 every time the micro-program return is called; the contents of the KT register will transfer to the KR register. Third level nesting subroutine ability is provided by the KU register 1340; and fourth level nesting subroutine ability is provided by the KV return branch register 1349. When the E field of the control store word is set to binary 6 the next control store word addressed is equal to the present address in KS register 1337 plus 1 in incrementor 1338. When the E field is set to binary 7 the CSU 1301 enters the diagnostic mode and the next address will be the present address plus 1.

In addition to the sequencing control of branching to the next control store address described above and shown in block 1335, there is hardware generated sequence control shown in block 1336 of FIG. 13b. (Note: Blocks 1335 and 1336 are in actuality hardware registers drawn so as to depict the different forms that the micro-instruction words may take.) The hardware generated branches are overriding conditions (such as errors, initialize, control store scan, etc.) which suppress the E field and force a fixed address into the control store address register KS 1337. The branch is made by forcing an interrupt line high (not shown) for one clock period and storing the address which would have been generated under the control of the E field into the KA interrupt return register 1339. A hardware generated address will be placed into the control store address register. Certain hardware/firmware generated interrupts take priority when the interrupt-block flip-flop (not shown) which prevents additional interrupts in their class from being executed until the interrupting condition has been satisfied. A firmware micro-operation exists for controlling the resetting of the interrupt-block flip-flop for those sequences which are under firmware control. Those sequences under hardware control automatically generate a reset of the block-flop at the end of the sequence. The following conditions, listed by priority, exists in this category; (a) control store load; (b) control store scan; (c) hardware error; (d) software error. The remaining hardware conditions do not set the interrupt block-flop but do cause an immediate action to occur when generated. The following conditions listed by priority, exist in this category;
 (a) initialize;
 (b) soft-clear;
 (c) enter maintenance panel;
 (d) enter maintenance panel;
 (e) hardware exit.

An initialize signal causes the CSU 1301 to branch to address binary 0, clear hardware resettable errors and execute a control store load operation followed by a control store scan sequence under hardware control. It will also perform system initialize. A soft-clear signal causes the CSU 1301 to branch to address binary 0, clear hardware resettable errors and reset the interrupt block-flop. An enter maintenance panel signal causes the CSU to branch to the address preset in the CSU address switches on the maintenance panel (not shown).

An enter maintenance channel signal causes the CSU to branch to an address generated via the maintenance channel (not shown). The address loaded is from maintenance bus QMB 1344, which is part of the maintenance channel, and is right-justified. A hardware exit signal causes the CSU to branch to binary address 2. This sequence is used as a maintenance facility. At the end of the sequence a return is initiated by issuing an E field branch with the E field set to binary 4.

A control store load signal causes the CSU to branch to address binary 0. It also turns off the CSU read-cycle flop (not shown), the system clock 1320, and places the CSU in the load state. In the load state the CSU can be loaded from the control store loader CSL 1303, the IOC 1305, the main memory 102, or the maintenance panel 1355. When loaded from the CSL an automatic scan is generated at the end of the load. When loaded from any other media a scan may be issued by either generating a micro-operation signal or setting the scan switch on the maintenance panel. A control store scan signal causes the CSU to branch to an address binary 0. A control store scan is under hardware control for the duration of the sequence. During the scan the system clock 1320 is off and therefore no commands or tests are executed. At the end of the scan sequence the hardware transfers the contents of the interrupt return register KA to the address register KS, the system clock is turned on and control is returned to the firmware.

A hardware error signal causes the CSU to branch to address binary 4. In the normal processing mode a hardware error detected in any CPU functional unit will activate a hardware error line (not shown). The control store sequence generated will test the system conditions to determine the action to be taken. In the diagnostic mode, error conditions which are hardware detectable are visible to microdiagnostics. The microdiagnostics control the action to be taken. A software error signal on the other hand causes the control store to branch to address binary 1. This address is the start of the software error reporting sequence which is under microprogram control.

Referring once again to FIG. 13c the E field 1326 is a 3 bit field for the branch code as previously described. The branching and/or micro-operation field 1327 is comprised of the A, B, C, D, and L fields (also shown on block 1335 of FIG. 13b) wherein the A field is the upper 6 bits of the next address, the B field is the middle 4 bits of next address of the mask field on 64-way branch, the C field is a 6 bit test field for 1 of 64 tests, the D field is another 6 bit test field for 1 of 64 tests, and the L field is the least significant bit. The K field 1328 is a 14 bit field of which 6 bits are for the constant field, 4 bits are for a constant or steering field, and 4 bits are a steering field for a constant. The data to bus field 1329 is comprised of the QA field having 4 bits for controlling information to the QA portion of the QMB bus 1344 and the QB field has 4 bits for controlling information to the QB portion of the QMB bus 1344. The F field 1330 is a 32 bit field which is coded to generate micro-operation subcommands. The P field 1331 is comprised of 4 bits reserved for checking.

In operation the micro-instruction words are stored in the control store array 1333. During a cycle of operation, the control store array is addressed by the contents of the KS address register 1337. This causes the contents of the location specified by the address to be read into the group of read latches 1357. Portions of the word contents of the read latches are distributed or transferred to storage registers within each of the functional units in the CPU. Each functional unit includes decoding logic circuits for generating the requisite subcommands specified by the control store word under control of the system clock source. In general decoding is performed within each functional unit in the CPU rather than being performed centrally in order to minimize the decoding time and to reduce the number of cables which would be normally required for transmitting command signals if decoding were performed centrally. Additionally, the decoding is done within each unit to avoid timing problems arising from differences in cable delays. Further, by decoding subcommands with each unit, those signals which are representative of certain conditions existing within the functional unit are required for the generation of certain subcommand signals do not have to be returned to the CIA unit 1302. A typical decoder unit 1359 is shown in FIG. 13b as receiving various fields from micro-instruction words and generating micro-operation signals a, b, c, d, . . . q, r. A typical micro-operation decoder 1359 receives commands from a micro-instruction word. The field from the micro-instruction word is decoded and sets one of a plurality of lines s, t, u, . . . y, z high. A matrix is formed by having predetermined control line impedance coupled to the s-z lines at points $\alpha, \beta, \gamma \ldots \psi, \omega$. Typically then when the field from a micro-instruction is decoded one of the lines s-z goes high. Since the black dots shown in the matrix by Greek letters $\alpha$ through $\omega$ represent impedance coupling between the two sets of lines, any electrical signal propagating along any horizontal wire will be coupled through to propagate along the vertical wire a-r where an impedance coupling (black dot) is indicated. Each vertical line a-r then may be coupled as one input to one each of AND gates 1360-1365. Other input signals may also be coupled to AND gates 1360-1365 including a timing signal $t_s$ from the central timing unit. Accordingly as each timing signal $t_s$ goes high those gates which have all the other input signals high will be enabled and will provide micro-instruction signals to predetermined functional units in the CPU. For example, if a command 1341 from read latch 1357 is decoded and a horizontal line is high the a, b, c, and q vertical control lines will be high and AND gates 1360, 1361, 1362, and 1364, will be enabled as the $t_s$ timing signal is applied to these gates sequentially. Hence the combination in which the vertical control lines are coupled to the horizontal control line at different points represented by the Greek letters $\alpha$ through $\omega$ represent a permanent switching matrix for supplying micro-operation signals to the central processing unit CPU for controlling the functional units within the central processing unit by micro-instructions furnished from the control store array 1333. Thus permanent firmware having an alterability feature can be built into the machine of this invention by merely specifying the sequence of micro-operations that is required as a capability of the computer system.

Under normal conditions data is written into the control store array 1333 via the CPU write-data register also known as the local register YO 1343. A control flop (not shown) defines whether the upper half or lower half of the storage array is to be written. Data from the control and load unit CLU 1304 arrives at the CIA/CSU via the maintenance bus QMB 1344 and is buffered by the storage local register YO 1343 before being written into the control store array 1333. The storage local register 1343 is time shared as both a read and a write local register. The multiplexor KQM 1345 may be controlled by either the maintenance panel 1355 or by microdiagnostics and provides a read out path from the registers connected to it. A compare register KP 1350 is provided for non-functional use and is used mainly for maintenance purposes and is utilized along with compare logic 1352 and decode logic 1351.

H. DISPATCHER FIRMWARE FOR CONTROL OF PROCESSES

The dispatcher is a firmware/hardware unit whose main purpose is to manage the various queues of processes, and to switch between processes and includes the updating of the queues of processes, the process control blocks PCB's, the running process word in the system base and the register of a new process. It also delivers messages to a process which is actually waiting for it on a semaphore (after a V-operation, a simulated V-operation for the IOC or for the exception handler). It also enqueues a message on a semaphore after a P-operation which freed a message link when a process is waiting on the free-link semaphore to deliver its message.

The dispatcher unit further calls on the native mode instructions firmware after the "rolling-in" of a process executing in native mode, or after a "contest" if the current process remains running and is executing in native mode. It also calls on decor extension firmware for:

(a) a temporary call during the rolling-out of a process executing in that decor extension;

(b) a temporary call during the rolling-in of a process executing in that decor extension;

(c) a definitive call at the end of the rolling-in of a process executing in that decor extension; and, (d) a definitive call after a contest if the current process remains running and is executing in that decor extension.

Moreover the dispatcher places the system in the idle loop when there is no running process.

There are several ways of entering or leaving the dispatcher as follows:

(1) The initialization procedure (SIP) provides entry as the last step, (See patent application Ser. No. 528,814 entitled Arrangement for Initializing a Data Processing System, assigned to the same assignee named herein.)

(2) The Start and Suspend Instruction provides for the entry into the dispatcher. The Start instruction starts a process and the Suspend instruction terminates a process. (See patent application Ser. No. 528,811 entitled Process Management System for a Data Processor.)

(3) The P and V operations provide for entry into the dispatcher. The P op picks up a message from a semaphore and if no message then the process goes into wait state. (See patent application Ser. No. entitled P & V Instructions on Semaphores for Process Synchronization invented by Jacques Bienvenu, et al, first filed on Nov. 30, 1973 in France having French Ser. No. 73 42697 and further filed in the United States within the priority convention date of Dec. 2, 1974 and having U.S. Ser. No. 529,015.)

Briefly then, the dispatcher is the main mechanism which manages the processes and accordingly the process control blocks PCB's by deciding which process is to be run and then taking the appropriate action, such as rolling-out the currently running process (i.e. write into the PCB all information relative to the currently running process contained in hardware registers, scratch pad memory, etc.), and rolling-in the new process (i.e. write from the PCB to various hardware registers, scratch pad memory, etc., all information necessary to run the new process.)

Figure 14A:
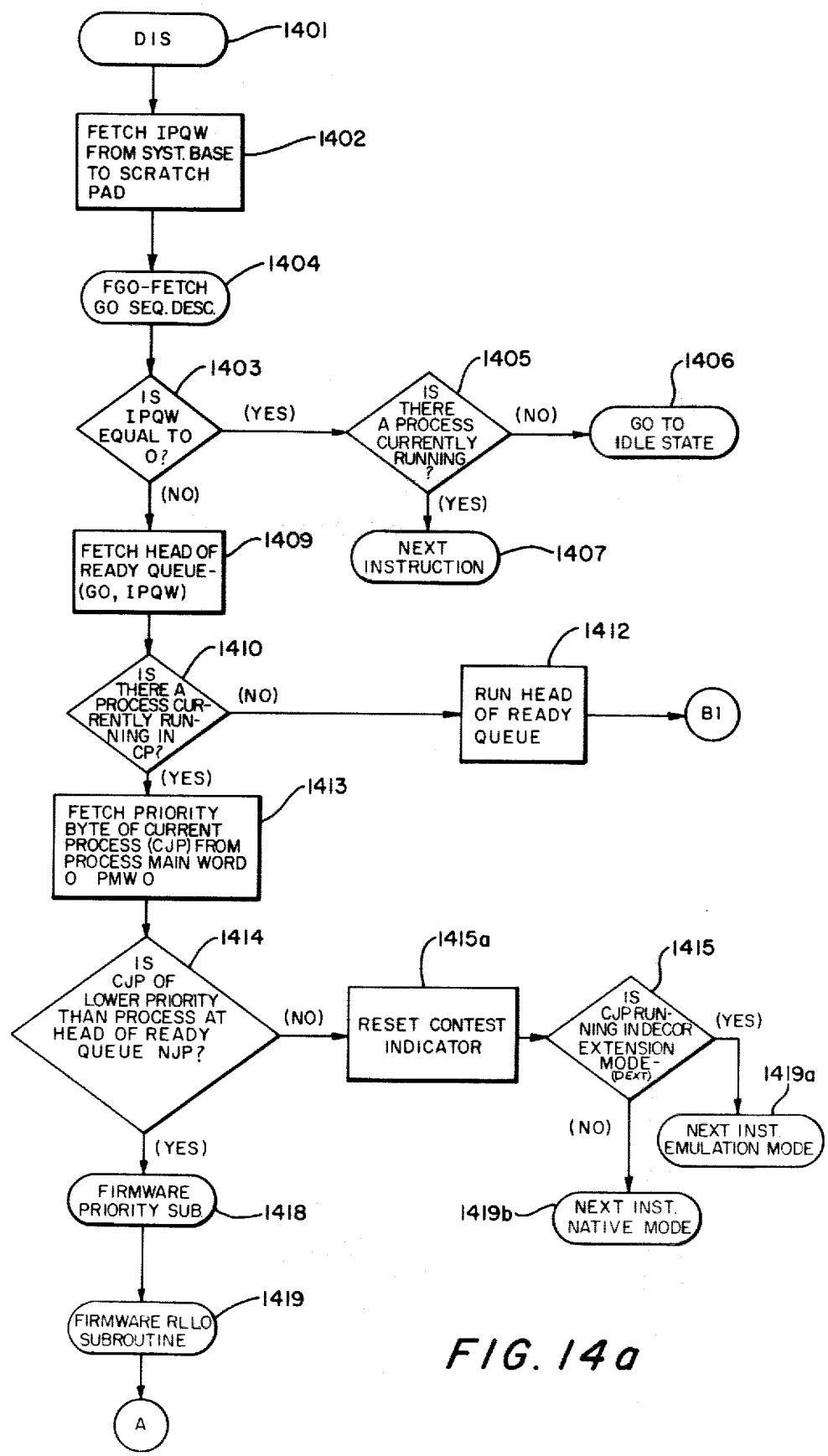
Figure 14D:
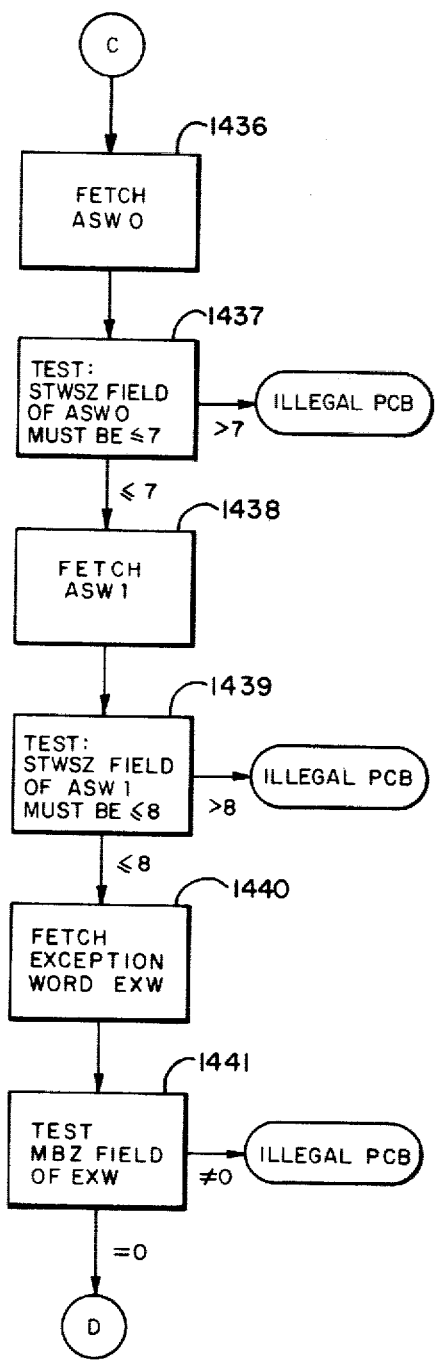
Figure 14E:
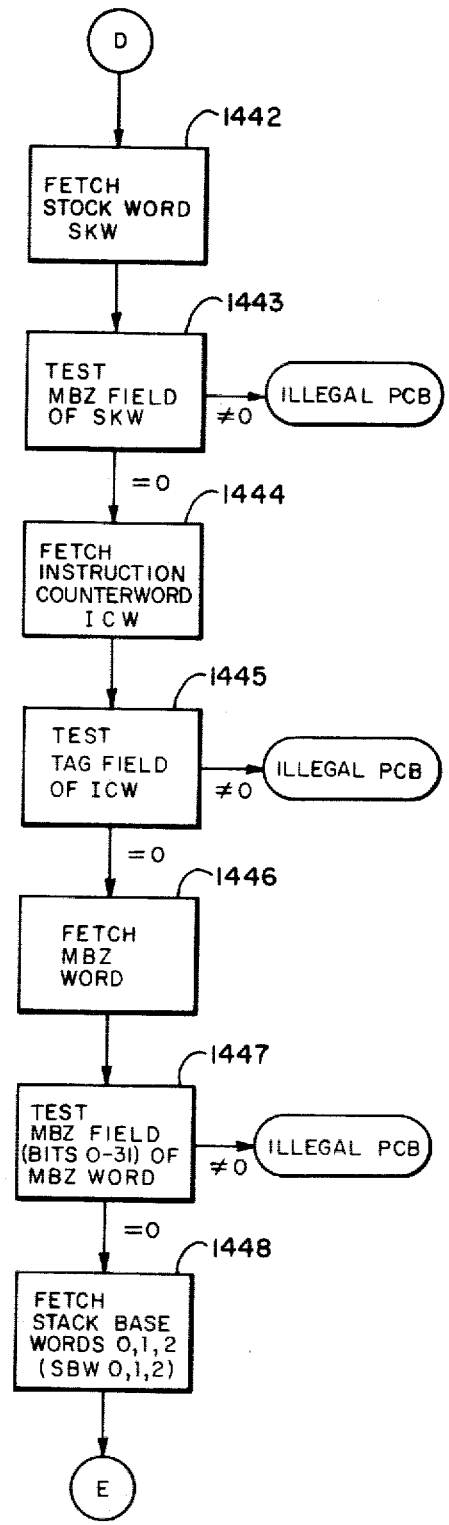
Figures 14F, 14G:
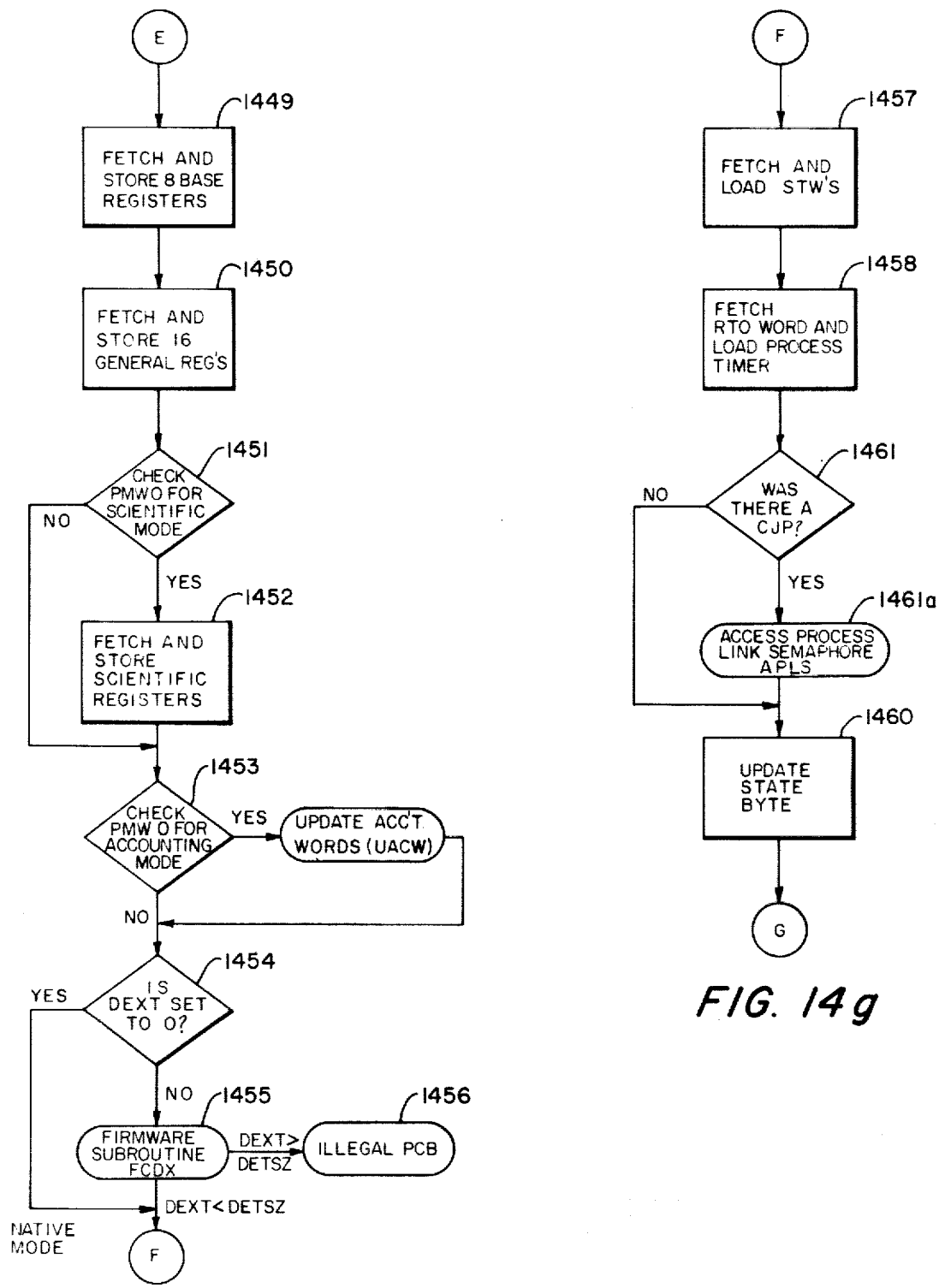
Figure 14H:
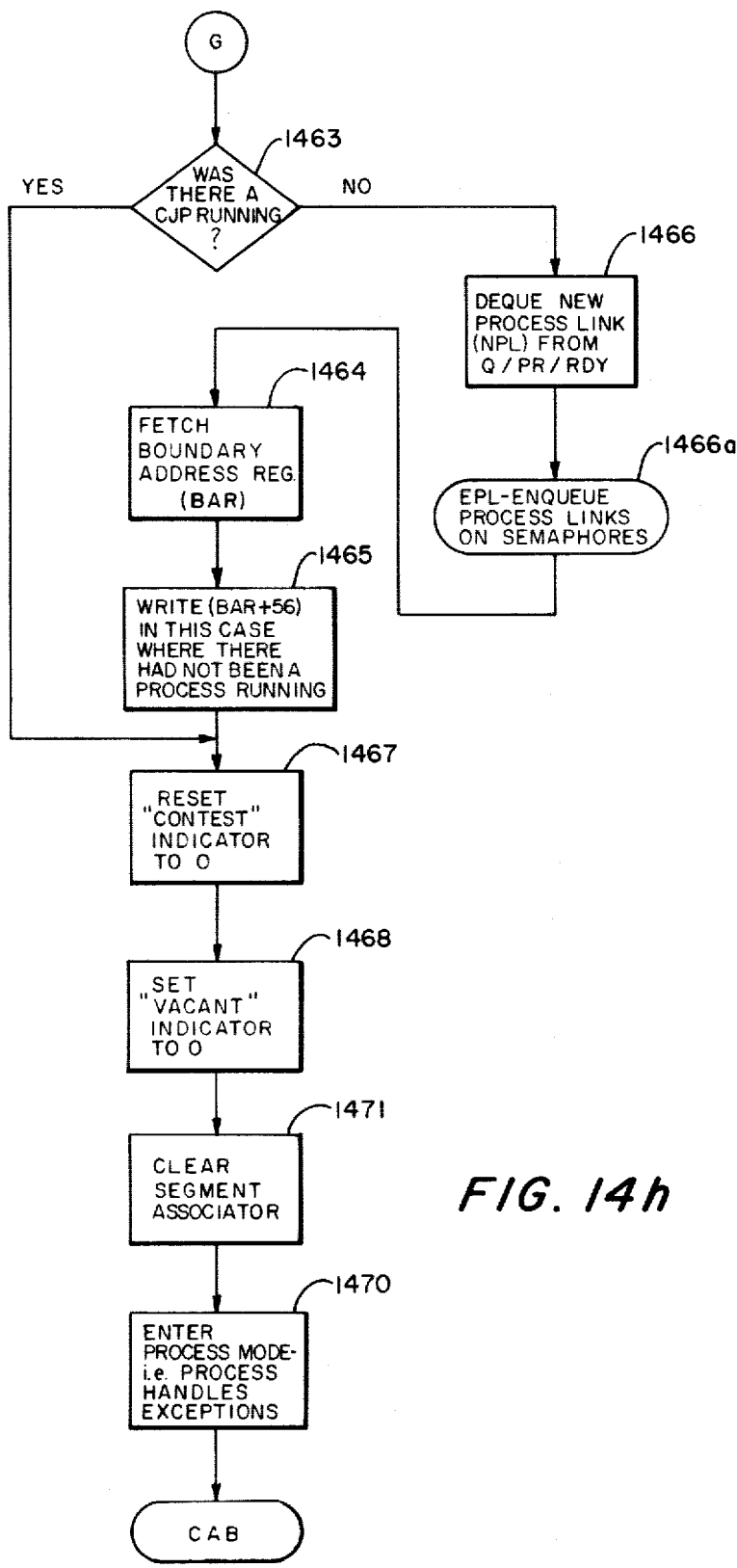

The representation of the functions performed by the dispatcher are shown in flow-charts FIGS. 14a-14i. For example, block 1402 of FIG. 14a is a representation of the function performed by the dispatcher wherein a microprogram word is delivered by the control store unit, and upon decoding by decoder 1359 controls the applicable portions of the CPU via an appropriate series of micro-operation signals 1360, 1361, etc. to retrieve the IPQW from the system base in storage subsystem 102, and transfer it to scratch pad memory 1315. Simultaneously the dispatcher fetches 1404 the GO segment descriptor (see FIG. 12) from the G table of segment descriptors pointed to by the G table word GTW in the system base. Bits 16-31 of the IPQW word contain a 16-bit positive integer which is the displacement from the base of the G segment number 0, referred to as the GO segment, to the head (first byte) of the Q/PR/RDY, queue of processes ready. If bits 16-31 of the IPQW word is 0, 1403 the ready queue is considered to be empty. If the ready queue is empty it indicates that there is no process currently waiting in the Q/PR/RDY and the ready-queue is empty. The next question to be decided in decision block 1405 is whether or not a process is currently running in the machine by determining whether or not the Vacant Indicator is set. If the Vacant Indicator is set (i.e. there is no process currently running) and since it was previously determined that there is no process in the ready-queue waiting to use the processor then the machine goes in the idle state 1406. However if there is a process currently running in the machine, but there is no one waiting to use the machine, the current process accesses its next instruction 1407.

Returning now to decision block 1403, of the flow chart of FIG. 14a if there is a positive integer in the pointer area of the IPQW (i.e. bits 16-31) the head of the ready queue pointed to by the IPQW word in the GO segment is fetched to the scratch pad memory. (Note: To avoid repetition and in the interest of clarity the intermediate functions of the dispatcher in conjunction with the control unit and CPU will be omitted; however it is to be understood that such intermediate functions as previously described by example are present typically.) Up to this point it has been determined that there is some process waiting in the ready-queue. Before further action can be taken it is necessary to determine if there is a process currently running in the central processor. This is determined at decision block 1410 of the flow chart representation and if there is no process currently running in the central processor (i.e. no CJP) the head of the ready queue is run 1412. However if there is a process running in the central processor the dispatcher must determine who has priority—the currently running process or the head of the ready queue? Accordingly therefore the priority byte of the current process (CJP) which is located in the running process word of the system base PCB 400, is fetched 1413. A decision is then made 1414 as to whether or not the current running process CJP is of lower priority than the new process NJP waiting at the head of the ready queue? (See decision block 1414.) If CJP is not of lower priority than NJP, CJP remains in control of the central processor and the contest indicator is reset 1415. (The contest indicator is always set to 0 except when one or more new processes have been placed on the ready-queue since the beginning of the last instruction executed on behalf of CJP thereby creating the possibility of a conflict; under these conditions the contest indicator is set to binary 1). Before the current process CJP is permitted to continue however, and execute further instructions a determination is made whether or not the CJP is running in decor extension mode 1415. If CJP is running in decor extension mode then the next instruction is executed in emulation mode (i.e. decor extension) and if it is not running in decor extension mode then the next instruction is executed in native mode. Returning once again to decision block 1414, if the NJP at the head of the ready queue has a higher priority than the CJP (i.e. its priority number is lower than CJP's priority number, the current running process CJP is "rolled-out" of the machine and the new process NJP is "rolled-in" to the machine. Accordingly a firmware priority subroutine PRIQ 1418 directs the enqueueing of the current process CJP into the ready-queue by LIFO priority and by priority number of first "rolling-out" the CJP under the direction of the firmware subroutine RLLO 1419. The RLLO subroutine directs the writing of the information of the CJP that is stored in the general registers, base registers, scientific registers, T-register, status registers, and instruction counter, back into the appropriate storage areas of the process control block PCB in main memory, and it directs the updating of the RUA. Moreover the DEXT number of process main word 0 (PMW0) in PCB 400 is updated 1420.

The new process NJP is now ready to be "rolled-in". The boundary address register BAR is fetched 1422 and the running process word RPW is fetched from address BAR plus 56 of the system base. See block 1423. The name of the new process NJP is next written into the running process word RPW and since the name of the new process NJP was written in the process link PL of the Q/PR/RDY, the name in the process link PL is therefore now placed in the RPW, block 1424. Therefore NJP from the ready-queue now becomes CJP and is entitled to control the central processor and accordingly is no longer waiting in the Q/PR/RDY and must be dequeued by taking its name out of the process link PL of the Q/PR/RDY, block 1425. When this is done the queue of processes ready Q/PR/RDY is updated by the firmware subroutine UQLK, 1425a. Accordingly the JP number of the process which was just taken out of the machine is placed in a process link in the Q/PR/RDY, since it now no longer has control of the machine and must wait for it, 1426. At this point the transformation of giving this control of the central processor to the new process and placing the old process in a ready queue is accomplished and because there is a process (the new CJP) in control of the central processor, the Vacant Indicator is set to 0, 1427; if on the other hand there were no CJP in control of the central processor the Vacant Indicator would be set to 1. At this point the assignment of the processor is complete and a new process has acquired the central processor whereas the old process was placed in a ready queue; however, the new process is not ready to run yet for the hardware of the central processing unit, 104 of FIG. 13a, such as the general registers 1307, the base registers 1308, scientific registers 1309, the T-register 1310, the status registers 1311, and the instruction counter 1312, must be supplied with control information from the process control block of the new process.

Accordingly the firmware subroutine 1430 controls the CPU and first fetches PMW 3 from the PCB (FIG. 4) to scratch pad memory 1315, and then fetches PMW 0. The MBZ field of PMW 0 is checked 1433 and if it is not binary 0 in illegal PCB exception results. However if the MBZ field of PMW 0 is zero then PMW 1 is fetched 1434. Again the MBZ field of PMW 1 is tested to determine whether or not it is a binary 0. If it is not binary 0 there is an illegal PCB exception; whereas if it is equal to 0 the dispatcher proceeds to C.

Accordingly address space word 0 ASW 0 is fetched from the appropriate space in the PCB and the segment table word size STWSZ is tested 1437 to determine whether or not it is less than 7. If it is greater than 7 an illegal PCB results if it is less than or equal to 7, then ASW 1 is fetched from the PCB, block 1438, and its STWSZ field is tested 1439 to determine whether or not it is less than or equal to 8. If its field is greater than 8 then an illegal PCB results; however, if its STWSZ field is equal or less than 8 the exception word EXW is fetched 1440, and its MBZ field is tested to determine whether or not it is equal to 0. If its MBZ field is not equal to 0 an illegal PCB results whereas if it is equal to 0 the stack word SKW is fetched 1442, and its MBZ field is tested 1443 to determine whether or not it is equal to 0. If the MBZ field is not equal to 0 then an illegal PCB results; whereas if it is equal to 0 the instruction counter word ICW is fetched from the PCB and placed in the instruction counter IC and its TAG field is tested to determine whether or not it is equal to 0, 1445. If the TAG field is not equal to 0 then an illegal PCB results. However if the TAG field is equal to 0 the MBZ word is fetched 1446 and its MBZ field (bits 0–31) is tested to determine whether or not it is equal to 0, 1447. If it is not equal to 0 then an illegal PCB results; whereas if it is equal to 0 stack base words 0, 1 and 2 SBW 0, 1 and 2 are fetched 1448. The contents of the 8 base registers in the base register saving area of the PCB is then fetched 1449 and stored in the machine's base registers 1308. Then the contents of the 16 general registers from the general register saving area of the PCB are fetched 1450 and stored in the machine's general registers 1307. Before fetching the contents of the scientific registers however a check is made of the capability byte of process main word 0 (PMW 0) to determine whether or not scientific mode is being utilized 1451. If scientific mode is being utilized then the contents of the scientific registers from the scientific register saving area of the PCB are fetched and stored 1452. The firmware then proceeds to make a check of the capability byte of PMW 0 to determine whether or not the accounting mode is being utilized 1453. If the accounting mode is being utilized (i.e. accounting bit of capability byte set to binary 1) the accounting words exists in the PCB and the ready time account word RTA is updated. Then the firmware proceeds to determine whether or not the DEXT number is set to 0, 1454. If it is not set to 0 it indicates that the machine may be in emulation mode (i.e. the decor extension capability is being utilized) and accordingly the DEXT number of PMW 0 is checked 1455 to determine whether or not it is greater or less than the DETSZ field of process main word 3 and if it is greater than the DETSZ field an illegal PCB exception 1456 results since the DEXT number is less than the DETSZ field but not equal to zero the machine is performing in legal emulation mode and proceeds to F. Returning to decision block 1454 if the DEXT field is binary 0 then native mode is being performed and the machine fetches STW's, 1457. The residual time out word RTO word of the PCB is fetched 1458 and the process timer is loaded, with the time limit that the CJP may spend in the running state.

Up to this point either (a) a new process NJP has been "rolled-in" to take control of the CPU when there was an old process CJP in the machine and the new process NJP was at a higher priority than the old process CJP or (b) there was no CJP in control of the CPU and the head of the ready queue was run. Briefly under condition (a) the CJP was taken out of the RPW and placed in a process link PL in the Q/PR/RDY, and the NJP in a process link PL in Q/PR/RDY was placed in the RPW thus effectively switching the positions of the 2 processes giving control to the NJP which now becomes the CJP and taking control away from the old CJP. Then the PCB of the NJP was accessed and the information required to run NJP (now the CJP) was placed in scratch pad memory or the array of registers in the ACU.

If there was no CJP in control of the CPU (condition b), then the head of the ready queue was run—i.e. the NJP became the CJP because of the dispatcher taking the NJP from the process link PL from the head of the ready queue and placing it in the RPW word. By doing this a process link PL was left empty in the Q/PR/RDY and it is required to take it out.

Accordingly beginning now at decision block 1461 the firmware determines whether or not there was a CJP in control of the CPU and if there was a free process link (FPLS) it was accessed and enqueued and the CJP was written therein. However if there was no CJP in control of the CPU state byte of PMW 0 of the NJP is updated 1460 and again there is a determination whether or not there was a CJP in the machine 1463. If there was no CJP in control of the processor the process link of the NJP (which was in the Q/PR/RDY and is now in control of the machine) is taken out of the Q/PR/RDY 1466 (i.e. dequeued from the Q/PR/RDY and becomes a free link semaphore FLSP and is now enqueued in the free process link queue (805 on FIG. 9) and becomes a part of the free process link queue 1466a. The contents of the boundary address register BAR are fetched 1464 and the running process word RPW of the NJP (now the CJP) located at BAR plus 56 of the system base is updated by placing the NJP identification in the RPW, block 1465. The Vacant Indicator is set to 0 in the case where there had been no CJP. Next the Contest Indicator is set to 0, 1467 and the Segment Associator (AS 132 on FIG. 1) which is a typical content addressable memory is cleared, 1471; then the process mode is entered 1470. (A process mode indicates that exceptions are handled by the process which is operating in the processor rather than by the operating system). The firmware then continues to CAB 1480 and the asynchronous trap bit AB is checked to determine whether or not it is set to binary 1, 1481. If the AB bit is set to binary 1 then a check is made 1482 to determine whether or not the process ring number PRN is greater than or equal to the asynchronous trap bit ARN. (The AB and the ARN are located in the priority byte of the PCB of each process and is meaningful when the process is in the running state; the AB and ARN are obtained from the RPW located at BAR plus 56 of the system base). The AB and ARN in BAR plus 56 of the RPW are reset since the next step 1484 is to proceed to an asynchronous trap routine which would take care of the conditions that cause the asynchronous trap bit or the asynchronous ring number to be set in the first place, and if these were not reset then at the next pass by the firmware it would give an indication that something was wrong where actually there was nothing wrong, and hence would always proceed to the asynchronous trap routine 1484 and would never execute. Going back now to decision blocks 1481 and 1482 if the AB bit is not set or AB bit is set and PRN is not greater than ARN, then the firmware would proceed to determine in what mode the processor would run—in the normal mode or in the emulation mode. Accordingly the DEXT number is checked to determine whether or not it is set to 0 and if it is set to 0 the normal mode of the machine is run 1487. However if the DEXT number is not set to 0 the emulation mode is run 1486.

III DETAILS OF A PREFERRED EMBODIMENT

1. Semaphore Revisited

It has been previously explained that processes may share program segments and, in addition, may share data segments. Due to this interrelated structure, the processes must be able to cooperate with each other and to this end the system explained previously contains a set of process synchronization functions. These functions utilize the data structure called the semaphore.

The semaphore is a shared data structure referenced by the address base of all cooperating processes. Being a shared data structure, a semaphore is used to connect a process and an event or resource which does not occur simultaneously. An event, as has been explained previously, is anything observed by a process which may be of interest to some other process. The event may be the completion of an asynchronous operation or the availability of a resource. An event may occur either by another process arriving at a certain stage of execution or by the arrival of a message. A semaphore, therefore, must be capable of storing the presence of events or resources waiting for processes. Alternatively, a process may reach a certain stage of execution before the event occurs. In this situation, the semaphore must be able to store the process waiting for the event. Thus a semaphore must have the dual capability of storing the earlier occurrence of either a process waiting for the event in order to continue or, alternatively, the event waiting for the process in order to associate with it.

In order to provide a complete picture of the semaphore, first, its relationship and existence in the system mechanism described earlier will be expounded; next, its various data formats will be examined in detail; and, finally its usage and operation in the system will be explained.

In FIG. 8, the physical configuration of main memory is shown as a logical grouping of segment tables. These tables, referred to as G segments, are used for storing semaphores and related information. More particularly, these G tables are divided into two conceptually distinct segments, one being the GO segment and the other being a plurality of SD segments.

The GO segment is used to hold a plurality of process links (PL) and a process link semaphore (PLS) of the system. Each process link contains four fields, one being the name of the process that it represents, the second being the priority of that process, the third being a connecting link to the next entry, and the fourth containing a segment relative address. The name field is a JP name which corresponds to the process control block (PCB) JP name. Consequently, each process link in the GO segment provides a two word stand-in for the PCB since each process link points to the PCB that it represents. The priority field is a straight copy of the priority field of the PCB. The link field is used to order the process links into a queue so that the dispatcher can look at them in a sequential order. Thus the GO segment provides a simple mechanism for the dispatcher to look at all the currently active processes since each process has a two word process link linking it to its PCB.

It has been previously explained that a process may be in any one of four states, i.e. the running, ready, waiting or suspended (not currently active) state. All processes except the process in the running state which are currently active are located in the GO segment by the process name and by a queue in which the process link having the process name resides. Thus, not only are these states indicated by the PCB, but the process links of the GO segment enable a queue organization such that easy access and alteration by the dispatcher is provided. Stated differently, each currently active process has its name in a process link and each process link is part of one of a plurality of queues in the GO segment. Thus a process name can appear in only one process link and a process link can be attached to only one queue at a time. For the dispatcher to change the state of the process, all that is required is a transferral of the process link to a different queue associated with the state of the process. Thus by changing the interrelationship of the process link in the GO segment, state changes are easily accomplished.

Since only one process may be in the running state, no queue organization for the process link is needed. However, a plurality of processes may be in either the ready or waiting states.

Moreover, there may be a plurality of different waiting states a process may enter since a process is capable of waiting for many different events. As a result, there is one ready queue for those processes ready to have the resources of the virtual machine, i.e. Q/PR/RDY, and a plurality of waiting queues for those processes waiting for an event or resource to occur in order to continue operation, i.e. Q/PR/S or Q/PR/FLS. As has been previously explained, a suspended process is not a currently active process and hence no queue for those suspended processes is provided.

In FIG. 9 an exploded view of the GO segment is given. There is only one GO segment in the system. The GO segment provides all the process links, i.e. two word stand-ins for all the processes which are capable of being operated on by the system.

Each process that is in the ready state is joined to the other processes by their link fields into a queue called the ready queue, Q/PR/RDY, 803c and d. The ready queue must have its head and tail, i.e. the first and last process link in the queue, delimited in some way. This is accomplished by the process links next field as indicated earlier. The tail of the queue, i.e. 803d, identifies itself by having a next link field with a zero value. The head of Q/PR/RDY is pointed to by a field in the system base area, namely, a word called by the internal process queue word (IPQW) which contains a pointer to the process link that is at the head of the ready queue. The dispatcher can thus look at all ready processes by locating the head of the ready queue via IPQW and then sequencing all the process links in Q/PR/RDY by their next link fields. When the currently running process goes to another state such as wait, the dispatcher selects the process link at the head of Q/PR/RDY, removes it from the queue, and uses the JP name to find its process control block. This process then becomes a new running process, going from the ready state to the running state via the dispatcher's directions.

The process that is in the running state is not represented by a process link in the GO segment. Instead there is another word in the system base area, called the running process word or RPW that contains two fields. One field is a JP name of a currently running process, the other is a copy of the priority field held in the PCB of that process. If a situation arises wherein the dispatcher compares the head of the ready queue to the currently running process to determine which process shall have control of the central processing unit, it would compare the RPW to the process link and then proceed.

Processes in the wait state are waiting for a signal or message that a certain event has occurred. Since more than one process may be waiting for the same signal or message, a queue of such processes may be required. Accordingly, each process in the wait state is also represented in the GO segment by a two word process link, and these process links are strung together into a waiting queue. Since more than one semaphore may have processes waiting, there may be numerous Q/PR/S's represented by strings of process links in the GO segment. For illustrative purposes, two waiting queues of processes are shown, i.e. 803a–b and 803e–g. The head of each such Q/PR/S is designated by its own semaphore as will be subsequently explained. This is in contradistinction to the one ready queue which is designated by the internal processor queue word in the system base. Both Q/PR/RDY and Q/PR/S are queues of process links that are manipulated by the dispatcher hardware and by P and V instructions when a process changes states. The dispatcher or P or V instruction can remove a process from one of these queues and place it on another queue and the dispatcher can move a process in and out of the running state.

The process links for waiting processes Q/PR/S are identical in format to the process links on Q/PR/RDY with the tail of the queue designated by a process link with a zero value next link field. A pointer to the head of a queue of waiting processes is held in a special data structure called a semaphore that is used for signaling the event. This semaphore, to be explained in more detail later, contains a process queue head pointer, PHQP, which designates the head process link in the queue of processes waiting on the semaphore, i.e. Q/PR/S.

When a process moves from ready or waiting state to the running or suspending state, it gives up its process link in the GO segment. This space is thus freed for some other use. On the other hand, when a suspended or running process moves to the ready or wait state, it must obtain a process link in the GO segment. Thus, there is a storage management problem in the GO segment. The dispatcher must be able to rapidly obtain and release two word process links. To solve this problem, the GO segment contains yet another queue that is automatically manipulated by hardware. This queue contains all free process links which may be used when a new process is introduced. Whenever a process link is released from use, e.g. by a ready or waiting process being suspended, a freed process link is added to the queue of free process links. Whenever new process link is needed to represent a process moving into the ready or wait state, one is obtained from the queue of free process links. These actions are primarily performed by the dispatcher but P and V instructions or start and suspend instructions may be utilized (both P and V instructions and Start and Suspend instructions are the subject of other patent applications cited in the Related Applications, supra). Enough process links must be contained in the GO segment at any given time to hold the names of all process which are in the currently active state.

The free process links are strung together in the same way as Q/PR/RDY and Q/PR/S and the queue tail is designated by a link with a zero valued next link field. The head of the free process link queue is pointed to by a field in a special data structure, called a process link semaphore (PLS) 901 that resides at the front of the GO segment. The free link semaphore is at a known place in the GO segment and hence the dispatcher has no trouble in locating it. Thus all the process links within the GO segment are tied in some fashion to either the ready queue, one of a plurality of waiting queues, or the free process link queue.

However, it should be noted that nothing in the process link itself identifies the queue that it is in. In looking at a process link in the GO segment, only a process name, a priority, and a link field that gets one to the next link is seen, i.e. there is no backward link or other identifying information. Thus by looking at the process links, it is impossible to determine the current state of the system.

It has been explained that a semaphore also has the capability of storing an event waiting for a process in order to associate with it. To accomplish these features, the remaining plurality of G segments are utilized. The remaining G segments are called semaphore descriptor (SD) segments, and are composed of Gn segments 802n. An SD segment is a segment that may contain semaphores, queues of message links controlled by semaphores and semaphore descriptors. The semaphore descriptor segments are referenced if the ordinary segment in the local address base of a process JP has a semaphore descriptor segment containing GS bits equal to 01. These GS bits will be subsequently described when accessing the semaphore descriptor segment. Furthermore, no two G segments can start at the same absolute address. As a result, the G0 segment is the first segment having an absolute starting address and the remaining SD segment, i.e. G1 through Gn have their own absolute starting addresses.

Figure 15:
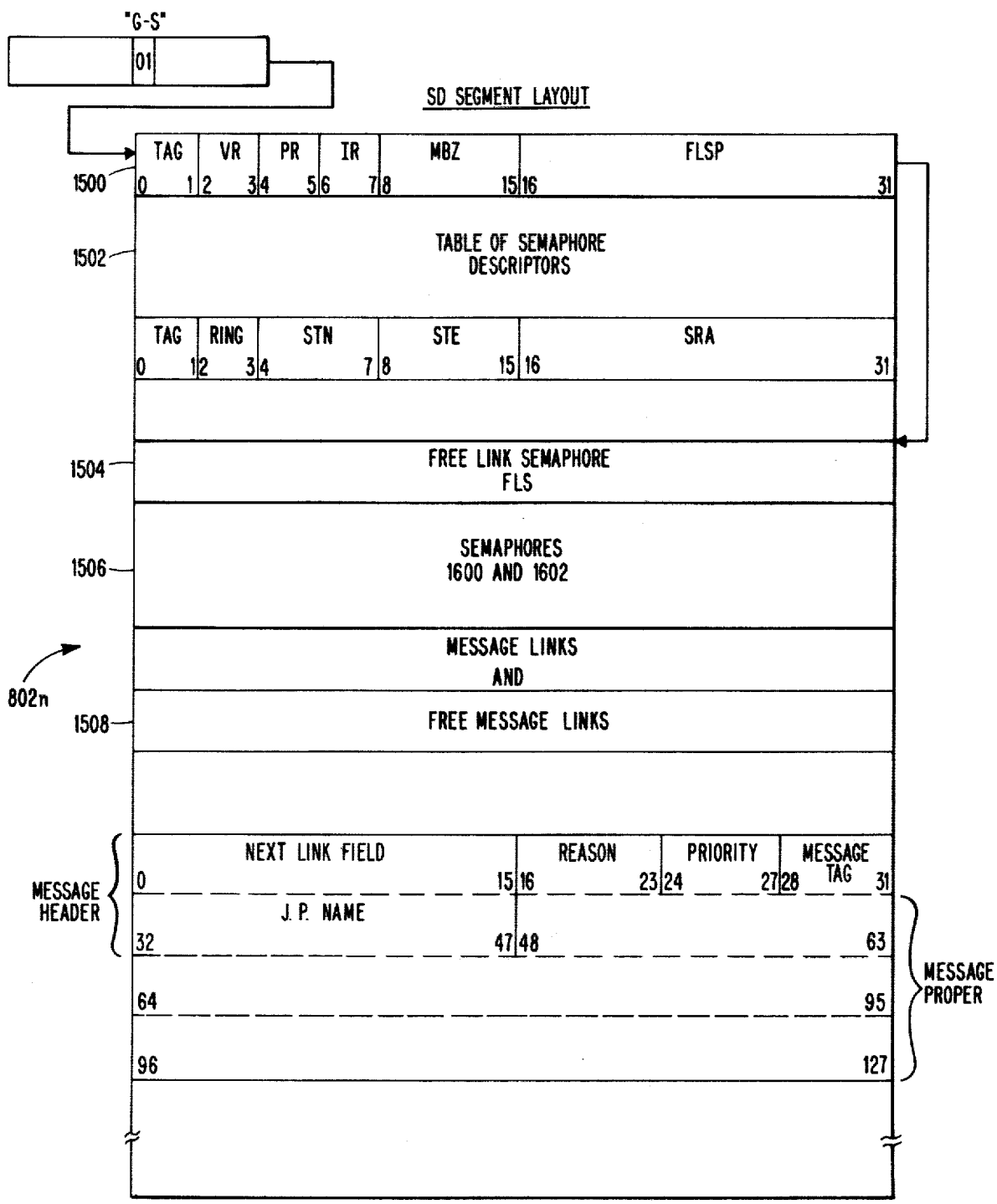
FIG. 15 is an exploded view of a semaphore descriptor segment and its arrangement.

The layout of a semaphore descriptor segment (SD) is shown in FIG. 15. Thus the first word of the semaphore descriptor segment must have the following 32 bit format. The first two bits are a tag field which as a 11 bit encoding indicating a so-called tag fault. This fault indication is merely a hardware mechanism for limiting access to a word of a SD segment. The next two bits, i.e. bits 2 and 3 are the VR ring number (Ring numbers and associated structures are the subject of another patent application cited in the related applications, supra). The ring number, VR, defines the maximum computed ring which is allowed to perform a V operation on semaphores through semaphore descriptors in the segment. The next two bits, i.e. bits 4 and 5 are the PR ring number which defines the maximum computed ring which is allowed to perform a P operation on semaphores through semaphore descriptors in the segment. Bits 6 and 7 are the IR ring number which defines the maximum computed ring which is allowed to perform an initialized semaphore count operation on semaphores through semaphore descriptors in the segment. The VR, PR, and IR of a semaphore descriptor segment do not necessarily refer to semaphores within this segment, but only to the semaphore descriptors 1502 (to be explained later) which reside in this segment, i.e. semaphores accessed through these descriptors. Thus, the semaphores may be in a segment different from this semaphore descriptor segment. Bits 8–15 must be zero and are labeled MBZ. Bits 16–31 are a free link semaphore pointer, FLSP, which is a relative address displacement in the semaphore descriptor segment. The free link semaphore pointer provides two functions in the system. First, it is defined to be the upper bound of the address of the semaphore descriptors in the semaphore descriptor segment. In other words, the segment relative address of any semaphore descriptor in the segment must be less than FLSP. If the relative address of any semaphore descriptor in this segment is not less than FLSP, then the semaphore descriptor is not pointing to a semaphore in that segment. Second, it points to the free link semaphore (FLS) to be subsequently explained. Thus in viewing FIG. 15 number 1500 refers to the semaphore descriptor segment's first word and number 1502 refers to one of a plurality of the semaphore descriptors.

The FLSP of the semaphore descriptor segment first word provides the relative address pointing to the free link semaphore 1504 which follows the semaphore descriptors 1502. The free link semaphore, FLS, controls the queue of free message links Q/ML/FLS in this segment, if the FLS exists. The free link semaphore must exist if the SD segment contains semaphores with messages. In addition, the FLS may be used to hold processes, i.e. Q/PR/FLS, if all the free message links are currently in use.

If there are no semaphore descriptors, then 1502 would be void. If there are no free message links, then the semaphore FLS shown as 1504 would not be necessary. Moreover, if this condition existed then, numeral 1506 which shows the semaphores within the semaphore descriptor segment would be void also.

In FIG. 15, 1506 indicates the location of the semaphores. The semaphores which may be in this part of memory are described in FIGS. 16a and 16b. Block 1508 contains the message links and free message links. Each of these links is contained in the SD segment much in the same manner as the process links in the G0 segment. This message area may contain other data as any other segment but normally would contain messages associated with various semaphores in the segment.

Each message link 1508 consists of four words constituting a message as shown in 1508a. The first 48 bits constitute the message header area and the last 84 bits constitute the message proper area. The message header contains 1½ words i.e. bits 0–47; the message proper occupies the remaining space of the link, i.e. 2½ words or bits 48–127.

The message header format has bits 0–15 as the next link field. This field has significance only when a message resides in the message link. It will then contain the relative address of the next message link of the queue in the semaphore descriptor segment, except if the link is the last one of the queue in which case the next link field will have a zero thus indicating the end of that queue. Bits 16–23 are the reason field which provides the reason for the message. It is only used in those situations having IO messages, otherwise it is meaningless. Bits 24–27 are the message priority level (MPL). This field is used in conjunction with semaphores with messages, the lowest value of the message priority level corresponding to the highest priority. Bits 28–31 are the message tag. This field contains basic information about the nature of the message. A message tag of 0000 indicates that the message was generated by P or V instructions. For a message tag of 1000, the IOC is known to have generated the message. Bits 32–48 are the sender's name. Depending upon the message, this field will contain the name JP of the process which sends the message, or the channel number for IOC messages, or zero in all other cases.

Figure 17:
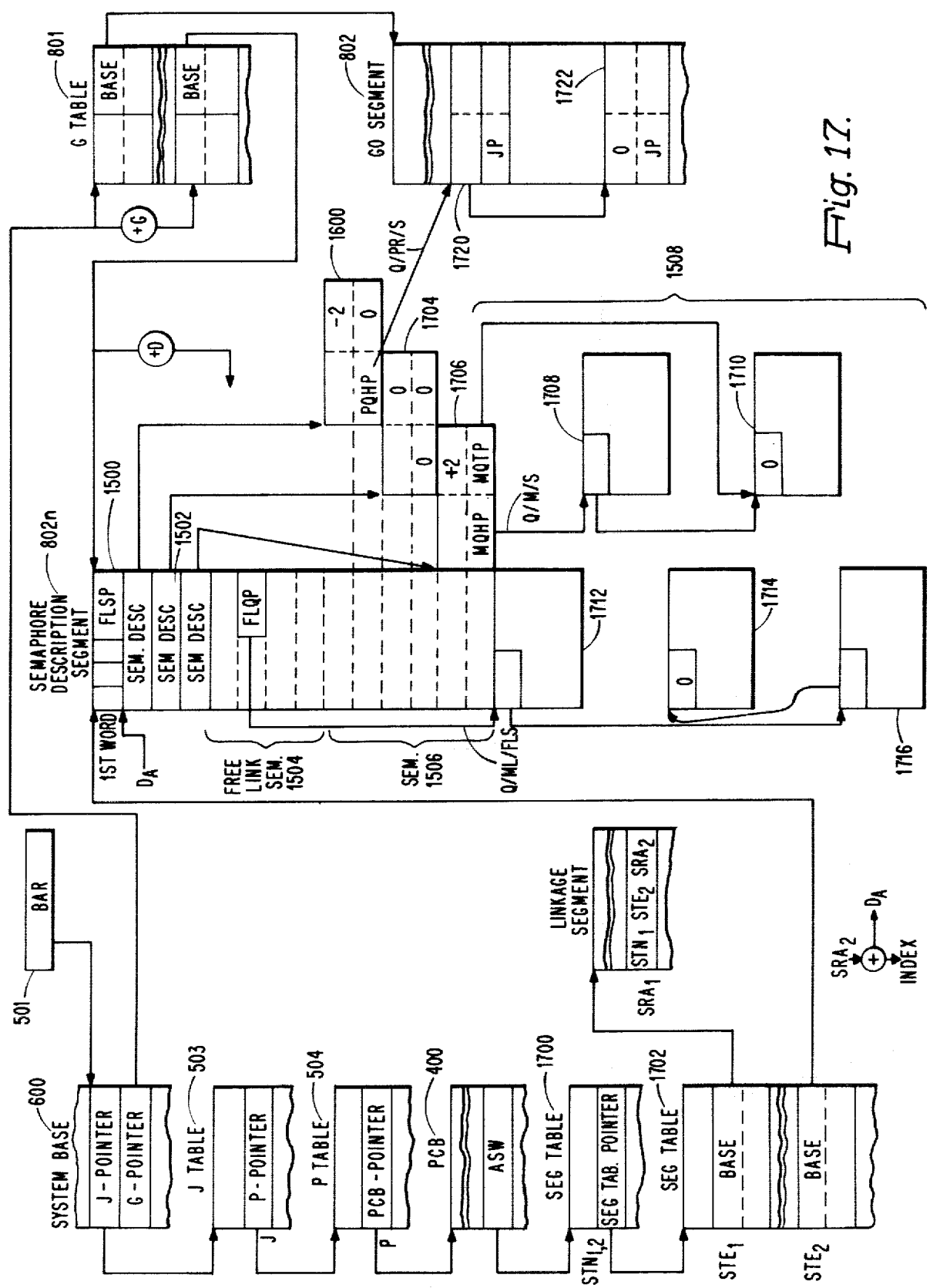
FIG. 17 is a schematic diagram of address development for the semaphore.

Messages are contained in the semaphore descriptor segments but not within the G0 segment. In FIG. 17 the interrelationship of the message links to the semaphore and the free link semaphore is shown as 1508a to 1508n. Messages are provided in the general registers 0 to 3 of a PCB. Thus a process executing a V operation would store the message proper in general registers 1 to 3 and the system hardware would construct the message header in general registers 0 to 1. Using general registers rather than space in a data segment makes it easy for the hardware to deliver the message. When the process is in a wait state its registers are easily addressed in the process control block and the fields of the messages are most easily examined in the registers once the process returns to the running state.

The message links and free message links are also queue organized. If the message links are tied to a semaphore a queue of messages in the semaphore (Q/M/S) is provided. If the message links are currently not being used, then they are tied to the FLS semaphore 1504 and a queue of message links on the free link semaphore, Q/ML/FLS, is provided. The structure of the Q/ML/FLS when no messages are provided is analogous to the Q/PR/PLS; however, several important distinctions to be explained supra, are realized.

Figure 18:
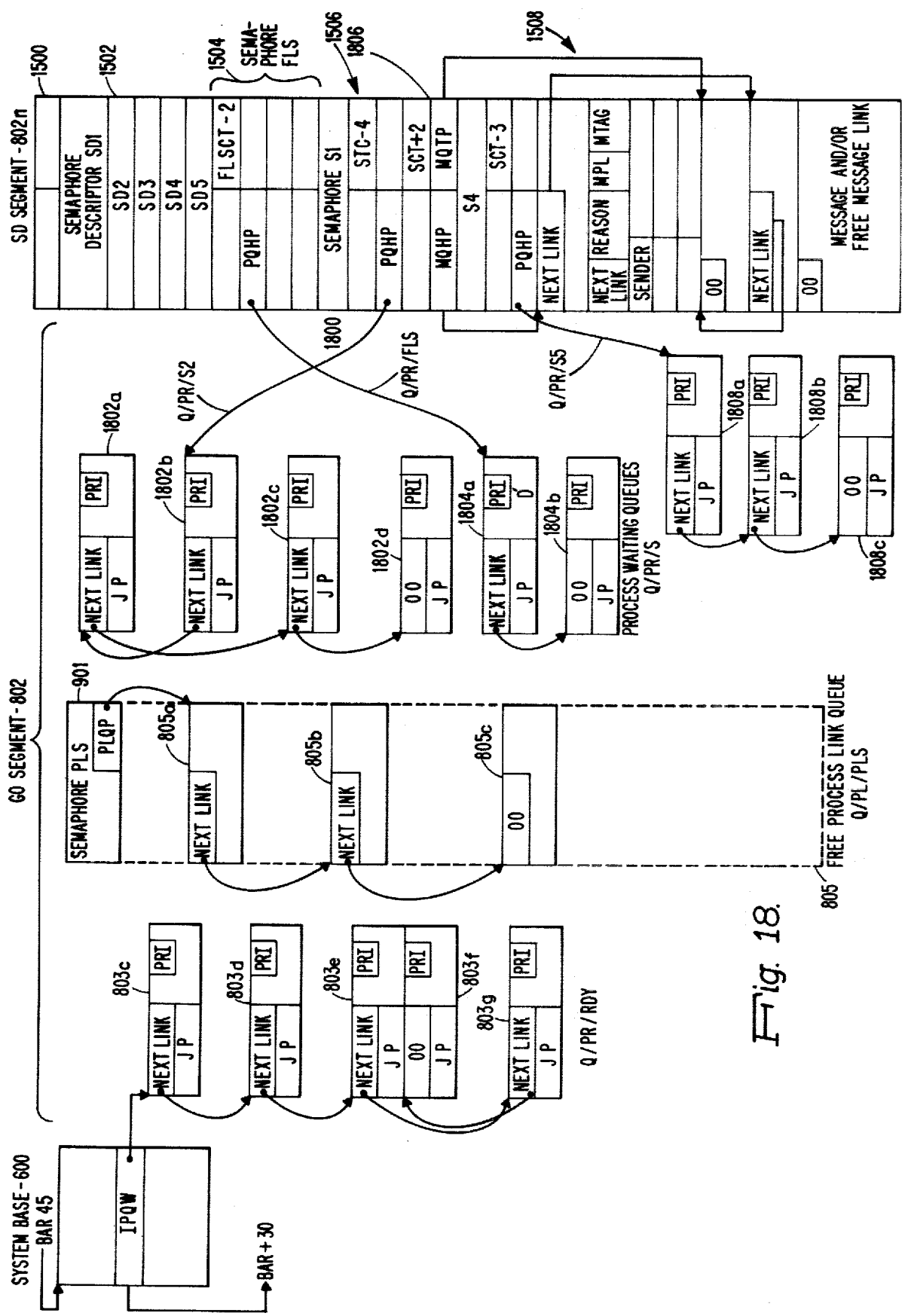
FIG. 18 is a schematic diagram showing the relationship of the semaphore descriptor segment with a G0 segment.

The above provides the basic memory allocation within which the semaphore exists. Before describing the operation of the structures of FIGS. 9 and 15 as shown in FIGS. 17 and 18, an examination of each of the semaphore's data structure is provided.

Referring to FIG. 16, the data structures which enable the processes and events to connect is described. More particularly, FIG. 16 illustrates eight types of semaphores which are used in the system previously described. These semaphores are: a semaphore 1600 without a message shown in FIG. 16a, a semaphore with a message 1602 shown in FIG. 16b of which there are two types, a process link semaphore 901 used in the GO segment and shown in FIG. 16c, a free link semaphore 1504 used in the SD segments and shown in FIG. 16d, a general semaphore 1605, a trap semaphore 1607, and an extended semaphore 1609.

It has been previously stated that a semaphore connects a process to an event or a resource. Where the semaphore is used only to indicate an event occurrence, but not to transfer particularized information concerning the event occurrence, the semaphore without a message data structure as shown in FIG. 16a is utilized. For example, semaphore 1600 may be associated with I/O devices such as disk drives. Any information concerning the availability of the disk drives, e.g. requesting the disk or indicating that the process is finished with the disk, would be signalled to a particular semaphore 1600. Other semaphores 1600 may be used to indicate other I/O devices or other quantities which have a present or not present quality. Each of these instances may have their own semaphore 1600. Semaphore 1600 consists of a double word, i.e. 64 bits. Its format is as follows. The first four bits, i.e. bits 0 to 3 are the semaphore tag (STAG) field which are used in all semaphores to indicate the particular type of semaphore. For a semaphore without a message, the stage field has an encoding of 0000. Bits 4–15 of semaphore 1600 are used to indicate the semaphore maximum count (SMC). The SMC field indicates the maximum number of resources which may be constructed on and tied to the semaphore. Bits 16–31 contain a semaphore count field (SCT) which is used to indicate the actual number of processes waiting on the semaphore or the actual number of resources waiting on the semaphore. The relationship of the SMC and SCT fields is that the value of SCT field can never be greater than the value of the SMC field for reasons which will subsequently be explained.

Bits 32–47 are a process queue head pointer (PQHP). A process queue head pointer is a 16 bit relative displacement which points to the head of the process link in the GO segment associated with the semaphore. The process queue head pointer will be zero when the SCT count is zero or positive since no processes are waiting on the semaphore and hence there is no process link to designate. If the SCT count is negative, then the field PQHP will point to the first process enqueued on the semaphore. Bits 48–63 are the tenant process name (TEP). This field contains the JP name of the last process to have performed a successful P operation on the semaphore. By this is meant that the name of the last process to have successfully obtained a resource from the semaphore is known by the TEP field. Since only an indication of an event occurrence is given, i.e. a signal, the TEP name indicates the last process to have received the signal.

In order to determine whether or not a semaphore is storing the presence of events or resources or the presence of processes, the SCT field count of the semaphore is determinative. If the SCT field is positive, the SCT value indicates the number of resources waiting for processes. Conversely, if the SCT is negative, the absolute value of the SCT indicates the number of processes waiting for resources. If the SCT field is equal to zero, no process or resource is presently waiting on the semaphore.

The SCT field is used in conjunction with the P and V operations on the semaphore to either increment or decrement the count. Thus a P operation, by which a process asks for a resource from a predetermined semaphore, decrements the SCT field by one when executed. Conversely, a V operation which indicates the availability of a resource to the semaphore increments the SCT field of the semaphore by one. Although no messages are connected to a semaphore without a message, the basic incrementing and decrementing by V and P operations respectively, applies for the SCT fields in both the semaphores without messages and the semaphore with messages.

When particularized information concerning an event occurrence is desired to be transmitted, a semaphore with a message 1602 is used. As was the situation with semaphore without messages, each semaphore with a message is associated with a particular occurrence, e.g. a social security deduction of a Federal tax deduction for a payroll account. Thus each semaphore is predetermined and the operating system constructs the address syllable locating the particularized semaphore when the particular event occurs.

The message semaphore tag field (STAG) is shown as bits 0–3. Depending on the encoding, the STAG field indicates whether the semaphore is one of two types, i.e. a message management semaphore or a message semaphore. For the semaphore with a message, the STAG field indicates the type of enqueueing of the message. If the STAG field is 0001, the messages are enqueued in a FIFO (first in, first out) manner. If the STAG field has a tag of 0010, only LIFO (last in, first out) messages are enqueued on the semaphore. If the STAG field is 0011, then FIFO or LIFO message enqueueing is permitted.

The message management semaphore has a STAG field of 0101 which indicates that message enqueueing is by priority of the process and for each priority level FIFO rules apply. The message management semaphore thus is distinguished from the message semaphore by using priority levels enabling important messages to be transferred more quickly.

In word 1602, bits 4–15 identify the semaphore maximum count SMC and bits 16–31 identify the SCT count and are identical to word 1600. Thus a message, which is another form of data as the signal, has the same present or not present quality as a signal used in the non-message semaphores. Therefore, the SCT field is effected in the same way by messages in the message semaphore as the signals in the non-message semaphores.

Bits 32–47 have either a message queue head pointer (MQHP) or a process queue head pointer (PQHP). If the SCT count is positive, there is indicated a number of messages enqueued on the semaphore. In this instance, the message queue head pointer would point to the first message in the message queue. Bits 48–63 contain a message queue tail pointer (MQTP) which points to the last message of the message queue when the SCT count is positive. If the SCT count is negative, the absolute value of the SCT count gives a number of processes enqueued on the semaphore. For this situation, the PQHP points to the head of the process link and the message queue tail pointer is zero since there are obviously no messages. For the situation where the semaphore count is equal to zero, the PQHP, MWHP and MQTP are all zero since there are no messages or processes being identified.

The semaphores in FIGS. 16a and 16b represent the signaling mechanisms for handling process synchronization. These would be located in SD segments at 1506. However, they also introduce a problem of requiring memory space for storing either processes or messages. In order to alleviate this memory management problem, free link semaphores shown in FIG. 16d and process link semaphores shown in FIG. 16c are provided. Each of these semaphores controls the available number of free message links or free process links, respectively, as will now be explained.

FIG. 16c illustrates the data structure of a process link semaphore PLS 901. The process link semaphore links together all the unused process links, i.e. those process links without a process name. When the state of a process is changed to a ready state, the first unused process link is obtained from the process link semaphore. This process link is then provided, among other fields, the name of the newly activated process. Conversely, when a process is suspended or terminated or put in running state, the process name contained in the queue link is removed and the linking field is then altered so that a link between all unused process links is maintained. Thus the organization allows process link queue control without modifying any link in the GO segment since it is simple enough to change the next link field contents of a link. As a result, the process links are transferred from queue to queue. Since all the processes names are stored in the GO segment, the process link semaphore is essentially a reservoir for the process links required by new processes entering into the system. In addition, the process link semaphore contains a process link queue head pointer (PLQP) in bit positions 48–63 which indicate the relative address of the first process link of the queue in relation to the GO segment base. Each process link contains a next link field which points to the next process link tied to the process link semaphore. Thus, as processes are introduced and terminated, the process links in the GO segment are rearranged but only the first process link must be known since from it all the remaining process links may be located.

The free link semaphore FLS shown in FIG. 16d is analogous to the process link semaphore in that it connects all the unused free message links of the segment. However, the free message links are not contained in the GO segment but are in the SD segments previously described. The FLS has a data structure which is three words long and has the following format. Bits 0 to 3 are the STAG field indicating the type of semaphore. For a free message link semaphore, this STAG field is 0000. The bits 4–15 must be zero as indicated by MBZ. Bits 16–31 are the free link semaphore count (FLSCT) and this field indicates the number of processes which are waiting for a free message link, Q/PR/FLS. This is a negative number which is decremented as processes are tied to the free link semaphore. When the FLSCT number is zero, no processes are waiting for a free message link. Bits 32–47 are the process queue head pointer PQHP and bits 48–63 are the free message link queue pointer FLQP. The process queue head pointer has been described previously re the semaphore with messages and the free message link queue head pointer is a pointer to the first message link associated with the free link semaphore. The free message links are strung together in LIFO order using their next link field. Bits 64–71 must be zero and bits 72–79 are the gobal name (G name) of the free link semaphore. Bits 81–95 are the logical channel count (CCT) which indicates the number of logical channels waiting for a free message link. This occurs in IO operations wherein a device via its logical channel is waiting for a free message link in order to communicate with the process currently being executed.

When a V operation is executed by a process on a semaphore with a message in the SD segment of the FLS, the first message link indicated by FLQP is used to store the message. The FLQP is then changed to point to the next free message link available. Conversely when a P operation is executed on a semaphore with a message in the SD segment of the FLS, the message link previously containing the information is now freed and hence will be returned to the queue tied to FLS. Only when no message links are available and a request for one is made is the PQHP of the FLS used since this indicates that a process has tried to deliver a message but was unsuccessful in doing so. Thus the FLS provides a storage memory management solution to the memory space limitations of an SD segment by keeping track of all free message links available in the segment.

FIG. 16e is the format of a general semaphore 1605. It indicates a two word format with three pointers in it. The first of these is a pointer 1614 to the first available resource occurrence and represents the ownership role of the general semaphore in the (ev–evo) set. It will either be zero of have a G segment address of the first available resource occurrence. Another is a pointer 1615 to the first resource occurrence i.e. showing the ownership of the rc__ro set of all resource occurrences whether available or not. Still another pointer 1616 is to the first event processing demand representing a process which is waiting for an event to happen.

The resource occurrence structure 1606 has three pointers 1717–1619. One pointer 1617 points to the next available resource occurrence and will be zero if the resource occurrence itself is not available; a second pointer 1618 points to the next resource occurrence and the total set of resource occurrences controlled by the semaphore; while a third pointer 1619 points to the owner process which will be zero if the resource occurrence is not currently owned or assigned by a process. In this situation either the next available resource occurrence pointer will be zero or the pointer to the owner of the process will be zero; they will never be in use at the same time.

The control structures for the trap semaphore are defined by FIG. 16g and 16h. The first of these is the trap semaphore 1607 which includes five pointers which support the sets described on the data structure diagram (FIG. 1d) and also include a Prepare Stack Instruction and an Enter Procedure Instructure which are filled in at the time that an event processing is initiated against the trap semaphore, and will be used to direct the system in executing an asynchronous procedure call. The first pointer 1621 is to the first available resource occurrence; the next pointer 1622 is to the first resource occurrence whether its available or not; the third pointer 1623 is to the owner process which is zero when the trap semaphore is not currently monitoring the event for anyone or contains the pointer to the process if it is monitoring an event—it is only when this pointer is in non-zero value that the prepare stack instruction in the Enter Procedure Instruction below is effective; the fourth pointer 1624 is a pointer to the first waiting resource occurrence of all the resource occurrences whether they are available or not; the fifth pointer 1625 is to the owner process (pr—epd2) which is zero when there are no event occurrences which have not been notified and when the owner process is not in trap mode. This pointer 1625 is used to hold information such that if a trap cannot be executed immediately (because the process is already in trap mode) it can be subsequently executed; moreover it provides a mechanism for the trap procedure to see if there are other traps to be executed.

The Trap Resource Occurrence FIG. 16h includes four pointers and is used with the trap semaphore. The first pointer 1628 is to the next available resource occurrence if there are others which have not been made known through the trapping; the second pointer 1629 is to the next resource occurrence in the set of all resource occurrences controlled by the trap semaphore; the third pointer 1630 is to the owner process which currently has the resource occurrence assigned to it; and the fourth pointer 1631 is the next event processing demand and holds the pointer to the next waiting resource occurrence; i.e. waiting in the sense that it should be handled as a trap but the process to handle it is currently in trap mode and therefore the trap must be held in the queue until the process returns to normal mode.

The next set of FIGS. 16I–16L relate to the extended semaphore. FIG. 16I is a data structure of the Extended Semaphore Itself and includes three pointers 1634–1636. The first pointer 1634 in the semaphore is the pointer to the first available resource occurrence i.e. a resource occurrence which is available but which has not been assigned either to a process or to an event processing demand; the second pointer 1635 is to the first resource occurrence of all the resource occurrences controlled by the extended semaphore. The Gate Event Processing demand structure of FIG. 16j includes four pointers 1638–1642. The first of these is the pointer 1638 to the next event variable such that this is one of many event processing demands which are monitoring the same extended semaphore; the second pointer 1639 is to the first process which is waiting on the occurrence and this is used in keeping track of the process that is waiting on the event processing demand; the next pointer 1640 is a pointer to the owner process and is a pointer to the owner process indicating which process has established an event processing demand on the event variable; the fourth pointer 1641 is a pointer to the first of the resource occurrences which have been acquired under the event processing demand and for which the process has not yet been notified—it is essentially the first member of the set epd--evo. In the gate processing demand 1610 there is also a maximum occurrence count which defines the maximum number of occurrences which may be handled by the system before the even processing demand itself becomes inactive.

FIG. 16k is very similar to FIG. 16j, however it has an additional pointer 1648 to the owner process which is the implementation of the pr—epd2 set and includes the pointer to the next event processing demands which are waiting because the process is already in the trap mode and therefore cannot have a trap within a trap. In addition the trap event processing demand 1611 has two normal instructions the first which is a Prepare Stack Instruction and the second is an Enter Procedure Instruction. These instructions are those to be executed on the behalf of the process which is the owner of the pr—epd1 and also the pr—epd2 set when the trap is allowed to take effect.

The extended semaphore mechanism is defined by FIG. 16L which is identical to that given for 16h and the explanation is the same.

A process link 1613 is utilized with all semaphores, and links all processes which are waiting for a message link in the semaphore descriptor segment containing the free link semaphores. The links are located in the GO segment, which contains all process queues. Each link 1613 consists of two words. The first field 1657 is a pointer to the next process link or zero if it is the last link in the queue. The priority field 1659 contains the priority of the process associated with the link. The AB field 1660 is the asynchronous trap field while the ARN 1662 is the asynchronous trap ring field. The JP field 1663 is the logical name of the process corresponding to the link; whereas the semaphore segment relative address 1664 is the semaphore segment relative address of a semaphore S on which the process attempted to perform a V-operation.

The control structure for a Binary Semaphore (Shared Access) is defined by FIG. 16N. The STAG field is the semaphore Tag field which are used in all semaphore structures to indicate the particular type of semaphore. The SML field 1570 is used to indicate the semaphore maximum count. The SMC field 1670 therefore indicates the number of resources which may be constructed on and tied to the semaphore. The semaphore count field SCT 1671 is used to indicate the actual number of processes waiting on the semaphore or the actual number of resources waiting on the semaphore. The second word of the Binary Semaphore comprises a pointer 1672 to a first waiting process showing the memberships of the ev—epd set, and a pointer 1673 to a first resource object assignment showing the memberships in the ro—roa set of FIG. 1J.

The Resource Object Assignment structure of FIG. 16O has two pointers 1676 and 1677 respectively and two MBZ fields 1674 and 1678 respectively. The pointer 1676 to next resource object assignment showing the membership in the ro—roa set, whereas the pointer 1677 to the next resource object assignment shows the membership in the pr—roa set of FIGS. 1J and 1L. The MBZ fields must be zero. The mode field 1675 indicates the mode of access by a process to a resource object.

The Resource Occurrence (Shared Access) structure of FIG. 16P is a doubleword having three pointers as follows: a pointer 1680 to next available resource occurrence showing the membership in the ev__evo set; a pointer 1681 to next resource occurrence showing the membership in the rc__ro set; and a pointer 1682 to first resource object assignment showing the membership in the pr__roa set. Of course the MBZ field 1679 must be zero.

Having now described the system configuration within which the semaphore functions and the semaphores, an analysis of the operation and functions of the semaphores is described. To aid in the description, FIG. 17 illustrates the addressing of the semaphore and both FIGS. 17 and 18 illustrate the various semaphores and the queues which may be tied to them. By an examination of FIGS. 17 and 18, the relationship of the semaphores and queue structure to the overall system design will be presented.

In FIG. 17, the development of the location of the semaphore via the segmented mechanism described supra in FIG. 5 is shown. More particularly, the semaphores are addressed by process synchronization and multiplexing instructions, i.e. P or V instructions which have a 20 bit address syllable whose resolution requires searching through the structure of addressing tables 503, 504 involving the JP numbers of the running process to select the process control block 400. Then the STN 1700 and STE 1702 values are used to find the segment table which is added to an index value to find the final segment SRA within the semaphore segment. Subsequently, there is performed an absolute address calculation that provides the semaphore descriptors location in memory. For other processes in the system to which a process would like to transfer a semaphore address and then expect to have a message returned via such semaphore, i.e. an IO process, the address of the semaphore is given via its GD address since the GD address is applicable on a system wide basis rather than a narrower JP process basis. Thus two means of addressing semaphore are provided. This results because semaphores and the structures built off of them are by necessity in the shared portion of the address base of different processes and therefore must be accessible by either method.

As was discussed in conjunction with FIG. 16, there are two basic semaphores which are addressed by P or V instructions, i.e. semaphores without messages 1600 and semaphores with messages 1602. Initially, the semaphore without a message will be examined and subsequently the semaphore with a message will be taken. The description given is taken at some time after system initialization. The semaphore structures have already reached a certain stage of development which is indicated in both FIGS. 18 and 17.

When a new process is entered by the system, i.e. the process is changed from the suspended state to a ready state, the name of the process is written into a process link 805 a–c of the GO segment 802 (the mechanism which provides for initialization of a process is the subject matter of another application which is referred to in Related Applications, supra). This process link is obtained from the queue tied to the semaphore PLS 901, i.e. the free process link queue. Thus the first link that the semaphore PLS references would be used for the new process name and the semaphore PLS would have its PLQP changed to point to the next free link in its queue. For example, the displacement field in PLQP in FIG. 18 would be changed from pointing to 805a to 805b. Concurrently, the link 805a would be entered into the ready queue Q/PR/RDY since the process has been started and is ready to have the resource of the virtual machine at its control. When process link 805a is placed into the ready queue, however, it would be placed in LIFO order based on its priority by the dispatcher. Thus it may be either the head of Q/PR/RDY or at most sixth in the given configuration in the ready queue.

Once on the ready queue, the process would wait its turn until it obtained control of the central processing subsystem. Having accomplished this feature, it would then be able to have the central processing unit execute its procedure segments including any communication signals via P or V instructions. In the case when a P instruction is executed on a semaphore without a message, i.e. a process that requires a signal from another process before it can proceed, the system mechanism would utilize the address syllable to determine the particular semaphore 1600 without a message which is being referenced. Upon locating this semaphore, the STAG field is tested to be 0000 and the SCT field would be tested to determine whether the count was greater than zero, less than zero, or equal to zero. If the SCT field was greater than zero, this would indicate that at least a prior process had performed a V operation on the particular semaphore. As a result, the particular semaphore without a message indicates that a particular resource with which it is associated is available for the requesting process. The process would then take the requested resource and enable the following operations. First, it would decrement the SCT field count by one indicating that it is executing a P instruction and next it would place its name in the TEP field becoming the tenant of the semaphore without a message indicating that a successful operation on the semaphore had occurred. After the semaphore changed its PQHP, the process would then continue into its running state.

If the SCT field of the semaphore without a message 1600 were less than or equal to zero, it would then indicate that the resource associated with the semaphore is not available. As a result, the process which is executing the P instruction on a semaphore without a message would pass into a queue of Q/PR/S, i.e. since it could not execute the P instructions because no resources were available, it would take itself out of the running state and tie itself to the semaphore without a message. This semaphore would signal the process when the resource it desired becomes available. Thus the process goes from the running state to the wait state by its own action of executing the P instruction. This is shown in FIG. 17 at 1600 wherein the situation has occurred twice and two processes are waiting on the semaphore without a message. Looking at numeral 1602, it is seen that the process queue head pointer PQHP is pointing to the first process, 1720 built from the semaphore 1600 which in turn has a next link field pointing to the second process 1722 built from the semaphore, the second process having a next link field of zero indicating that there are no further processes built on the semaphore 1600 without a message. As the process transferred itself to the Q/PR/S, it would decrement the SCT field but would not place its name in the TEP field since no successful operation on semaphore 1600 had occurred.

If the process performed a V instruction on a semaphore 1600 of the type without a message, i.e. the process has finished using the resource and has a signal indicating such which it wants to deliver to the semaphore, the SCT field would again be tested to determine the status of the semaphore. If the semaphore had an SCT count greater than zero, i.e. there are resources available, or equal to zero, the count is incremented by one indicating that the resources used by the process is available for use by another process. The process executing the V instruction would then continue in the running state.

If however, the SCT count were less than zero as shown in FIG. 17 indicating that there is another process in the Q/PR/S waiting on a resource, the giving up of the resource via the V instruction would then pass the first process 1720 tied to the semaphore into the queue Q/PR/RDY in addition to incrementing the SCT count by one. The dispatcher would take the signal from the semaphore and put the PCB of the process 1720 waiting on the semaphore into the ready state. When a process is passed to the ready state, it is then placed upon a queue Q/PR/RDY. This queue links all the processes which are in the ready state, i.e. which are waiting for the availability of the CPU. Processes are enqueued in Q/PR/RDY in priority order and in each priority level, FIFO or LIFO rules apply. FIFO rules apply when the process was in a waiting state before enqueueing and LIFO rules apply when the process was in the running state before enqueueing. The current process in the running state would then be tested for priority with the process of the head of the ready queue. It should be noted that the head process of the ready queue may or may not be the process that was previously waiting on the semaphore which was just put into the ready state. A test would be made as to which process, i.e. the running process or the process at the head of the ready queue, had higher priority, the one with the higher priority becoming the process in the running state. Thus in FIG. 17, if a V op was performed on semaphore 1600, the head pointer pointing to the process link 1720 would indicate that that process would be the one to receive the signal. The process link 1720 would then be placed into the ready queue 803 and the SCT count of semaphore 1600 would be incremented to a minus one ($-1$). Moreover, the PQHP pointer of semaphore 1600 would then indicate process link 1722 as the next process to receive a signal when a resource is made available.

The semaphore of the type with messages 1602 are indicated at 1706 in FIG. 17 and 1806 in FIG. 18. When a P instruction is executed on a semaphore with a message, the SCT field will be ascertained in order to determine the status of the semaphore itself. If the count is greater than zero, this indicates a queue of messages on the semaphore Q/M/S. This results since previously some process has performed a V operation on the semaphore, thereby tying a message to the semaphore and concurrently incrementing its count from zero to a positive number. Since the semaphore 1706 has messages 1708 and 1710 tied to it, the message 1708 is copied into the general registers of the current process executing the P instruction. In addition to transferring the contents of the messages, message link 1708 passes into the queue of messages on the free link semaphore, Q/ML/FLS, since the information that was resident in message link 1708 is freed. The count of semaphore 1706 would be decremented by one to a plus one ($+1$); the message queue head pointer would be altered to indicate that message link 1710 would be the next message tied to semaphore 1706 and the message queue tail pointer would not change since 1710 is the last message in the message link. If, however, a message were being added to the Q/M/S on 1706, then the SCT field would be incremented by one, the message queue head pointer would remain unaltered, and the message queue tail pointer would point to the message being added with the message link assuming FIFO enqueueing. If LIFO or priority enqueueing were indicated, the resulting queue would indicate the appropriate order.

When the message link is added to the queue Q/ML/FLS, there is a test performed on the FLS semaphore corresponding to the SD segment shown generally as 802n. This test determines if a process is waiting in the queue Q/PR/FLS, i.e. whether a process has been waiting on a free message link. Since a message link has been freed by the current process being run, if another process has been waiting for a free message link, the message that this other process contained may now be copied into the freed message link. However, in this example, it is shown that free message links have been available, i.e. 1712, 1714 and 1716 are free message links and hence there would be no process waiting for a free message link. Therefore, this step would not be executed.

If the SCT count were less than zero when the P instruction was executed on a semaphore with a message, this would indicate that a Q/PR/S was already established. As a consequence, the process executing the P operation would become another one of the processes waiting on the semaphore and hence would tie itself to the queue. Thus, in this instance and looking at FIG. 18 and semaphore 1800 with a message, the process would obtain a free process link from the GO segment 802 and would tie itself to the process links 1802 tied to the semaphore 1800 and lengthen the queue of Q/PR/S built from semaphore 1800.

If the SCT count were zero as shown by semaphore 1704 in FIG. 17, then a queue of processes Q/PR/S would be built from the semaphore since the P operation would decrement the SCT count to minus one ($-1$) and change the PQHP of semaphore 1704 to point to it. It should be noted that there are variations on this procedure depending upon whether or not process links are available; however, for purposes of this invention they need not be explained.

For the situation where the process is performing a V operation on a message semaphore, the process expects to continue in the running state, but it must rid itself of the message which it contains. This message carries the process name of the process that sent it among other fields. Thus many processes can send information through a single semaphore, stamped with the sender's name provided they send messages and not just signals. These messages are distinct from one another and the memory space 1508 of the SD segment may be used to store them.

More specifically, in executing the V instruction, if the SCT field is less than zero, which is the situation for semaphore 1800 of FIG. 18, some process 1802b is waiting for the message about to be delivered. As a consequence, the message of the process executing the V instruction would be written into the PCB pointed to by the process link 1802b tied to the semaphore 1800 upon which the V instruction was performed. The process receiving the message would then pass into the ready queue Q/PR/RDY 803 and the current process which executed the V operation would continue running if it had a higher priority than the process at the head of the ready queue. The count of the semaphore 1800 would be incremented by one to a minus three ($-3$) and the PQHP would be changed to point to process link 1802a.

If the SCT count were greater than or equal to zero which is the situation for semaphores with messages 1704 and 1706 in FIG. 17, there is indicated that no processes are waiting on messages. Stated differently, there are messages waiting for processes to associate with. Therefore, the message provided by the current running process if delivered to the semaphore 1704 would build a Q/M/S, or if delivered to semaphore 1706 would add to the Q/M/S already developed. In either situation, the first test of the firmware would be whether or not a free message link is available from the Q/ML/FLS. Since in this instance, there are three free message links, i.e. 1712, 1714 and 1716 which are available, the process can deliver its messages via the operation. As a result, it would take the first free message link, i.e. 1712 and deliver its message into that free message link. This link would then be tied to the queue Q/M/S of the semaphore addressed and the process executing the V operation and delivering the message would continue running. The addressed semaphore would then have its SCT field count incremented by one.

If however, there were no free message links available, as is shown in FIG. 18 showing Q/PR/FLS, 1804, the process executing the V instruction cannot deliver the message. Therefore, this process must go into the waiting state until a free message link is available. In this situation a process link would be obtained from the GO segment 802 and would be tied to the free link semaphore 1506 at 1804b. By being tied to FLS, there is indicated that there were no free message links available when the process attempted to deliver its message. When a free message link subsequently becomes available, the process may deliver its message and be removed from the FLS semaphore. Thus FIGS. 17 and 18 should be contrasted since in FIG. 18 the free link semaphore has processes tied to it since no free message links are available, whereas, in FIG. 17 there are free message links available which are tied to the FLS semaphore. Thus in FIG. 17, the FLQP field points to the first free message link available whereas in FIG. 18 there are no free links available and only the PQHP field is utilized. The PQHP field points to the first process tied to the FLS semaphore.

Both FIGS. 17 and 18 show more than one semaphore of the message type. Since each semaphore may have processes waiting, there may be numerous Q/PR/S's, each of which is represented by queues of process links in the GO segment. This is graphically shown as 1802, 1804 and 1808 in FIG. 18, which have process links in the GO segment tied to the semaphores. In addition, other SD segments (not shown) may have semaphores which are also capable of tieing the process links in the GO segment.

It has been previously stated that a semaphore must have the dual capability of storing the earlier occurrence of either a process waiting for the event in order to continue or, alternatively, the event waiting for the process in order to associate with it. These concepts have been shown by Q/PR/S and Q/M/S, respectively. In viewing the relationship of these queues to the semaphore it is realized that the queue of messages on a semaphore and the queue of processes on a semaphore are diametrically opposed concepts. The data structure, i.e. the semaphore, will hold either one or the other. If a process has executed a P operation and no event or resource is available to complete the request made in the P operation, then the semaphore will build a queue of processes on the semaphore Q/PR/S. Conversely, if an event or resource occurs and there is no process waiting for this event or resource, then the semaphore will build a queue of messages on the semaphore Q/M/S. Each of these is indicated by the SCT field in the semaphore. Thus if the semaphore SCT count is positive, it indicates that there are messages waiting for processes and hence a queue of messages on the semaphore has been built. If the semaphore SCT count is negative, this indicates that there are processes waiting for a message or event and a queue of processes on the semaphore has been built. If the semaphore count is zero, this indicates that there are neither processes nor messages waiting and no queue exists.

The Q/ML/FLS and Q/PR/FLS are usually found singly on the FLS semaphore 1506. If there are message links which are not used by the semaphores in the SD segment, then the free link semaphore will have a queue of free message links. This would be indicated by a zero FLSCT count in the FLS semaphore and a non-zero FLQP. If the free link semaphore has a negative FLSCT count indicating no free message links available, then FLS has built a queue of processes Q/PR/FLS and its PQHP will have a non-zero count.

In view of the limited message links and free message links in a semaphore descriptor segment, there must be some apparatus which prevents one message semaphore from using up all the free links. This is accomplished by each message and non message semaphores containing a maximum count field as shown in FIGS. 16a and 16b. This field i.e. bits 4–15 restricts the length of the queue. Thus if signals or messages tied to the semaphore as shown by the value of the SCT field exceeds the SMC value, an exception condition occurs. This feature is provided not only to aid in memory space management but also to insure that one semaphore does not use all or a significant number of free message links available in the system.

2. GENERAL DESCRIPTION OF P AND V INSTRUCTIONS

It has been previously shown how processes are represented in the hardware (PCB), the states that they may be in, and the dispatcher unit which is used to control the status and movement of the processes. In addition, the process synchronization function including the data structure of a semaphore has been presented and explained.

Integral with the dispatching unit and semaphores for controlling process synchronization are operations on the semaphore. Two basic operations on the semaphore are required if processes are to use the semaphore as a signaling mechanism. One operation, the V op or V instruction, sends a signal to the semaphore. The other operation, the P op or P instruction, picks up a signal from the semaphore.

The V instruction may be viewed as a sending operation used by the executing process that has some data and wants to send it to another process or to any of a group of processes. The V instruction allows the process to send the data, (i.e. a signal or message) to an inbetween point, the semaphore. The semaphore stores the data until another process is ready to pick it up. In the meantime, the process executing the V instruction is free to proceed since the data has been delivered.

The P instruction may be viewed as a receiving operation that is used by the process that needs data either from a particular process or from one of many processes. The P instruction allows the process to receive the data (i.e. a signal or message) from the semaphore. If the data is present, the process executing the P instruction continues. However, if the data is not stored by the semaphore, the process executing the P instruction goes into the wait state. The semaphore holds the process in this case instead of the data. The process is held in the wait state by the semaphore until another process removes the reason for the process entering the wait state, i.e. the sending of data for the process via the same semaphore. This action is accomplished by a V instruction.

Thus a process that requires data (i.e. a signal or message) from another process before it can proceed attempts to obtain the signal by executing a P instruction on a previously agreed upon semaphore. Conversely, a process that delivers data (i.e. a signal or message) to another process before it can proceed attempts to transmit the data by executing a V instruction on the semaphore. Moreover, if the process receiving the data is in the wait state, its reason for being in the wait state is obviated. As a result, the V instruction also allows the process which requested the message to be transferred to the ready state. Thus the data delivered by the V instruction is stored in the PCB of the process requesting the data and is subsequently examined when the process is transferred to the running state by the dispatcher mechanism.

Since there are two different types of semaphores, i.e. semaphores with messages and semaphores without messages, there are two types of P and V instructions. Each type of P and V instructions may be executed by a semaphore of the same type. Thus, each instruction must be directed to a semaphore with the proper tag bits, that is, P and V instructions with messages may be directed only to semaphores with tag bits that type them as message semaphores and P and V instructions directed to semaphores without messages may be directed only to non-message semaphores. In addition to the above, both message and non-message P instructions may be executed as P test instructions as well. A test instruction allows the running process to continue even though the action intended by the instruction was not achieved. Thus there are four P instructions. V instructions with messages may call for LIFO or FIFO queueing and may be executed as V test instructions as well, giving four kinds of V instructions with messages, plus a V instruction without message for a total of five V instructions.

The following memonics are shown in the flow diagrams and are used in describing each of these instructions:

SEP: A P instruction on a non-message semaphore. The instruction either picks up a signal from the semaphore, or causes the executing process to enter the wait state and be queued on Q/PR/S.

SEPM: A P instruction on a message semaphore. The instruction either picks up a message from the head of Q/M/S off the semaphore or causes the executing process to enter the wait state and be queued in Q/PR/S. If a message is retrieved from Q/M/S, the message link is returned to Q/ML/FLS and a check of the count field in the FLS semaphore is made. If a process is found in Q/PR/FLS waiting for a free message link, that process is then placed back into the ready state and allowed to execute its V instruction on the FLS semaphore.

SEPT: A P test on a non-message semaphore. This is the same instruction as SEP except that failure to obtain a signal from the semaphore does not cause the executing process to enter the wait state.

SEPTM: A P test on a message semaphore. Same as SEPM except that failure to obtain a message from the semaphore does not cause the executing process to enter the wait state.

SEV: A V instruction on a non-message semaphore. The instruction delivers a signal which is stored on the semaphore. If the semaphore has a queue of processes waiting for the signal, Q/PR/S, the first process in the queue receives the signal and moves from the ready state to the wait state.

SEVF: V instructions on a message semaphore.

SEVL: Each instruction delivers a message to the semaphore. If the semaphore has a queue of waiting processes, Q/PR/S, the first process in the queue receives the message and moves from the wait state to the ready state. If there is no Q/PR/S, the message is placed in Q/M/S in either FIFO (SEVF) or LIFO (SEVL) order. If there is no Q/PR/S and a message link cannot be found in which to queue the message, the executing process enters the wait state and is queued in Q/PR/FLS. The instruction counter of the process executing the V instruction remains at its current count such that the V instruction will be retried when the process is again in the running state.

SEVTF: V test instruction on message semaphores.

SEVTL: These instructions are the same as SEVF and SEVL except that failure to find a free message link in the free link semaphore queue does not cause the process executing the V instruction to enter the wait state.

Each of the above instructions upon execution enables the control store unit 130 to execute a predetermined set of functions. The representations of the various functions are shown in the flow charts in FIGS. 20 to 26. The execution of these functions is similar to that described with respect to the dispatcher unit (FIG. 14) and utilizes the same operating components exhibited in FIG. 13. In order to render clear the general transfer of information, only the major blocks for operation units will be described. Moreover, in order to avoid repetition and in the interest of clarity, the intermediate functions of the control store unit in conjunction with the P and V instructions and the central processing unit are omitted; however, it is understood that such intermediate functions as described with respect to FIG. 14 are typically present.

In addition, FIG. 19 represents a more detailed diagram of a portion of the ALU unit 1315 shown in the CPU 104 in FIG. 13. Thus, FIG. 19a illustrates the 256 words which are stored in a scratch pad memory located within LSU 1315 and FIG. 19b depicts some of the working locations shown in FIG. 19a which specifically apply to the functioning of the P and V instructions to be discussed. Each of these detailed illustrations will become readily apparent when considered in conjunction with FIGS. 20 to 26 which incorporate an explanation of their role in the overall functioning of the CPU system.

3. Development of Semaphore for both P and V Instructions

Figure 20A:
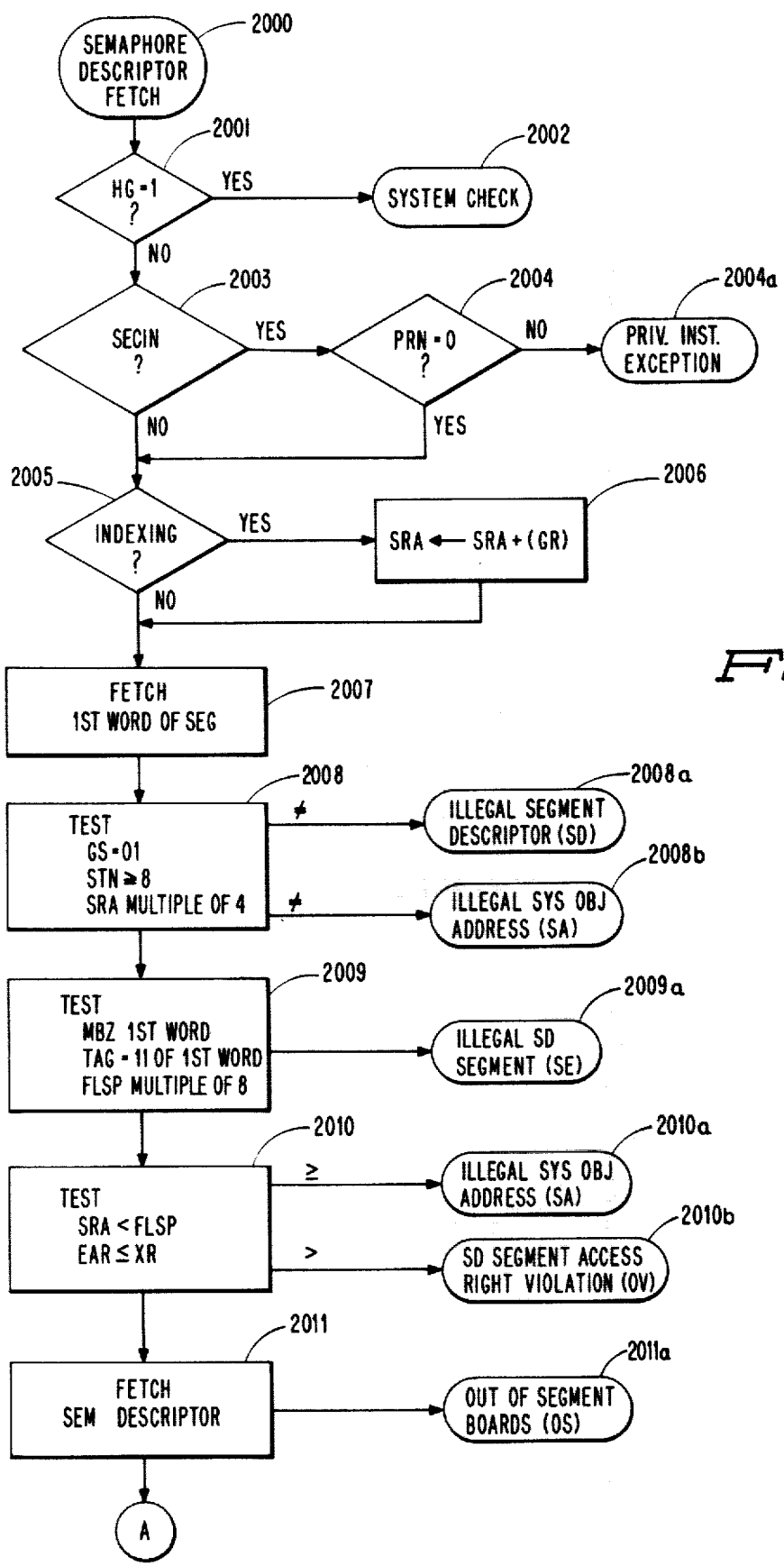
FIGS. 20A–B are flow diagrams of the semaphore descriptor fetch subroutine used for all P and V instructions.

Referring more particularly to the drawings, FIG. 20 illustrates the semaphore descriptor fetch operation functions which are executed by each of the P and V instructions, and FIGS. 21 to 26 illustrate the various P and V instructions and the functions which they perform upon execution.

More specifically, FIG. 20, block 2000, shows the institution of the semaphore descriptor fetch routine enabled by each of the P and V instructions previously recited. Each instruction includes an operation (op) code in bits 0 to 7, a complementary code in bits 8 to 11 and a 20 bit address syllable in bits 12 to 31. The op code indicates to the system the type of instructions, e.g. P or V and the variations thereof. The complementary code indicates specific information about the instruction; for example, whether LIFO or FIFO enqueueing, whether a test instruction, etc. The address syllable indentifies the semaphore descriptor. The resolution of the address syllable requires searching through the structure of the addressing tables involving the JP numbers of the running process to select the PCB (see FIGS. 4 and 17), then the STN, STE values to find the segment table and possibly indexing or indirect addressing to find the final segment relative address SRA within the segment. Finally, an absolute address calculation is provided that provides the semaphore's location in memory. Thus the address syllable of a P or V instruction develops into the address of the semaphore descriptor.

In addition to fetching and testing the semaphore descriptor, the subroutine 2000 also fetches the semaphore being addressed, and enables a branch to either the P or V instruction which is to be executed on the semaphore. Thus prior to the execution of the SF subroutine 2000, the op code and complementary code have been analyzed such that it is known that a semaphore descriptor is to be fetched. In step 2001 the question is asked whether the hardware gate is unlocked. The hardware gate is part of the hardware control mask 1313 and when locked defines a system critical state. The operating system must be in a critical state when firmware manipulation of processes and queues is occurring since any interrupt risks causing a non-recoverable loss of information within the system. Thus when the hardware gate has a 1 value indicating that movement of processes and queues is in progress no further instructions, including P and V instructions, may be executed which would interfere with the execution of these manipulations. If the answer to question 2001 is yes, the hardware gate is locked, step 2002 is executed. This is a system check which essentially detects another operation, e.g. any exception condition (which would normally cause the current operation to be interrupted and the essential exception mechanism to be entered) and initiates a system check (i.e. a model dependent diagnostic sequence) thereby preventing the system from continuing to operate in all ill defined states. In addition, any attempt to perform a synchronization or process control instruction which might cause the current process to be swapped initiates a system check in step 2002. Both the checking of the hardware gate in step 2001 and the system check in step 2002 are performed by the hardware located within instruction fetch unit 1318.

Steps 2003 and 2004 are hardware tests also performed by instruction fetch unit 1318. In step 2003 the question whether or not a SECIN instruction (see patent application Ser. No. 528,812, first filed on Nov. 30, 1973 in France having French Ser. No. 73 42696 and further filed in the U.S. within the priority convention date of Dec. 2, 1974 and entitled "Semaphore Initialization Instruction for Process Synchronization") is being executed is asked. This SECIN instruction must have a process ring number equal to zero in order to execute. As a result, if the answer is yes, step 2004 tests the process ring number of the instruction. If the ring number is not zero, a privilege instruction exception 2004a occurs. For the P and V operations, however, the answer to question 2003 will be no and as a result, step 2005 asking whether indexing of the address syllable of the P or V instruction is required is executed.

At this point, the normal development of the instruction's address syllable has been occurring. Thus the segment relative address SRA and a segment number SEG, described supra, have been determined. The question asked in step 2005 is whether one bit in the address syllable indicates indexing. If the answer is yes, step 2006 adds the contents of a general register indicated by the address syllable to the SRA before the actual memory fetch occurs. This provides the memory location of the first word of the SD segment 1500 shown in FIG. 15. In step 2007, the transferral of the word 1500 from main memory to the scratch pad memory location WC0 in FIG. 19b is performed. This first word contains the tag and ring fields for the P and V instructions and determines whether or not they may be executed. It should be noted that a fetch operation from main memory 102 via the data management unit DMU 1321 to the arithmetic and logic unit (ALU) 1317. Conversely, a main memory write operation is from ALU 1317 to DMU 1321 to main memory 102.

In step 2008, a few preliminary checks by the ALU 1317 are made to verify the fact that a valid semaphore segment has been accessed. More specifically, in step 2008 the GS bit in the segment descriptor itself must be equal to 01. The G stands for the gated segment and S stands for the semaphore segment so the semaphore segment bit has to be set in order to access the semaphore segment. Also, a check is made to see if the STN is greater than or equal to 8 since the semaphore segments are the small segments which have this restriction. (See patent application for Segment Address Development, cited supra, for explanation of this feature). A third check in step 2008 is whether the SRA is a multiple of 4 since the SRA points to a word aligned descriptor which is 4 bytes. If the GS bit is not set to 01 and the STN is greater than or equal to 8, an illegal segment descriptor exception subroutine 2008a is enabled. If the SRA is not a multiple of 4, an illegal system object address subroutine is enabled as shown in step 2008b. Unless otherwise indicated as was shown for steps 2001 to 2004, all testing is done by ALU 1317.

In step 2009, the first word of the semaphore segment (SD) i.e. word 1500 in FIG. 15, is tested. This word has been identified by the segment descriptor just tested. More specifically, bits 0 and 1 of the tag field are tested to be encoded 11, bits 8 to 15 of the MBZ field are tested to be all zeros and bits 16 to 31 of the FLSP field are tested to be a multiple of 8 (i.e. the last three bits are zero). If this data structure status is not met, then an illegal SD segment in step 2009 is indicated; otherwise, the data structure is proper and the next step 2010 is executed.

Having located the SD segment and determined that the first word is proper, the semaphore descriptor's location and contents in main memory are next examined. Thus, in step 2010, the SRA developed in step 2006 is tested to make sure that it is less than the FLSP, i.e. bits 16 to 31 of word 1500. This requirement is made necessary by the structure of the SD segment shown in FIG. 15. As was stated then, the semaphore descriptors which are addressed by the relative displacement of the SRA are formed in block 1502. The FLSP points to block 1504 which is sequentially at a higher address in main memory than the semaphore descriptors in block 1502. Thus the SRA which is developed from the address syllable of the P or V instruction must reference one of the semaphore descriptors in block 1502 which, by design, must be less than the relative address FLSP which references block 1504. Thus the FLSP serves two purposes; one is to locate the free link semaphore and the other is to set the upper limits for the semaphore descriptors 1502. If these conditions are not met, step 2010a is executed, this step being an exception subroutine indicating that an illegal system object address has been developed. Step 2010 also invokes the ring protection checks which is the subject matter of another patent application cited supra. Thus, the EAR field is checked to be less than or equal to the XR field, XR identifying the first word 1500 and being either VR, PR or IR depending upon whether a V instruction, a P instruction or a SECIN instruction is being executed. If the EAR number, which is the ring number for the segment, is greater than the individual ring protection field an exception condition in step 2010b is executed.

In step 2011 the semaphore descriptor 1502 is fetched from the SD segment 208n of main memory and transferred to the scratch pad memory 1900 location WC1. In step 2012 a series of tests on the semaphore descriptor 1502 are performed. These tests are similar to the tests in step 2008 on the segment descriptor. These tests are made on the tag field, bits 0, 1 which must be equal to 01; the ring field, bits 2, 3, which must be equal to 00; the STN bits 4 to 7 which must be greater than or equal to 8; and, the SRA field, bits 16 to 31 which must be a multiple of 8. The SRA field of the semaphore descriptor 1502 points to the actual semaphore being addressed. Since the semaphore is a double word quantity, it is required to be on a double word boundary and hence be a multiple of 8 for addressing purposes. If any of these tests are unsuccessful, an exception subroutine 2012a is executed indicating that an illegal segment descriptor format has been determined. Since the exception subroutines are associated with a non successful test which the system must rectify, these situations will not be further discussed.

Having now determined a proper segment descriptor, the next actions are to obtain the actual semaphore itself. In step 2013 the question is asked whether or not the semaphore segment number is in associative memory 1319a of address control unit 1319. The reason this question is asked is that the semaphore word will be fetched from main memory; however, if it is within the associative memory 1319a, main memory need not be accessed. Thus if the answer to question 2013 is no, step 2014 enables a subroutine SDF which loads the segment descriptor in the associator. The actual mechanics of this transfer is the subject of another patent application to Brown et al on Address Development Technique Utilizing A Content Addressable Memory, filed Aug. 24, 1972, patent Ser. No. 283617 now matured into U.S. Pat. No. 3,860,286, which application is incorporated by reference herein.

In step 2015, a test again is made whether the GS bit of the new segment is equal to 01. In the usual situation, the semaphore descriptor references a semaphore within its own SD segment. However, this condition may not exist and the semaphore descriptor may have referenced a new SD segment and hence a test for whether the GS bits are equal to 01 is made.

In step 2016, the write permit WP bit described supra, is tested to determine whether it is equal to 1 indicating that it is permissible to write into memory. In step 2017, the written bit (W bit) in the segment descriptor is tested to determine whether it is equal to 1. If the answer to this question is yes, step 2020 is executed; if the answer is no, step 2018 calling a subroutine WUP which writes and updates the W bit is executed. This is done since a write operation on memory is performed and therefore the W bit must be updated if it has not yet been done. All these operations are performed on the semaphore descriptor 1502 previously described.

It has been previously explained that there are two possible methods for addressing semaphores, one method being via P and V instructions. The other method of addressing semaphores is shown in step 2019 and if utilized, enters the development process, i.e. the flow chart, at this point. The other method is an IO device addressing the semaphore which provide an absolute GD address. In either case, no matter which method of addressing the semaphore is used, step 2020 fetches both words of the semaphore. These words would be fetched from the associator 1319a and transferred to the scratch pad memory locations WC4, WC5. From these locations, various tests on the semaphore by the ALU 1317 are made.

However, before these tests are made, step 2021 tests the operation code and complementary code of the instruction to determine whether or not it is a SECIN (semaphore count initialization) instruction. If it is, a branch to a subroutine enabling the SECIN instruction, the subject matter of another patent application cited supra, is executed. If it is not, i.e. it is a P or V operation, step 2023 tests the stag field of the semaphore. This stag field is shown in FIG. 16 which illustrates the various semaphores operated upon by the P and V instructions.

In step 2024, the SCT field in location WC4 of the semaphore is incremented by one and stored in location WC7. This is an anticipatory step arising from the fact that performance on a V operation is more critical for operation of the system. By performing the incrementing step in 2024, the timing involved for a V operation is assisted. If the anticipatory step is wrong, the subroutines dealing with the P instructions will correct this situation. In step 2025, the SMC field is positioned in the ALU 1317, anticipating that a V operation will be executed and that the SCT will thus have to be checked against SMC. In addition, a flop in arithmetic and logic unit 1317a called PM0 is set. This flop indicates that neither a P operation or the SCT is equal to zero. If this condition does not exist, it will be changed later.

At this point, the functions to set up a P or V instruction have been accomplished. In step 2026 the instruction in the IFU unit 1318 is tested to determine whether its operation code and complementary code indicates a V operation. If the answer to this is yes, a branch to the V instruction sequence 2027 is made; if not, a branch to the P instruction sequence 2028 is made.

Thus subroutine 2000 in FIG. 20 has fetched and checked the segment descriptor, the first word 1500 of the semaphore descriptor segment 802n, the semaphore descriptor 1502 and the actual semaphore 1506 upon which the V or P operation will be executed. Accordingly, all the preliminary work necessary for the proper execution of any of these instructions has been performed and the firmware indicates that the instruction may be properly executed.

4. P Instructions

Figure 20B:
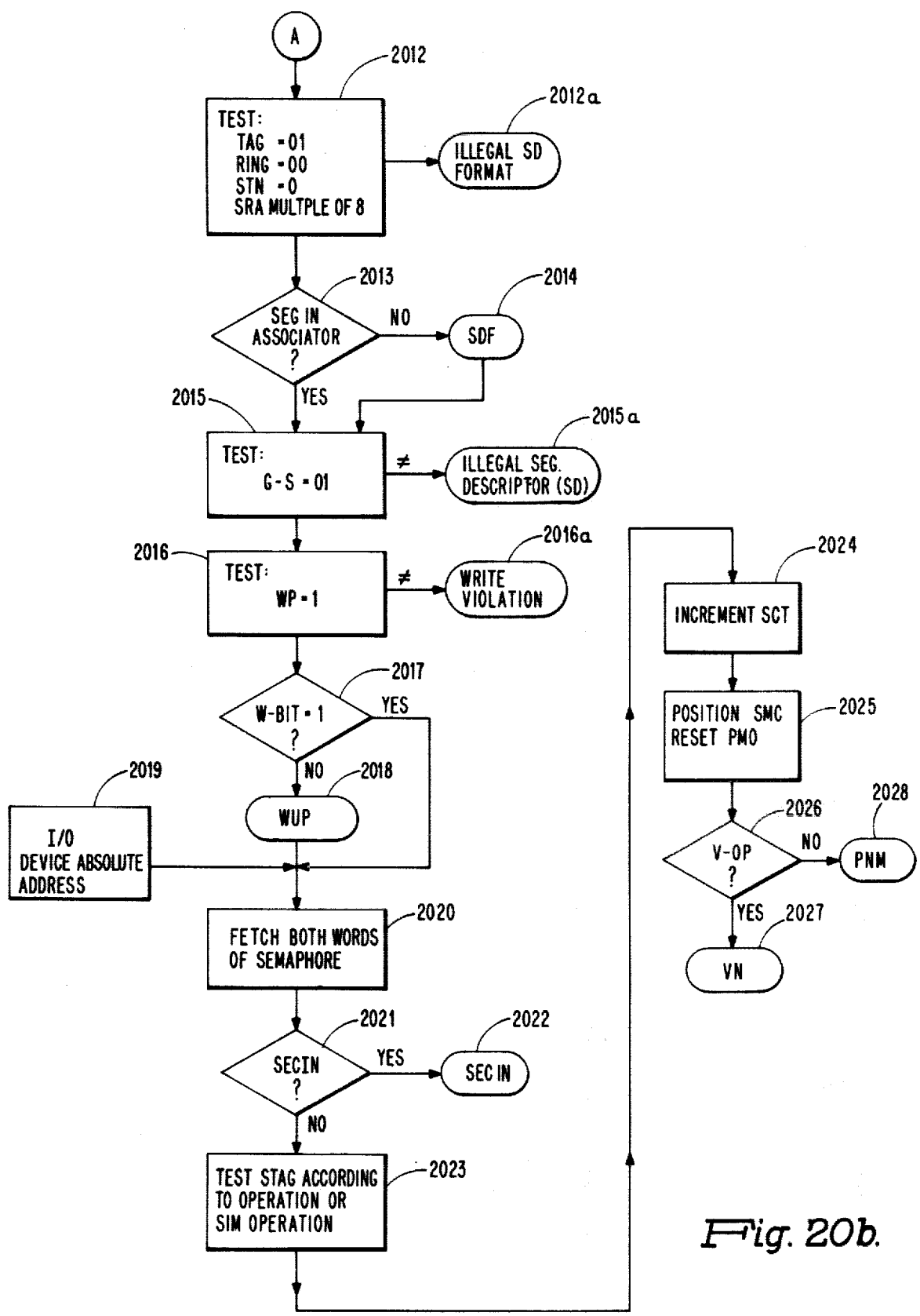
Figure 21:
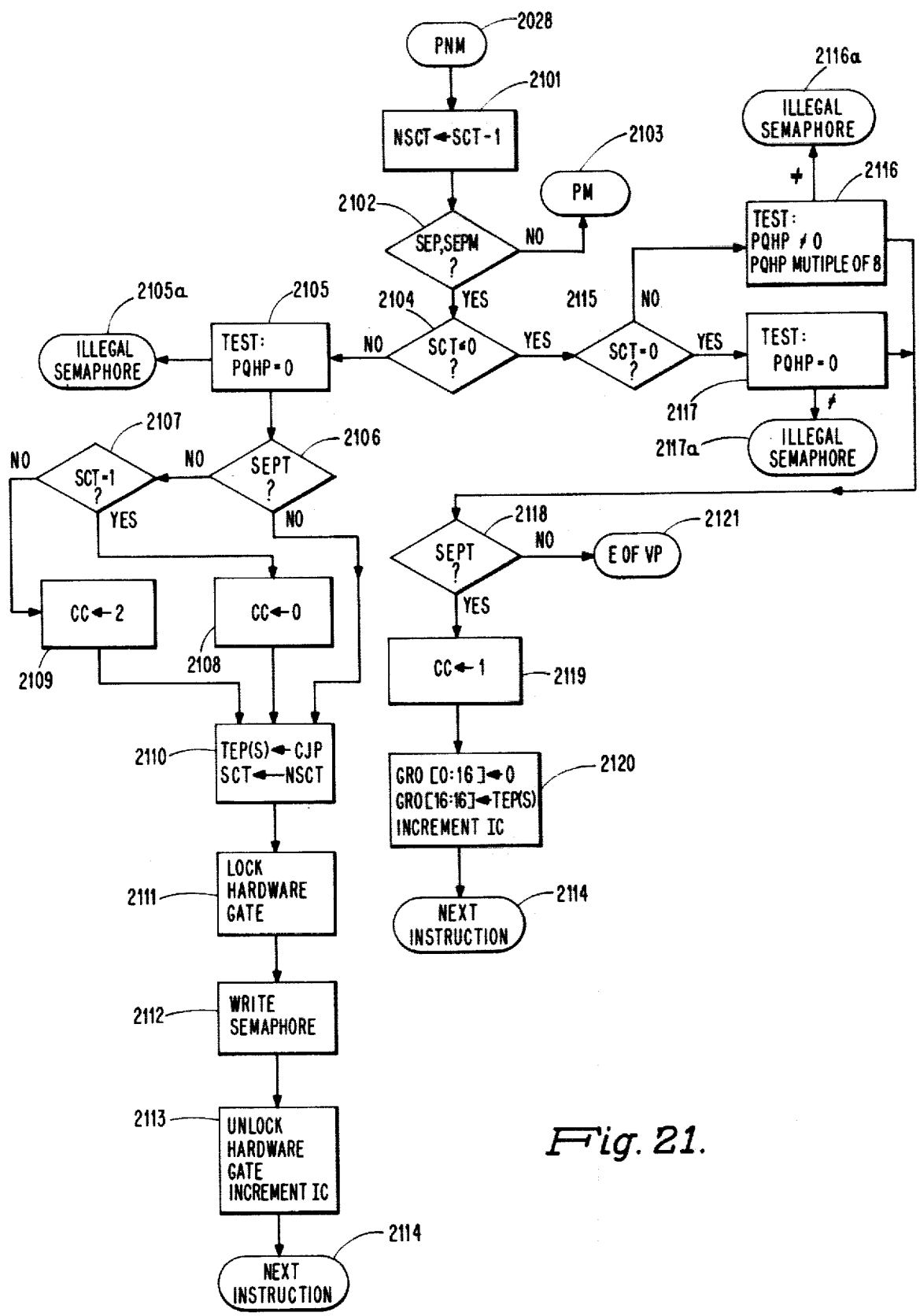
FIG. 21 is a flow diagram of the P instruction on semaphores without messages.

If step 2028 of FIG. 20 has been executed, the next set of functions would be those shown in FIG. 21. More particularly, FIG. 21 shows both the overall functions first executed on P instructions and then the functions performed on P instructions on semaphores without messages.

Because the answer to the question in step 2026 was no, in step 2101 the new semaphore count (NSCT) is set equal to the old semaphore count minus 1. This results since a P operation is requesting data, and the semaphore count should indicate that there is one less data on the semaphore. In addition, this step negates anticipatory step 2024 wherein the SCT was incremented. Thus the old SCT field which is stored in location WC4 and not the incremented SCT which is stored in scratch pad memory at location WC7 is retrieved. This SCT is then decremented giving the new semaphore count NSCT which is written into scratch pad memory location WC7.

A. P Instructions on Non Message Semaphores

In step 2102, the question is asked whether this is a P operation on a non message semaphore. This results since all P instructions are first analyzed by subroutine 2028. In step 2102, the operation code and complementary code of each of these instructions is again tested in IFU 1318 to determine whether a branch to FIG. 22 and PM subroutine 2103 should be made. This branch is made if this is an instruction on a semaphore with messages; if the test indicates an instruction on non message semaphore, then the remaining part of the PNM subroutine is completed.

Assuming that the answer is no to the question in 2102, the data requested by this P instruction is a signal which may indicate, for example, that a resource such as a tape device or magnetic disk is available. Step 2104 checks the SCT field of the semaphore without message and asks the question whether or not the SCT field has a value less than or equal to zero. If the answer is no, i.e. if the semaphore count is greater than zero, indicating that a resource is available for the process executing the P instruction, then steps 2105 to 2114 describe the successful execution of a P instruction on a semaphore without messages. More particularly, step 2105 tests the PQHP field of the semaphore without message, i.e. bits 32 to 47 of semaphore 1600, to determine that it is equal to zero. This status must exist since there are no processes tied to this semaphore. If this condition does not exist, an illegal semaphore exception 2105a condition results and the control store unit 130 handles this exception condition.

Step 2106 asks the question whether this is a test P instruction. As explained earlier, a test instruction always enables the executing process to remain in the running state. Since under the conditions now existing, a non test instruction may be successfully executed because the resource desired is available from the semaphore, the test instruction sets a condition code and then functions as a non-test instruction to receive the resource. This is shown by step 2107 where the SCT field is tested for a value of 1. If this condition exists, then step 2108 enables a condition code of zero to be transferred to status register 1311. If the SCT field is not equal to 1, this means that the SCT field must be greater than 1 since in step 2104 it was determined that the SCT field was greater than zero. In this situation, step 2109 is executed wherein a condition code in status register 1311 is set to 2 indicating that more than one signal is available.

In either situation, i.e. whether or not this is a test P instruction on a non message semaphore or merely a P instruction on a semaphore without a message, step 2110 is executed. Since the SCT count of the P instruction is positive, it is known that the P instruction may be successfully executed on the semaphore because of the previous steps. Thus this step prepares the scratch pad registers WC4, WC5 with the information that will eventually be written into main memory. In step 2110, the TEP field, i.e. bits 48-63 in scratch pad memory location WC5 have the JP name of the process executing the P instruction written therein. This indicates that with respect to the resource associated with this semaphore, the process currently using the resource is the one with its JP name in the TEP field. Concurrently, the NSCT field developed in step 2101 is now written from location WC7 into the scratch pad memory location WC4 as SCT. Thus the updating of two fields which indicate a successful P operation has been accomplished.

In step 2111, the hardware gate is locked indicating that a system critical operation involving an indivisible action is occurring. In step 2112, the updated fields of the semaphore indicating a successful P instruction and written in scratch pad memory locations WC4, WC5 are transferred to the SD segment in main memory 102 via DMU 1321. These fields replace the previous fields of the semaphore. In step 2113, the hardware gate is unlocked indicating that the critical state is over and the instruction counter 1312 is incremented. Thus the next instruction of the executing process (CJP) is executed.

If the SCT field of the semophore without a message was less than or equal to zero in answer to step 2104, a branch to step 2115 would occur. To this status, the semaphore being addressed by the P instruction of the executing process does not have any resources which it is holding. As a result, the P instruction requesting the resource will not be successful. Depending on the P instruction, the executing process is either placed into the wait state, i.e. it must wait until the semaphore receives the resource, or it may continue if it is a test P instruction.

In step 2115 the question is asked whether the SCT field is equal to zero. If it is, this means there are no messages or processes tied to the semaphore without a message and hence step 2117 tests to make sure that the process queue head pointer is equal to zero. If the SCT count is unequal to zero, this means that it is less than zero indicating that there are processes tied to the semaphore without messages. In this case, step 2116 is executed testing whether the PQHP is both unequal to zero and a multiple of 8. The PQHP is unequal to zero since it identifies the first process link tied to this semaphore. Because the process links associated with the process are 8 bytes in size, the PQHP is a multiple of eight so as to point to the first byte of the process link holding the information about the process waiting on the semaphore.

If both these tests are successful, it is known that the semaphore is appropriate. Step 2118 asks the question whether this is a test P instruction being executed. If it is, a condition code of 1 is set as shown in step 2119. This condition code indicates that had the P instruction been executed, the executing process would have gone into the wait state. Thus status register 1311 receives the condition code of 1. In addition, step 2120 is executed to determine the JP name of the last process to have performed a successful P operation on that semaphore without a message. It should be noted that since there was no successful P operation, the executing process does not place its JP name in the TEP field of the semaphore 1600. However, the name of the last successful executing process to have performed a P operation on this semaphore is stored since this process is holding the resource requested by the current executing process. The J, P name in the TEP field of the semaphore is then written into the general register 0 (GR0) of the current executing process. This is shown in step 2120 by the JP name being written into the last 16 bits of the GR0 of the executing process. The first 16 bits have all zeros placed therein. If the process executing the P test instruction has a higher priority than the process which has the resource and its JP name in the TEP field, then the current process may decide to suspend the process using the resource. In any case, however, the instruction counter 1312 is incremented and the next instruction of the running process which has performed the P test instruction is executed as shown in step 2114.

If this had not been a test instruction, i.e. in step 2118 the op code indicated that this was a P instruction on a non message semaphore, then a subroutine E of VP 2121 is executed which places the current executing process into the wait state. Thus the current executing process is no longer in the running state and a process link having its J, P name is tied to the semaphore addressed by the P instruction.

Before considering step 2121 which puts the current process into the waiting state, the branch subroutine PM 2103 from the question in 2102 is considered since this invokes the subroutine for the P operation on a semaphore with a message. This subroutine also has a branch to E of VP 2121 when the executing process of a P instruction on a message semaphore is to be put into the wait state. At this time, the explanation of the E of VP subroutine 2121 will be made.

B. P Instruction on a Semaphore with Message

Figure 22A:
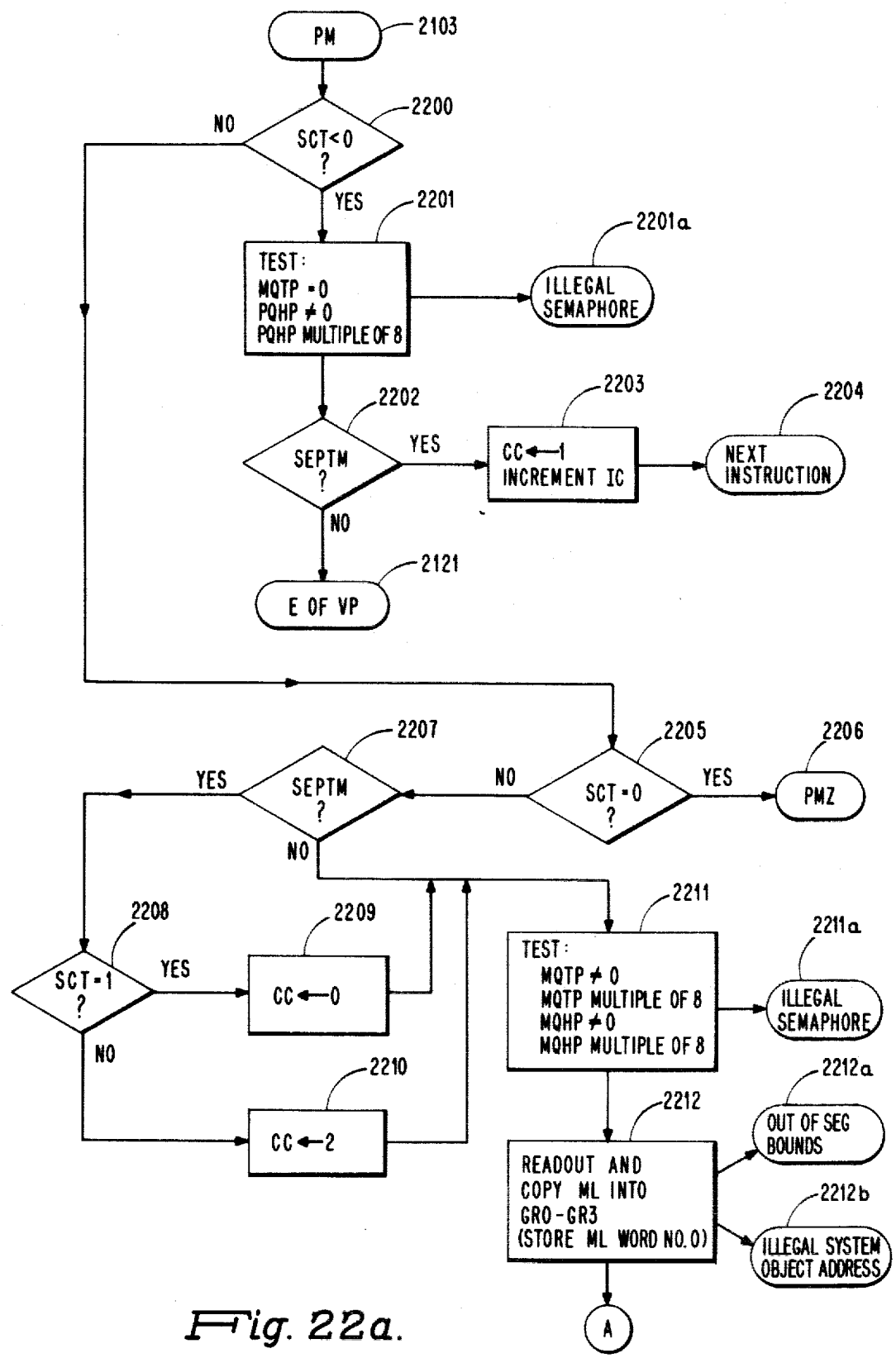

If in step 2102 the operation code indicated that the P instruction was on a semaphore with a message, a branch to FIG. 22a and step 2200 is made. In FIG. 20, the semaphore has already been fetched and resides in locations WC4, WC5 of scratch pad memory. In step 2200 the question is asked whether the SCT field, i.e. bits 16–31, is less than zero, i.e. are processes tied to the semaphore with a message shown in FIG. 16 as 1602. If the SCT field is tested by the arithmetic and logic unit 1317 to be less than zero, step 2201 tests the PQHP and MQTP fields in the semaphore with a message to determine that they are correct. More specifically, message queue tail pointer MQTP, i.e. bits 48 to 63, must be equal to zero since processes and not messages are tied to this semaphore with a message. Bits 32–47 are the process queue head pointer indentifying the first process tied to this semaphore and these 16 bits are tested both for being unequal to zero and being a multiple of 8. The former test is made to determine that a process link which is two words is tied to the semaphore and the latter test indicates the pointing to the first byte of the two words of the process link. Thus it has been determined by these tests in 2201 that a queue of processes waiting on the semaphore, Q/PR/S, exists and the indication that the SCT field is less than zero is accurate.

In step 2202, the question is asked whether this is a test P instruction on a semaphore with a message. Since a test instruction cannot put the executing process in the wait state, the same situation as occurred with step 2118 in FIG. 21 results. Thus the status register 1311 is set to a condition code of 1 indicating that the P instruction on a semaphore with a message is not executed and the instruction counter step 2204, of the executing process is incremented by 1 enabling the next instruction for the current process to be executed.

If the P instruction on a semaphore with a message is not a test instruction, the executing process initiating the P instruction would require a message. Since none is available, the current executing process is required to wait for the message and hence subroutine E of VP 2121 places the executing process into the wait state. This was also shown in FIG. 20.

C. Placing of Executing Process into the Wait State

The E of VP subroutine is invoked for those situations wherein the current process cannot continue its execution and must be placed into the wait state. Thus the two situations, described supra, involving semaphores without messages 1600 and semaphores with messages 1602 are treated the same since a Q/PR/S is formed. Later in discussing V instructions, it will be shown that the E of VP subroutine is also invoked when no free message links are available. In this situation, the process cannot deliver its message and hence it is placed on a queue in the FLS semaphore 901 waiting for a free message link, Q/PR/FLS. All these conditions results in the firmware, shown in FIG. 23, executing the same functions.

More specifically, since the executing process about to be placed in the wait state is currently in the running state, a process link must be obtained from the PLS semaphore 901 as shown in FIGS. 16c and 18. In FIG. 18 the PLS semaphore 901 in the GO segment 802 points to the process link 805a which, in turn, references the remaining process links in a seriatim manner, all process links being in a queue tied to the process link semaphore 901. In a step 2301 of FIG. 23a, the APLS subroutine accesses the process link 805a tied to the PLS semaphore 901. The APLS subroutine is shown in FIG. 23c.

Figure 23A:
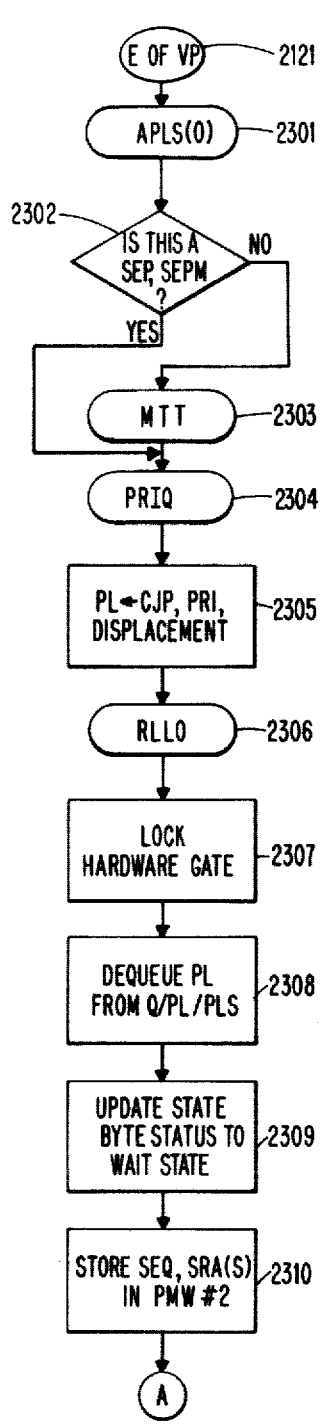
FIGS. 23A–H are flow diagrams of the EVP subroutines called by both the P and V instructions for transferring the process in the running state into the wait state.
Figure 23B:
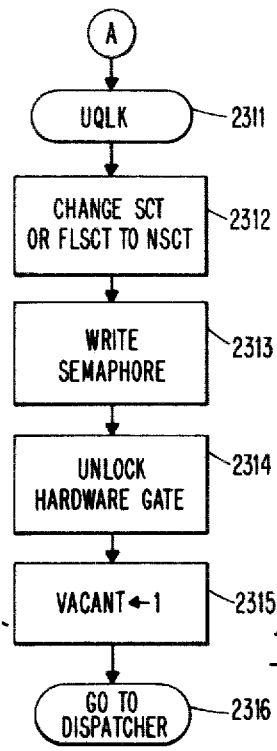
Figure 23C:
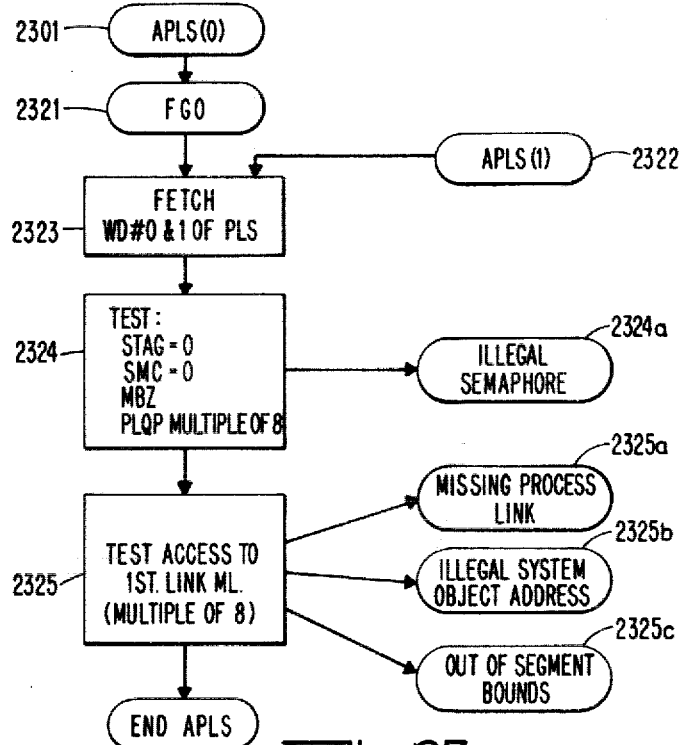
Figure 23D:
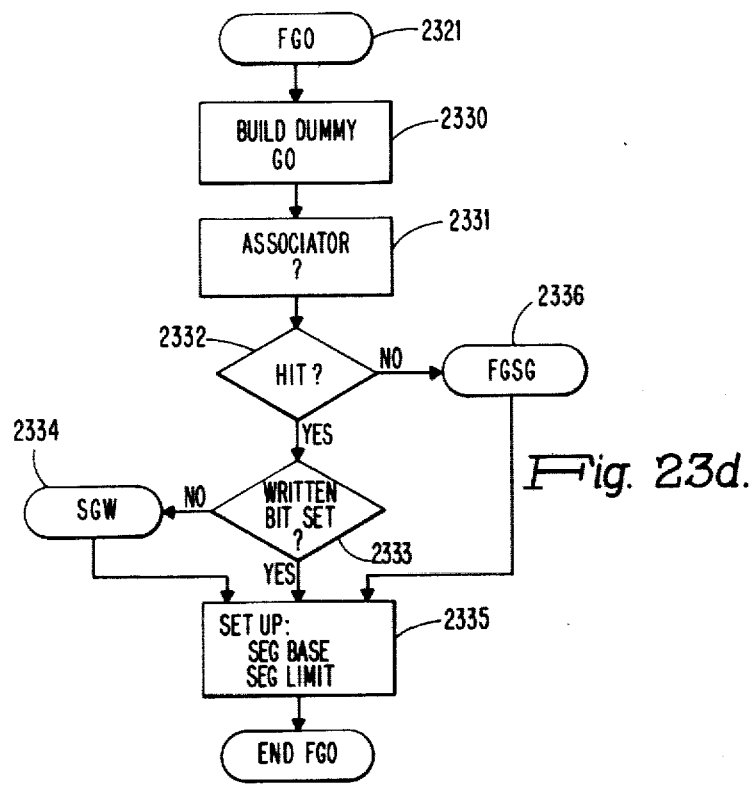

Referring to FIG. 23c, the first step of the APLS subroutine is to access a FG0 subroutine 2321. The FG0 subroutine, shown in FIG. 23d, develops the address of the PLS semaphore 901 which is a constant since the PLS semaphore is always the first word in the GO segment. The first step of the FG0 subroutine 2330 indicates that the firmware creates the address, i.e. segment number, which locates the PLS semaphore in the GO segment descriptor. This is accomplished by selecting a register in a scratch pad memory location WC9 and creating a 12 bit number as follows. The first four bits are set equal to 0111 which indicates that it is a G number and the last 8 bits are set to zero indicating that it is the zero segment of the G number. This segment number thus describes the location of the PLS semaphore in the GO segment. This segment number is then in step 2331 transferred to the associative memory 1319a to determine whether or not the associative memory contains the segment number's segment descriptor and thus the segments's base address. As was explained earlier, the associator is a fast access memory and relieves the system of having to go to main memory to fetch the information. (See patent application to R. Brown et al, cited supra). In step 2332 the question is asked whether a hit has been made, i.e. whether or not the associative memory 1319*a* contains the segment number built in step 2330. If the associative memory contains this address, step 233 asks the question is the written bit in the segment descriptor set? This test is made since, in the present situation, the current process is going to be queued on the semaphore and accordingly requires writing of particular information, e.g. next link pointers etc. The written bit has been described supra. If the written bit has not already been set, a branch to the SGW subroutine in step 2334 is executed thereby writing the W bit in both the associative memory 1319*a* and main memory. If however, the written bit has been set, there is no need to write it and hence step 2335 is executed.

If the associator did not contain the segment number created in step 2330, i.e. in step 2332 the no branch was taken, a subroutine FGSG 2336 is executed which places the segment number into the associator so that the next time the segment number created in 2330 is referenced to the associator 1319*a,* a hit condition will occur. This subroutine also sets the U and W bits of the segment number in both the associator and main memory.

In all cases, step 2335 is executed which sets up for future use the segment base and segment limit. This step essentially transfers the segment base address and segment limit of the segment descriptor now located in the associator's memory to the working registers in the address control unit 1319. The segment limit identifies the end address of the segment in memory. The out of segment exception routine is executed when the address to be derived is greater than the segment limit.

Upon completing step 2335 a return to the APLS subroutine in FIG. 23*c* is made. Step 2323 is next executed. However it is noted that step 2322 indicates a variation of APLS subroutine which does not require the calling of the FG0 subroutine. This situation occurs when the PLS semaphore address has been previously accessed and thus the utilizing of the FG0 subroutine would be redundant. With either APLS subroutine step 2323 transfers the PLS semaphore to the arithmetic logic unit 1317 wherein certain tests are made. In step 2324, a check is made on the two words of the PLS semaphore 901 shown in FIG. 16*c.* Thus the STAG field, bits 0 to 3, are checked to determine whether they are all zeros; the SMC field, bits 4 to 15, are checked to make sure they are all zero; the MBZ field, bits 16 to 31 are checked to be zero; and, the PLQP field, which points to the next process link, is checked both to determine that it is a multiple of 8, since all the process links are two words in length, and also that it is non-zero since the PLQP points to the first byte of the process link.

If these tests are successful, then step 2325 tests the access to the first process link on the process link semaphore by doing a memory fetch of the 8 bytes of the link. If the link is not in valid memory, an exception will occur as a result of this memory fetch. If the test is successful, the absolute address of the link is stored in scratch pad memory location W30. If the PLQP pointer was zero, there is indicated that no process links are presently available. Stated differently, all the process links provided in the system have processes in either the waiting or ready state and there are no further process links available for new processes being entered. If this condition occurs, then a missing process link exception 2325*a* is executed. If this very unusual situation occurs, several existing processes may be suspended in order that their process links might be made available to the system. If, however, all these tests were successful, the APLS subroutine is completed thus bringing us back to FIG. 23*a* and step 2302.

In step 2302 the question is asked is this a P instruction? If the answer is no, i.e. if it is a V instruction, subroutine MTT 2303 is executed which writes the message header as shown in FIG. 15. However, in the present situation, the answer is yes and step 2304 subroutine PRIQ is executed.

The PRIQ subroutine determines the placement of the process link associated with the current executing process which is being placed into the wait state. This placement is on a priority basis into the queue of a semaphore. Priority placement is required for all processes being enqueued or for messages on a semaphore which has a STAG field indicating enqueueing by priority. The PRIQ subroutine compares the priority of the link, either process or message, to be entered to the priority of the links enqueued on the semaphore and, depending on the type of priority queueing, i.e. FIFO or LIFO, ascertain its placement. Subsequently, the UQLK subroutine utilizes the information developed by the PRIQ subroutine and writes the new link into the queue in addition to changing any information of the other links as required.

for purposes of explanation, the PRIQ subroutine will be described for the situation wherein a P instruction on a semaphore has been unsuccessful, i.e. the results of FIGS. 20 and 21. Moreover, since the PRIQ subroutine 2304 involves a number of variables, a general notation non consonant with the result of the notation of the flow charts is given. For example, the notation PL in FIGS. 23*e* and 23*f* stands for the link to be queued, the link capable of being either a process link or message link. The notation QHP is a queue head displacement which may be the PQHP or MQHP for the semaphore. The notation in subroutine 2304 (I) is used to indicate whether FIFO queueing by priority or LIFO enqueueing by priority is to be used and as a result, a flop in auxiliary memory 1317*a* is set for this purpose. The notation SNL is the next link field of the process link to be entered. As will be seen, the process link or message link which has been obtained is inserted somewhere in the queue. Therefore, SNL identifies the next process or message link immediately following it. The first link indicator indentifies whether or not the new link is to be placed at the head of the queue, i.e. when the subroutine is finished if the first link indicator is still equal to 1, the added process or message link is the head link of the queue. ULK stands for the process or message link which immediately precedes the new link to be added and hence its next link field is required to be updated to identify the location of the new link being added. The next link field of ULK is identified by SREL which is the value of the next link field in the ULK. Thus if it is required to insert the process or message link in the middle of the queue, the link immediately before the newly inserted link is changed and has the SREL value. In addition, the newly inserted process or message link references the subsequent link which was previously identified by the ULK.

In order to make clear the actual transformation enabled by the PRIQ 2304 subroutine, reference is made to FIG. 18 and specifically Q/PR/S5 having 1808a, 1808b, and 1808c process links tied thereto. Into this queue by priority will be added the process link 805a from the PLS semaphore. For purposes of explanation, the process link 805a will be referred to as Z and its next link field is indicated by SNL. The process link 1808a, 1808b and 1808c will hereafter be referred to as process links A, B and C. Thus process link A will have a next link field which will point to B and process link B will have a next link field which points to C, C's next link field being zero. Since the priority of the process link Z is the priority of the executing process to be placed into the wait state, the location of the process link in this queue as well as the changes to be made to other process links A, B, C and/or semaphore S5 are shown.

More specifically, step 2340 indicates that the SNL is set equal to the queue head pointer, i.e. the first process link in the queue. The first link indicator is set to 1; subsequently, if it is determined that it is not the first link that is going to be changed, the first link indicator will be changed to zero. LK which is the current link being examined in this instance would be the next link field of process link A. Thus initially LK is process link A and ULK, the link to be updated would also be process link A.

In step 2341 the next question asked is whether the queue head point is equal to zero. If the answer is yes, this indicates an empty queue and step 2342 is executed. The next link field of Z, i.e. SNL, would be set to zero indicating that there are no further links on the queue and the process queue head pointer of the semaphore would be written to point to the process link being added to the queue. If the link were a message link, the message queue tail pointer would also be set to point to the message link since it is the only link in the queue. This would be the end of the PRIQ subroutine as shown by step 2343. Thus for this example, the link Z, i.e. 805a would form the only link in the queue on the semaphore.

However, in the particular situation stated previously with respect to semaphore S5, there are three process links tied to this semaphore and hence the answer to the question in 2341 would be no. As a result, the first word, i.e. word 0 of the process link A would be fetched. In step 2345, the question is asked whether the priority of the process link Z is less than the priority of the process link A. If the answer to the question in 2345 is yes, i.e. the priority of process link Z is the highest in the queue, this indicates that process link Z would be placed ahead of process link A. Hence the position for the process link is now determined. Subsequently, a subroutine UQLK would take this information which is written in scratch pad memory in locations WDB, WDC, WDD, WDE and update the semaphore.

If, however, the priority of process link Z was less than the priority of process link A, a step 2346 would be executed. In step 2346 the question asked is whether the priority of Z is equal to the priority of A. If this situation occurs, then step 2347 asks the question whether the I parameter set in 2304 is equal to 1. If the I parameter is equal to 1, this indicates a LIFO enqueueing which means last in, first out for the same priority level. As a result, link Z would be placed at the head of the queue and step 2343 would be executed ending the subroutine. If, however, the I parameter is not equal to 1 indicating that FIFO enqueueing, i.e. first in, first out, is to be done, then step 2348 would be executed. It should be noted that if the priority of the process link Z was less than the priority of process link A, step 2348 would automatically be executed as shown by the no path from step 2346.

Thus for both FIFO and for a lower priority enqueueing step 2348 asks the question is the next link equal to zero. This is referring to the next link field of A. If the answer is yes, this indicates that there are no further process links tied to the queue of the semaphore, i.e. there was only process link A tied to the semaphore, As a result, the Z process link would be tied to the A process link and would be the new end link of the queue. If this condition exists, step 2349 writes certain information in the scratch pad memory locations WDB, WDC and WDD which is written by the UQLK subroutine. This information stored by step 2349 is the following. The SNL of Z would be set to zero since there are no further links on the queue. The SREL which is the next link field of A receives a value which points it to process link Z. Thus the SREL would become the PL. In addition, the first link would be changed to zero indicating that the first link of the queue is not changed. Finally, the MQTP of the semaphore if this were a message link would be changed to indicate that the Z message link would be the last message link. However in the particular instance being examined, Z is a process link and not a message link and hence the MQTP would remain at zero. This would be indicated by another flop in associative memory 1317a which would indicate whether or not a process were being placed in the wait or ready state or a message were being added to the queue. The end of the PRIQ would then be indicated as shown by 2343.

If, however, the next link field was not equal to zero, which would be the current situation since there are process links B and C to be examined, step 2350 is executed. In order to keep track of the various links now being referenced, the link A which is LK is now changed to ULK and link B which was the next link is now going to be made LK indicating that process link B is one being examined. In step 2351, the first word of the process link B would be fetched from main memory and transferred to scratch pad memory location W32. The next link field of process link B is then checked to determine if it is a multiple of 8 and if it is within the GO segment as shown by steps 2351a and 2351b respectively. If these conditions are met, step 2353, FIG. 23f is executed. In this step the priority of the process link Z is compared to the priority of process link B. If the priority of process link Z is less than the priority of process link B, then step 2353 indicates that process link Z is placed before process link B and after process link A. As a result, the information is written in scratch pad memory locations WDB to WDE as was shown for step 2349 and the subroutine PRIQ is over, step 2343. Thus the A next link pointer would point to process link Z and next link pointer of process link Z would point to process link B. This is accomplished as follows. SNL, i.e. the next link field of Z, receives the value ULK, i.e. the location of process link A. Thus process link Z now points to process link B. SREL, i.e. the next link field of A, receives the value of PL, i.e. the location of process link Z. In addition, the PQHP, MQHP and MQTP would all be left unchanged.

If the priority of process link Z was greater than or equal to the priority of process link B, a branch to step 2354 is executed. This is the same as step 2346 asking whether the priorities are equal with step 2355 being the same as step 2347. Thus if the priority of Z is equal to the priority of B in answer to question 2354 and if the flop in ALU 1317a indicates that LIFO enqueueing is to be done, then step 2353 is executed and the information is written in scratch pad memory. If, however, the I value is set to zero indicating FIFO enqueueing or if the priority of Z is less than the priority of B, step 2356 is executed. This is a return to the loop at step 2348 to determine whether process link B is the last link of the queue. If it is not, then process link C is fetched in step 2350 and the updating of fields again occurs as previously explained. Thus, when the priority of process link Z is determined with respect to the other links in the queue as shown in 1808a, 1808b and 1808c, the temporary registers receive the relevant information in scratch pad memory locations WDB to WDE which is subsequently written into main memory by the UQLK subroutine.

Thus the PRIQ subroutine determines whether either the process link if a Q/PR/S or Q/PR/FLS, or alternatively where the message link if Q/M/S, Q/ML/FLS is placed into the queue. The PRIQ subroutine stores this information in the temporary registers in scratch pad memory. These temporary registers will be later referenced by the subroutine UQLK and the information is then written in main memory tying together all the links in the queue so that a logical seratim order is established.

Upon completion of the PRIQ subroutine, a return to the E of VP subroutine 2121 in FIG. 23a is made. More specifically, step 2305 is next executed. In step 2305, the process link 805a which has been obtained from the GO segment and has the JP name, priority value, and the SRA value of the current running process is written into the process link 805a in main memory.

Having obtained a process link, the information available to the current executing process must be stored so that, upon re-entering the running state, there was no loss of continuity. Thus, the next step to be executed is the actual storing of the current information available to the executing process. This is shown in step 2306 indicating the subroutine RLLO shown in FIG. 23g.

The RLLO subroutine transfers the current information to a PCB shown in FIG. 4. In accomplishing this, step 2360 is executed which is a subroutine URUA. This is an accounting subroutine which updates the running time of the process about to leave the running state. The URUA subroutine indicates the amount of computer time used and hence the amount of money to be billed to the customer.

Steps 2361 and 2368 enable the contents of the general registers in the central processing unit 104 to be transferred to the PCB, described supra. Thus step 2361 transfers the contents of the status register 1311 to word 4 of the process control block. Step 2362 stores the contents of the T register 1310 into the process control block address 28. Step 2363 calculates the segmented address of the next instruction to be sequenced as contained in register 1312 and transfers this segmented address to the process control block address 32 as shown by step 2364. In step 2365 the base registers generally indicated at 1308 are then transferred to process control block addresses 52 to 80; step 2366 transfers the general registers shown as 1307 to process control block addresses 84 to 144. In step 2367, the capability byte of the PCB is accessed and tested to determine whether a scientific capability has been used. If it has, the scientific registers 1309 are stored in process control block addresses 148 to 176 and the storing of current information by the subroutine is finished. If, however, there has been no scientific capability, then the RLLO subroutine has already been completed. Thus the current state of the executing process, i.e. the process which has been in the running state and is now being transferred to the wait state is transferred to the process control block. When the information requested by the process via the P instruction becomes available, the process will subsequently be placed again in the running state and no loss of continuity is experienced.

Upon completing the transfer of information into the process control block, subroutine E of VP 2121 in FIG. 23a is re-entered. In step 2307 which is next executed, the hardware gate, previously described, is locked thus indicating that a critical state of the system is being entered. During this time, the updating of the information in main memory is realized in addition to the current process entering the wait state.

In step 2308, the process link 805a obtained from the PLS semaphore 901 in the GO segment is dequeued, and thus released. In step 2309, the state byte of the process control block is changed to indicate that the process is now in the wait state instead of the running state. This is in PMW number 0 shown as byte 3 in FIG. 4 for process control block address 0. In step 2310, process control block address 8, i.e., PMW #2 word, has the segment relative address and the segment number of the semaphore which has been addressed written therein. This provides the PCB with the information required to locate the semaphore on which the process is waiting. (For a more detailed description of this, see related patent applications on Start and Suspend Instructions).

Subsequently, step 2311, FIG. 23h, which is the UQLK subroutine is executed. Previously, the PRIQ subroutine indicated where the process link would be placed in the queue on the semaphore. The UQLK subroutine performs the write operation thus updating the main memory to reflect the state of the system.

Figure 23H:
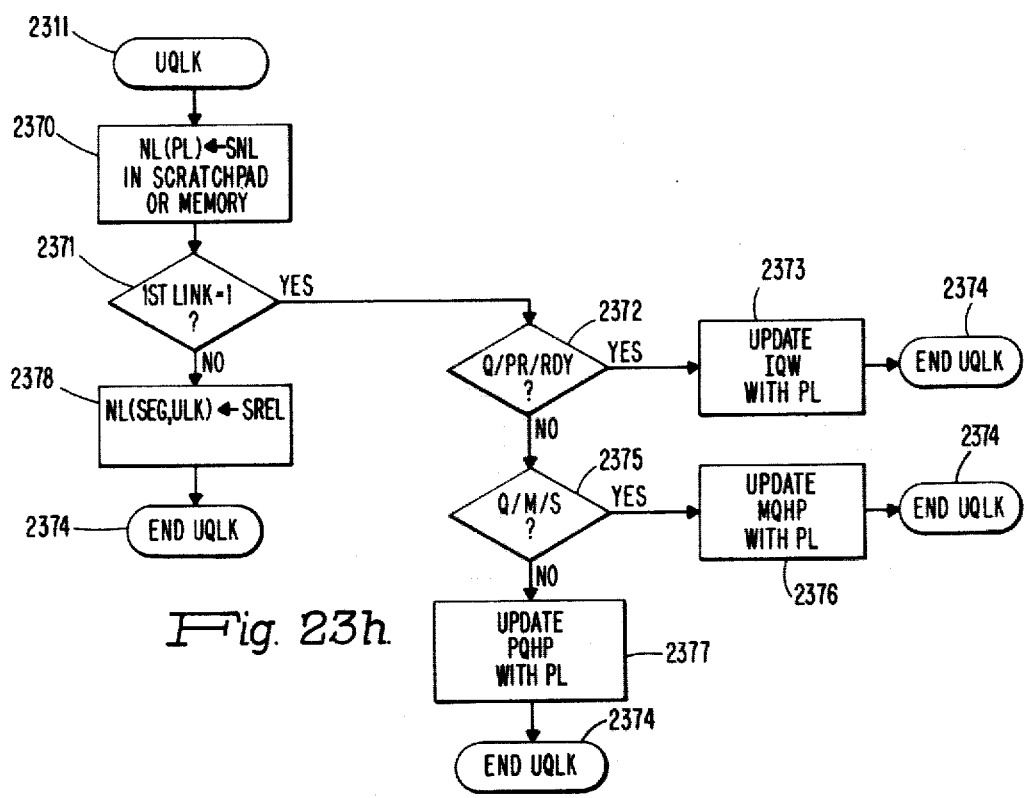

In step 2370 shown in FIG. 23h as the first step of subroutine UQLK, the next link field of the process link 805a to be entered, SNL, is transferred from a scratch pad memory location WDB to the next link field in main memory. In step 2371, the first link indicator is checked to determine whether it is a 1, i.e. whether the link to be updated is the head of the queue. If this answer is yes, step 2372 is executed asking the question is this head process link the head of the ready queue, Q/PR/RDY. This question is asked since the V instruction, infra, uses the PRIQ and UQLK subroutines to place a process on Q/PR/RDY. If the answer is yes, the IQW word, described supra, is altered so that it now points to the location of the process link being introduced in step 2373 and this ends the UQLK subroutine.

However, for our particular situation, the answer is no and step 2375 asks the question is this a message link. If the answer is yes, the message queue head pointer is updated in step 2376 with the location of the process link being introduced and the subroutine is completed. If the answer is no to the question in step 2375, then a process link is being updated and step 2377 updates the PQHP pointer of the semaphore with the location of the process link, PL, from scratch pad location W31.

If the answer to the question in step 2371 were no, indicating that the link to be entered was not at the head of the queue, step 2378 would transfer the next link field to main memory. Thus the next link field SREL of the link pointing to the link to be entered would be changed and the next link field SNL of the link being entered would receive the PL field. Stated differently, the next link field of process link Z to be added to the queue receives SNL. The process link identifying process link Z receives SREL. This information is transferred from scratch pad memory locations WDC and WDE respectively. If this is a Q/M/S, the MQTP is also updated thus completing the UQLK subroutine.

Returning to FIG. 23b, in step 2312, the SCT field, or the FLSCT field if it is a free link semaphore, is now written in scratch pad location WC4. The NSCT count was previously determined in step 2101 of FIG. 21 and stored in scratch pad location WC7. In step 2313, entire contents of the semaphore as stored in scratch pad locations WC4, WC5 is transferred to main memory thus updating the semaphore. Upon completing this transformation of information, the hardware gate in step 2314 is unlocked indicating that the critical state is now over and in step 2315 the vacant gate in ALU 1317a is set to a binary ONE indicating that the executing process has been taken out of the running state. In step 2316 control of the system is transferred to the dispatching unit, described in FIG. 14, to determine the next process to enter the running state.

This completes the operation of subroutine E of VP 2121 which changes the state of the executing process to the wait state. The executing process as shown by FIGS. 20 and 21 was attempting to perform a P instruction on a non-message semaphore or a message semaphore, respectively. Being unable to do so, the process cannot continue its operation until the data is provided to it and hence it enters the wait state by its own action.

Returning to FIG. 22a and block 2200 wherein the SCT count was tested to be less than zero and thus indicating that a P instruction on a message semaphore required the changing of the executing process to the wait state, if the questions were answered no, a branch to step 2205 would be executed. In step 2205 the question is asked whether the SCT field is equal to zero. If the answer to this question is yes, a branch to 2206 the subroutine PMZ shown in FIG. 24a occurs.

D. Message Transfer not Utilizing a Queue

The PMZ subroutine 2206 is a special subroutine which is invoked for a P instruction, either test or non-test, on a semaphore with a message when the SCT field of the semaphore is equal to zero. In this instance, the subroutine determines whether or not a previous process is currently waiting for a free message link in order to put its message on a semaphore. This would occur for the situation wherein all the free message links have been previously used and there are no further free message links available for executing processes desiring to deliver messages. In this situation, to be discussed infra, the executing process trying to deliver the message would be put into the wait state since it could not deliver the message. The current process executing a P instruction requesting a message first attempts to determine if the above situation has occurred before it places itself into the wait state. If the situation has occurred, the process which tried to deliver the message is relieved of its message thereby removing its impediment to execution and also the current process executing the P instruction receives the message thereby allowing it to continue in the running state. Thus, in this particular situation, neither the deliverance of the message by a prior V instruction to a message link nor the reception by the current running process of the message from a semaphore occurs but rather a hybrid situation results wherein the current running process receives the message from a process in the wait state via its PCB.

Figure 24A:
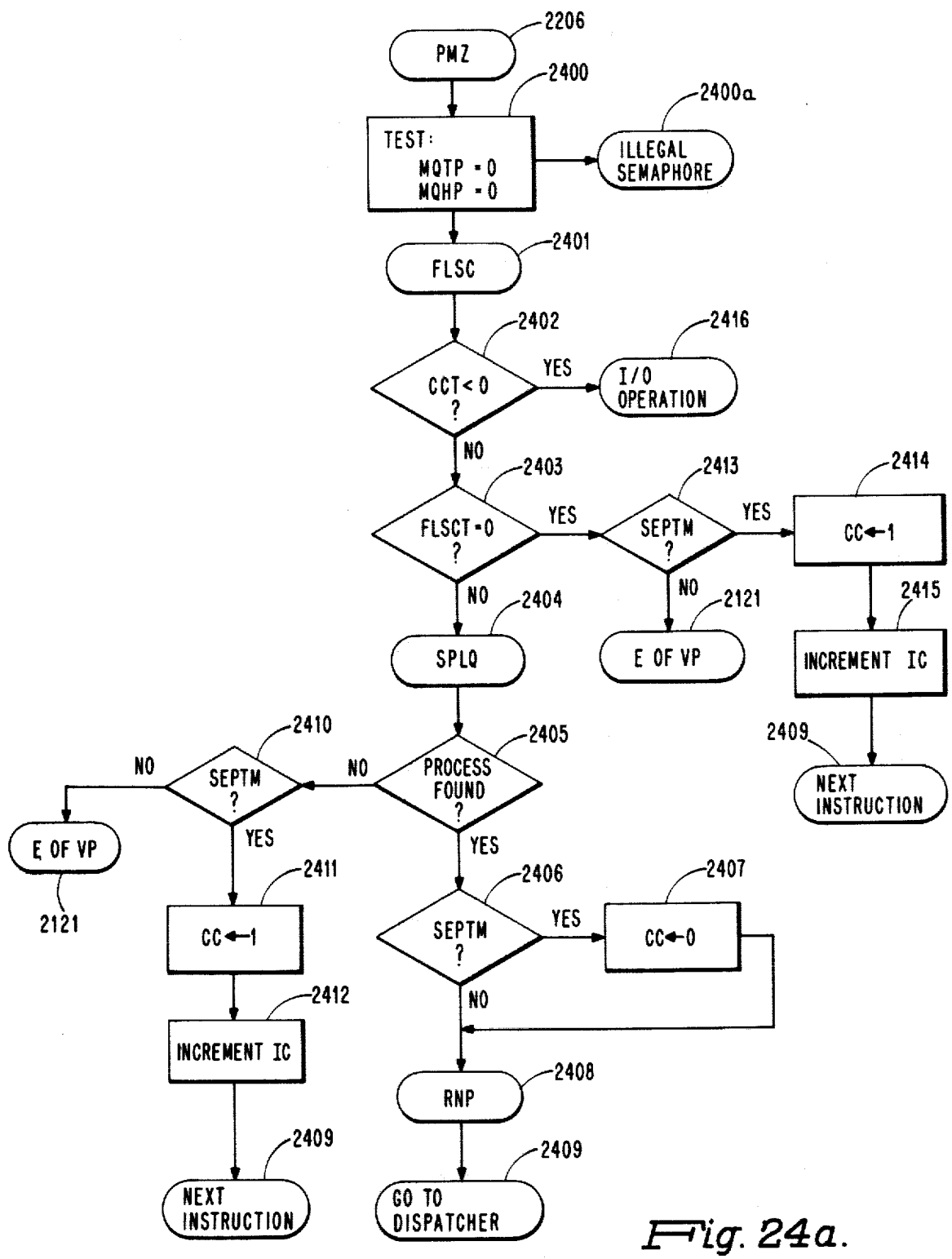
FIGS. 24A–D are flow diagrams of the PMZ subroutine for transferring a message without entering a queue on a semaphore.

More specifically, in step 2400 of FIG. 24a the message queue tail pointer MQTP and the message queue head pointer MQHP of the semaphore with a message are tested to determine whether or not they are zero. Since the SCT field of the semaphore has a zero value, both these conditions should exist otherwise an illegal semaphore 2400A condition exists. Having determined this, step 2401 executes a subroutine for a free link semaphore fetch (FLSC which is shown in FIG. 24b). This subroutine fetches the free link semaphore and performs a series of tests to determine its status.

More specifically, in step 2420 of FIG. 24b the first word the semaphore descriptor segment having the free link semaphore which is to be referenced, is fetched from main memory and transferred to scratch pad memory location WD2. This first word is shown in FIG. 15 as a number 1500. In step 2421, the following tests by the ALU 137 are performed on the first word. The tag field, i.e. bits 0 to 1 are tested to have a value of 11, the MBZ field bits 8 to 15, are tested to be all zeros and the FLSP field, i.e. bits 16 to 31 are tested to determine whether they are a multiple of eight since they will point to the first byte in the free link semaphore 1504 shown in the SD segment layout in FIG. 15.

In step 2422, the free link semaphore pointed to by the FLSP and shown in FIGS. 16d as 1504 is fetched. These three words are then stored in scratch pad memory locations WCB, WCC, WCD, respectively, such that the following test may be performed in the arithmetic and logic unit 1317. In step 2423, the STAG field, i.e. bits 0 to 3 are tested to determine whether they are all zeros. In step 2424, the CCT field, i.e. bits 80 to 95 and the FLSCT field, i.e. bits 16 to 31 of the FLS 1504 shown in FIG. 16 are tested to determine whether they are greater than zero. Neither the FLSCT nor the CCT may ever be greater than zero. These fields are usually set to zero when there are free message links available and become negative when no free message links are available. The absolute value of these fields indicate the number of processes waiting to receive free message links, i.e. the number of processes tied to Q/PR/FLS. Thus, the testing for greater than zero is to determine whether or not the proper encoding for the free link semaphore has been made.

In step 2425, the FLSCT field is tested to determine whether it is less than zero since that if it is less than zero there is a Q/PR/FLS tied to free link semaphore. If the answer is yes, step 2426 tests the PQHP field, i.e. bits 32 to 47 to determine that it is unequal to zero and that it is also a multiple of 8. If the FLSCT is equal to zero, which is the only other possibility, this indicates that free message links may be available. As a result, the PQHP pointer of the free link semaphore should be equal to zero which is the test performed in step 2427. Should any of these tests not be successful, an illegal semaphore exception condition occurs.

In step 2428 the SMC field bits 4–15 (also referred to as the MBZ field in FIG. 16c) is tested to determine whether it is zero. This is inherent limitation on the free link semaphore since it can never store message links. Only free message links are queued on a FLS. As a result, the SMC field is set to zero since the free link semaphore should never have a positive value.

Figure 24C:
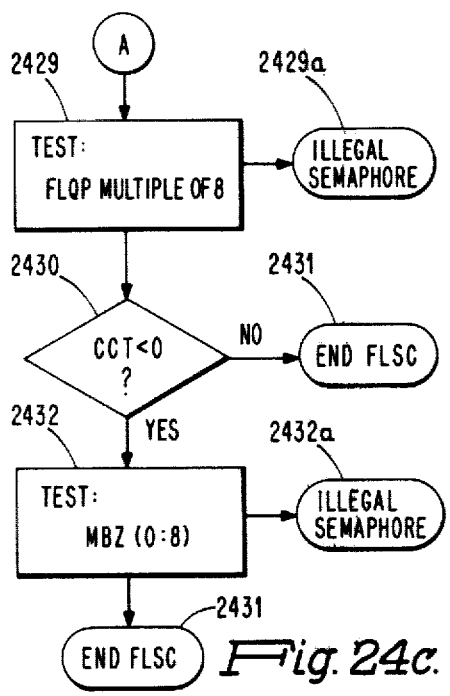
Figure 24B:
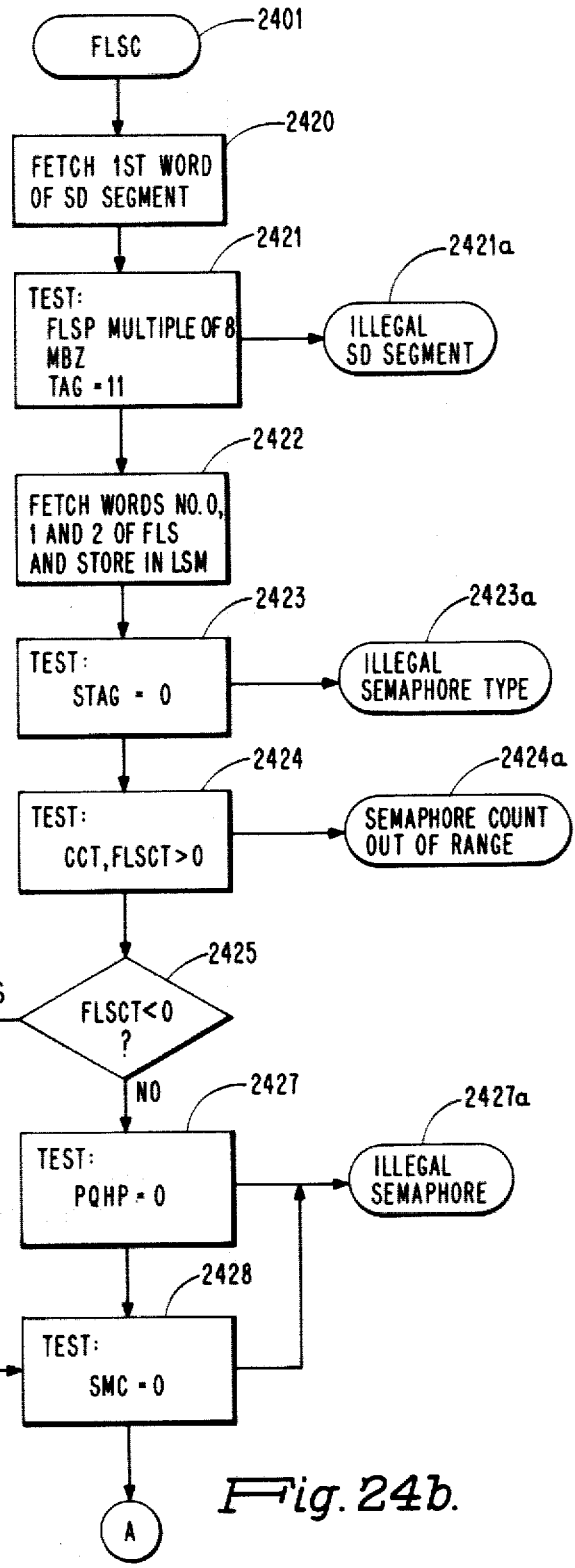

In step 2429 in FIG. 24c, the free link queue pointer, i.e. bits 48 to 63, which points to the first free message link is tested to make sure that it is a multiple of 8 since the FLQP identifies the first free message link which is 4 words long. In step 2430, the CCT field, i.e. bits 80 to 95 is tested to determine whether it is less than zero. Previously, in step 2424, it was tested to be greater than 0 and this test indicates by a no answer that it is equal to 0 and hence the end of the FLS subroutine 2431 results. If a yes answer to the question in 2430 results, then step 2432 which test the MBZ field, i.e. bits 64 to 71 is made and the end of the FLSC subroutine results. Thus, the FLSC subroutine not only checks the free link semaphore to make sure that it is within the design constraints of FIG. 16d but it also stores off in scratch pad memory locations WCB, WCC, WCD, the three words of the free link semaphore for future use.

Upon completion of the FLSC subroutine in 2401, step 2402 in FIG. 24a is executed. Step 2402 asks the question is the CCT less than zero. If the answer to this is no, this indicates that there is no I/O channel waiting for a free message link. In step 2403 the question is asked is the FLSCT equal to zero. If it is not, this indicates that there is a process waiting, Q/PR/FLS, and, as a result, the SPLQ subroutine 2404 is executed.

The SPLQ subroutine searches the free process link queue to determine whether there is a process in Q/PR/FLS which attempted to perform a V operation, i.e., deliver a message, on the same semaphore for which the current running process is executing a P instruction, i.e. requesting the message. Stated differently, has the message requested by the P instruction been previously attempted to be delivered but was unsuccessful since no free message links were available? This situation results when a previous running process attempted to deliver a message to the SD segment having the free link semaphore. The process was unable to do so because there were no free message links available. As a result, the process is placed in the wait state and tied to a Q/PR/FLS by the E of VP subroutine with the result that at some later time, it will transfer the message to the proper semaphore. However, the situation may now exist where the current running process is executing a P instruction which may be directed to the same message. Subroutine SPLQ 2404 will determine whether this situation has resulted.

Figure 24D:
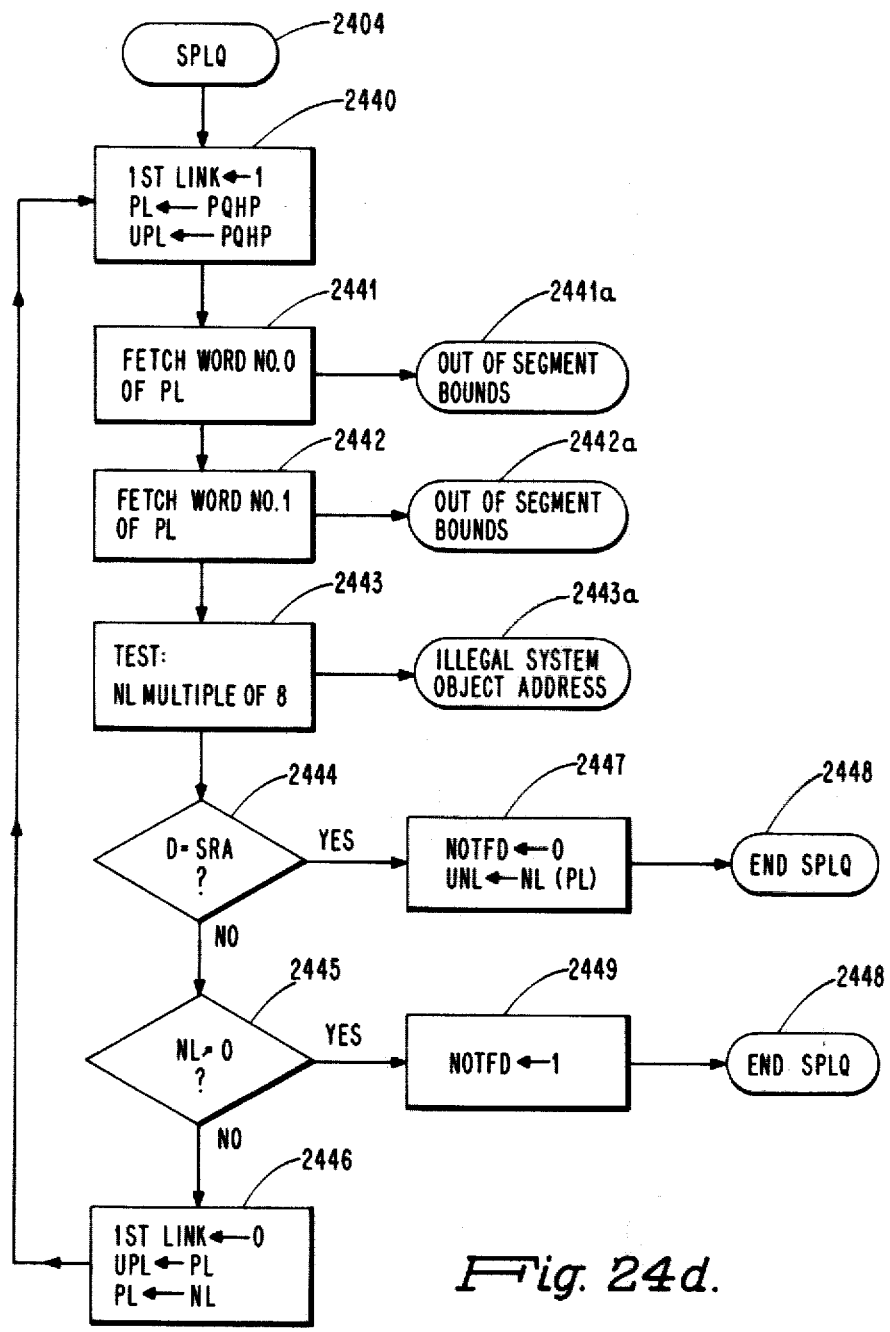

More specifically, in FIG. 24d, the subroutine SPLQ references each of the process links tied to Q/PR/FLS to determine whether the displacement fields of the process link, i.e. bits 48 to 63 of each process link are equal to the displacement field of the current running process executing the P instruction. If a match is found, i.e. the displacement fields are equal, the message from the prior running process is transferred to the current running process and the current running process executing the P instruction remains in the running state. However, if the displacements are found unequal, then the current running process executing the P instruction is placed into the wait state.

In FIG. 24d, step 2440 initializes a flop in auxiliary memory 1317a which indicates that the first link in the Q/PR/FLS is being referenced. This flop determines whether or not the PQHP field of the free link semaphore is to be changed. If the state of the flop remains the same, it indicates that the first process link on the Q/PR/FLS has a displacement field equal to the P instruction and hence its message was taken. If the state of the flop is changed, the PQHP of the free link semaphore remains unchanged. Also, in step 2440, PL and UPL variables are initialized. These variables are written in scratch pad memory location W32 and WE8 and identify the process link and updated process link, respectively. For the initial process link to be examined, both PL and UPL identify the same process queue pointer of the process link.

In steps 2441 and 2442 the first and second words respectively, of the process link, which would be the head process link on the Q/PR/FLS is fetched from main memory to the ALU 1317. In step 2443 the next link field, i.e. bits 0 to 15 of the process link, is checked to determine whether it is a multiple of 8 since each process link it locates is a two word quantity. In step 2444 the D field of the process link, i.e. bits 48 to 63 is compared to the SRA of the current running process to determine whether or not they are equal. If the answer is no, then step 2445 asks the question whether the next link field of the process link is equal to zero, i.e. are there additional processes having process links tied to the free link semaphore. If the answer is no, step 2446 is executed which sets the first link indicator to zero, thereby indicating that the PQHP of the free link semaphore need not be changed since the head process link will remain the same. In addition, the updated process link, UPL, is set to the old PL value in scratch pad location WE8, and, the PL, i.e. process link is now changed to identify the next link field which would be the second process link tied to Q/PR/FLS. Subsequently, steps 2441 to 2444 are again executed on this second process link to determine whether or not the displacement field contained in the process link is equal to the segment relative address (SRA) of the current running process which is executing the P instruction.

If this condition is found, i.e. a yes to the question in step 2444, step 2447 is executed which sets an indicator in auxiliary memory 1317a to zero indicating that a process link having the same displacement field was detected and the updated next link, i.e. UNL, is set equal to the next link in the queue. The UNL field stored in scratch pad location WE9 enables the next link field of the process link immediately prior to the one being removed to be changed to the value of the process link having the same displacement field. Thus the queue contains a continuous series of pointers to all the process links tied to the free link semaphore. When this has been accomplished, step 2448, the end of the SPLQ subroutine, is realized. It should be noted that steps 2447 provides the information for the UPLQ subroutine, described infra to write the new information into the Q/PR/FLS.

If the D field(s) of the process links tied to the Q/PR/FLS were not found to be equal to the SRA of the current running process executing the P instruction, step 2449 sets the flop explained in step 2447 to 1 indicating that all the process links of Q/PR/FLS were examined and none was found to contain the message that the P instruction requested. As a result, the end of the SPLQ subroutine is executed and the UPLQ subroutine does not write the variables UPL and PL into the Q/PR/FLS queue.

Upon completion of the SPLQ subroutine 2404, step 2405 is executed and asks whether the process has been found. This question essentially says has the process which attempted a V instruction on the same semaphore that the P instruction requested a message from been located? If the answer is yes, i.e. if the flop in step 2447 is a zero, step 2406 asks the question whether this was a test P instruction and if it is, 2407 sets a condition code in status register 1311 to zero indicating that the P instruction will be executed. Regardless of the question asked in step 2406, step 2408 invokes the subroutine RNP which is ready new process. Thus, whether a test P instruction or a P instruction was executed, the message is delivered to the current running process executing the P instruction. Additionally, the process which attempted to execute the V instruction is set to the ready state by subroutine RNP 2408. Step 2409 is a transfer to the dispatcher described in FIG. 14.

If in response to the question in step 2405 there was no process found, step 2410 asks the question whether this was a test P instruction. If the answer is yes, then in step 2411 a condition code is set in status register 1311 to 1 indicating that the instruction will not be executed and in step 2412, the instruction counter 1312 is incremented and the current running process executes its next instruction.

If in step 2410 there was a P instruction on a semaphore with a message and the current running process did not receive a message, then a branch to the E of VP subroutine 2121 in FIG. 23a is executed which places the current running process into the wait state and allow the dispatcher to select the new process to be placed into the running state.

If in step 2403 the answer to the question whether the FLSCT of the free link semaphore was equal to zero was yes, thereby indicating that there are no process links on the free link semaphore, i.e. there were no previous processes which attempted to execute a V instruction and no free message links were available, then step 2413 is executed asking the question is this a test instruction. If the answer is yes, again a condition code is set to 1 in step 2414. In addition, the instruction counter 1312 of the current running process executing the test P instruction is incremented in step 2415 and the next instruction is then executed, step 2409. If the answer was no to the question of step 2413, i.e. a non-test P instruction on a message semaphore, then the current running process is placed into the wait state as shown by the E of VP subroutine 2121.

In FIG. 24a, the result of the response to the question 2402 was first assumed to be no. However, if the answer was yes thereby indicating that there were processes desiring to transfer a message from the input/output devices, subroutine 2416 would be executed. This would be essentially the same operation as has been previously explained for the no answer except that the message would be sent directly from the I/O device rather than from the Q/PR/FLS. If there was no message trying to be delivered, then the current running process would go into the waiting state, waiting for the message requested by the execution of the P instruction.

E. P Instruction on a Semaphore with a Message where the SCT is Greater than Zero If in FIG. 22a at step 2205, it was determined that the SCT field of the P instruction on a message semaphore was not equal to zero, i.e. that the SCT field was greater than zero, it is known that the message requested by the running process is available. As a result, the request of the P instruction is satisfied and the running process may continue executing. More specifically, in response to the question in 2205, a branch to step 2207 is made. In step 2207 the question is asked whether this is a test instruction. At this point, it is known that the P instruction may be executed, however for a test instruction a condition code must be set. Thus if the answer is yes, then another question in step 2208 is asked as to whether the SCT field of the semaphore with a message to which the P instruction is directed is equal to 1. If the answer is yes, a condition code of zero is set in status register 1311; if the answer is no a condition code of 2 is set in status register 1311 as shown by steps 2209 and 2210 respectively. These condition codes indicate the number of messages on the Q/M/S to which the P instruction is directed.

If the answer to the question in step 2207 was no, or alternatively, if it was yes and the condition codes have been set, step 2211 is executed. At this point it is known that there is a queue of messages on the semaphore (Q/M/S) and certain tests will be made on this semaphore to determine its legality. Thus in step 2211 both the message queue head pointer MQHP and message queue tail pointer MQTP of the semaphore must be unequal to zero and multiples of 8. In step 2212, the message link which is at the head of Q/M/S is read out from the queue and the message is transferred to the general registers 1307 of the central processing unit 104. Thus the message in general register 0 to 3 of the process control block whose process link is tied to the Q/M/S is the one which is transferred to the general registers of the current running process controlling the central processing unit 104. The contents of the general registers are transferred to scratch pad memory locations 00 to 03 in FIG. 19a.

Figure 22B:
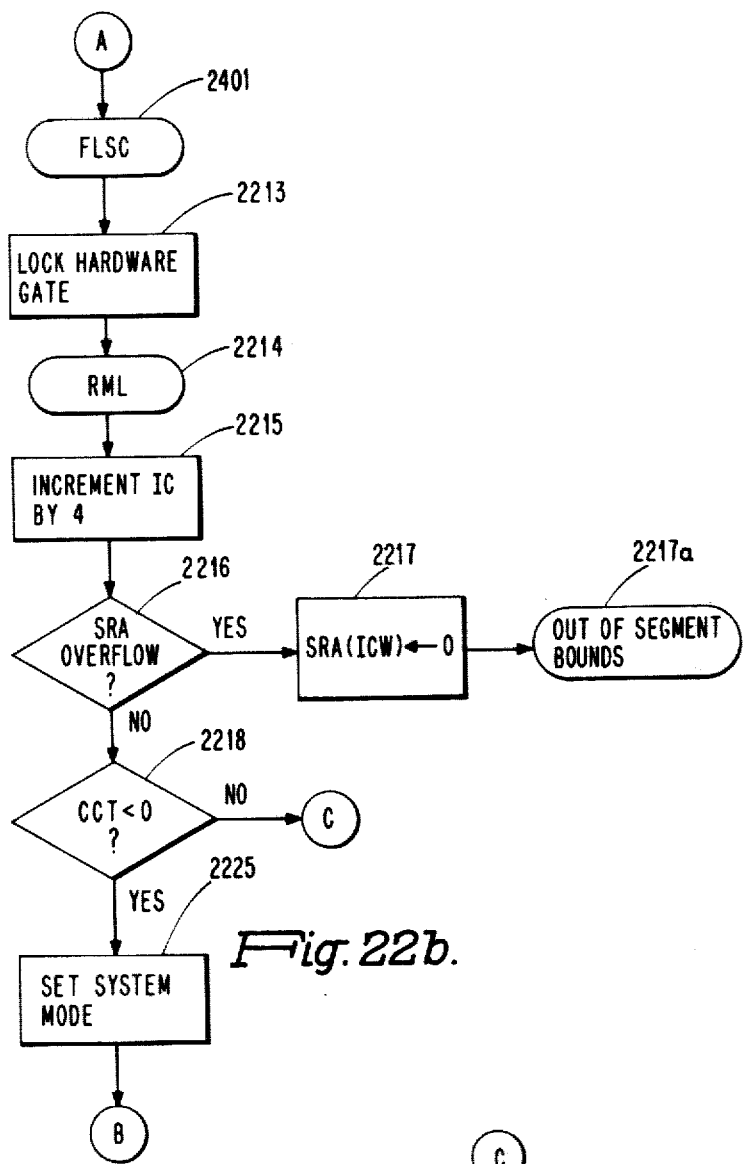
Figure 22D:
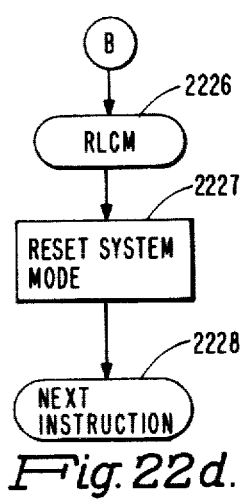
Figure 22C:
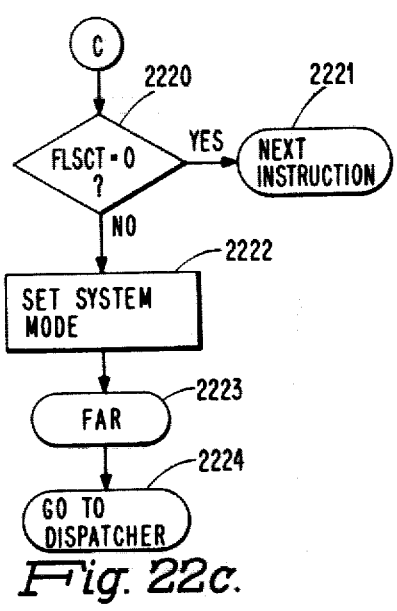
Figure 22A:
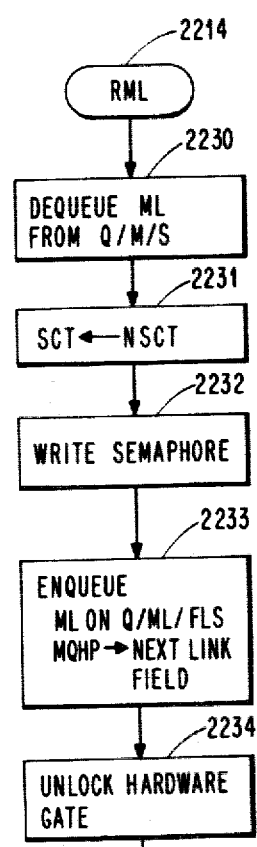

The next step executed is step 2401 in FIG. 22b which calls the FLSC subroutine described supra in FIG. 24b. This subroutine fetches the free link semaphore and ascertains its present state. This subroutine is executed since a message link has been freed and will be placed on the queue of free link messages pointed to by the FLS, Q/ML/FLS. In step 2213, the hardware gate is locked thus indicating that a critical state in the system is occurring. The writing into memory for the critical state is performed by subroutine RML, 2214 shown in FIG. 22e.

The subroutine RML releases the message link having the message which is transferred to the current running process executing the P instruction and, in addition, updates the semaphore and Q/M/S previously holding the message link. This is shown by steps 2230–2234 in FIG. 22e. More specifically, step 2230 dequeues the message link in the Q/M/S. This dequeueing operation changes the message queue head pointer of the semaphore in scratch pad location WC5 to the next link field of the first message link on the semaphore. In step 2231, the decremented semaphore count in scratch pad location WC7 is transferred to scratch pad memory location WC4, indicating that one less message link is now tied to the semaphore with a message, Q/M/S. In step 2232, the contents of the scratch pad memory locations WC4, WC5 are transferred to main memory such that the semaphore in the main memory now contains its current status. Thus the main memory location now indicates that there is one less message link on the semaphore which has a new message queue head pointer identifying the first message link. In step 2233, the free message link is now enqueued on the Q/ML/FLS in LIFO fashion. This requires changing the FLQP pointer of the free link semaphore to point to this message link, i.e. the information from FLSC subroutine 2401 is now written. In addition, the previous FLQP contents which indicated the first link in the free message link queue is transferred to the next link field of the free message link being added to the queue, Q/ML/FLS. Thus, the logical structure for the free message link remains intact. In step 2234, the hardware gate is unlocked indicating that the system critical state is over and the RML subroutine is finished.

Returning to FIG. 22b and step 2215, the instruction counter of the current running process is incremented. Normally, this ends the P instruction, however, since a free message link has been made available to the Q/ML/FLS and this free message link may be the first free message link in the queue, a special situation occurs. This situation results since a previous process may have tried to execute a V instruction to deliver a message to the SD segment of the FLS semaphore but was unable to do so. Hence, it is now desired to enable the transfer of the message to occur.

Thus in step 2216, the question is asked whether the new instruction count in instruction counter 1312 has overflowed, a question always asked after the instruction counter has been incremented. If the answer is yes, step 2217 indicates a segment relative address overflow and sets the SRA of the instruction counter to a dummy value of zero and additionally enables an out of bounds segment exception. This also occurs for each incrementing of the instruction counter, e.g. step 2203.

If the answer was no to the question in 2216, step 2218 asks the question is the CCT less than zero. In this situation it is desired to look at the free link semaphore to determine whether an I/O device has requested a free message link on Q/ML/FLS. If the answer is no, i.e. the CCT count is equal to zero, FIG. 22c and step 2220 is executed asking the question is the FLSCT of the free link semaphore equal to zero. If it is, this indicates that there are no processes waiting for the free message link just added to the free link semaphore. As a result, the next instruction 2221 of the current process is executed. If the answer is no in step 2220, i.e. there are processes waiting to deliver messages, then the system mode is set in 2222. By setting the system mode, it is recognized that the instruction is over. Moreover, if an error results, the instruction just executed is known to have been successfully completed. In step 2223, the subroutine FAR, fetch and ready address, described infra in FIG. 25b, is executed. This places the previous process which attempted a V instruction in the ready queue Q/PR/RDY and as a result the dispatcher in step 2224 is notified. If, however, in step 2218 the CCT was less than zero, i.e. there was an IO device which attempted to deliver a message and no free message links were available; then step 2225 is executed setting the system mode since the instruction has been completed. Step 2226 in FIG. 22d then invokes the RLCM subroutine which allows the IO device to obtain the just freed message link and step 2227 resets the system mode allowing the next instruction in 2228 to be executed. Thus by FIGS. 22b-22d not only have the P instructions been successful in obtaining the requested messages, but also the free message link previously storing the delivered message has been transferred to either the free link semaphore or the semaphore on which an unsuccessful V instruction had been attempted.

This completes the P operation on a semaphore with a message and the various situations which may arise depending both upon the state of the semaphore and the state of the free link semaphore.

5. Instructions on Semaphores

Figure 25A:
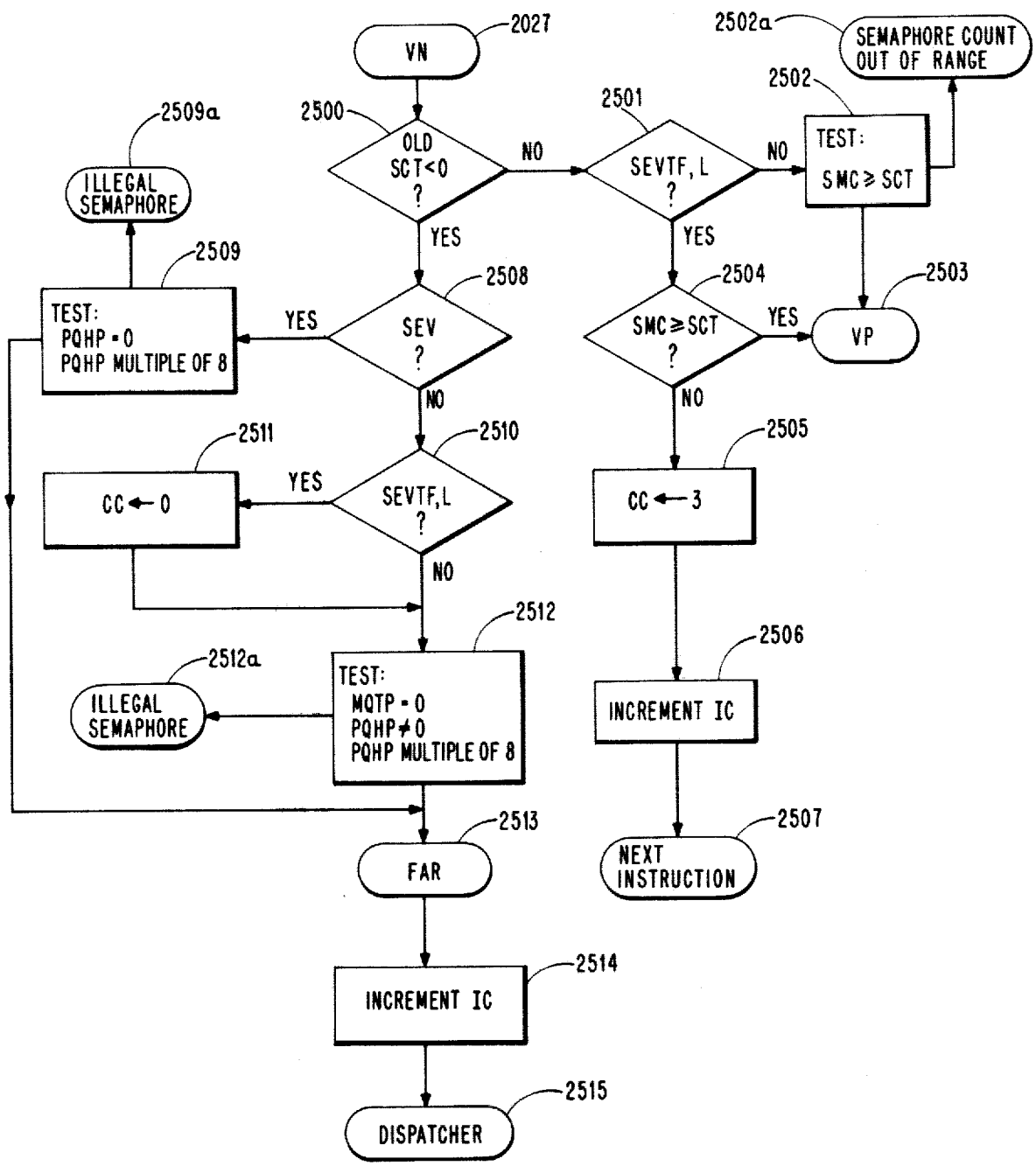

If in FIG. 20b, the answer to question asked in step 2026 was yes, i.e. a V operation was performed, a transfer to VN subroutine 2027 shown in FIG. 25a occurs. The following is an explanation of various permutations for a V instruction executed by the current running process.

It will be recalled that in FIG. 20 the semaphore has been fetched and that a preliminary determination was made that a V operation was to be executed. In step 2500, the question is asked whether the old SCT stored in scratch pad location WC4 is less than zero, i.e. whether there are signals or messages tied to the semaphore which has been fetched. Thus this question disregards the new semaphore count which was anticipated in FIG. 20 and which is stored in a scratch pad location WC7. If the answer to the question in 2500 is no, the V instruction, if possible, adds another signal or message to the queue on the semaphore.

More specifically, in step 2501, the op code and complementary code of the V instruction is tested to determine whether a test V instruction is to be executed. If the answer indicates a non test V instruction, step 2502 tests whether the semaphore maximum count (SMC) of the semaphore is greater than or equal to the new semaphore count which was aligned in scratch pad memory in step 2025. If the semaphore maximum count is less than the new semaphore count, this indicates that more data than had been anticipated by the system has been placed on the semaphore and, as a result, an exception condition in 2502a is set. If, however, the semaphore, indicates that further data may be stored, a branch to step 2503 the subroutine VP, i.e. V positive is made. Before discussing this branch, steps 2504 to 2507 will be discussed.

In step 2504 it has been determined this is a test instruction. The question is then asked, as was the situation in step 2502, whether the semaphore maximum count of the semaphore is greater than or equal to the new semaphore count field anticipated in step 2025. If the answer is no, i.e. that the SCT is greater, the V instuction is not able to be completed. Consequently, a condition code of 3 is set in the status register 1311 in step 2505 and the running process has its instruction counter incremented at 2506 to execute the next instruction. If the answer is yes to the question in 2504 indicating that the semaphore may store additional data, then a branch to the V positive subroutine in step 2503 occurs. The V positive subroutine shown in FIG. 26 enables additional messages or signals to be added to the semaphore.

A. V Instruction on Semaphores having a Positive SCT Field

In step 2600, the V instruction's op code and complementary code in the instruction fetch unit 1318 are tested to determine whether or not this is a V operation on a non-message semaphore. If the answer to the question in 2600 is yes, a branch to step 2601 is made. In step 2601 the incremented SCT count developed in step 2024 of FIG. 20b is retrieved from scratch pad memory location WC7 and transmitted to the scratch pad memory location WC4. In step 2602, the hardware gate is locked and in step 2603 the incremented SCT count is written into the semaphore in main memory thus indicating that another signal is available from the semaphore without a message. In step 2604 the hardware gate is unlocked signifying the end of a critical state of the system and the instruction is complete.

If, however, in step 2600 the V instruction is a message semaphore, then step 2605 is executed. Step 2605 asks whether the SCT field is greater than zero. It has already been determined that the semaphore count is not less than zero and therefore if it is not greater than zero, it is equal to zero. Thus if the answer is no, in step 2606 the message queue tail pointer MQTP and message queue head pointer MQHP fields of the message semaphore addressed by the V instruction are tested for zeros since there should be no Q/M/S.

If, however, the answer to step 2605 is yes, i.e. there are messages on the semaphore, then step 2607 is executed which tests both the MQTP and MQHP to determine whether they are unequal to zero and multiples of 8 as was previously described. If this condition exists, the FLSC subroutine, step 2401 is executed. This subroutine, as was explained previously in FIG. 24b checks the free link semaphore and stores it in scratch pad memory locations WCB, WCC, WCD.

Upon returning from the subroutine in step 2608 the operation type is tested. If it is a V instruction on a semaphore with a message, SEVFL, SEVTL, then step 2609 is executed. If it is not, i.e. it is an IO instruction, a P instruction or an exception handler V operation, then step 2608a and the subroutine SVP is executed. This subroutine enables the message to be delivered to the semaphore.

Figure 26A:
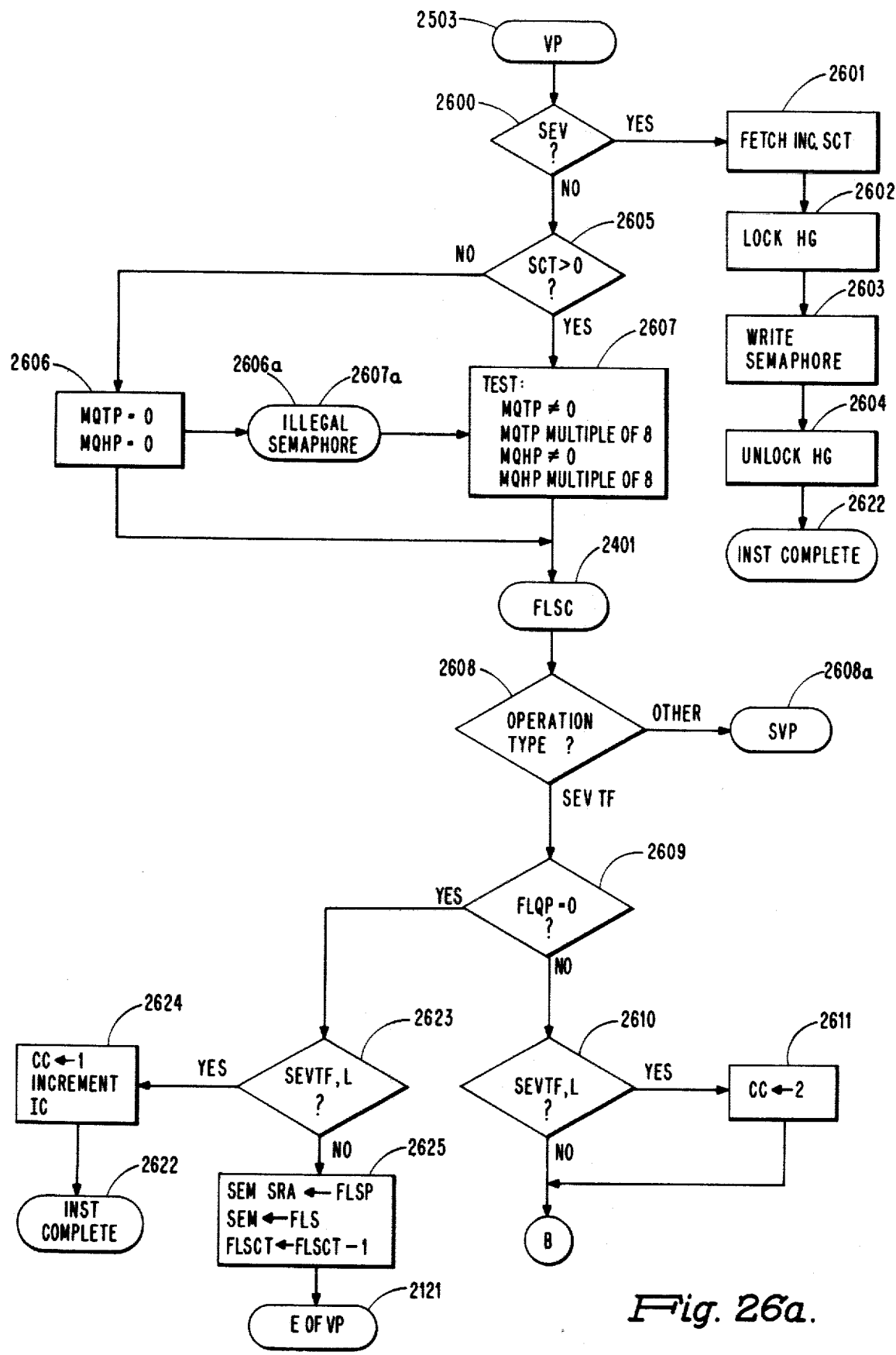
FIGS. 26A–F are flow diagrams of the V instruction on a semaphore when the SCT field of the semaphore is positive.
Figure 26B:
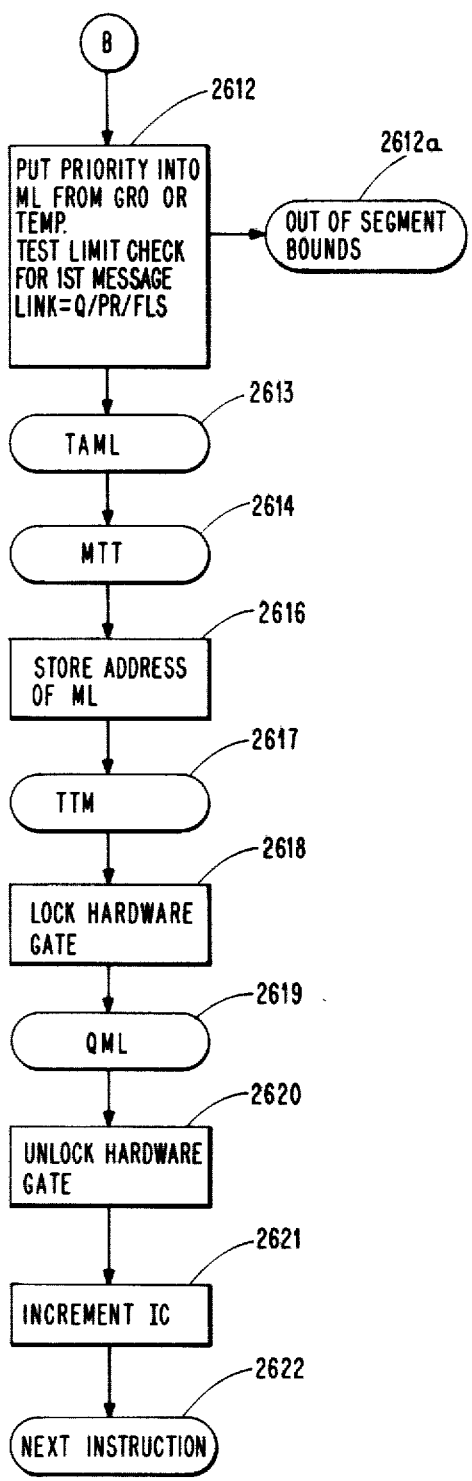

If, however, this is V instruction by the executing process, then in step 2609 the FLQP field of the free link semaphore is tested to determine if it is equal to zero. It should be noted that both the semaphore and the free link semaphore have been checked as legal representations. If the FLQP pointer is not equal to zero, this indicates that there are still free links available. Thus the next question asked in step 2610 is whether this is a test V instruction. If the answer is yes, a condition code is set to 2 in step 2611 and in either case, i.e. whether or not it is a test V instruction, step 2612, FIG. 26b is executed.

In step 2612, a test is made to determine whether the message link is within the SD segment. At this point, the free link semaphore is about to release a free message link in order to write the message of the running process executing the V instruction. It is required to determine whether or not the free message link is within the physical boundary of the SD segment. Also, if the message link is within the segment, the priority of the running process is transferred into the free message link in bits 24 to 27. After this occurs, step 2613 executes a subroutine TAML which tests access to the message link, and if favorable, locates the message link in the queue on the semaphore, Q/M/S.

Figure 23E:
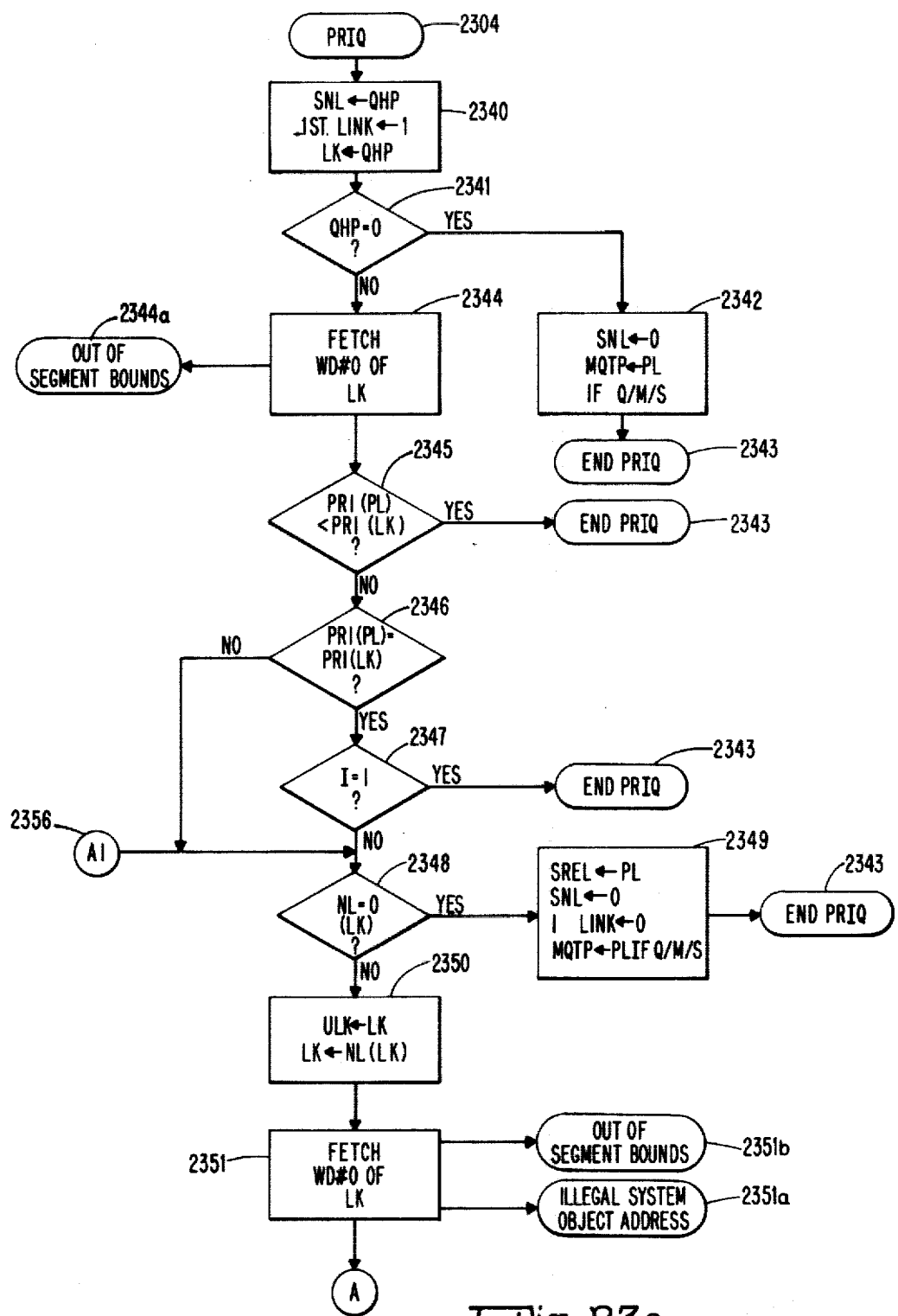
Figure 23F:
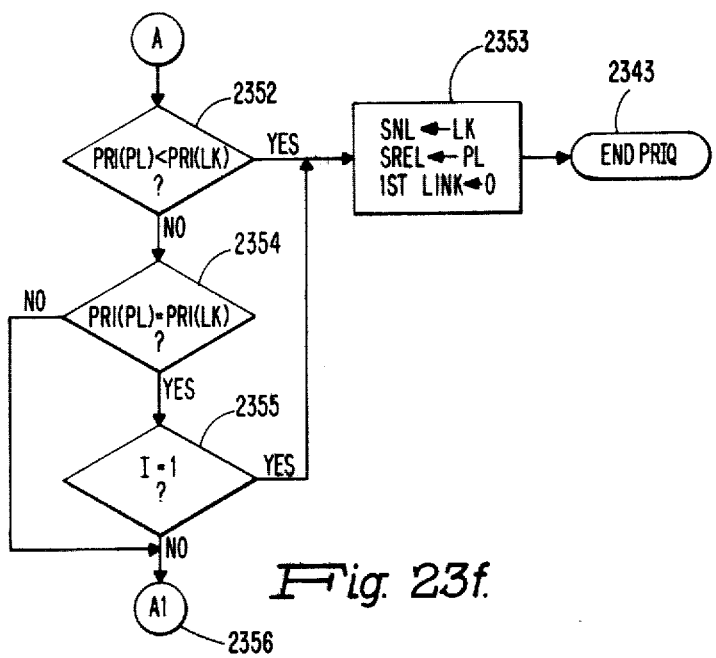
Figure 23G:
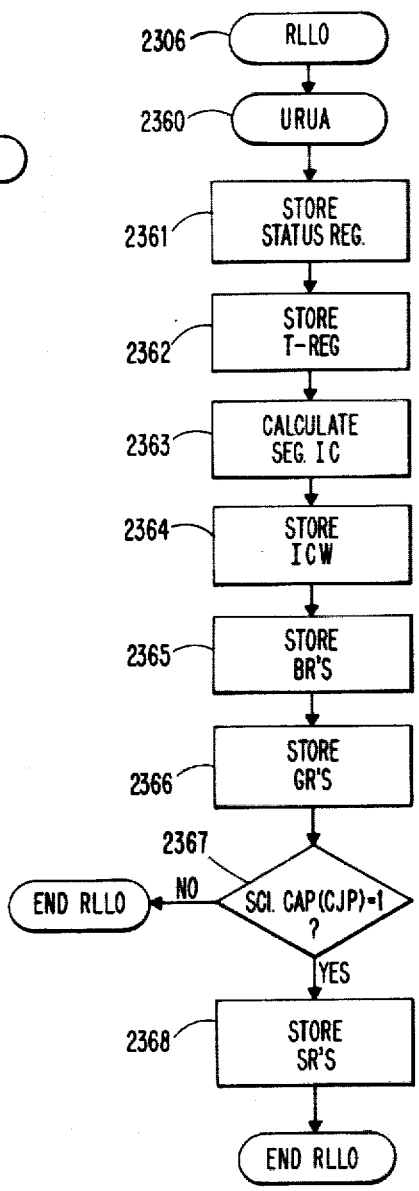
Figure 26C:
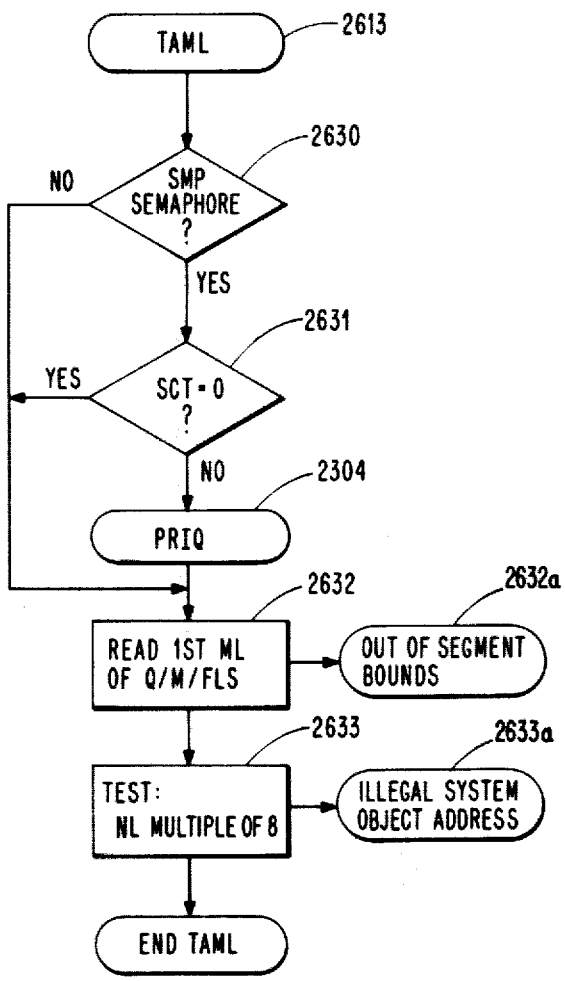

The TAML subroutine is shown in FIG. 26c and more specifically in step 2630 asks the question whether this is a V instruction on a semaphore with a message wherein the message is queued by priority. Thus this question checks the STAG field of semaphore located in scratch pad memory location WC4. If this test indicates a priority semaphore, the question is asked whether or not the SCT is equal to zero in step 2631. If the count of the semaphore is not equal to zero, this indicates that there are message links tied to the semaphore queue, Q/M/S, and therefore subroutine PRIQ 2304 shown in FIG. 23e is executed. The subroutine PRIQ, as was previously explained, establishes the priority location of the message in the message link and checks the validity of the adjacent message link. This information is stored in scratch pad location WDB to WDE by the PRIQ subroutine so that subsequently the UQLK subroutine writes the information into main memory.

If the answer to the question in 2630 is no, i.e. this is not a message semaphore which is enqueued by priority, or if the answer to the question in 2631 is yes, the SCT count is zero indicating that there are no messages enqueued on the semaphore, then the actual location of the message link is determined later. In step 2632 the first free message link of the free link semaphore, Q/ML/FLS, is read from main memory into the ALU 1317. This free message link would be the one indicated by the FLQP pointer of the FLS semaphore. In step 2633 the next link field of the free message link is transferred to a location W32 in scratch pad memory after it is tested to be a multiple of 8. This next link field is eventually transferred back and written as the FLQP pointer of the free link semaphore. Consequently, the FLS semaphore identifies the second free message link as the head free message link of the queue since the first free message link will be used by the V instruction. Subsequent to step 2633, the subroutine is over and a return to FIG. 26b at step 2614 is made.

Step 2614 indicates the subroutine MTT which has been named 2303 in FIG. 23a. The MTT subroutine stands for a move function and operates to move to a temporary place in the working store area some of the fields in the message. The reason for this is that the first word and a half, i.e. the message header as shown in FIG. 15 at 1508, must be constructed. The message proper which is the next two and a half words of the message link is provided by the running process.

Figure 26D:
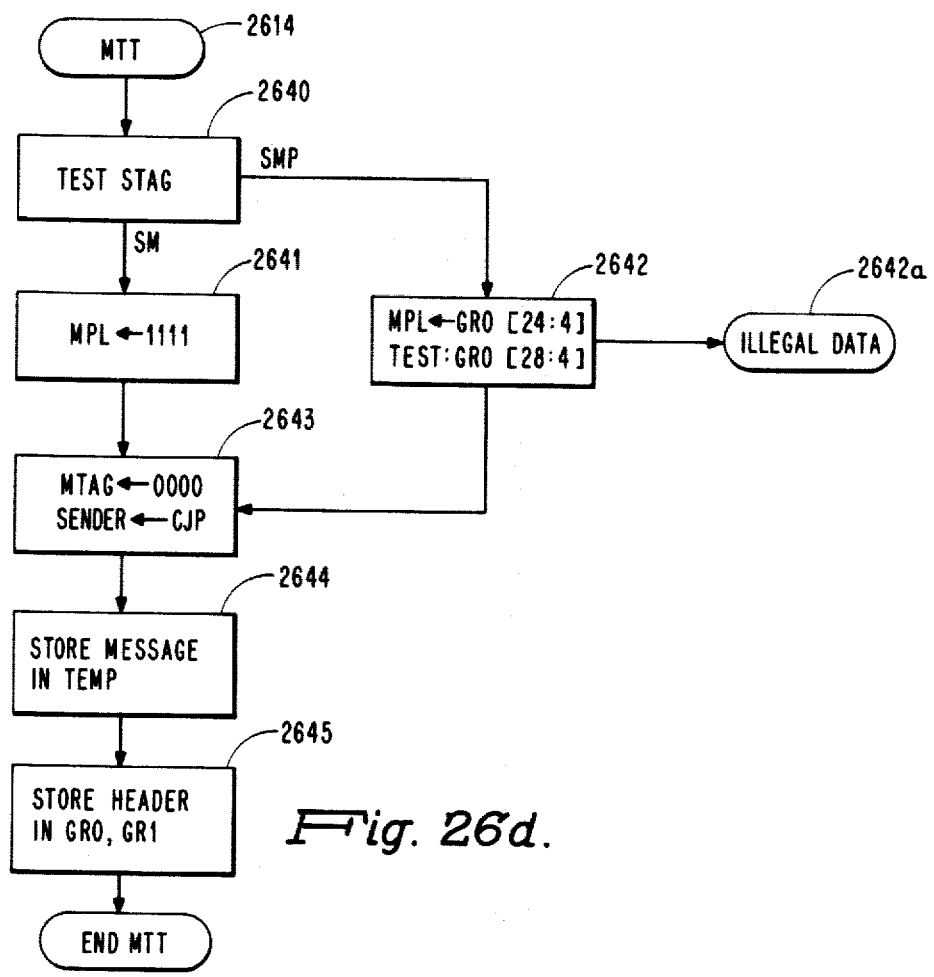

More specifically, in FIG. 26d, step 2640, the STAG field, i.e. bits 0 to 3 of the semaphore with a message are tested. If the STAG field indicates that this is not a priority semaphore, then step 2641 is executed setting the MPL field, i.e. bits 28 to 31, of the message header equal to 1111 which indicates that this is not a priority message. If, however, the STAG field indicates that it is a priority message, then step 2642 reads from general register #0 1309 the priority of the process executing the V instruction. This priority is then written into message priority field bits 24 to 27. Concurrently, a test is made on bits 28 to 31 of the message link to determine whether a zero value is contained in those four bits. If not, this is illegal data as shown by the exception condition generated in step 2642a.

In either case, step 2643 constructs the message tag, i.e. bits 20 to 23. In this particular instance, the message tags would be all zeros since this is not an IO operation. Also, step 2643 puts the current process name into bits 32 to 47 thus indicating the running process which has executed the V instruction. In step 2644 the message which is to be delivered by the V instruction is then transferred into the temporary storage registers at storage locations WE4 to WE7. This would be the next two and a half words to be filled into the message link, i.e. bits 48 to 127. In step 2645 the message header now resident in temporary storage registers is transferred to the general registers 0 and the first 16 bits of general register 1 of the running process. Thus the complete message to be delivered to the message link is now resident in general registers 0 to 3 of general registers 1309. If it had developed that a message link was not available, then the current running process would have been put into the wait states with its general registers holding the message in general registers 0 to 3 of its PCB. Thus the subroutine MTT not only constructs the message but insures that it is stored for future use.

Upon completion of the MTT subroutine, step 2616 in FIG. 26b is executed. This step stores the absolute address of the message link. Since the relative address is given by the free link queue pointer head, FLQP, the absolute address is developed from this and then stored in temporary storage register location W30. In step 2617, subroutine TTM is executed. This subroutine transfers the information which is double word aligned and contained in temporary storage locations WE4 to WE7 into main memory. Thus the TTM subroutine places the message link into the absolute address in main memory.

The TTM subroutine is shown in FIG. 26c and specifically includes step 2648 which reads out from temporary register storage locations WE4 and WE5 the first double word of the message link and transfers it to main memory and step 2649 which reads out from scratch pad locations WE6 and WE7 and writes into main memory the second double word of the message link.

Having set up the message link with the proper information, step 2618 locks the hardware gate indicating a critical state operation is to be executed and step 2619 executes the QML subroutine which transfers the message link prepared in the TAML subroutine 2613. The reason for requiring two subroutines is that an undivided operation for writing into main memory is required thus necessitating the locking of the hardware gate. The preparing of the information is not a critical operation and can be interrupted. Thus a separate subroutine to check on the information is executed prior to the writing of the information in main memory and when the hardware gate is locked, the second subroutine does the actual writing as will be seen in QML 2619 in FIG. 26f.

More specifically, the QML subroutine dequeues the free message link from Q/ML/FLS and enqueues the freed message link onto the semaphore with messages thus either adding to the queue of messages on the semaphore Q/M/S or forming the first message link on the queue of the semaphore. Thus in step 2650, the first free link of the free link semaphore is dequeued. This is accomplished by transferring from scratch pad memory location W32 the next link field of the just freed message link to the FLQP pointer of the FLS semaphore in scratch pad location WCC. In step 2651, the question is asked of the semaphore to which the V instruction is directed, is the semaphore empty, i.e. are there previous message links on the semaphore. If the answer is yes that the semaphore does not have any additional message links tied to its queue, then step 2652 indicates that the message queue head pointer and message queue tail pointer of the semaphore should be changed to indicate the relative address of the message link taken in step 2650. Additionally, the next link field of this message link is set to zero since it is the only message link tied to the semaphore in a Q/M/S. Subsequently, in step 2653, the incremented SCT field of the semaphore is fetched from scratch pad location WC7, then transferred to location WC4. In step 2654 the entire contents of storage locations WC4 and WC5 in the scratch pad memory are transferred to the freed message link, (step 2650) in main memory. Thus not only is the message written into the message link in main memory but the semaphore pointing to the message link is updated via step 2654.

If the answer to the question in 2651 was no, i.e. that there were additional message links tied to this semaphore, then step 2655 asks the question whether or not this is an instruction being executed on a priority semaphore. If the answer is no, step 2656 asks the question whether this is a FIFO V instruction. This is determined by checking the operation code and complementary code, i.e. the first 12 bits of the V instruction in the instruction fetch unit 1318. If the answer is yes, i.e. it is FIFO enqueueing, this indicates that the message link will be the last one in the queue. Thus step 2657 updates the message queue tail pointer of the semaphore and sets the next link field of the message link to be enqueued on the semaphore to zero since it is the last one of the queue. Then step 2653 and step 2654 are executed to update both the semaphore and the message link.

If the answer to the question in 2656 is no, then LIFO enqueueing is indicated and step 2658 updates the message queue head pointer of the semaphore and transfers the old message queue head pointer contained in the semaphore to the next link field of the message link being enqueued on the semaphore. This results since the message being delivered by the V instruction of the current running process is to be the first one delivered to a P instruction addressed to the same semaphore. As a result, it is placed at the head of the Q/M/S. Subsequently, steps 2653 and 2654, described previously, are executed.

Figure 26E:
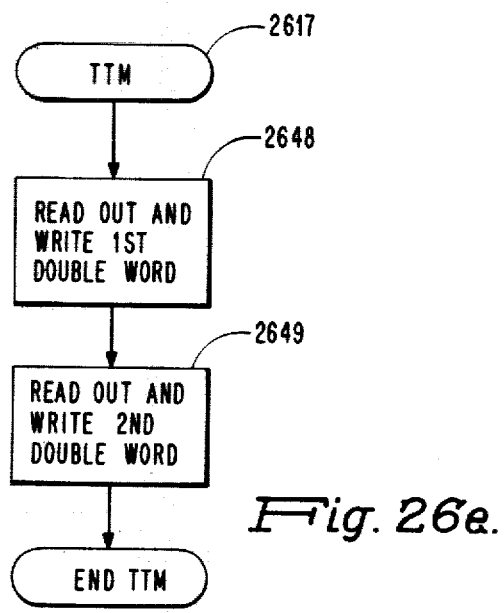
Figure 26F:
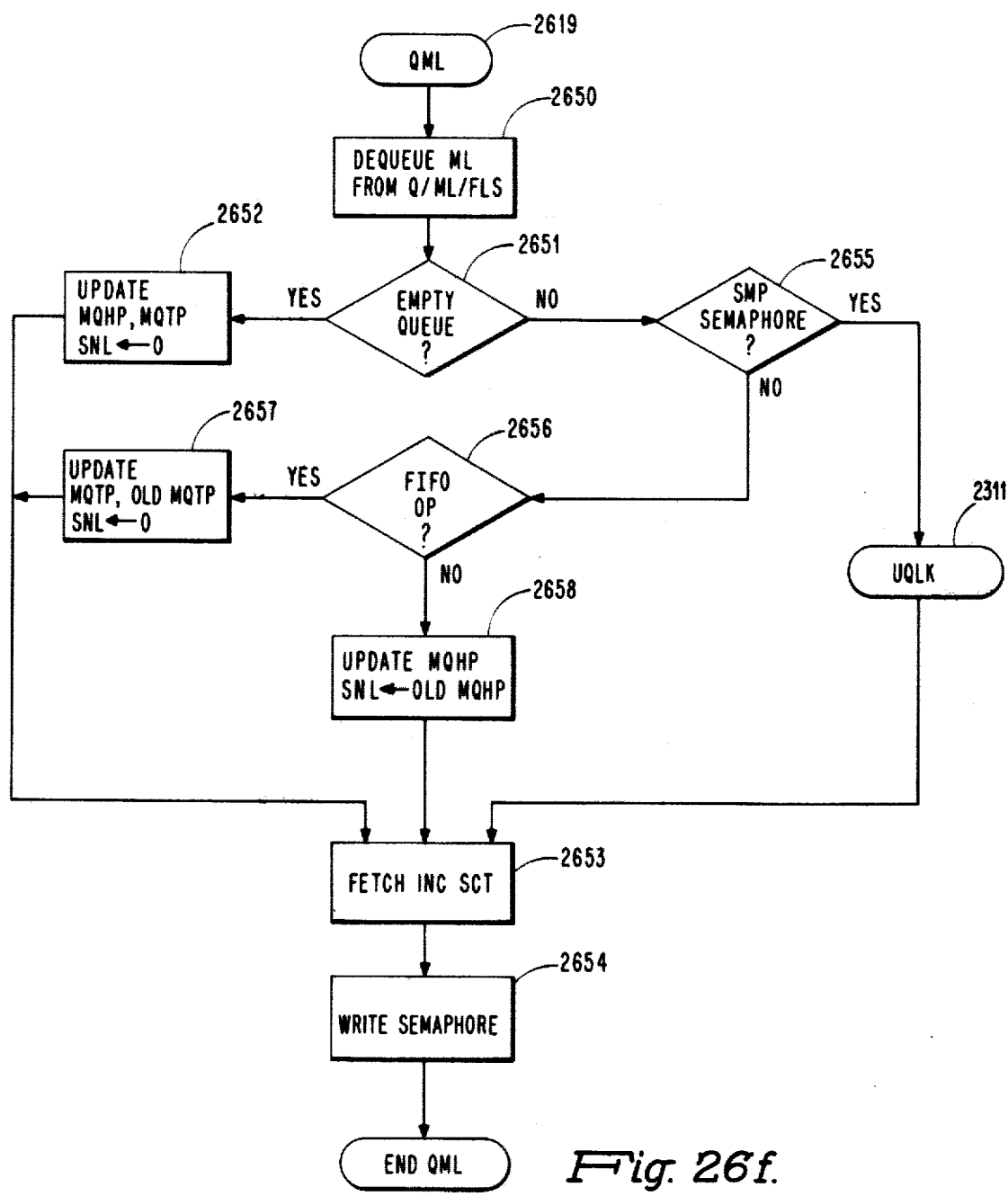

If in step 2655 the answer to the question was yes that priority enqueueing was required, the information needed for enqueueing has already been developed by the TAML subroutine 2613 in FIG. 26e and, more specifically, by the PRIQ subroutine 2304 referenced by the TAML subroutine. Thus the UQLK subroutine described in FIG. 23h as 2311 is executed writing this information into main memory for the process link fields. This situation occurs when the message link may be required to be placed somewhere in the middle of the message queue tied to the semaphore. The UQLK subroutine 2311 realigns the message queue by priority such that a sequential ordering of next link fields is provided. Steps 2653 and 2654 transfer this information to the main memory locations for the semaphore having the message links queued by priority.

Upon completion of the subroutine QML, FIG. 26b indicates that step 2620 is next executed which unlocks the hardware gate indicating that the system critical state is over. After step 2620, steps 2621 indicates that the instruction counter 1312 of the running process is incremented and the next instruction is sequenced by 2622.

B. V Instruction on Semaphores with Messages when no Free Message Links are Available If in FIG. 26a the answer to the question in step 2609 was yes, i.e. that the FLQP pointer of the FLS semaphore was equal to zero indicating that there were no free links available, then step 2623 asks the question whether or not this is a test instruction. If it is a test V instruction then step 2624 indicates that a condition code in status register 1311 is set to 1, and the instruction counter 1312 is incremented and the next instruction is executed in step 2622. If the answer is no in step 2623, then the process executing the V instruction has nowhere to deliver its message since there are no free message links available from the free link semaphore in the SD segment shown in FIG. 15. As a result, in step 2625, the FLS semaphore is changed to make it equivalent to a semaphore with a message enabling it to receive a process. This is equivalent to a semaphore having a negative SCT field on which a P instruction is executed. Thus the V instruction is unable to be executed by the current running process and, as a result, the free link semaphore holds the current executing process which is transferred into the wait state. Since this is a typical P operation, step 2625 enables the information of the free link semaphore to be transformed and step 2121 which is E of VP subroutine will treat the FLS semaphore the same as a message semaphore receiving a P instruction. In step 2625 the free link semaphore pointer FLSP becomes the semaphore relative address, i.e. the semaphore SRA. The FLSCT count which has been zero or less than zero since previously there may have been no free message links available is now decremented by one (i.e. minus 1) to indicate that the free link semaphore is holding the absolute number of FLSCT processes which were unable to deliver messages. Also shown graphically is the free link semaphore becoming a semaphore. After step 2625, the E of VP subroutine 2121 previously explained with reference to FIG. 23a is executed which essentially forms a queue of processes on the free link semaphore, Q/PR/FLS, by taking a process link from the GO segment shown in FIG. 17 and placing the current running process into the wait state. This completes the V instructions on semaphores having an SCT field which is greater than zero.

C. V Instructions on a Semaphore having a Negative SCT Field

Returning to FIG. 25a, in step 2500, if the answer to the question whether the old SCT is less than zero was yes, this indicates that previously, processes had requested data from the semaphore. Since the semaphore did not have the data, the processes were placed into the wait state until the data became available. Not that a V instruction is to be executed on the semaphore, not only will the previous process receive the necessary data to take it out of the wait state but also the current running process is able to deliver its message thus continuing in the running state. As a result, the remaining portions of FIG. 25 describe functions which are performed on both the current running process and a process which has been placed into the wait state because data was not available.

More specifically, steps 2508 to 2512 set up both the message and non-message semaphores and step 2513 transfers the information from the current running process executing the V instructions to the process on the semaphore which had requested the data. Thus, step 2508 asks the question whether or not this is a V operation on a semaphore without a message. If the answer is yes, indicating that a queue of processes are on the non-message semaphore, i.e. Q/PR/S, the process queue head pointer of the semaphore is tested in step 2509 to determine whether or not it is a multiple of 8 and unequal to zero. If the answer to the question was no that it is a V operation on a message semaphore, step 2510 asks the question whether this is a test V instruction on a semaphore with a message. If it is a test instruction, a condition code is set to zero in step 2511 indicating that not only is the SCT negative but upon executing the V instruction a process will be placed into the ready state. In either case, i.e. whether or not it is a test instruction, step 2512 is executed testing that both the message queue tail pointer is equal to zero since this is a Q/PR/S and the process queue head pointer is not equal to zero and a multiple of 8 for the reasons stated previously.

If the semaphore is legal, then in step 2513 the FAR subroutine, i.e. the fetch and ready process, is executed. This subroutine delivers the message to the head process on the semaphore thus completing the V instruction on the semaphore with a message. In addition, this subroutine changes the PCB of the process receiving the message such that the dispatcher can place that process into the ready queue.

The FAR subroutine 2513 is shown in FIG. 25b. More specifically, the first step of the FAR subroutine is to access the FG0 subroutine 2321 previously described with respect to FIG. 23d. The FG0 subroutine develops the head pointer for the GO segment. In step 2520, the first link of the semaphore holding the process, Q/PR/S, is accessed. Thus the process queue head pointer of the semaphore is added to the address developed from the FG0 subroutine to provide the process link required. It should be noted that if this were a free link semaphore, the process link would be developed from the PQHP field which would be added to the address of the GO segment in step 2520. Subsequently, the subroutine RNP in step 2521 is accessed thus ending the FAR subroutine.

Subroutine RNP 2521 is shown in FIG. 25c. It functions to ready a process which is in the wait state. This subroutine was also executed in FIG. 24a, step 2408, when a process tied to FLS semaphore delivered its message. It is recalled that the situation involved the current running process executing a P instruction requesting a message. The message was not delivered since there were no free message links available at the time. As a result, the message was transferred and the process which was unable to deliver its message was then taken out of the wait state and placed into the ready queue. At that time, explanation of the subroutine RNP was deferred.

In addition to the above, the RNP subroutine, as a result of the dispatcher function, may roll out the current running process if the process at the head of the ready queue has a higher priority. FIG. 14 explains this in more detail.

Since the RNP subroutine executes on a process other than the current process in the running state, it must first locate this other process. Thus step 2522 calls the PCBA subroutine which is shown in FIG. 25h. This subroutine fetches the absolute address of the process control block containing the process which is in the wait state. More specifically, in step 2560, the P table pointer is fetched using the J number. This implies, in referring to FIGS. 5 and 17, that the J table is obtained from the system base and then the table with the J number is indexed to develop a pointer to the P table.

In step 2561 the pointer to the P table is referenced and the P number is then indexed and added to the pointer in order to provide from the P table the address of the process control block. The address of the process control block is then fetched from main memory to the arithmetic and logic unit 1317. In step 2562, the first bit is checked to indicate that the process control block is in memory, i.e. that it is not a vacant process control block, one which may have been suspended. Additionally, the tests on bits 1 to 7 are made in order to determine that they are zeros. The remaining portions of the first word are then stored by step 2563 in scratch pad memory location NJA, FIG. 19a, since these 24 bits are the absolute address for the process control block.

Upon completion of the subroutine PCBA 2522, step 2523 of FIG. 25c is executed. In step 2523, the op code and complementary code of the instruction is tested. If it is an IO instruction, step 2524 is executed taking the data which is a message and storing it at the PCB address plus 84 which is the address of the general register 0 in the PCB. If it is a message V instruction or a test message V instruction, step 2525 transfers the information stored in general register GR0 to GR3 of the running process to the temporary storage area via the subroutine MTT described in FIG. 26*d* as 2614. Again step 2524 will then transfer the message to the PCB address +84.

In either case, the subroutine TTM, step 2617 is executed in order to write the message into main memory. This transfer is to the process control block from the temporary storage locations WE4 to WE7.

If in step 2523 the testing of the operation code indicated that there was a V instruction on a semaphore without a message, then there would be no need for storing messages in the process control block locations +84. However, in any case, step 2527 is executed which fetches the internal queue word identifying the head of the ready queue. It should be noted at this point that an additional entry from 2528 is shown which entry indicates the branch from a start instruction, the subject matter of another patent application incorporated by reference herein. The start instruction only requires a transfer of some process into the ready queue and hence requires the location of the IQW word.

Subsequent to the fetching of the internal process queue word, subroutine PRIQ 2304 which was described in FIG. 23*e*, is executed. This subroutine determines where the process which had previously performed a P operation upon the semaphore, i.e. a process now in the wait state, is to be placed vis-a-vis the ready queue, Q/PR/RDY. The PRIQ subroutine checks the priority of the processes in the ready queue via the priority fields in the process links to determine the placement of the process link in the ready queue. No actual memory writing is done by the PRIQ subroutine.

In step 2529, FIG. 25*d*, the UACW subroutine is executed which updates the accounting words in the process control block. This subroutine totals the time which the process spent in the wait state. In step 2530, again the operation code of the V instruction in the instruction fetch unit 1318 is tested to determine whether a start instruction is being executed. If it is a start instruction, a branch to step 2531 wherein the process name and priority byte of the process being initialized is stored into a process link. In step 2532 the priority of the process in the PCB is transferred to the process link. This step thus updates the priority byte which was transferred from scratch pad memory in case a change of priority for the priority byte had occurred.

If, however, this is a non start instruction, then the process is being changed from the wait state, i.e: a process link already exists. Thus in step 2533 the priority of the process which was in the wait state as shown by the process link is transferred to the scratch pad memory location NJP, FIG. 19*a*. This results since the priority in the process link field of a process is the latest version of the current priority. Thus if there has been a change of priority while the process was in the wait state, it would only be indicated by the process link field.

Figure 25E:
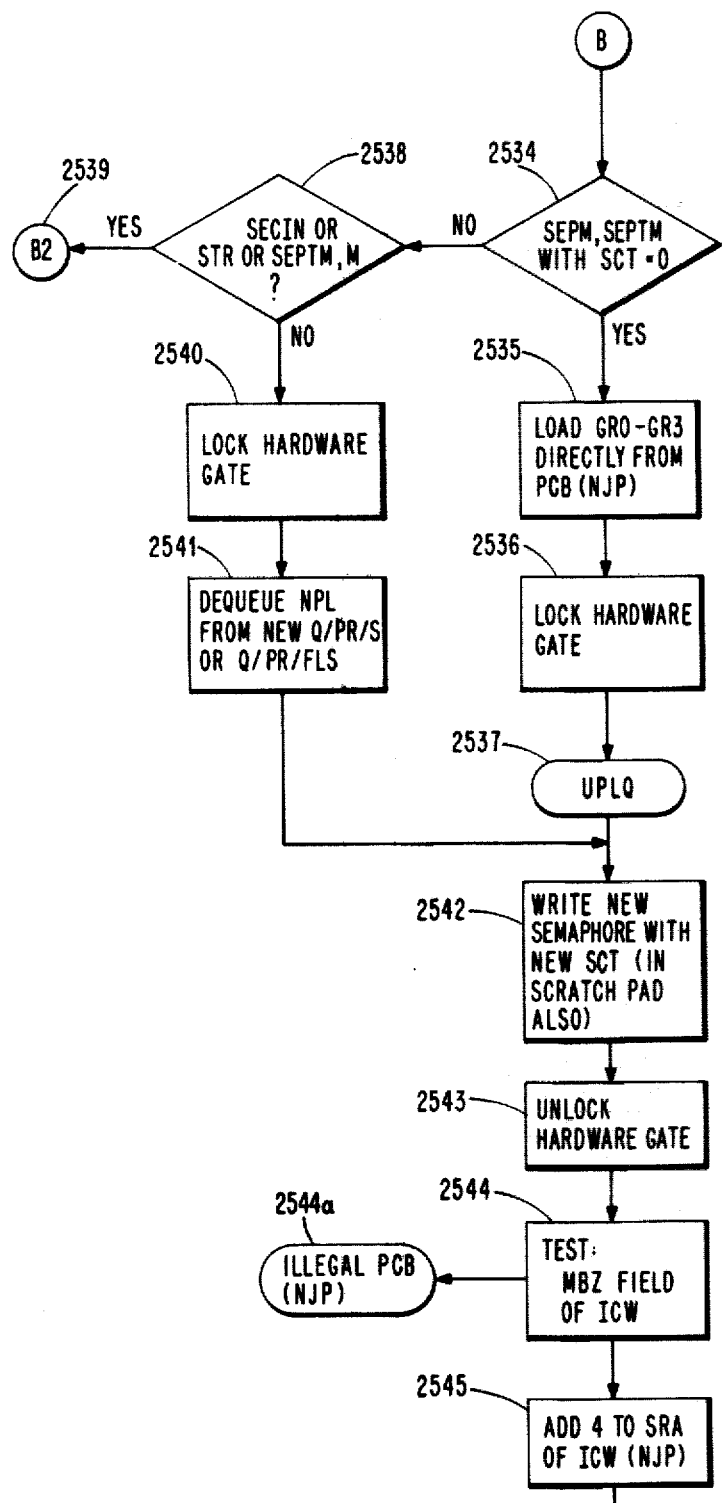
Figure 25F:
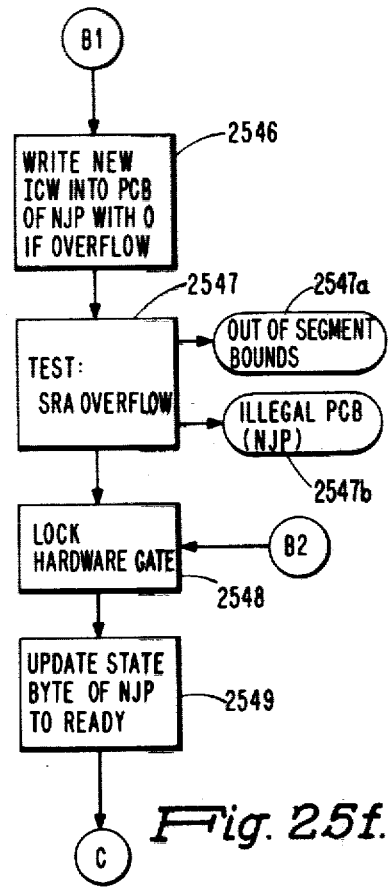
Figure 25G:
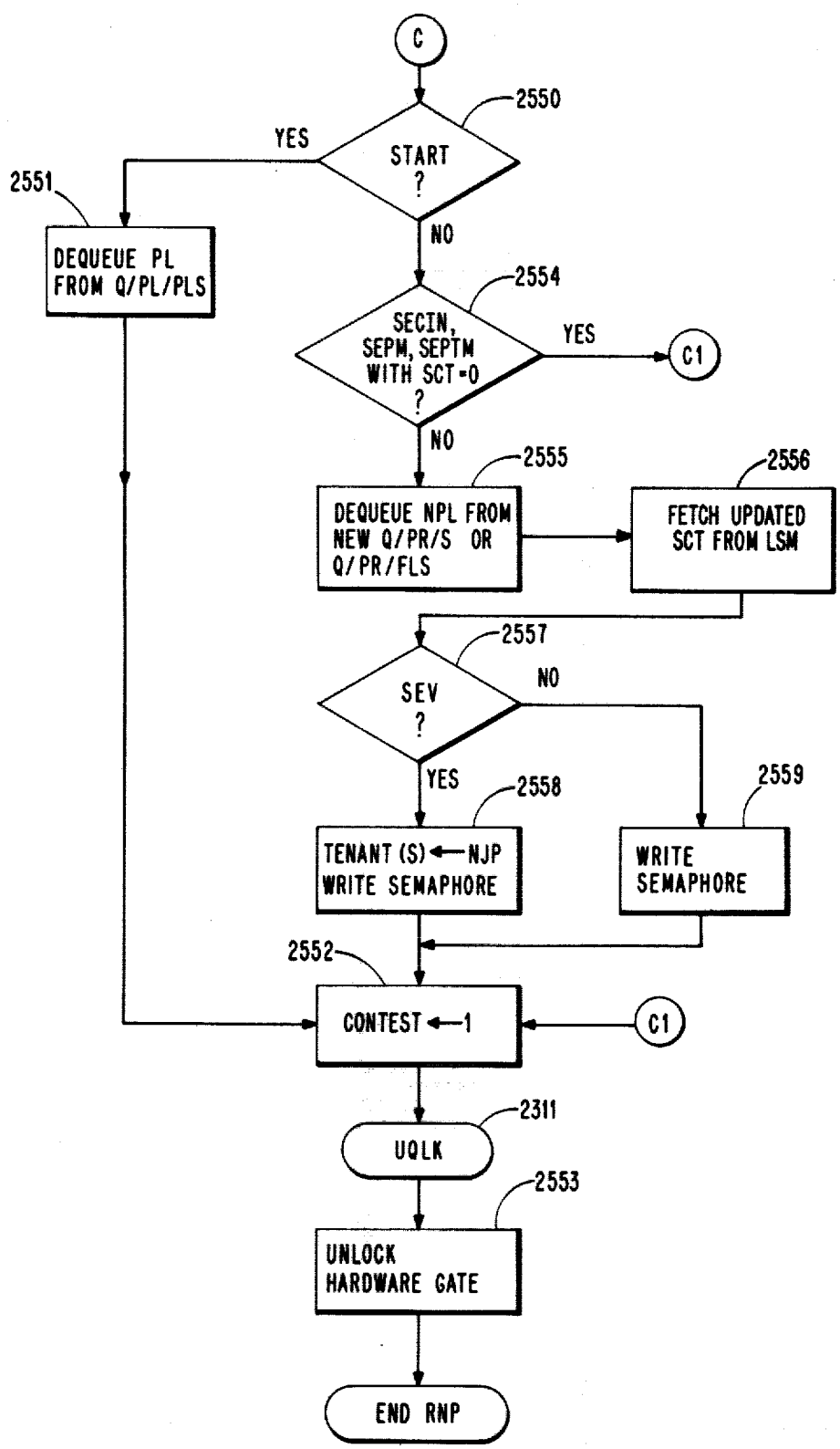
Figure 25H:
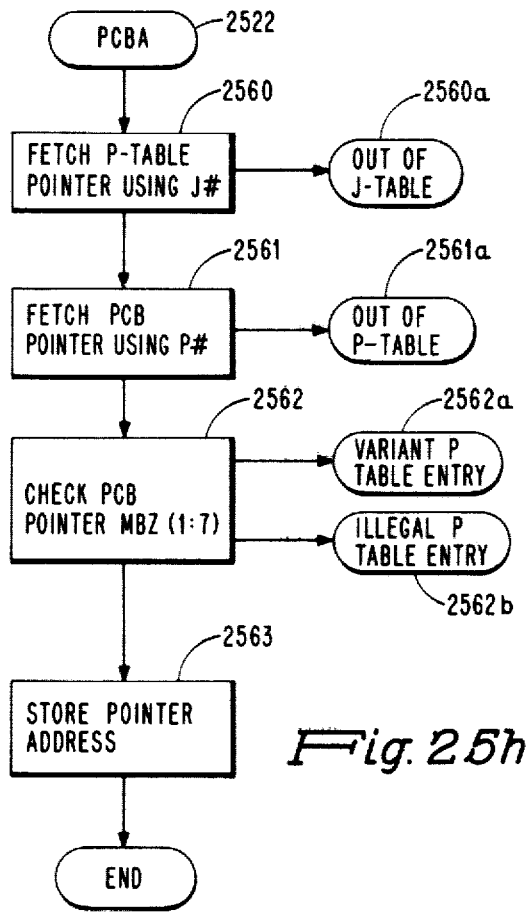
Figure 25I:
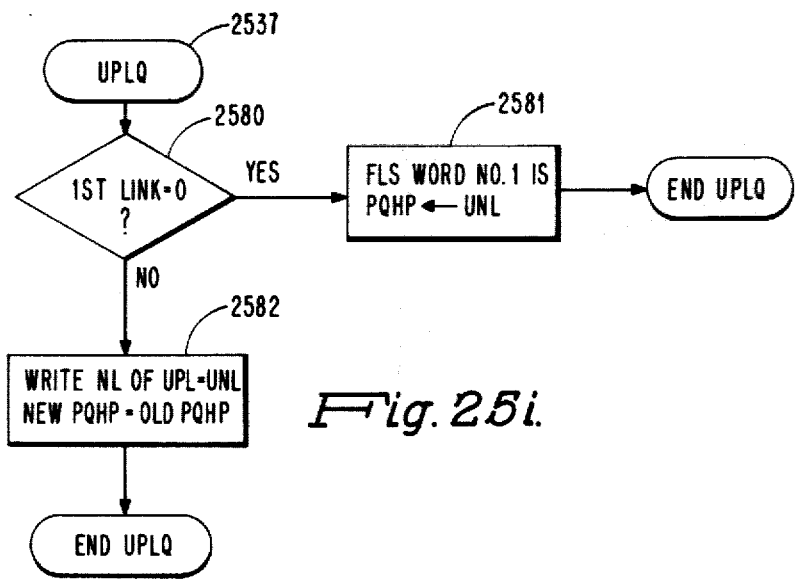

In step 2534, FIG. 25*e*, the operation code is again tested to determine if this is a P instruction, either test or non-test, on a semaphore with a message with the SCT field equal to zero. This results from the branch from the PMZ subroutine FIG. 24*a* which called the RNP subroutine in step 2408. If this condition exists, then in step 2535 the contents of the process control block of the process which was in the wait state, i.e. the values in address +84, is transferred to the general registers GR0 to GR3 of the process currently executing the P instruction. It is recalled that the PCB of the process in the wait state contains a message since no free message links were available. As a result, the process was tied to Q/PR/FLS. Now a P instruction is executed and the PMZ subroutine has determined that the displacement fields are equal. Consequently, a transfer of the message from the process in Q/PR/FLS is made. Subsequently, in step 2536, the hardware gate is locked indicating that a critical state is being entered and in step 2537, the UPLQ subroutine is executed. This subroutine removes a process link thus updating the Q/PR/FLS as shown in FIG. 25*i.*

Thus in step 2580 a test is made to determine whether the first link indicator is equal to zero, i.e. whether this is the process link being removed. If it is, then step 2581 indicates the process links are the head of the queue and hence the process queue head pointer in scratch pad location WE5 is updated with the contents of UNL stored in scratch pad location WE9. If, however, it is not the head of the queue, then in step 2582, the old process queue head pointer is equal to the new process head queue pointer and the next link field of the process link being removed is transferred to the link immediately preceding it. Thus the immediate preceding link identifies the process link formerly identified by the removed process link, insuring a logical connection of all the process links in Q/PR/FLS. This link information is the information stored in scratch pad locations WE8 and WE9 by the SPLQ subroutine.

If the answer to the question in 2534 was no indicating that the special condition does not exist, then a branch to step 2538 is executed. Since there are a plurality of instructions which may result in the answer no, step 2538 asks the question whether this is a Secin, Start or P or P-test instruction on a message semaphore. If the answer is yes, a branch to 2539 is made. This branch is executed since the dequeueing from a Q/PR/S or Q/PR/FLS is delayed until step 2555. If, however, the answer to question 2538 is no, as would occur for V instructions, step 2540 locks the hardware gate and step 2541 dequeues the process link from the semaphore Q/PR/S or Q/PL/FLS, i.e. the process link is taken from the queue in which it existed. The removed link is also added to Q/PR/PLS. In step 2542, the addressed semaphore is written with a new SCT field in both scratch pad memory and main memory. This indicates the new status of the semaphore. Step 2542 is also executed if the PMZ subroutine had been invoked. Subsequently, in step 2543 the hardware gate is unlocked indicating that the indivisible critical operation is over.

At this point, the process being held by the semaphore has received the data it previously requested. However, when a P instruction is unable to be executed, the instruction counter of the running process remains the same as the process is rolled out into the wait state. Thus when the process returns to the running state, the instruction counter indicates that the P instruction is to be executed. Since the P instruction of the process has now been executed, i.e. it has received its message, the instruction counter contents stored in the PCB should be incremented by four. By doing this, the process starts up at the next instruction subsequent to its execution of the P instruction. Steps 2544 to 2547 provide for this change in the contents of the instruction counter.

In step 2544, the MBZ field of the instruction counter word is tested for zero. In step 2545 four is added to the segment relative address stored in the instruction counter thus enabling the instruction counter to indicate the next instruction to be executed. In step 2546, FIG. 25f, this new address for the instruction counter word is written into the process control block of the process which had executed the P instruction and in step 2547 it is tested to determine whether or not the incremented address has overflowed the segment. This situation may occur when the instruction counter is incremented. Thus the process being removed from the wait state is now able to function in the running state once the dispatcher transfers it.

Step 2548 is executed if the branch from step 2539 indicating a Secin, Start or P or test-P instruction on a message semaphore has occurred or following the incrementing of the instruction counter of the process which was in the wait state. In step 2548, the hardware gate indicating a critical state is again locked and in step 2549 the state byte of the process which has just been updated is set to the ready state such that the dispatcher may place it onto the ready queue.

In step 2550, FIG. 25g, the question is again asked is this a Start instruction. If the answer is yes, then in step 2551, the process link which contains the information about the process being initialized is taken from the queue of process links on the process link semaphore, Q/PL/PLS and the contest indicator is set to 1. The contest indicator is set when one or more new processes have been placed on the ready queue since the beginning of the last instruction executed by the current running process. The contest indicator identifies the possibility of a conflict by the head process of the ready queue with the current running process for the running state. Subsequently, in step 2311, the subroutine UQLK, previously described with respect to FIG. 23h, is executed which updates the process links determined by the PRIQ subroutine. In step 2553, the hardware gate is unlocked because the system critical operation is now over. Also, the RNP subroutine is over. Thus it is seen for this branch that the RNP subroutine updated both the current running process executing a V instruction and a process which was started by the current running process.

If, however, the answer to the question in 2550 was no, the same question as was asked in step 2534 is asked for step 2554, i.e. is this a SECIN, or a P instruction either test or non-test, on a semaphore with a message with the SCT count equal to zero. For the P instructions, the enqueueing has already been done by the UPLQ subroutine. As a result, a branch to step 2552 is executed since a process has been added to the ready queue and a comparison of the priorities of the running process to the process at the head of Q/PR/RDY is made. Thus it is seen for this branch that the RNP subroutine updated both the current running process executing a P instruction on a message semaphore and a process in the wait state which was tied to the free link semaphore since no free message links were available.

If, however, the conditions of the question in 2554 have not been met, i.e. the SCT count is not equal to zero, or it is not one of the instructions enumerated above, step 2555 is executed which takes the new process link from the waiting queue, i.e. either Q/PR/S or Q/PR/FLS and in step 2556, the updated SCT is fetched from scratch pad memory location WC7 and entered into the process link. In step 2557, the question is asked whether or not this is a V instruction on a semaphore without a message. If it is, step 2558 removes the name of the current running process from the tenant field of the semaphore, i.e. bits 48 to 63 as shown in FIG. 16. In addition, step 2558 updates the semaphore with all the current information stored in scratch pad memory locations WC4 and WC5, i.e. the new updated SCT as formed in 2556 and any changed queue pointers which may have occurred earlier. Upon having the non-message semaphore completely updated, the contest indicator in step 2552 is set to 1 indicating that a new process has been entered into the ready queue since the last instruction was executed by the current running process. The same steps as indicated previously, i.e. steps 2311 and 2553 are then executed resulting in the termination of the RNP subroutine. Thus it is seen for this branch that the RNP subroutine updates both the current running process executing a V instruction on a non-message semaphore and a process in the wait state which was tied to the non-message semaphore.

If, however, the answer to the question in step 2557 was no indicating that it was a V instruction on a message semaphore, then step 2559 would write into the semaphore in main memory a new head pointer changing Q/PR/S and a new count field and steps 2552, set seq., previously explained, are then executed. Thus it is seen for this branch that the RNP subroutine updates both the current running process executing a V instruction on a message semaphore and a process in the wait state which was tied to the message semaphore.

Upon completion of the RNP subroutine, a return to FIG. 25a in step 2514 is executed wherein the instruction counter for the current running process is incremented. In step 2515 the dispatcher is called allowing the process which has been previously updated to be transferred to the ready queue and also allowing the dispatcher to determine which process should be in the running state, i.e. respond to the contest indicator being set to one.

This completes the best mode of operation for the family of P and V instructions. Having shown and described one embodiment of the invention, those skilled in the art will realize that many variations and modifications can be made to produce the described invention and still be within the scope of the claimed invention. Thus, many of the steps may be altered or replaced by different steps which will provide the same result and fall within the spirit of the claimed invention. It is the invention therefore to be limited only as indicated by the scope of all of the claims.

GLOSSARY OF TERMS

Absolute Address—the physical address of a hardware byte in main memory store.

Address Development—a hardware function which operates on a number of address elements to compute an absolute address which is used to refer to a location in main storage.

Addressing—locating an object by any of a number of virtual, logical, and physical means.

Address Space—the set of logical, segmented addresses corresponding to a process that the CPU is permitted to transform into absolute addresses during execution of that process.

Address Space Word—one of two words in a process control block which point to the segment table word array. The segment table word array defines the segment tables associated with the process.

Address Syllable—a logical address recognized by CPU hardware, normally an operand of an instruction.

Analyzer/Translator—that part of the static linker that first passes the control language stream to the linker; then, if the control language is error-free, the analyzer/translator converts it to tables and other structures for the static linker to use.

Asynchronous Processing—concurrent activation of more than one process.

Auxiliary Memory—is comprised of 64 flip-flops for storing miscellaneous states of the system and is located in ALU.

Base Register—the primary element in segment addressing, referenced by number in every address syllable.

Boundary Address Register—a visible hardware register that defines the lowest memory address accessible to firmware/software.

Call—see procedure call-Inward Call-Outward Call.

Central Process Unit—a part of a computer that includes circuits controlling the interpretation and execution of instructions.

Channel—a means of communicating between the processor subsystem and a peripheral subsystem. There are two types of channels, physical and logical. A physical channel is the hardware connection between the input/output control unit IOC and the peripheral control unit PCU. A logical channel is a software communications path between main memory and a single peripheral device.

Channel Command Entry—an instruction in a channel program.

Channel Command Word—an element of a channel command entry. Two channel command words constitute a channel command entry.

Channel Program—a sequence of instructions that cause a specific input/output i/o operation to be performed by a peripheral device.

Complementary Code—a code in some instructions which together with the operation code defines the function of Compilation Unit—the single object-code module that results from compiling or assembling one procedure in any high level language processor. The CU is not executable unit it is linked.

Concurrency—apparent simultaneity.

Condition Field—a 4-bit field in a branch instruction. Each bit of the field corresponds to a setting of the condition code in the status register bits 0 and 1.

Contest Indicator—a hardware structure located in auxiliary memory and indicates a new entry was placed in the ready queue, and there may be possible content for priority.

Data Address Space—the set of logical record addresses accessible by a process through data management; consists of four elements; logical fields, logical records, data base pages, and files.

Data Descriptor—an information structure which is used in indirect addressing and as a description in data manipulation.

Decor—the functional characteristics or architecture of a computer system.

Decor Extension Mode—a mode of operation permitting the operating of the system in emulation mode.

Descriptor—a 32-or 64-bit field used in developing the address of any data field. It is one of many pointers in the addressing scheme of the invention.

Descriptor Block—a data block containing any number and variety of descriptor declarations except semaphore descriptors. No other data is allowed.

Device Adapter—electronics which adapts a specific device to a

Device Adapter Interface—the interface between a device adapter and its associated peripheral controller(s).

Device Control—a software facility which handles device specific characteristics.

Dispatcher—the firmware responsible for dispatching processes in the CPU.

Dispatching—a field within the instruction format or a data descriptor which provides relative position information within a segment.

Displacement Addressing—a form of direct addressing in which the operand defines a location relative either to the base of the immediate segment or to the current location counter.

Dynamic Addressing—addressing which results in resolution, during execution, of references defined within the process group.

Editor—that part of the static linker that format and outputs any or all of the information that results from linking a particular procedure.

Effective Address—a logical, as opposed to physical, address consisting of a segment table number, a segment table entry, and a segment relative address. These elements show the way to a particular segment segment descriptor, which eventually points to the segment being referenced.

Emulation Mode—operation of a computer so as to initiate another computer, and appear to operate in the other computer's environment.

Exception—an exception occurs when the hardware detects the existence of some condition that has been specified as requiring special handling.

Event—anything observed in a system by a process which may be of interest to some other process.

Firmware—that part of a hardware unit implementation which utilizes a form of micro-programmed control.

G, D Name—the name used by the hardware to refer to a semaphore. G, the G-segment name is the number of the entry in the G-table containing the segment descriptor; D is the relative address in the segment.

G-Segment—a segment containing semaphores which may be addressed using the G, D name form and associated mapping facility (the G-table).

G-Table—a table used for storage mapping (locating a G-segment) when the G, D name form is used.

Gating—a facility for controlling entry to procedures in a (gated) segment through the use of procedure descriptors.

General Register—a 32-bit register available to executing processes which generally holds binary or bit string data. Certain general registers can be used for indexing (GR8 through GR15).

Index—a data structure which is maintained and operated upon by the system. The structure is visible to the user only in terms of a key which he presents for the purpose of making available or positioning to a specific record occurrence.

Indexing—modification of an address by a signed arithmetic value by adding something to something.

Index Register—a general register used for indexing (GR8 through GR15).

Indirection—a method of addressing whereby an address is used to obtain another address, rather than the actual data.

Indirection to Base—the form of indirection whereby a data descriptor containing a base register number and a displacement is found at the address referenced.

Indirection to Segment—the form of indirection whereby a data descriptor containing a segment address is found at the address referenced.

Indirect Segment Descriptor—a type of segment descriptor which contains information for addressing another segment descriptor, rather than a segment.

Instruction—the unit of execution of a central processor visible to a programmer.

Instruction Counter—a register associated with an executing process which contains the segmented address of the next instruction of the procedure being executed.

Interleave—sequential accessing of memory modules to reduce memory access time.

Interrupt—the discontinuance of a process in the system due to an event occurrence.

Interrupt Process—a process which is activated in response to an interrupt.

Inward Call—when one procedure execution in one ring number calls another procedure to execute in a lower ring number.

I/O Controller—a unit which provides the basic control for a specific I/O subsystem.

I/O Processor—potentially asynchronous system processes which deal primarily with the movement of data between peripheral storage or I/O devices and main storage.

J.P. Tables—a collection of logical addresses for locating a process control block.

Job—a unit of work for the system.

Job Control Language—a language for describing a job and its component parts.

Job Step—the major subdivision of a job leading to the execution of a program defined by a JCL statement.

Job Step Table—a system table used to map the first part of a process name, i.e., to locate the process group table.

Linked Module—the output of the static linker. It is a consolidated group of compilation units (CU) whose cross-references were resolved by the static linker.

Linking—see static linking.

Logical Channel—see channel.

Logical Processor—the collection of hardware resources and control information necessary for the execution of a process.

Main Storage—all addressable storage from which instructions can be executed or from which data can be loaded directly into registers.

Magnetic Tape Controller—the elements of the peripheral subsystem related to magnetic tape devices.

Mass Storage Controller—the elements of the peripheral subsystem related to mass storage devices.

Memory Management—operating system facilities for the allocation, relocation, and disallocation of physical memory.

Message—information transmitted from a source or to a destination—neither being a file.

Microinstruction—same as microinstruction word, and control store word.

Micro-program—a set of machine codes used to implement the control functions of a processor.

Multiplex—to share a hard resource, such as memory, usually by time division.

Multi-programming—the concurrent execution of two or more programs by a single computer.

Native Mode—operation of a computer in its native environment.

Offset—in address development, the number of bytes after the beginning of the segment at which an addressed part of the segment starts.

Operating System—a system of basic software designed to support the efficient operation of user software.

Outward Call—when one procedure executing in one ring number calls another procedure to execute in a higher ring number.

Peripheral Control Unit—a stand-alone micro-programmed processor which executes channel programs to perform I/O operations.

Peripheral Subsystem Interface—a standard interface used for transfer and control between free-standing peripheral control units and I/O control units.

Physical Channel—see channel.

Physical Data Structure—a complete definition of the organization of data as it is physically recorded on media.

Physical I/O—that part of the operating system which initiates and controls the transfer of data between memory and peripheral or terminal devices.

Physical Storage—hardware used for the storage of data. It is composed of various types of recording media and the recording/reading hardware.

P-operation—a machine instruction involving a semaphore which causes a process to enter the wait state or to receive a message.

Privileged Instruction—an instruction which must be executed in ring 0.

Procedure—a named software function or algorithm which is executable by a processor without concurrency: a Fortran subroutine, a Cobol program, a PL/1 internal procedure.

Procedure Call—a mechanism for creating a stack frame within a stack segment.

Procedure Descriptor—a word containing the location and entry point of a procedure.

Procedure Segment—the type of segment whose contents represents a procedure, procedures, or part of a procedure.

Process—the ordered execution of instructions without concurrency by a processor, either central or i/o.

Process Address Space—the memory addresses which may be referenced or to which control may be transferred during a particular process.

Process Control Block—a data structure (hardware defined and recognizable) that contains information needed to specify the state of a process at any given time.

Process Group—a related set of processes, usually those necessary for the performance of a single job-step.

Process Group Builder—that part of the static linker whose actions yield the linked module.

Process Group Loader—an operating system facility that makes final resolutions in a linked module to create an executable process group then it loads the process group into memory and starts its execution.

Process Group Table—see P Table.

Process Link—an entry in a ready process or waiting process queue.

Process State—the dynamic condition of a CPU process e.g., running, ready, waiting, or suspended.

Process Switch—the hardware function that disassociates one process from the central processor and associates another.

Process Synchronization—the functions that act to coordinate the asynchronous activity among processes. These functions generally involve semaphores and the P and V operations.

Processor—a unit capable of receiving data, manipulating it, supplying results, and controlling its sequence of operations in response to stored programs: short for central processor, generic for central processor, peripheral processor, or hardware/software processor.

Program—the specification of the procedural and associated information necessary to solve a problem, i.e. the ordered collection of instructions which is executed by the computer and operates on data to perform a user's job or some phase of that job.

Program Execution—the activity of a process in conformance to program specification.

Protection—the function, enforced by hardware and software, of preventing processes from interferring with each other or sharing each other's address space in an unauthorized manner.

P-Table—a hardware defined data structure containing entries, each pointing to the origin of a process control block. The P-table entries point to the total set of PCB's comprising a process group at any given time. Also called process group table.

Q/PR/RDY—queue of processes ready i.e. a ready-queue.

Queue—an ordered list of entities awaiting information, process or availability.

Ready State—a process state in which no processor is associated but all necessary resources, except a processor, are available for changing to the running state.

Relative Address—the incremental/decremental location of some object relative to another.

Relocation—movement of a segment from one location in main storage to another including the adjustment of all required references to its previous location.

Return—the function and operations necessary to resume the action of a procedure at a point immediately following the point where it entered some other procedure.

Ring—a protection attribute of a segment that restricts the read, write, and execute access of process to that segment. A level of privilege of a process for read, write or execute.

Rolling-in—performing the operation necessary to give control of a processor to a new process.

Rolling-out—performing the operations necessary to take away control of a processor by a process.

Running State—the dynamic condition of a process (connected to a CPU) that is executing.

Scratch Pat Memory—256 locations in ALU for storing CPU control information—also known as a local store unit.

Scheduling—determining the sequence of operations.

Scientific Registers—a 64-bit register used in the manipulation of binary floating point numbers. There are four scientific registers in the invention when the system has the scientific option.

Segment—a contiguous main memory space treated as a unit.

Segmentation—the use of a division of main memory into logical groupings called segments rather than into a single linear store.

Segment Base—the current origin of the segment. This is one of the fields in a segment descriptor word.

Segment Descriptor—entry in a segment table defining the characteristics of a segment or pointing to a segment descriptor.

Segmented Address—see effective address.

Segment Number—the identification of a particular segment consisting of a segment table number (selecting one of the segment tables of the process) and a segment table entry of that chosen table.

Segment Relative Address—during address development, the final value to be added to the segment base to obtain the absolute address.

Segment Table—a table containing segment descriptors used to establish the addressability of a process to its segments. The collection of segment tables of a process defines the address space for that process.

Segment Table Entry—an item in a segment table. Each segment table entry is a segment descriptor.

Segment Table Word—an entry in a segment table word array pointing to the segment tables of a process. The array is pointed to by one of two address space words in the process control block.

Semaphore—data structures used to control communication between processes.

Semaphore Block—a data block containing only semaphore descriptor declarations.

Stack—a mechanism that accepts, stores, and allows retrieval of data on a last-in-first-out basis. Comprised of a number of contiguous portions called stack frames.

Stack Active Area—the portion of the current stack frame that holds a pointer to the saving area, the caller's instruction counter, parameter space and local variables—in short, the data of the current frame most likely to be useful to execution of the called procedure.

Stack Base Words—a group of three words in a process control block which contain the segmented address of the stack segments for rings 0, 1, and 2 associated with the process.

Stack Frame—a contiguous part of the stack segment holding the data stored for a single procedure call.

Stack Operations—the push-down and pop-up operations of storing and retrieving information to/from the stack. In practice, manipulation of the pointers used to reference the information stored in the stack.

Stack Overflow—the action of attempting to store more information into the stack then the available space can hold. This is detected by hardware.

Stack Register—see T register.

Stack Segment—the segment of a process that contains its stack.

Static Linking—an intermediate step between compiling a source procedure and executing the object form of that procedure; linking resolves the external references made to and from that procedure.

Status Register—an 8-bit register which specifies the status of the procedure currently being executed.

Swapping—releasing the main memory space occupied by a segment by writing the segment out to secondary storage. The actual writing to secondary storage may be suppressed if the segment has not been modified since the last time it was read in.

Synchronization—having a fixed relationship in time; synchronized execution of two or more processes.

System Base—a fixed area in main memory which acts as a root for all information structures.

Task—the smallest unit of user-defined work consisting only of a single stream of non-concurrent instructions.

T Register—a software visible hardware register which contains the segmented address of the top of the procedure stack.

Unit Record Controller—the elements of the peripheral subsystem related to unit record devices such as card equipment, paper tape equipment, and line printers.

User Process Group—the internal representation of any job step, as opposed to a system process group which exists independently of any job.

Vacant Indicator—a hardware structure that indicates that the process which had control of the CP has suspended itself i.e. no CJP in the CPU. Located in Auxiliary Register, of the ALU.

Virtual Memory—an addressing concept that allows a programmer to code without regard to physical memory size; virtual memory manager automatically manages the exchange of segments between main memory and secondary storage.

V-Operation—a machine instruction intended for interprocess signaling the completion of an event. A V-OP operates on a designated semaphore.

ABBREVIATIONS

ACU—address control unit
ALU—arithmetic and logic unit
AS—address syllable
ASW—address space word
BAR—boundary address register
BCD—binary coded decimal
BR—base register
CCE—channel command entry
CCU—channel control unit
CMRN—the callers maximum ring number
CCW—channel command word
CET—current state entry time
CIA—control store interface adapter
CJP—currently executing process
CPU—central process unit
CU—compilation unit
CSU—control store unit
D—displacement
DMU—data management unit
DA—device adapter
EAR—effective address ring
EXW—exception word
GR—general register
GTW—G-table word
IC—instruction counter
IFU—instruction fetch unit
I/O—input/output
IOC—input/output controller
IPQW—internal process queue word
IR—index register
ITBB—indirect to base register
ITS—indirect to segment
J—job
JCL—job control language
JTW—J-table word
LCT—logical channel table
LIFO—last-in-first-out
LSU—local store memory or scratch pad memory
MBZ—must be zero
MOS—metal oxide semiconductor
MAXR—the maximum ring number at which a procedure may execute MAXR is found in the segment descriptor of $SEG_{EP}$.
MSC—mass storage controller
MTC—magnetic tape controller
NFS—non-functional status
NPRN—new process ring number
NJP—new process replacing the currently executing process
PCB—process control block
PCT—physical channel table
PCU—peripheral control unit
PL/1—programming language/one
PMW—process main word
Q/PR/RDY—queue of processes ready
RD—read ring
RHU—reserved for hardware use
RPW—running process word
RSU—reserved for software use
RTA—ready time accounting
RTO—residual time out
SBW—stack base word
SEG—segment number
SKW—stack word
$SEG_{EP}$—the segment which contains the entry point as found in the procedure descriptor
$SEG_{PD}$—the segment which contains the procedure descriptor
SR—scientific register
SRA—segment relative address
STE—segment table entry
STN—segment table number
STR—status register
STW—segment table word
STWA—segment table word array
T—T-register (stack register)
URC—unit record controller
WR—write ring
WTA—waiting time accounting

REFERENCES

1. Dijkstra, E. W., Co-Operating Sequential Processes. Programming Languages. F. Gennuvs, Ed. Academic Press. New York 1968. [First published as Report EWD, Department of Mathematics, Technological University, Eindhoven, The Netherlands, 1965].
2. Patil, S. S., Coordination of Asynchronous Events. Report MAC-TR-72. Project MAC, M.I.T., Cambridge, Mass., June 1970.
3. Patil, S. S., Limitations and Capabilities of Dijkstra's Semaphore Primitives. Computation Structures Group, Memo No. 57, Project MAC, M.I.T., Cambridge, Mass., February 1971.
4. Holt, A. W. and F. Commoner. Events and Conditions. Record of the Project MAC Conference on Concurrent Systems and Parallel Computations. Association for Computing Machinery, June 1970, pp. 3-52.
5. Bachman, C. W., Bouvard, J., Architecture Definition Technique: Its Objectives, Theory, Process, Facilities and Practice. Proceedings of the 1972 ACM SIGFIDET Workshop, DATA DESCRIPTION, ACCESS AND CONTROL. Association for Computing Machinery, November 1972.
6. Bachman, C. W., Data Structure Diagrams, DATA BASE (Quarterly Newsletter of ACM SIGBPD). Volume 1, Number 2, Summer 1969.

We claim:

1. In combination with a multiprogram computer system having a plurality of resources and also having a plurality of processes, each process capable of assuming a running, ready, wait or suspended state, and having an extended semaphore mechanism associated with an event whose occurrence is the detection in any of a first plurality of processes of a condition which is significant to any of a second plurality of processes, a deadlock detection system for detecting the situation wherein any first of said processes is waiting for any one or a plurality of said resources which can never become available to said any first of said processes, said deadlock detection system comprising:

(a) first means for establishing on behalf of said any of said second processes an interest in at least one event occurrence in any of said first plurality of processes;

(b) second means, coupled to said first means, for specifying the condition which constitutes an event occurrence of interest to any of said second processes;

(c) third means, coupled to said first and second means, for monitoring on behalf of said any of said second plurality of processes for said event occurrence, in said any of said first plurality of processes; and (d) fourth means coupled to said first and second means for notifying said first means that said one event occurrence in said any of said first plurality of processes cannot occur.

2. The deadlock detection system as recited in claim 1 including fifth means coupled to said first, third and fourth means, for preventing the establishment on behalf of any of said second processes an interest in said one event occurrence of said any of said first plurality of processes.

3. A deadlock detection mechanism for detecting in a computer system the situation wherein any of a first plurality of processes is waiting for any of a first plurality of resource which can never become available to said any first of said processes, said deadlock detection mechanism comprising:

(a) first means for requesting on behalf of said any first of said processes the assignment of any of a first plurality of resource to said any first of said processes;

(b) second means, coupled to said first means, for recording the assignment of any of a first plurality of resource if said any of a first plurality is currently available;

(c) third means, coupled to said second means, for notifying said any first of said processes of assignment of a resource of said first plurality of resources;

(d) fourth means, coupled to said first means, for causing said any first of said processes to assume the wait-state and to wait for the availability and assignment of requested said any of a first plurality of resource if all resources of said first plurality of resources are assigned to any second of said processes and not currently available;

(e) fifth means, coupled with said second means, for requesting the release of assignment of said resource of a first plurality of resources by said any second of said processes to which it is currently assigned;

(f) sixth means, coupled to said second and fifth means, for causing any first of said processes, which has been waiting upon the availability for assignment of any of a first plurality of resource, to assume the ready-state if said any of a first plurality of resource becomes available for assignment;

(g) seventh means, coupled to said second and fourth means, for examining the resource/process relationships of any process currently waiting upon the availability of a resource and any resource currently assigned to a process;

(h) eighth means, coupled to said seventh means, for determining when all said second of said resources are waiting upon the availability of any of a second plurality of resource which are currently assigned directly to said any first of said processes or which are assigned indirectly through third, fourth, etc. process/waiting/resource-assignment pairs to said any first of said processes which circular relationship would constitute a deadlock; and, (i) ninth means, coupled to said eighth means, for notifying said any first of said processes of deadlock detection and the non assignment of any of a first plurality of resource.

4. In combination with a multiprogramming computer system having a plurality of resources and also having a plurality of processes, each process capable of assuming a running, ready, wait or suspended state and each resource capable of assuming a shareably assigned, exclusively assigned or available state a deadlock detection system for detecting the situation wherein any first of said processes is waiting for a resource which can never become available to said any first of said processes said deadlock detection system comprising:

(a) first means for requesting on behalf of said any first of said processes the shared assignment or exclusive assignment of any first of said resources to said any first of said processes;

(b) second means, coupled with first means for recording the exclusive assignment of said any first of said resources to said any first of said process if said any first of said resources is currently available for exclusive assignment;

(c) third means, coupled with first means, for recording the shared assignment of said any first of said resources to said any first of said processes if said any first of said resources is currently available for shareable assignment;

(d) fourth means, coupled with first means, for notifying said first of said processes of assignment of said any of said resources;

(e) fifth means, coupled to said first means, for causing said any first of said processes to assume the waitstate and to wait for the availability and assignment of requested said any first of said resources if said any first of said resources is assigned exclusively to any second of said processes and not currently available for either exclusive or shared assignment;

(f) sixth means, coupled to said first means, for causing said any first of said processes to assume the wait-state and to wait for the availability and assignment of requested said any first of said resources if said any first of said resources is assigned shareably to any one or several second of said processes and not currently available for exclusive assignment;

(g) seventh means, coupled to said second and third means, for requesting release of said assignment of said any second of said processes to which it is currently assigned;

(h) eighth means, coupled to said second, third and seventh means, for causing any first of said processes, which has been waiting upon the availability for assignment of said any first of said resources to assume the ready-state if said any first of said resources becomes available for assignment;

(i) ninth means, coupled with said second, third, fifth and sixth means for examining the process/resource relationships of any process currently waiting upon the availability of a resource and any resource currently assigned to a process;

(j) tenth means, coupled to said ninth means, for determining when said second of said processes is waiting upon the availability of any second said resource which is currently directly assigned to said any first of said processes or which is assigned indirectly through third, fourth, etc., process-waiting resource assigned pairs to said any first of said processes which circular relationship would constitute a deadlock; and, (k) eleventh means, coupled to said tenth means, for notifying said any first process of deadlock detection and the non assignment of said first of said resources.

5. The combination as recited in claim 3 including tenth means for determining whether said first of said processes, when waited, would be waiting for either a specific resource or any resource within a specific resource class which specific resource or all resources within the specific resource class can never become available to said any first of said processes.

6. The combination as recited in claim 4 including twelfth means for determining whether said first of said processes, when waited, would be waiting for either a specific resource or any resource within a specific resource class which specific resource or all resources within the specific resource class can never become available to said any first of said processes.

7. A firmware/hardware deadlock detection system for a multiprogram computer system having semaphore architecture for interprocess communication and control, and having plural resource classes each with plural interchangeable resource objects, and plural processes each capable of assuming a running, ready, wait or suspended state, which comprises:

(a) event status requesting means responsive to said plural processes for communicating on behalf of said plural processes a request for exclusive access to resource object members of said plural resource classes;

(b) event status detection means responsive to said requesting means for defining a set of resource objects in a requested one of said plural resource classes and indicating the availability of each member of said set;

(c) process control means responsive to said requesting means for assigning a requesting one of said plural processes to a wait state;

(d) resource assignment means responsive to said detection means for exclusively assigning a member of said set to said requesting one of said plural processes; and (e) deadlock detection means in electrical communication with said assignment means and said process control means for signalling the occurrence of a deadlock condition in accordance with a logic decision tree wherein each member of said set is assigned to processes waiting on resource classes which in turn are assigned to waiting processes, and each process in the decision tree of each member of said set is in a wait state.

8. A firmware/hardware deadlock detection system for a computer system having semaphore architecture for interprocess communication and control, and having plural resource classes each with a reuseable resource object and plural processes each capable of assuming a running, ready, wait or suspended state, which comprises:

(a) event status requesting means in electrical communication with said plural processes for communicating on behalf of said plural processes exclusive or shared access requests for said resource object classes;

(b) event status detection means responsive to said requesting means for indicating the availability of any requested one of said plural resource classes for exclusive and shared assignment;

(c) process control means responsive to said requesting means for assigning a requesting one of said plural processes to a wait state;

(d) resource assignment means responsive to said detection means for exclusively or sharedly assigning said any requested one of said plural resource classes; and (e) deadlock detection means in electrical communication with said assignment means and said process control means for indicating the occurrence of a deadlock condition if said any requested one of said plural resource classes is assigned to a second of said plural processes waiting on a second of said plural resource classes assigned to said any requesting one process, or if said any requested one of said plural resource classes is assigned to a set of said plural processes and, in accordance with a logic decision tree wherein each member of said set is waiting on resource classes which in turn are assigned to waiting processes, each process in the decision tree of each member of said set is in a wait state.

9. A firmware/hardware deadlock detection system for a multiprogram computer system having semaphore architecture for interprocess communication and control, and having plural resource classes each with plural interchangeable resource objects, and plural processes each capable of assuming a running, ready, wait or suspended state, which comprises:

(a) event status requesting means in electrical communication with said plural processes for communicating on behalf of said plural processes shared access requests for resource object members of said plural resource classes;

(b) event status detection means responsive to said requesting means for defining a set of resource objects in a requested one of said plural resource classes and indicating the availability of each member of said set for a shared assignment;

(c) process control means responsive to said requesting means for assigning a requesting one of said plural processes to a wait state;

(d) resource assignment means responsive to said detection means for sharedly assigning a member of said set to said requesting one of said plural processes; and (e) deadlock detection means in electrical communication with said assignment means and said process control means for signalling the occurrence of a deadlock condition in accordance with a logic decision tree wherein each member of said set is assigned to processes waiting on resource classes which in turn are assigned to waiting processes, and each process in the decision tree of each member of said set is in the wait state.

10. A firmware/hardware method for detecting a deadlock condition in a multiprogram computer system having semaphore architecture for interprocess communication and control, and having plural resource classes each comprised of plural interchangeable resource object members, and plural processes each capable of assuming a running, ready, wait or suspended state, which comprises:
- (a) upon a requesting one of said plural processes seeking access to a resource object member of a first of said plural resource classes, examining a state queue of said first class to detect the availability of class members;
- (b) if at least one member of said first class is available, assigning said one member to said requesting one process;
- (c) if no member of said first class is available, examining an assignment queue of any first member of said first class to identify any second of said plural processes to which said first member is assigned;
- (d) comparing said requesting one process and said second process to detect an equivalence;
- (e) if an equivalence occurs, examining said first class for any second member, and if said second member is not detected, indicating a deadlock condition;
- (f) if said second member is detected, examining an assignment queue of said second member to detect any third of said plural processes to which said second member is assigned and repeating said method beginning at step (d) with said third process replacing said second process;
- (g) if an equivalence is not detected at step (e), examining the state queue of said second process to detect a wait state or a running state;
- (h) if a wait state is detected, examining the assignment queue of said second process to detect an any second of said plural resource classes which said second process is waiting upon;
- (i) repeating said method beginning at step (a) with said second class replacing said first class, and assigning said requesting one process to a wait state if a process to which any member of said second class is assigned is in a running state, and otherwise indicating the occurrence of a deadlock condition;
- (j) if a deadlock condition is detected in step (i), examining said first class for an any third member and indicating the occurrence of a deadlock condition if said first class is exhausted;
- (k) if said first class is not exhausted, repeating said method beginning with step (c) with said third member replacing said first member; and
- (l) if a running state is detected at step (g), assigning said requesting one process to a wait state pending the availability of any member of said first class.

11. A firmware/hardware method of detecting a deadlock condition in a multiprogram computer system having a semaphore architecture for interprocess communication between a plurality of processes each capable of assuming a running, ready, wait or suspended state, said computer system further having a plurality of resource classes each with a reuseable resource object, which comprises:
- (a) upon one of said plurality of processes requesting either exclusive or shared access to a first resource object, examining the state queue of said first resource object to detect an available or an assigned state;
- (b) if said first resource object is available, assigning said first resource object to said one process;
- (c) if said first resource object is assigned, examining an assignment queue of said first resource object to identify any second of said plurality of processes to which said first resource object is assigned;
- (d) comparing said one process to said second process, and indicating a deadlock condition to restart said one process if an equivalence occurs;
- (e) if an equivalence does not occur, examining the state queue of said second process to detect a running or a wait state;
- (f) if a running state is detected, examining the assignment queue of said first resource object to detect any third of said plurality of processes to which said first resource object is assigned, and if said third process is detected, repeating said method beginning at step (d) with said third process replacing said second process;
- (g) if said third process is not detected, assigning said one process to a wait state pending the availability of said first resource object;
- (h) if a wait state is detected at step (e), examining the assignment queue of said second process to detect a second resource object upon which said second process is waiting and repeating said method beginning at step (c) with said second resource object replacing said first resource object;
- (i) if a deadlock condition is not detected in step (h), examining the assignment queue of said first resource object to detect an assignment to any fourth of said plurality of processes and repeating said method beginning at step (d) with said fourth process replacing said second process; and
- (j) if an assignment to said fourth process is not detected, assigning said one process to a wait state pending the availability of said first resource object.

12. A firmware/hardware method of detecting a deadlock condition in a multiprogram computer system having a semaphore architecture for interprocess communication between a plurality of processes each capable of assuming a running, ready, wait or suspended state, said computer system further having a plurality of resource classes each with plural interchangeable resource objects, which comprises:
- (a) upon any first of said plurality of said processes requesting a shared access to a member of a first set of resource objects in any first of said plurality of resource classes, examining the state queue of said first resource class to detect the availability of each member of said first set;
- (b) if at least one member of said first set is available, assigning said one member to said first process;
- (c) if no member of said first set is available, examining an assignment queue of any first member of said first set to identify any second of said plurality of processes to which said first member is assigned;
- (d) comparing said first process and said second process to detect an equivalence;
- (e) if an equivalence is not detected, examining the state queue of said second process to detect a running or wait state;
- (f) if a wait state is detected, examining the assignment queue of said second process to identify any second of said plurality of resource classes upon which said second process is waiting and repeating said method beginning at step (a) with said second resource class replacing said first resource class;

(g) if a deadlock condition is not detected in step (f), examining the assignment queue of said first member to detect and identify an any third process to which said first member is assigned;

(h) assigning said first process to a wait state if said third process is not detected, and repeating said method beginning with step (d) with said third process replacing said second process if said third process is detected;

(i) if a deadlock condition is detected at step (f), examining said first set to detect and identify an any second member, and indicating the occurrence of a deadlock condition to restart said first process if said second member is not detected;

(j) if said second member is identified at step (i), examining the assignment queue of said second member to identify an any fourth of said plurality of processes to which said second member is assigned and repeating said method beginning at step (d) with said second member and said fourth process respectively replacing said first member and said second process;

(k) if an equivalence is detected in step (d), examining said first set to detect and identify an any third member of said first set, and indicating a deadlock condition to restart said first process if said third member is not detected;

(l) if said third member is identified, examining the assignment queue of said third member to identify an any fifth of said plurality of processes to which said third member is assigned, and repeating said method beginning at step (d) with said third member and said fifth process respectively replacing said first member and said second process;

(m) if a running state is detected at step (e), examining the assignment queue of said first member to detect an any sixth of said plurality of processes to which said first member is assigned, and assigning said first process to a wait state if said sixth process is not detected; and (n) if said sixth process is detected at step (m), repeating said method beginning with step (d) with said sixth process replacing said second process.

* * * * *